United States Patent
Koyama et al.

(10) Patent No.: US 12,527,979 B2
(45) Date of Patent: Jan. 20, 2026

(54) TREATMENT OF HER3-MUTATED CANCER BY ADMINISTRATION OF ANTI-HER3 ANTIBODY-DRUG CONJUGATE

(71) Applicant: DAIICHI SANKYO COMPANY, LIMITED, Tokyo (JP)

(72) Inventors: Kumiko Koyama, Tokyo (JP); Yoshinobu Shiose, Tokyo (JP); Suguru Ueno, Tokyo (JP)

(73) Assignee: DAIICHI SANKYO COMPANY, LIMITED, Tokyo (JP)

( * ) Notice: Subject to any disclaimer, the term of this patent is extended or adjusted under 35 U.S.C. 154(b) by 934 days.

(21) Appl. No.: 17/276,394

(22) PCT Filed: Sep. 19, 2019

(86) PCT No.: PCT/JP2019/036668
§ 371 (c)(1),
(2) Date: Mar. 15, 2021

(87) PCT Pub. No.: WO2020/059772
PCT Pub. Date: Mar. 26, 2020

(65) Prior Publication Data
US 2022/0072144 A1    Mar. 10, 2022

(30) Foreign Application Priority Data
Sep. 20, 2018   (JP) ................. 2018-175510

(51) Int. Cl.
*A61K 47/68*   (2017.01)
*A61P 1/00*   (2006.01)
*C07K 16/32*   (2006.01)

(52) U.S. Cl.
CPC .... *A61K 47/6855* (2017.08); *A61K 47/68037* (2023.08); *A61P 1/00* (2018.01); *C07K 16/32* (2013.01)

(58) Field of Classification Search
None
See application file for complete search history.

(56) References Cited

U.S. PATENT DOCUMENTS

| 6,214,345 B1 | 4/2001 | Firestone et al. |
| 2013/0195870 A1* | 8/2013 | Jaiswal .............. A61P 35/00 424/139.1 |

(Continued)

FOREIGN PATENT DOCUMENTS

| CA | 3053749 A1 | 9/2018 |
| EP | 3 590 534 A1 | 1/2020 |

(Continued)

OTHER PUBLICATIONS

"Daiichi Sankyo Initiates Phase 2 Study of DS-8201 in Patients with Advanced HER2-Overexpressing or HER2-Mutated Non-Squamous Non-Small Cell Lung Cancer", Daiichi Sankyo Company Limited News Release. May 31, 2018 (Year: 2018).*

(Continued)

*Primary Examiner* — Karl J Puttlitz
(74) *Attorney, Agent, or Firm* — Foley & Lardner LLP

(57) ABSTRACT

A therapeutic agent for HER3-mutated cancer containing an anti-HER3 antibody-drug conjugate as an active ingredient and/or a method of treatment for cancer, the method including administering an anti-HER3 antibody-drug conjugate to a subject determined to have HER3-mutated cancer.

22 Claims, 33 Drawing Sheets
Specification includes a Sequence Listing.

SEQ ID NO: 1 - Amino acid sequence of heavy chain of anti-HER3 antibody

QVQLQQWGAGLLKPSETLSLTCAVYGGSFSGYYWSWIR
QPPGKGLEWIGEINHSGSTNYNPSLKSRVTISVETSKN
QFSLKLSSVTAADTAVYYCARDKWTWYFDLWGRGTLVT
VSSASTKGPSVFPLAPSSKSTSGGTAALGCLVKDYFPE
PVTVSWNSGALTSGVHTFPAVLQSSGLYSLSSVVTVPS
SSLGTQTYICNVNHKPSNTKVDKRVEPKSCDKTHTCPP
CPAPELLGGPSVFLFPPKPKDTLMISRTPEVTCVVVDV
SHEDPEVKFNWYVDGVEVHNAKTKPREEQYNSTYRVVS
VLTVLHQDWLNGKEYKCKVSNKALPAPIEKTISKAKGQ
PREPQVYTLPPSREEMTKNQVSLTCLVKGFYPSDIAVE
WESNGQPENNYKTTPPVLDSDGSFFLYSKLTVDKSRWQ
QGNVFSCSVMHEALHNHYTQKSLSLSPGK

(56) References Cited

U.S. PATENT DOCUMENTS

| | | | |
|---|---|---|---|
| 2017/0021031 A1* | 1/2017 | Hettmann | A61K 47/6869 |
| 2020/0061031 A1* | 2/2020 | Yonesaka | A61K 31/506 |

FOREIGN PATENT DOCUMENTS

| | | | |
|---|---|---|---|
| JP | 2015-500638 A | 1/2015 | |
| JP | 2015-536336 A | 12/2015 | |
| JP | 2017-503784 A | 2/2017 | |
| JP | 2017-521050 A | 8/2017 | |
| JP | 2018-522822 A | 8/2018 | |
| WO | WO-02/083067 A2 | 10/2002 | |
| WO | WO-03/026577 A2 | 4/2003 | |
| WO | WO-2004/054622 A1 | 7/2004 | |
| WO | WO-2005/112919 A2 | 12/2005 | |
| WO | WO-2006/135371 A1 | 12/2006 | |
| WO | WO-2007/112193 A2 | 10/2007 | |
| WO | WO-2008/033891 A2 | 3/2008 | |
| WO | WO-2009/100194 A2 | 8/2009 | |
| WO | WO-2009/134976 A1 | 11/2009 | |
| WO | WO-2009/134977 A1 | 11/2009 | |
| WO | WO-2010/093395 A1 | 8/2010 | |
| WO | WO-2011/130613 A1 | 10/2011 | |
| WO | WO-2011/130616 A1 | 10/2011 | |
| WO | WO-2013/055993 A1 | 4/2013 | |
| WO | WO-2013/081645 A2 | 6/2013 | |
| WO | WO-2014/057687 A1 | 4/2014 | |
| WO | WO-2014/061277 A1 | 4/2014 | |
| WO | WO-2014/107024 A1 | 7/2014 | |
| WO | WO-2014/134457 A2 | 9/2014 | |
| WO | WO-2014/145090 A1 | 9/2014 | |
| WO | WO-2015/155998 A1 | 10/2015 | |
| WO | WO-2018159582 A1 * | 9/2018 | A61K 31/436 |

OTHER PUBLICATIONS

Chen et al., Determination of Drug-to-Antibody Ratio for Antibody-Drug Conjugates Purified from Serum, Agilent Technologies, pp. 1-9, 2016 (Year: 2016).*

Jaiswal et al., vol. 23, Issue 5, May 13, 2013, pp. 603-617 (Year: 2013).*

International Searching Authority, "International Search Report," issued in connection with International Patent Application No. PCT/JP2019/036668, dated Nov. 26, 2019.

International Searching Authority, Written Opinion, issued in connection with International Patent Application No. PCT/JP2019/036668, dated Nov. 26, 2019.

Alimandi et al., "Cooperative signaling of ErbB3 and ErbB2 in neoplastic transformation and human mammary carcinomas", Oncogene, 1994, pp. 1813-1821, vol. 10.

Alley et al., "Antibody-Drug Conjugates: targeted drug delivery for cancer", Current Opinion in Chemical Biology, Aug. 2010, pp. 529-537, vol. 14, Issue 4, 2010 Elsevier Ltd.

Damle, "Tumour-targeted chemotherapy with immunoconjugates of calicheamicin", Expert Opinion on Biological Therapy, 2004 pp. 1445-1452, vol. 4.

Defazio et al., "Expression of c-erbB Receptors, Heregulin and Oestrogen Receptor in Human breast Cell Lines", International Journal of Cancer, 2000, pp. 487-498, vol. 87, 2000 Wiley-Liss. Inc.

Ding et al., "Somatic mutations affect key pathways in lund adenocarcinoma", Nature, Oct. 2008, pp. 1069-1075, vol. 455, 2008 Macmillan Publisher Limited.

Ducry et al., "Antibody-Drug Conjuagtes: Linking Cytoxic Payloads to Monoclonal Antibodies", Bioconjugate Chemistry, Sep. 21, 2009, pp. 5-13, vol. 21, 2009 American Chemical Society.

Greenman et al., "Patterns of somatic mutation in human cancer genomes", Nature, Mar. 2007, pp. 153-158, vol. 446, 2007 Nature Publishing Group.

Burris et al., "Phase II Study of the Antibody Drug Conjugate Trastuzumab-DMI for the Treatment of Human Epidermal Growth Factor Receptor 2 (HER2)-Positive Breast Cancer After Prior HER2-Directed Therapy", Journal of Clinical Oncology, Feb. 1, 2011, pp. 398-405, vol. 29, No. 4, 2010 American Society of Clinical Oncology.

Jaiswal et al., "Oncogenic ERBB3 Mutations in Human Cancers", Cancer Cell, May 13, 2013, pp. 603-617, vol. 23, 2013 Elsevier Inc.

Jeong et al., "ERBB3 kinase domain mutations are rare in lung, breast and colon carcinomas, Letter to the Editor", International Journal of Cancer, 2006, pp. 2986-2987, vol. 119, 2006 Wiley-Liss, Inc.

Kan et al., "Diverse somatic mutation patterns and pathway alterations in human cancers", Nature, Aug. 12, 2010, pp. 869-873, vol. 466, 2010 Macmillan Publishers Limited.

Mishra et al., "Activating HER3 mutations in breast cancer", Oncotarget, 2018, pp. 27773-27788, vol. 9, No. 45.

Mishra et al., "Genomic alterations of ERBB receptors in cancer: clinical implications", Oncotarget, 2017, pp. 114371-114392, vol. 8, No. 69.

Naidu et al., "Expression of c-erbB3 protein in primary breast carcinomas", British Journal of Cancer, 1998, pp. 1385-1390, vol. 78, No. 10, 1998 Cancer Research Campaign.

Senter et al., "The discovery and development of brentuximab vedotin for use in relapsed Hodgkin lymphoma and systemic anaplastic large cell lymphoma", Nature Biotechnology, Jul. 2012, pp. 631-637, vol. 30, No. 7, 2012 Nature America, Inc.

Sergina et al., "Escape from HER family tyrosine kinase inhibitor therapy by the kinase inactive HER3", Nature, Author Manuscript, Jan. 2007, pp. 437-441, vol. 445.

Stransky et al., "The Mutational Landscape of Head and Neck Squamous Cell Carcinoma", Science, Aug. 26, 2011, pp. 1157-1160, vol. 333.

Wang et al., "Exome sequencing identifies frequent mutation of ARID1A in molecular subtypes of gastric cancer", Nature Genetics, Dec. 2011, pp. 1219-1223, vol. 43, No. 12, 2011 Nature America, Inc.

Hyman et al., "Abstract CT001: Neratinib in HER2 or HER3 mutant solid tumors: SUMMIT, a global, multi-histology, open-label, phase 2 "basket" study", AACR Annual Meeting 2017; Apr. 1-5, 2017, Washington, DC. Philadelphia (PA): AACR; Cancer Research, 2017, vol. 77, Issue 13, Supplement.

Author Unknown "Daiichi Sankyo Initiates Phase 2 Study of DS-8201 in Patients with Advanced HER2-Overexpressing or HER2-Mutated Non-Squamous Non-Small Cell Lung Cancer", DAIICHI Sankyo Company, Limited News Release, May 31, 2018.

Office Action dated Jul. 27, 2022 issued in corresponding Canadian Patent Application No. 3,113,207.

Daiichi Sankyo, "Daiichi Sankyo initiates Phase 2 study of DS-8201 in patients with advanced HER2-overexpressing or HER2-mutated non-squamous non-small cell lung cancer", Press Release, May 31, 2018.

Jaiswal et al., "Oncogenic ERBB3 mutations in human cancers", Cancer Cell, 2013, 23, 603-617.

Extended European Search Report issued in corresponding European Patent Application No. 19863647.4 dated Jun. 23, 2022.

* cited by examiner

[Figure 1]

SEQ ID NO: 1 - Amino acid sequence of heavy chain of anti-HER3 antibody

QVQLQQWGAGLLKPSETLSLTCAVYGGSFSGYYWSWIR
QPPGKGLEWIGEINHSGSTNYNPSLKSRVTISVETSKN
QFSLKLSSVTAADTAVYYCARDKWTWYFDLWGRGTLVT
VSSASTKGPSVFPLAPSSKSTSGGTAALGCLVKDYFPE
PVTVSWNSGALTSGVHTFPAVLQSSGLYSLSSVVTVPS
SSLGTQTYICNVNHKPSNTKVDKRVEPKSCDKTHTCPP
CPAPELLGGPSVFLFPPKPKDTLMISRTPEVTCVVVDV
SHEDPEVKFNWYVDGVEVHNAKTKPREEQYNSTYRVVS
VLTVLHQDWLNGKEYKCKVSNKALPAPIEKTISKAKGQ
PREPQVYTLPPSREEMTKNQVSLTCLVKGFYPSDIAVE
WESNGQPENNYKTTPPVLDSDGSFFLYSKLTVDKSRWQ
QGNVFSCSVMHEALHNHYTQKSLSLSPGK

[Figure 2]

SEQ ID NO: 2 - Amino acid sequence of light chain of anti-HER3 antibody

DIEMTQSPDSLAVSLGERATINCRSSQSVLYSSSNRNY
LAWYQQNPGQPPKLLIYWASTRESGVPDRFSGSGSGTD
FTLTISSLQAEDVAVYYCQQYYSTPRTFGQGTKVEIKR
TVAAPSVFIFPPSDEQLKSGTASVVCLLNNFYPREAKV
QWKVDNALQSGNSQESVTEQDSKDSTYSLSSTLTLSKA
DYEKHKVYACEVTHQGLSSPVTKSFNRGEC

[Figure 3]
HER3 expression
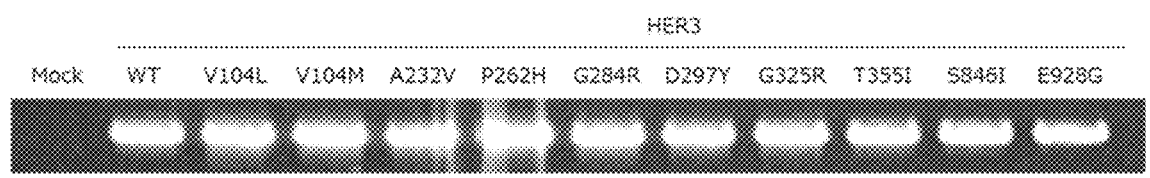
[Figure 4]
HER3 expression
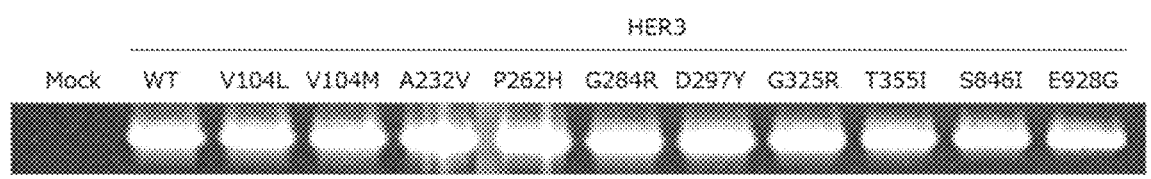
[Figure 5]
HER2 expression
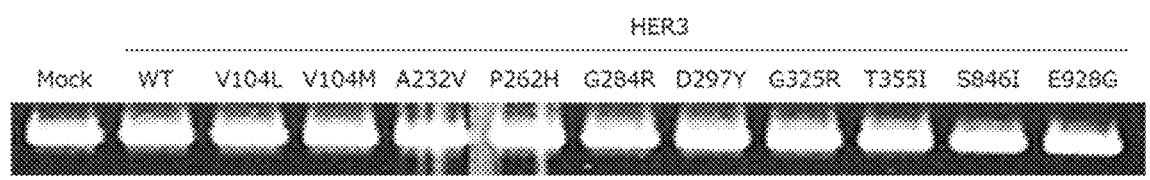

[Figure 6]
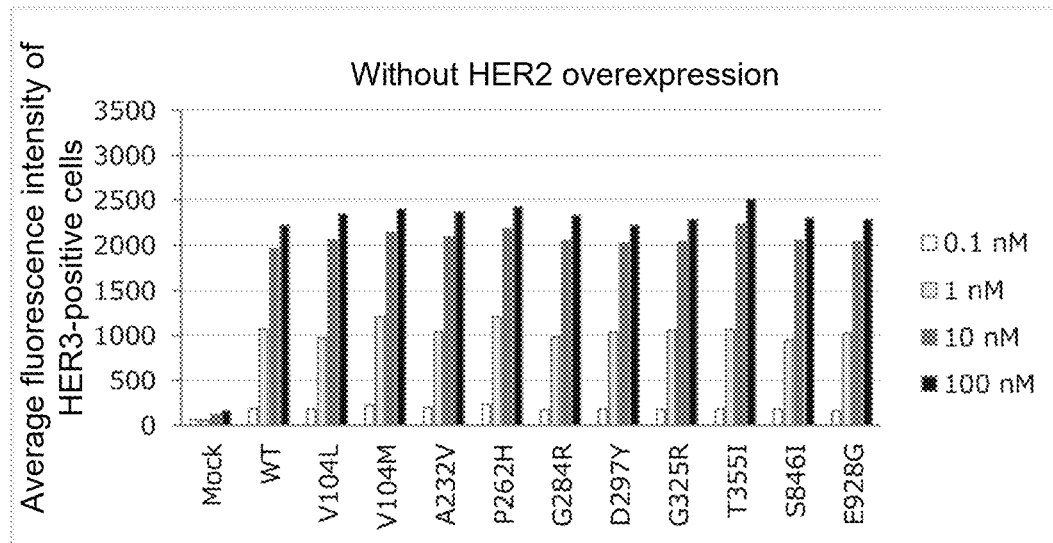
[Figure 7]
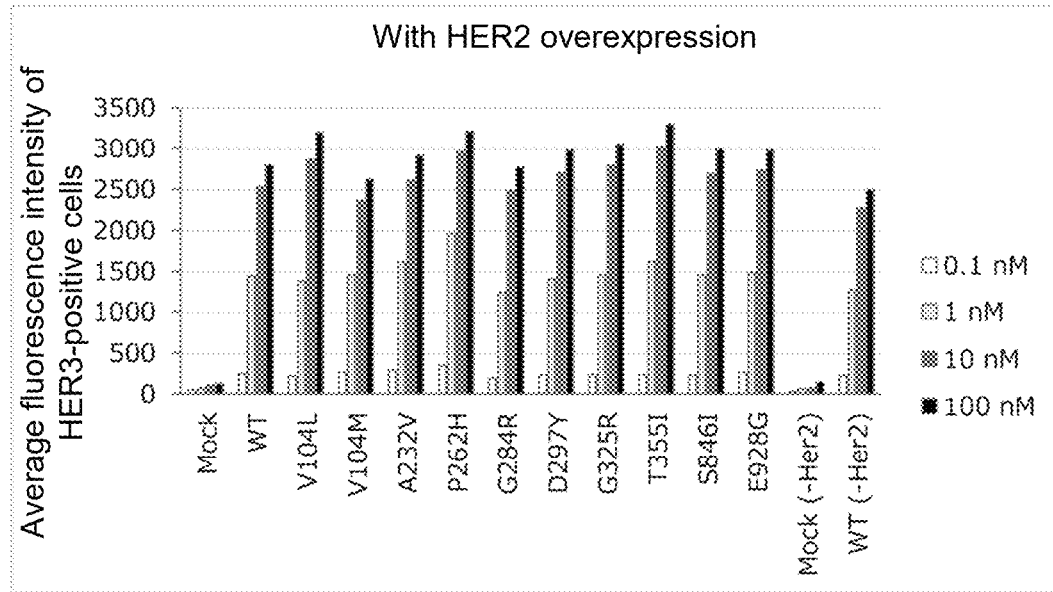

[Figure 8]
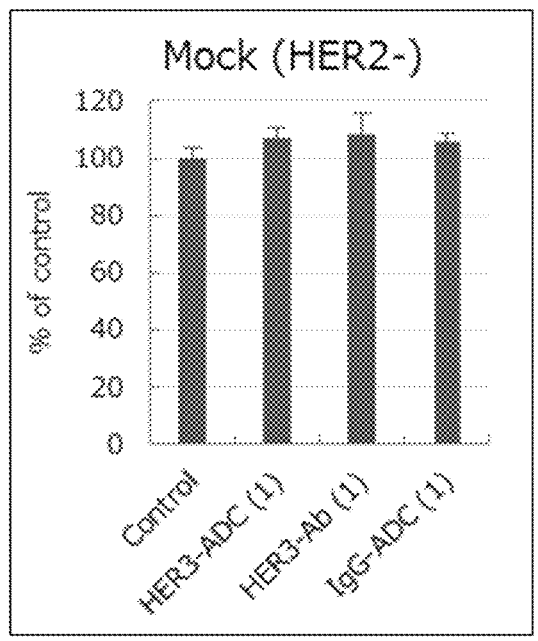
[Figure 9]
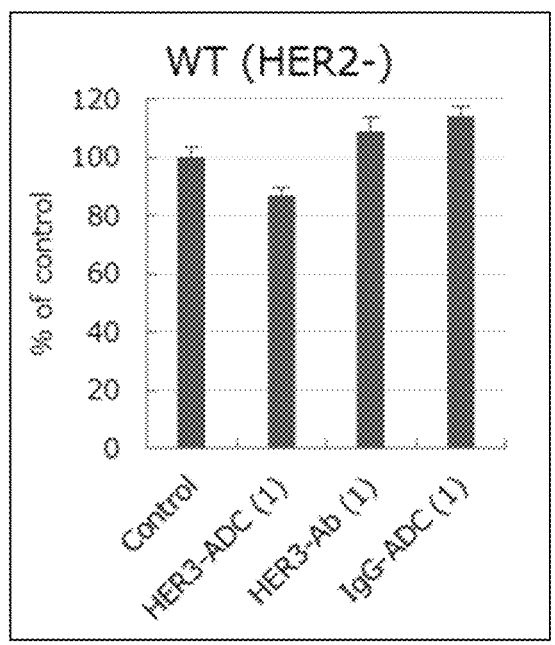

[Figure 10]
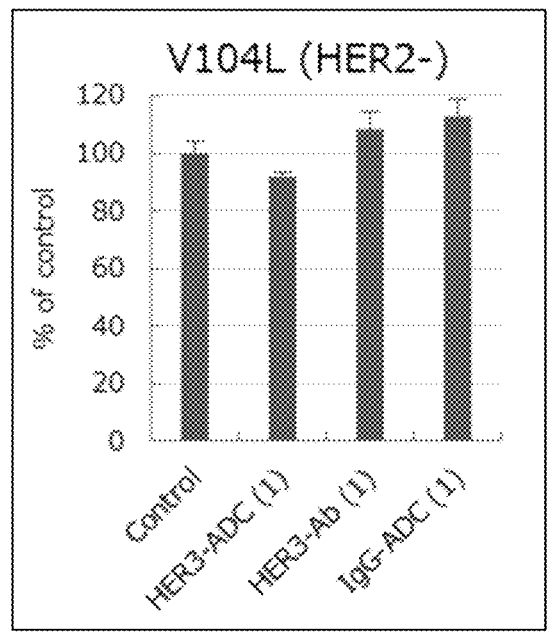
[Figure 11]
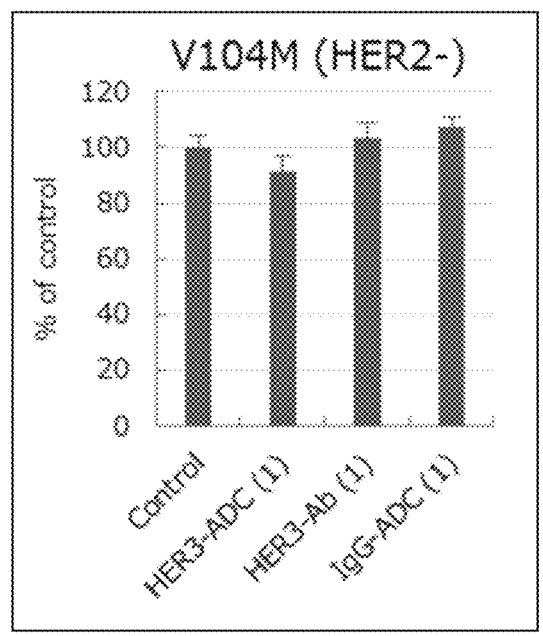

[Figure 12]
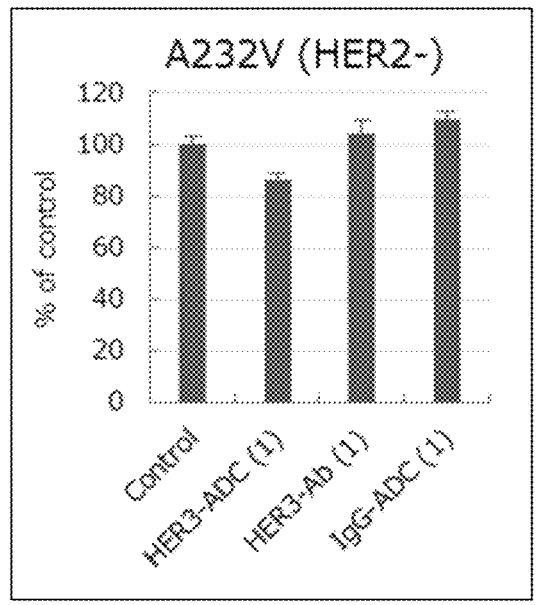
[Figure 13]
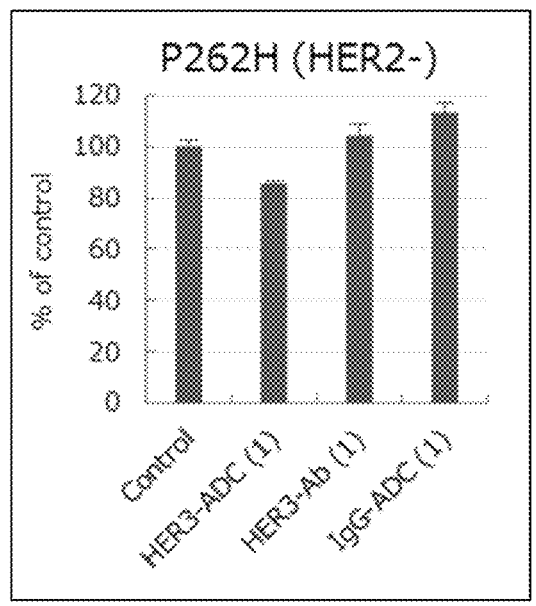

[Figure 14]
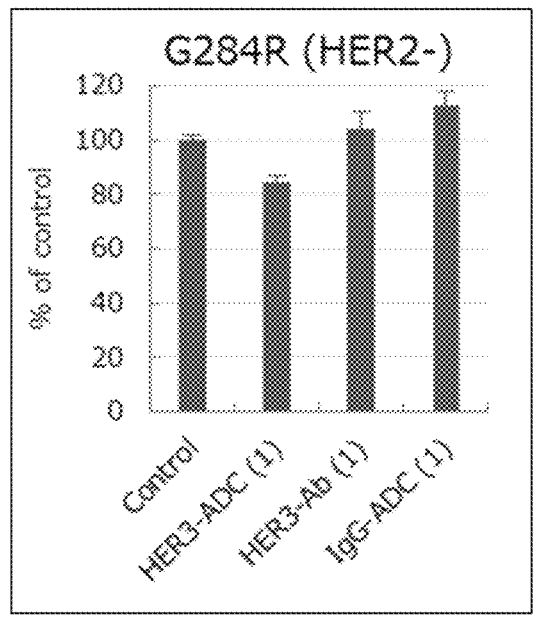
[Figure 15]
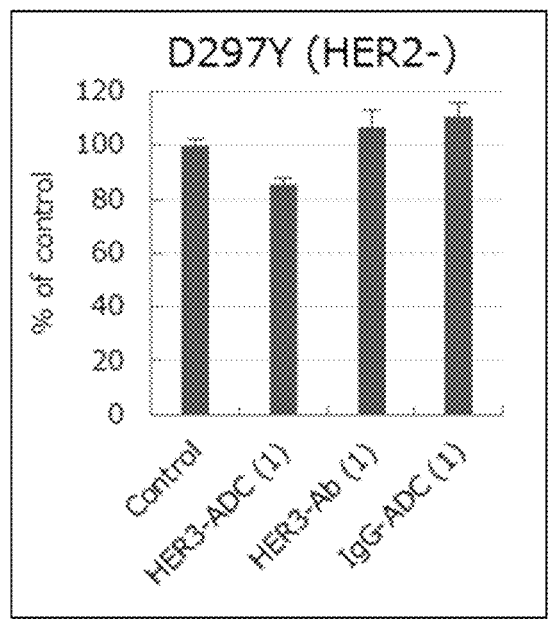

[Figure 16]
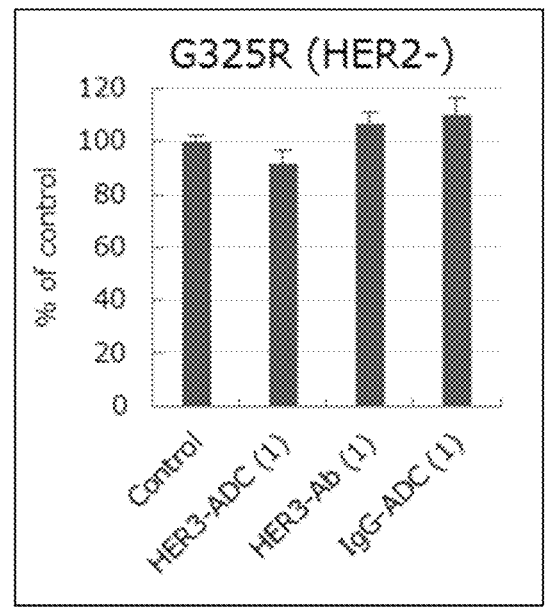
[Figure 17]
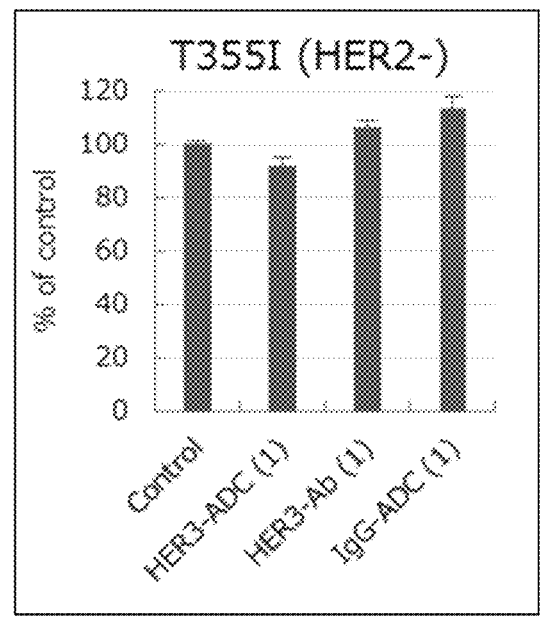

[Figure 18]
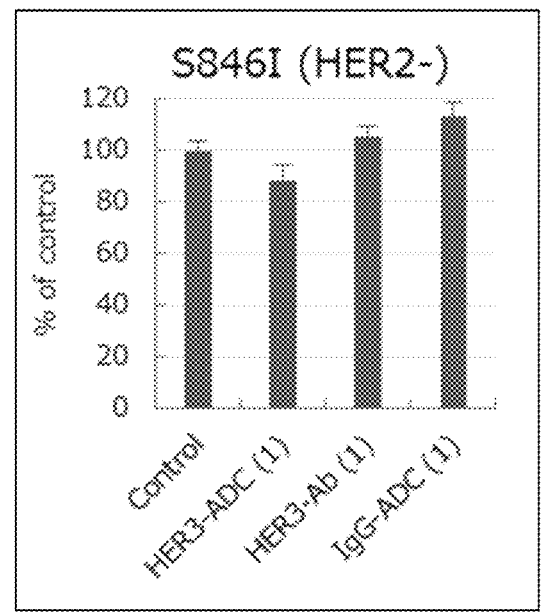
[Figure 19]
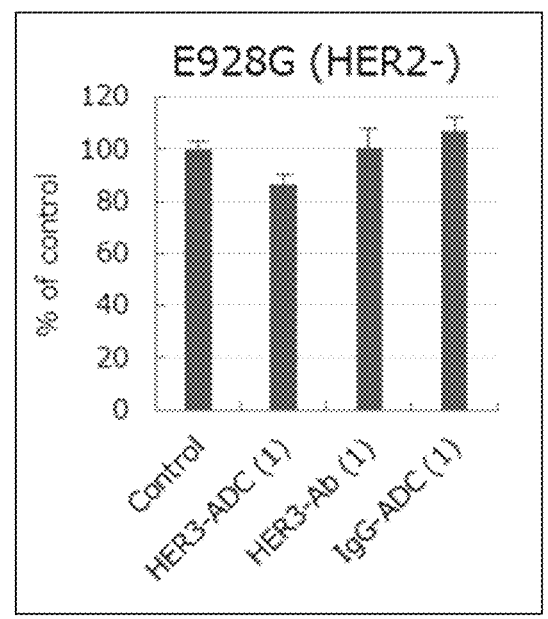

[Figure 20]
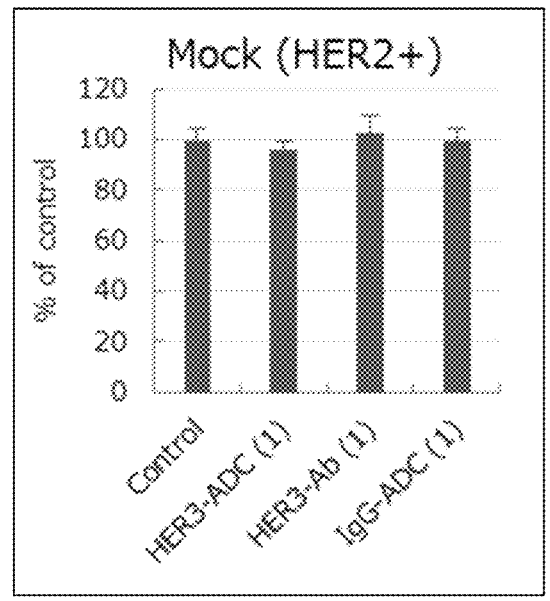
[Figure 21]
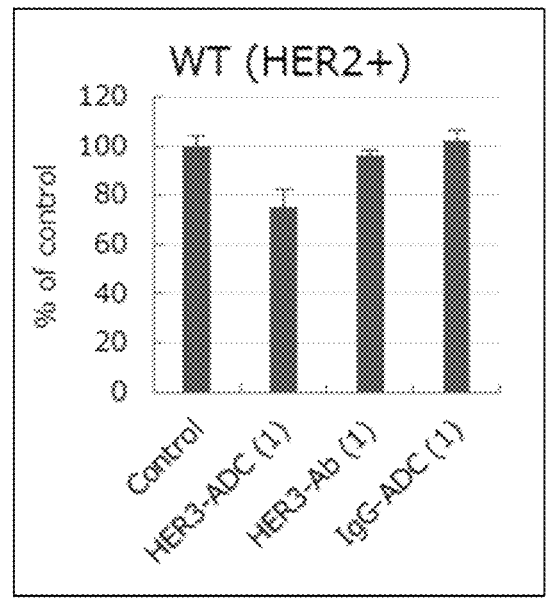

[Figure 22]
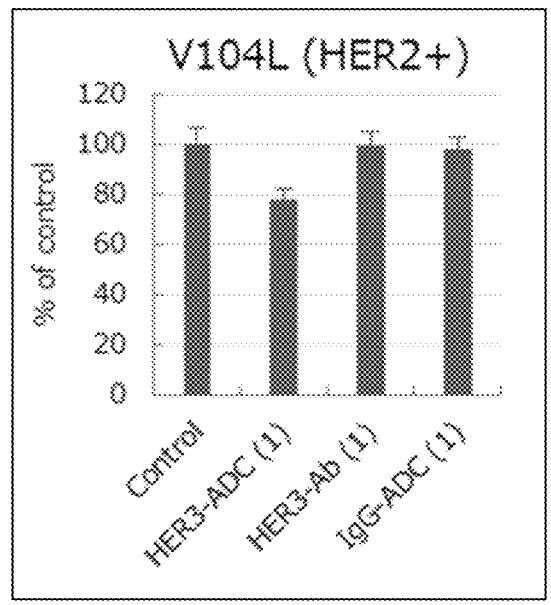
[Figure 23]
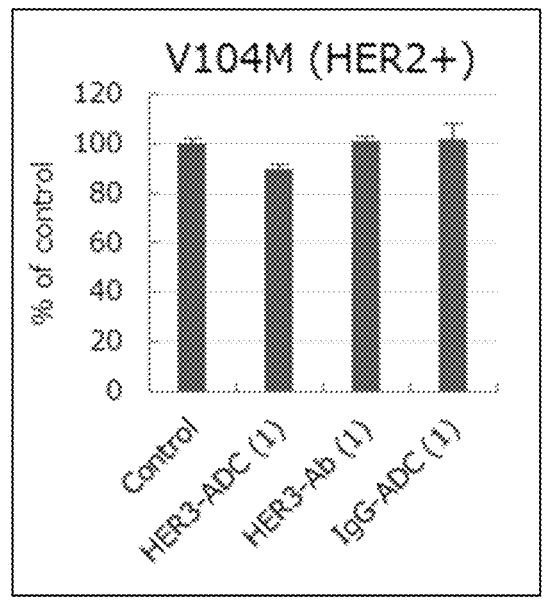

[Figure 24]
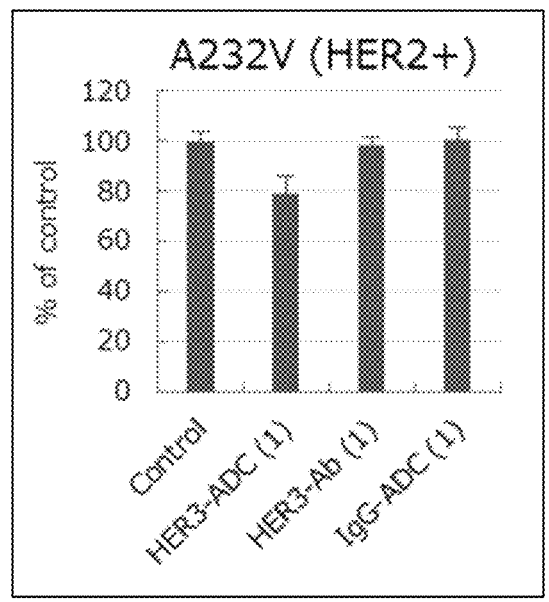
[Figure 25]
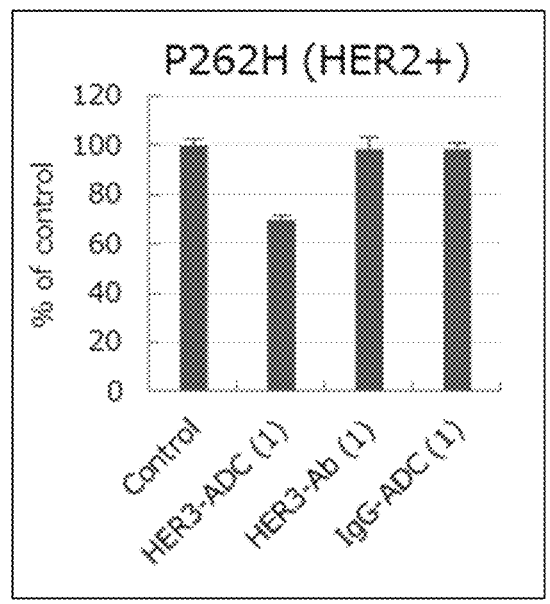

[Figure 26]
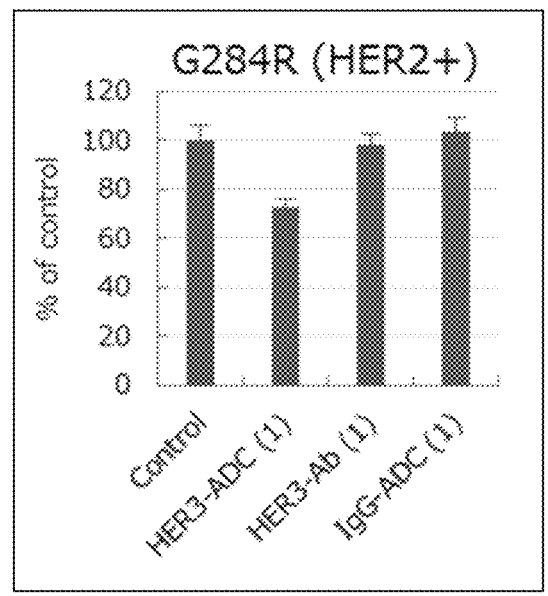
[Figure 27]
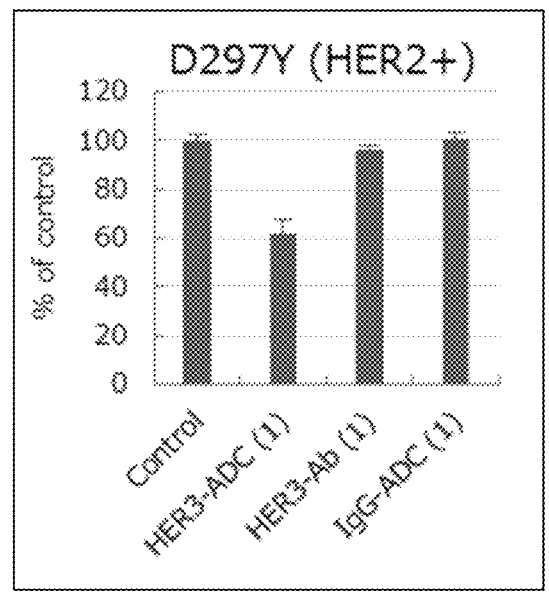

[Figure 28]
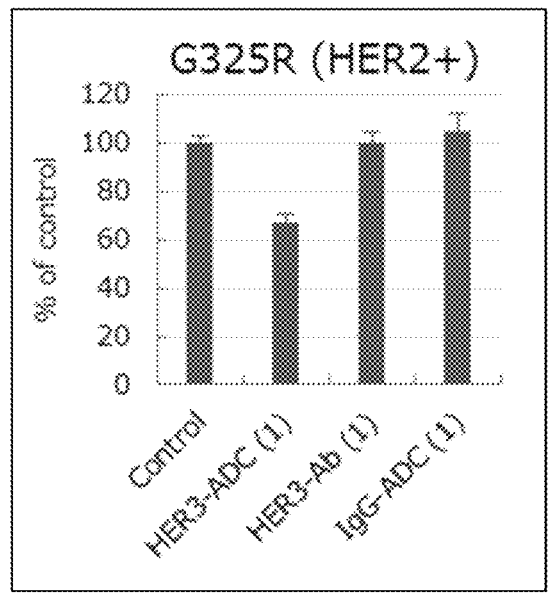
[Figure 29]
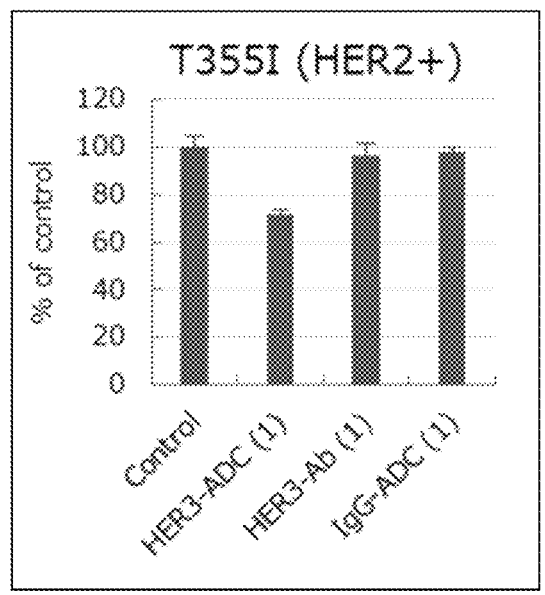

[Figure 30]
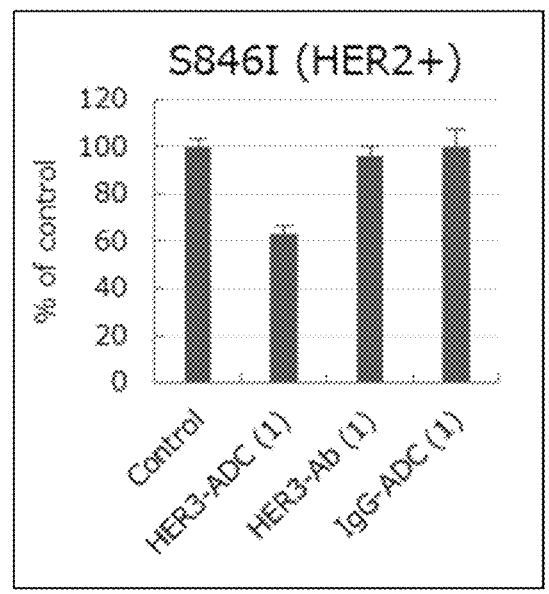
[Figure 31]
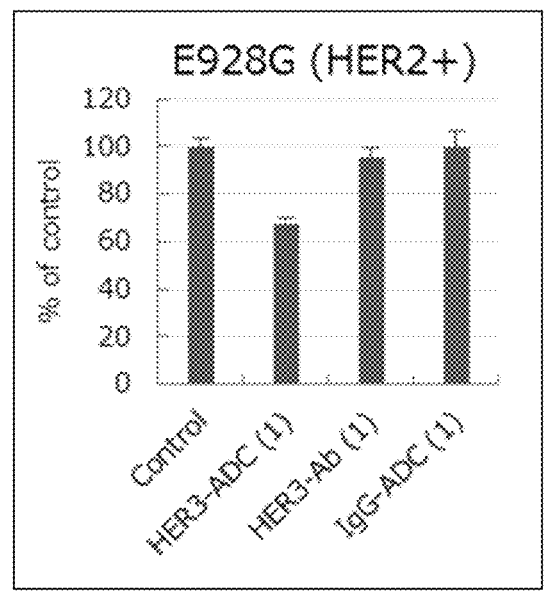

[Figure 32]
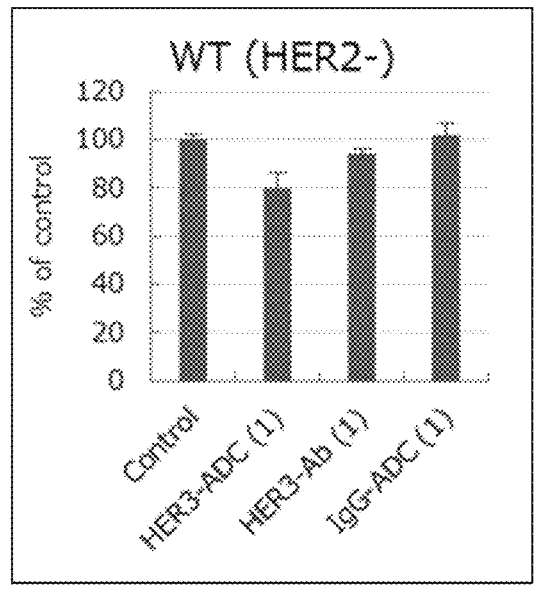
[Figure 33]
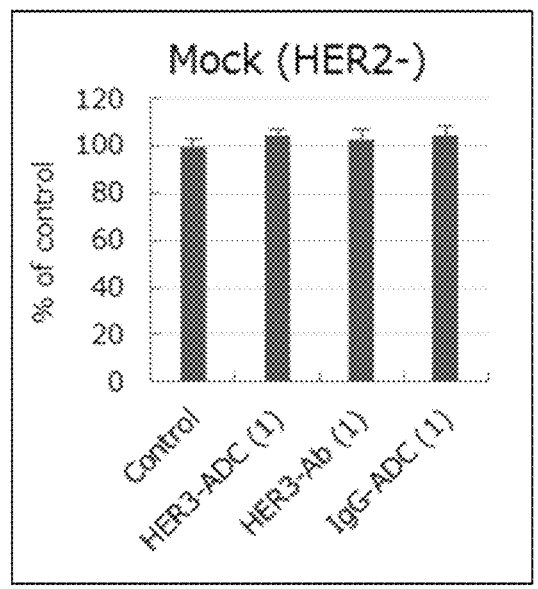

[Figure 34]
HER3 expression
[Figure 35]
HER2 expression
[Figure 36]
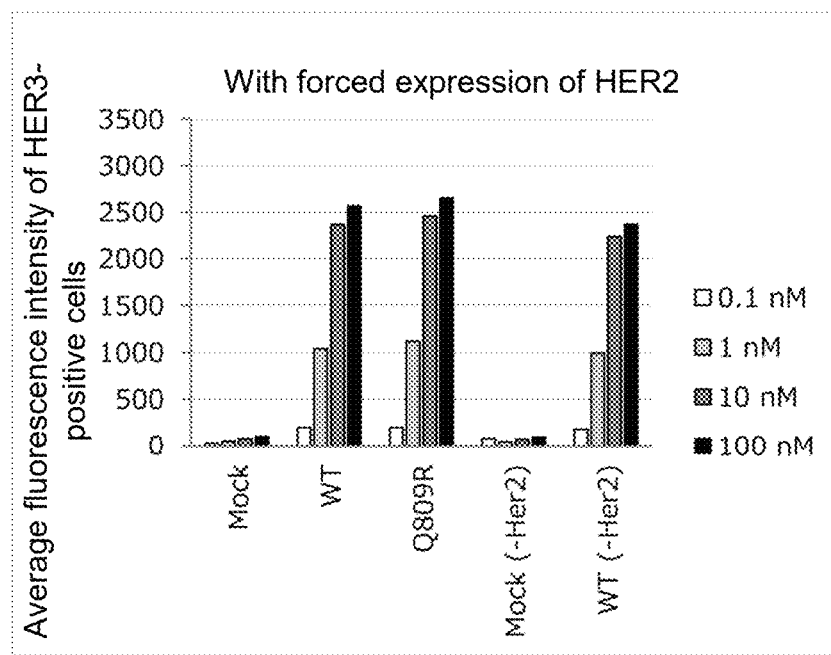

[Figure 37]
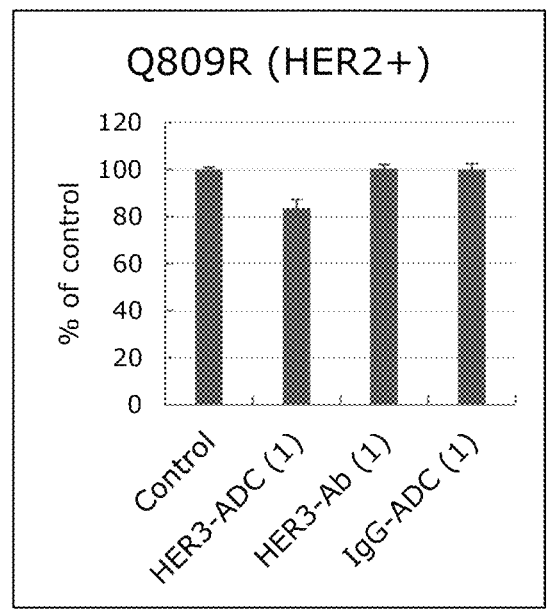

[Figure 38]
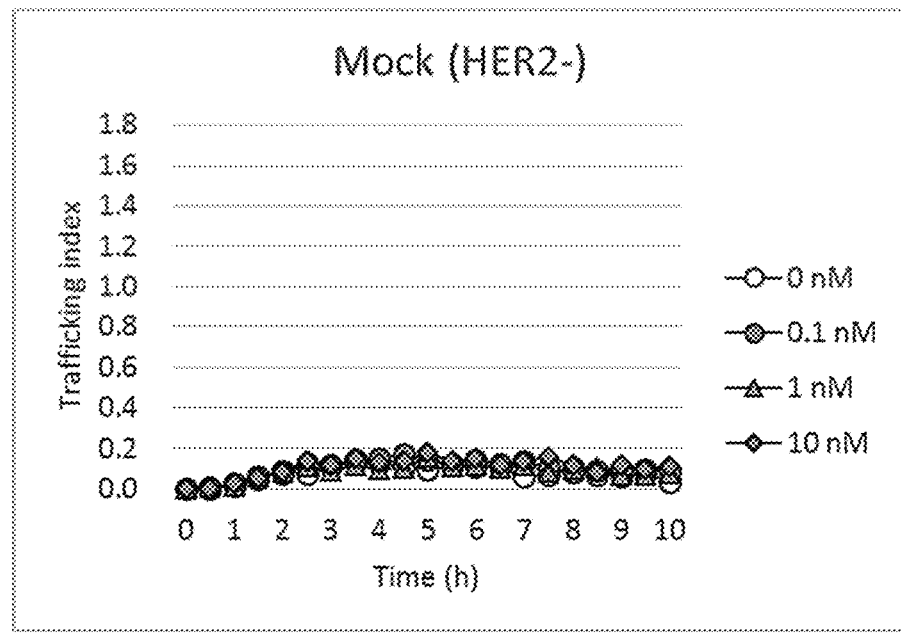
[Figure 39]
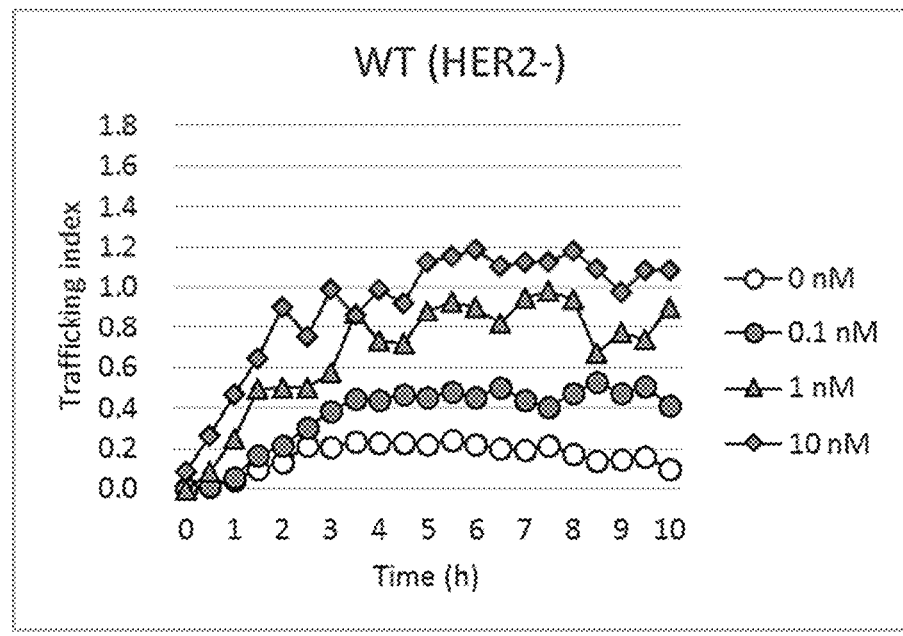

[Figure 40]
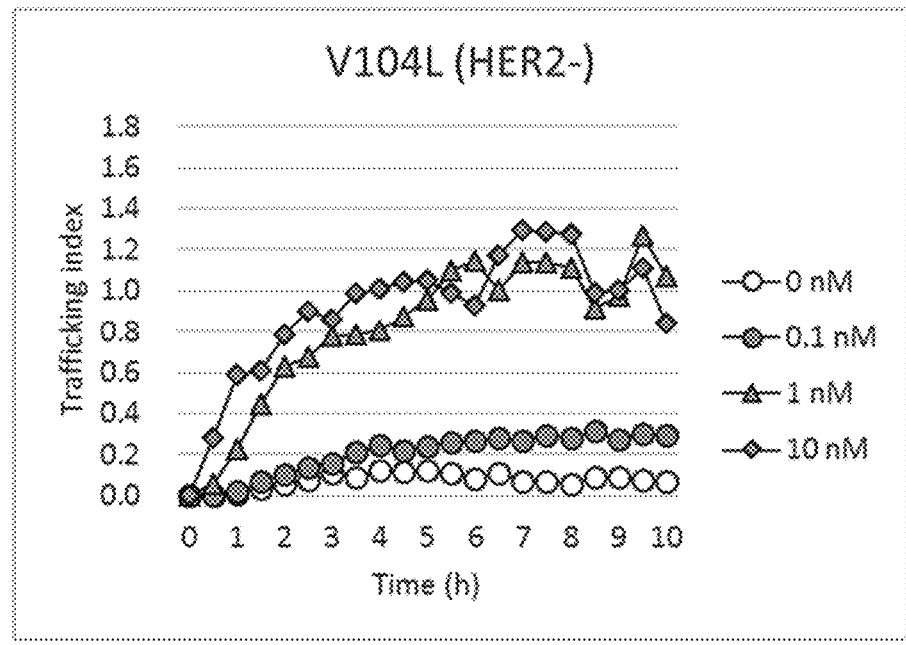
[Figure 41]
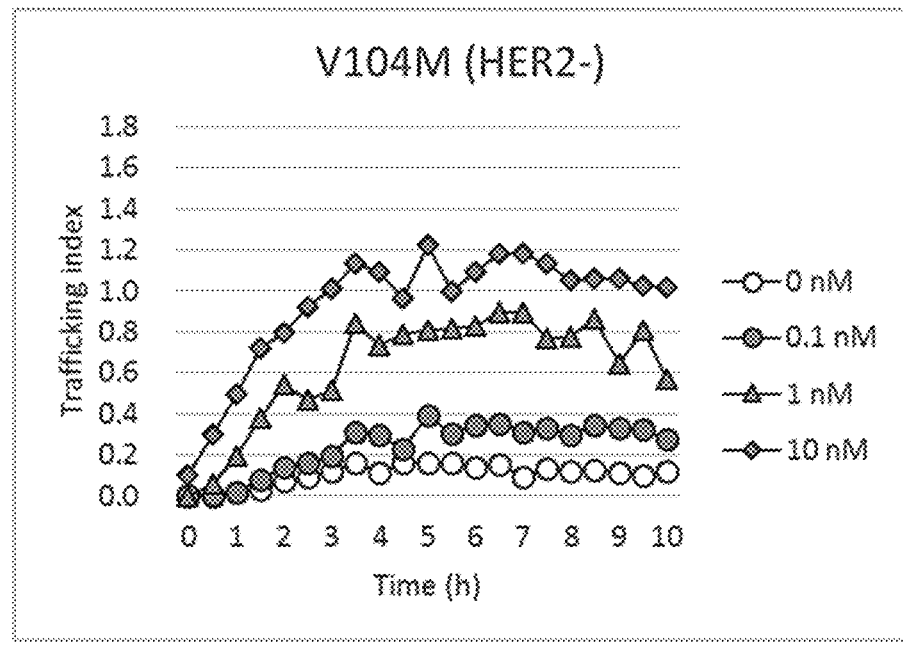

[Figure 42]
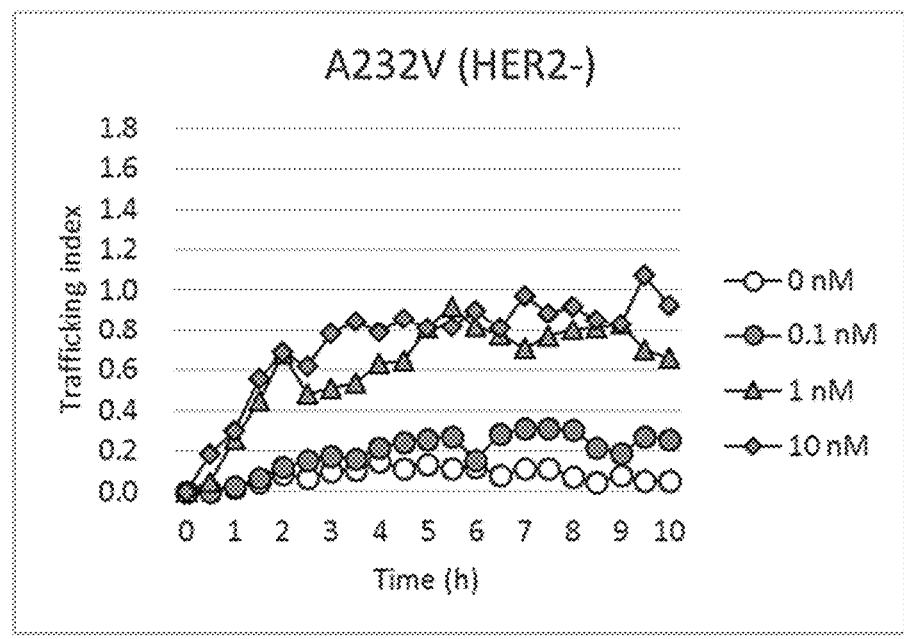
[Figure 43]
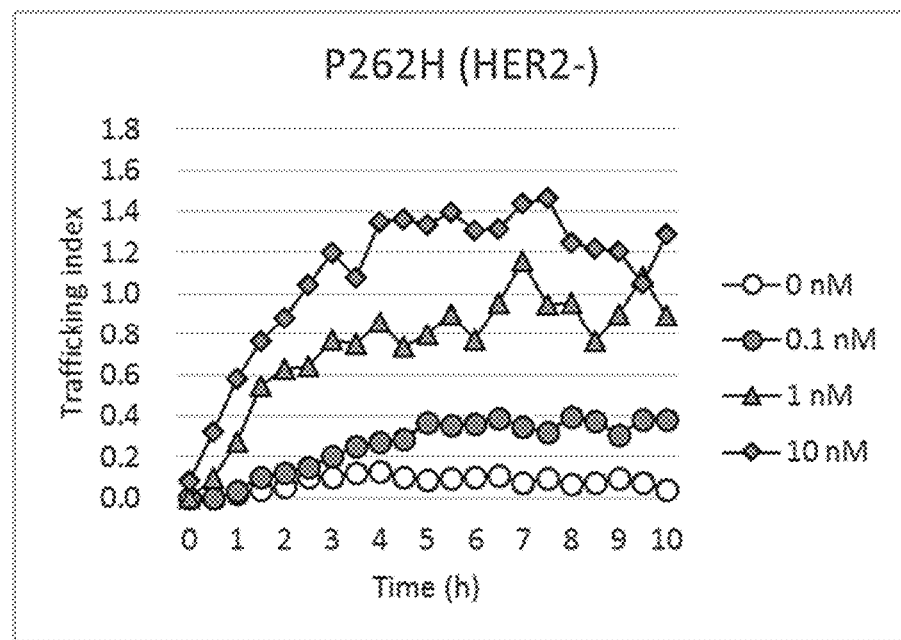

[Figure 44]
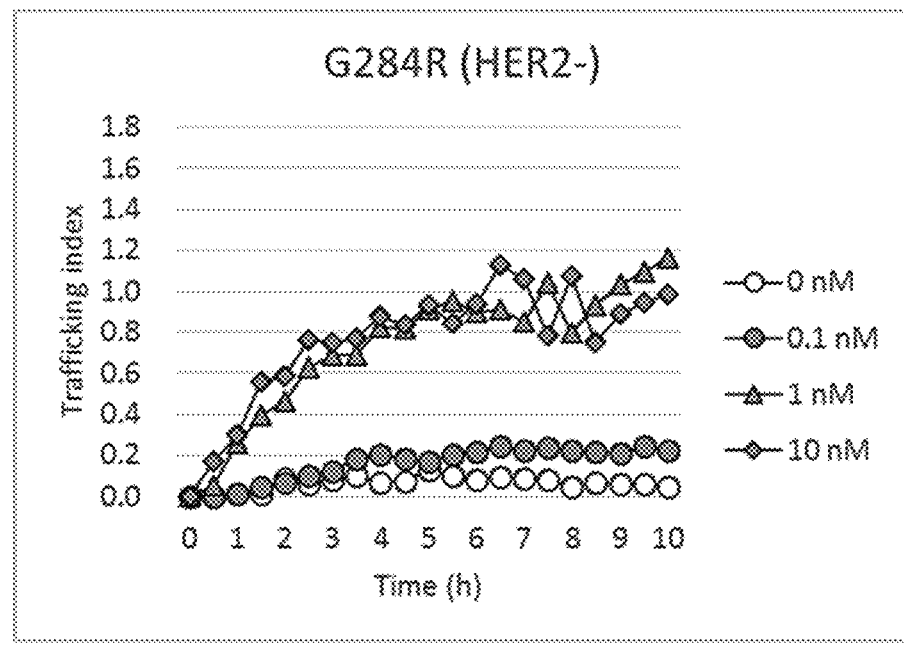
[Figure 45]
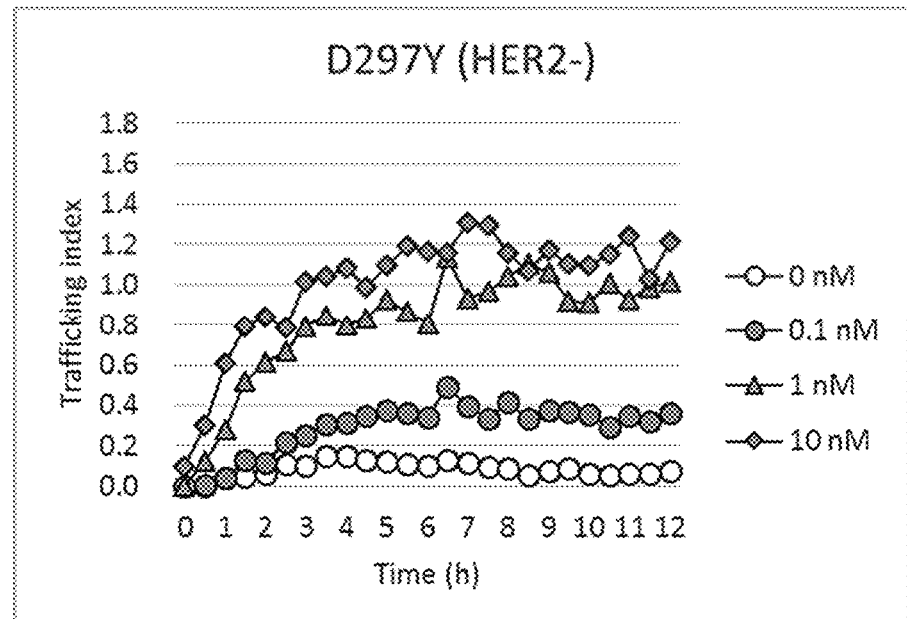

[Figure 46]
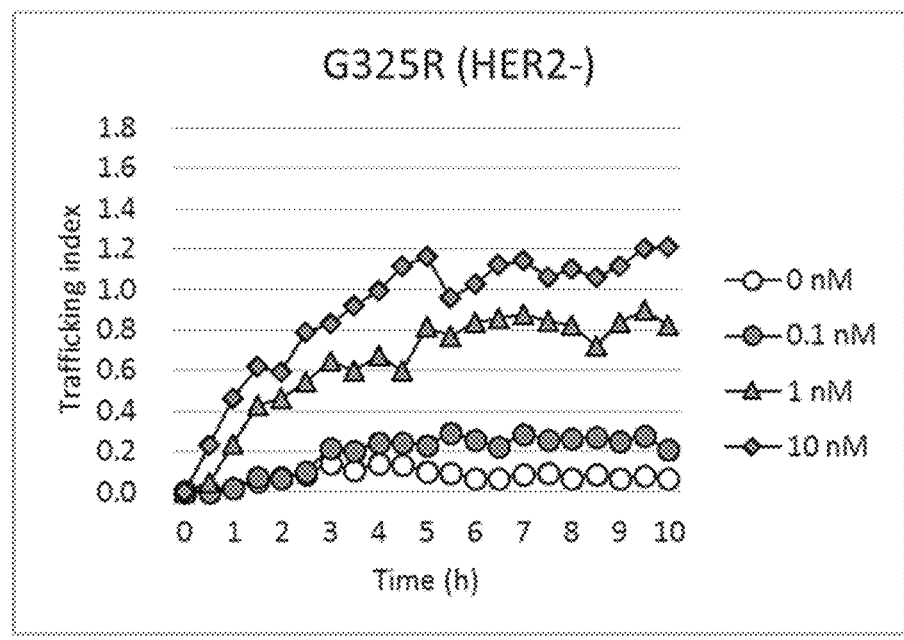
[Figure 47]
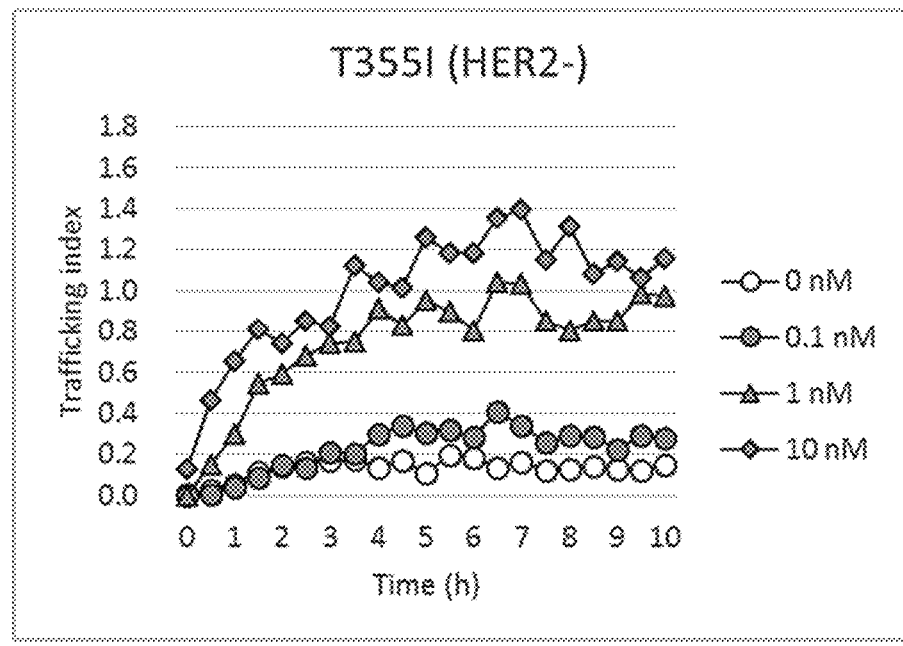

[Figure 48]
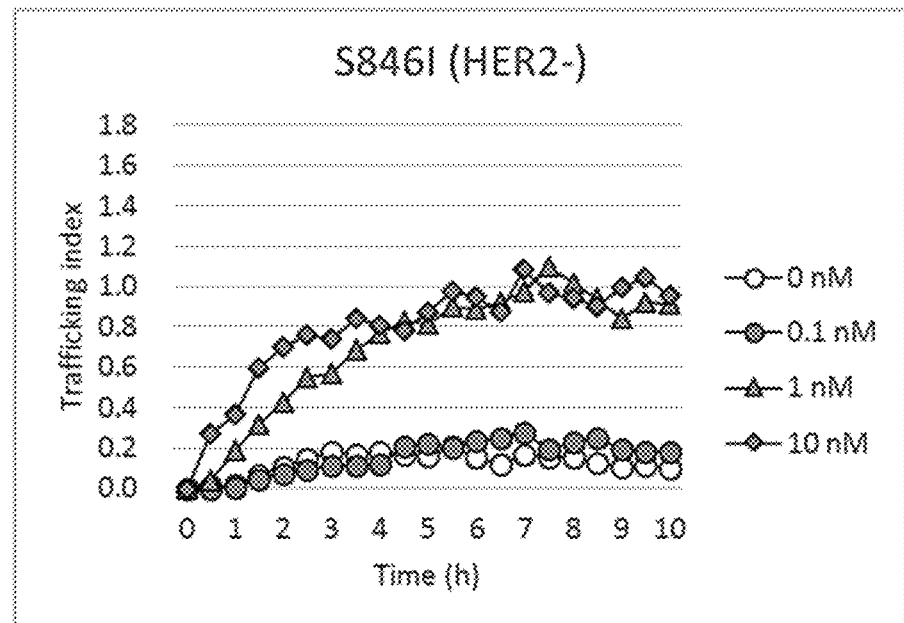
[Figure 49]
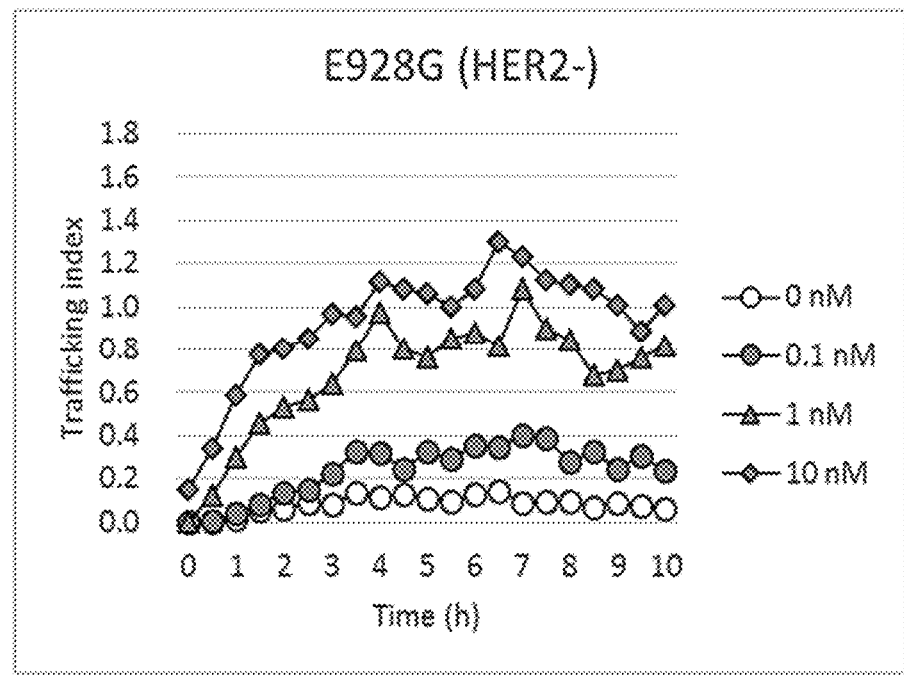

[Figure 50]
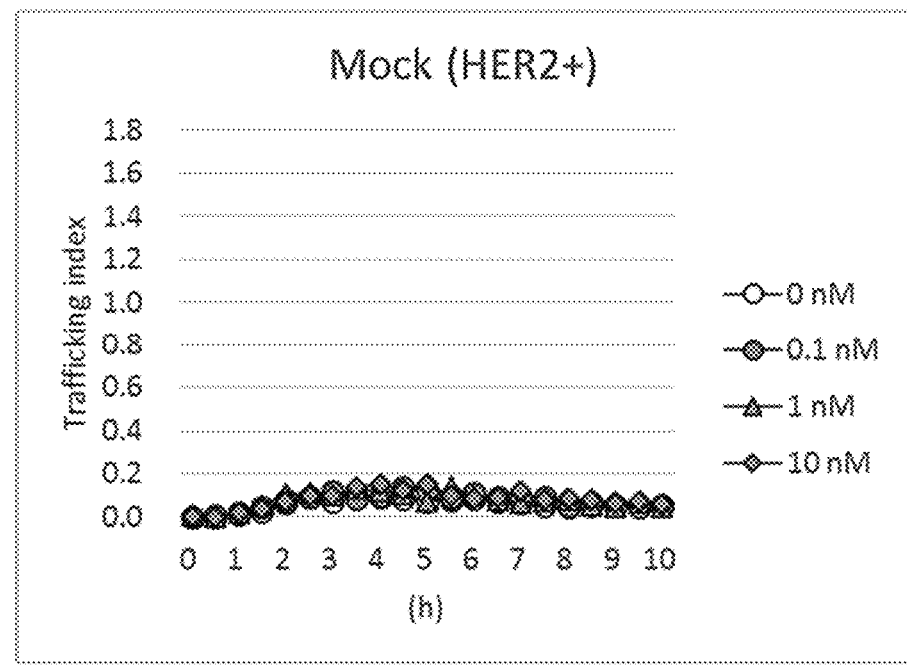
[Figure 51]
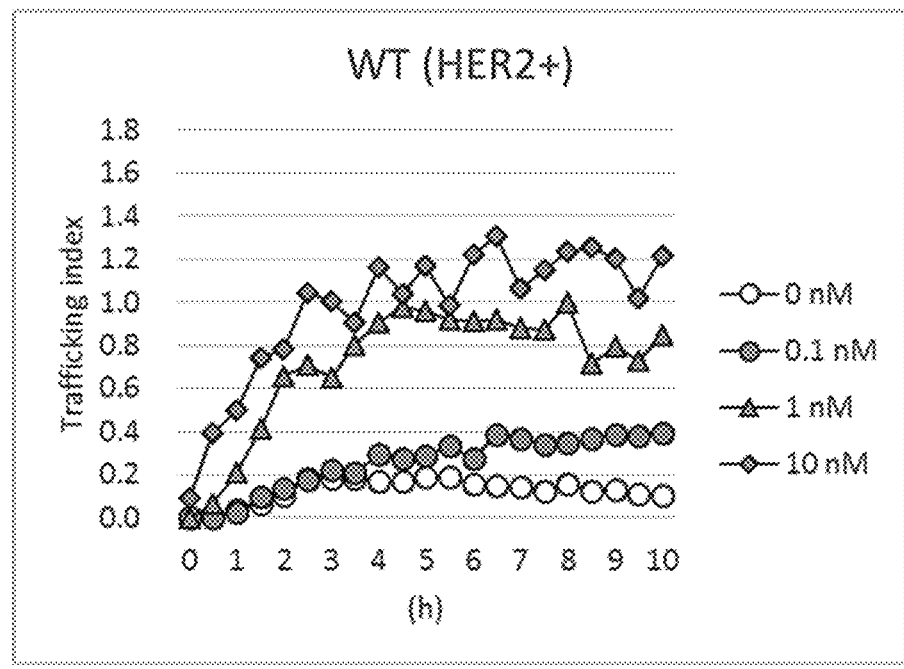

[Figure 52]
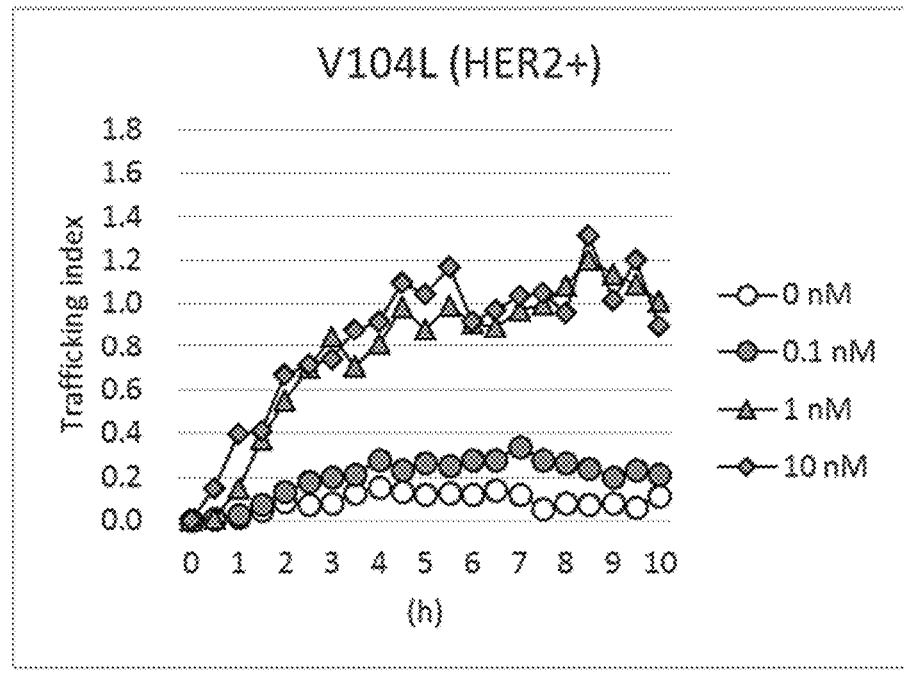
[Figure 53]
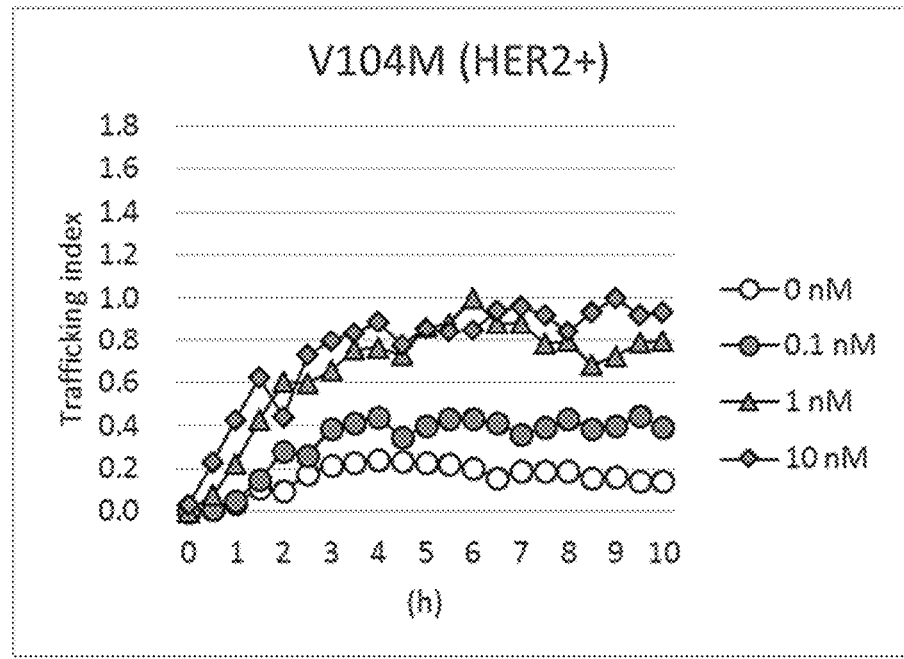

[Figure 54]
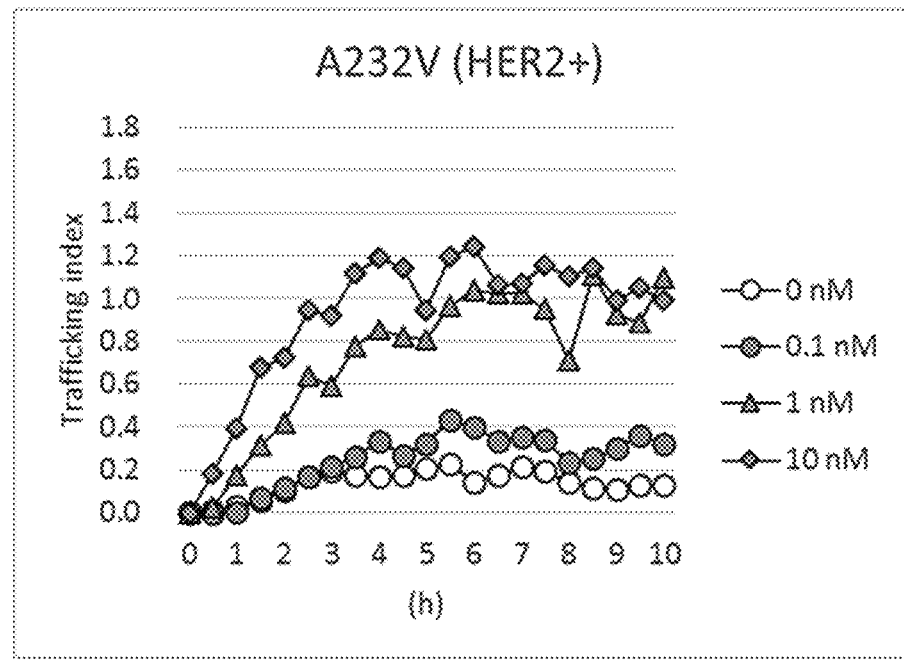
[Figure 55]
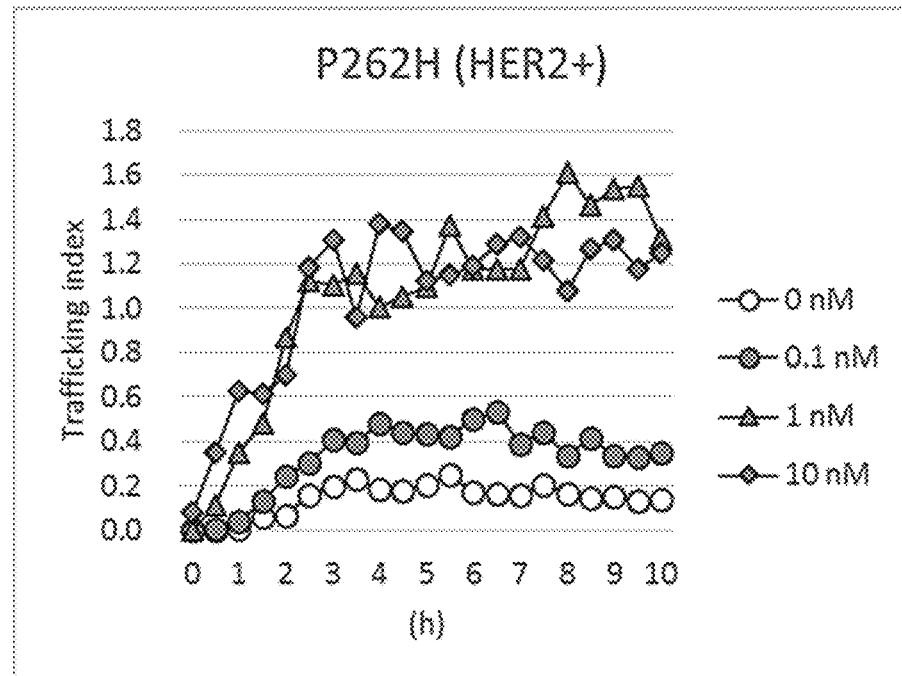

[Figure 56]
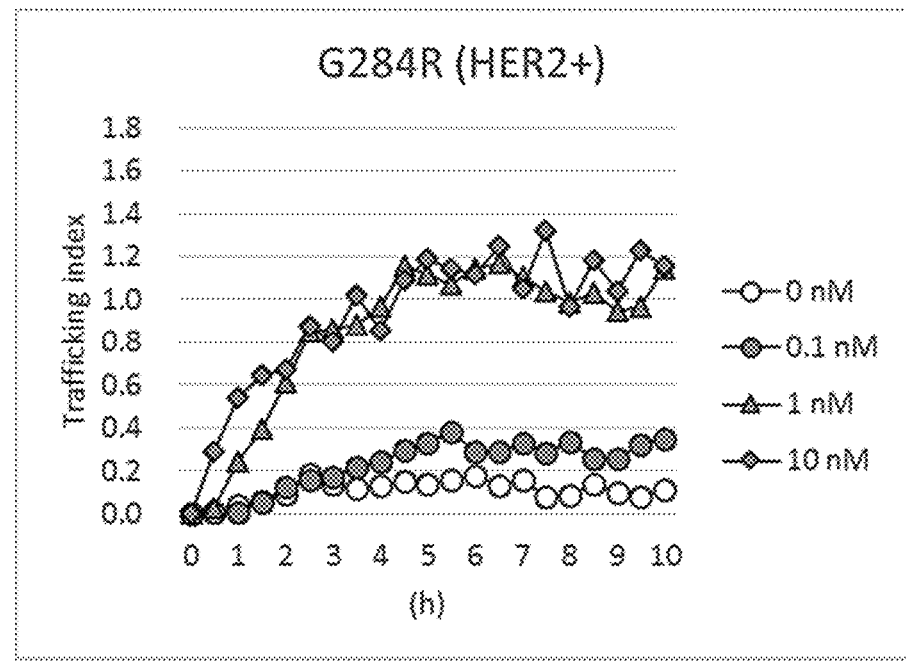
[Figure 57]
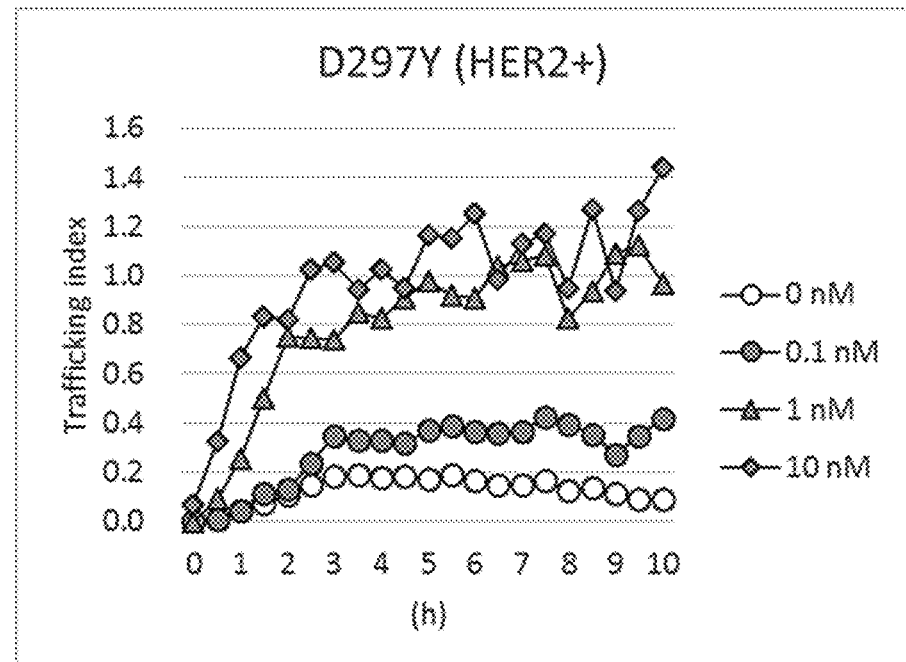

[Figure 58]
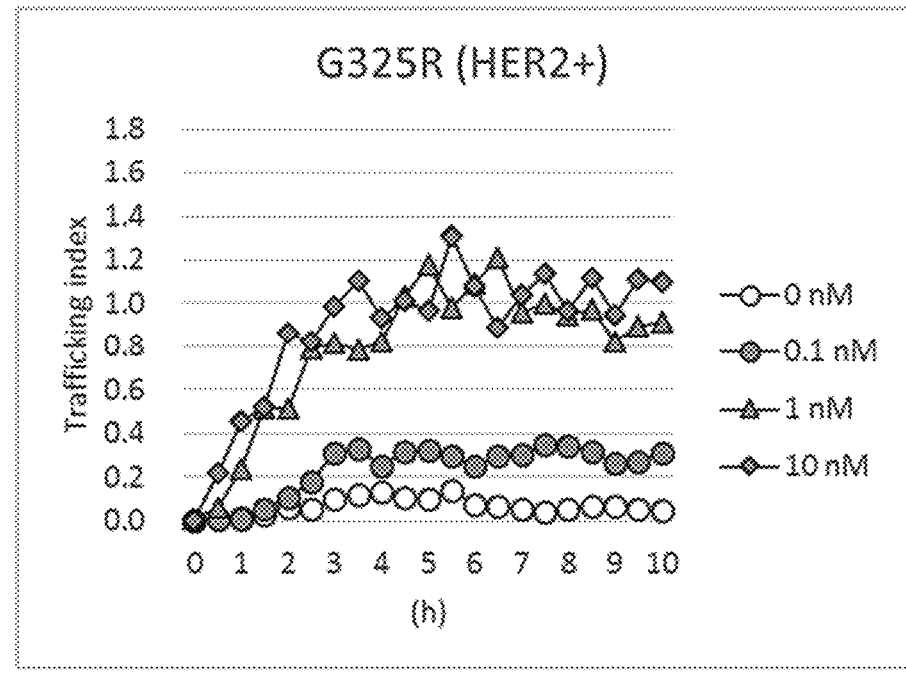
[Figure 59]
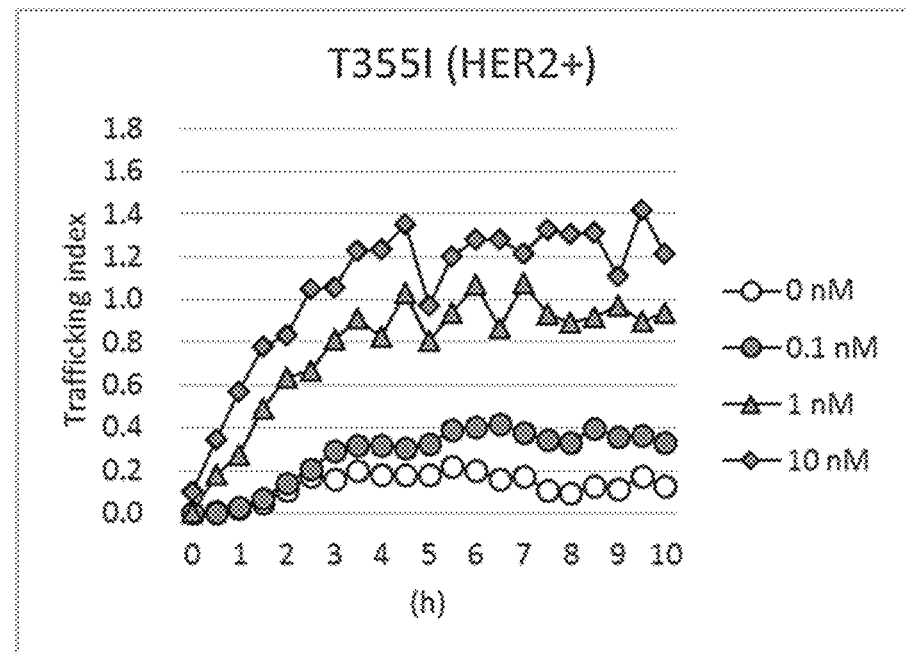

[Figure 60]
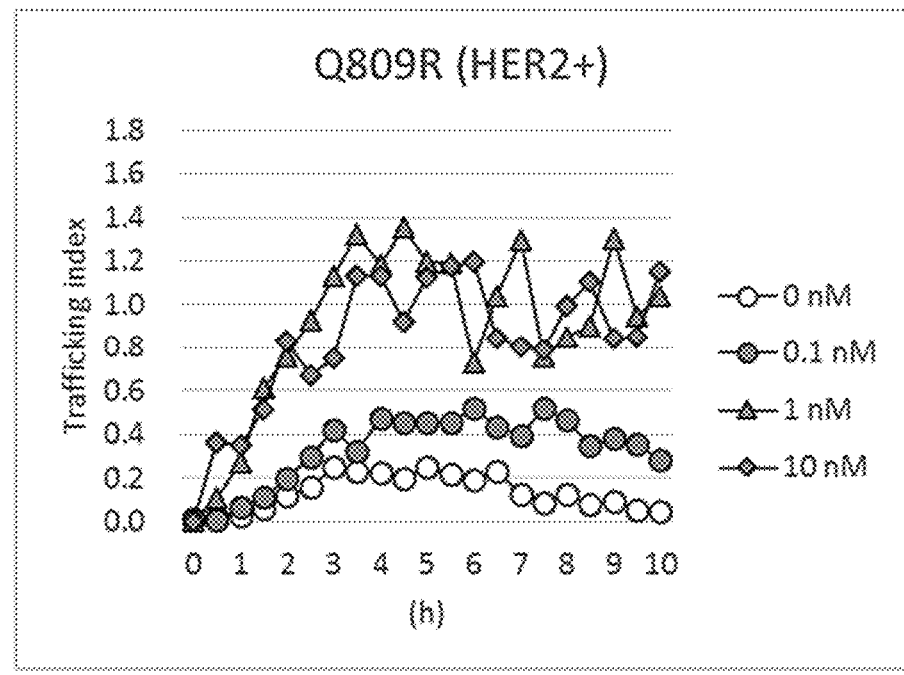
[Figure 61]
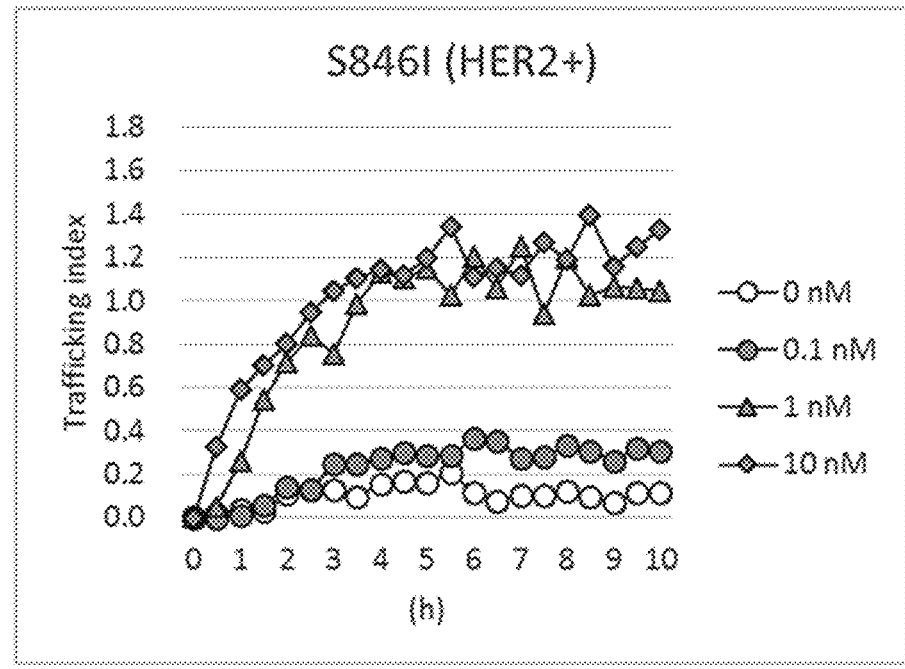

[Figure 62]
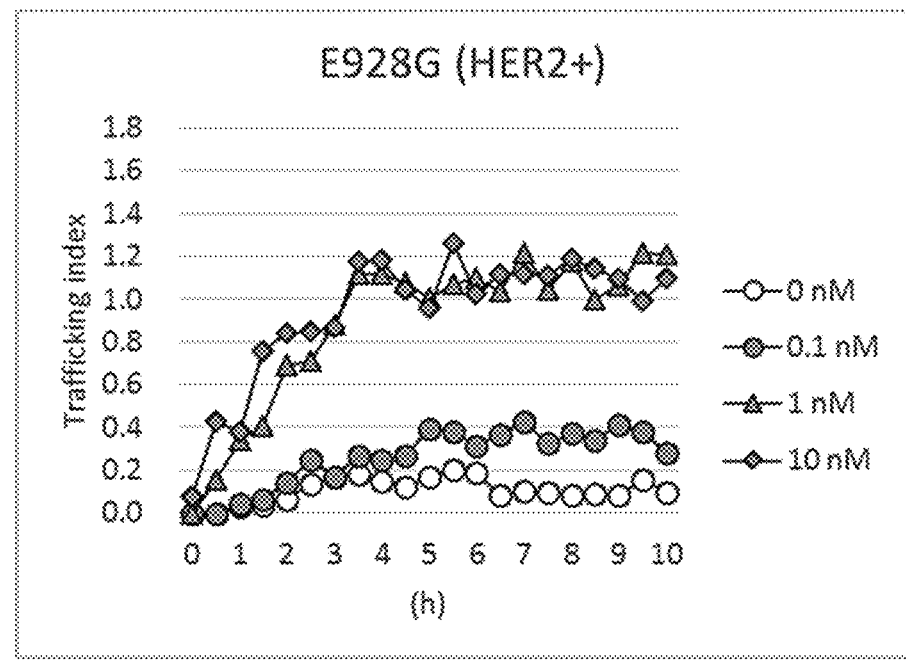
[Figure 63]
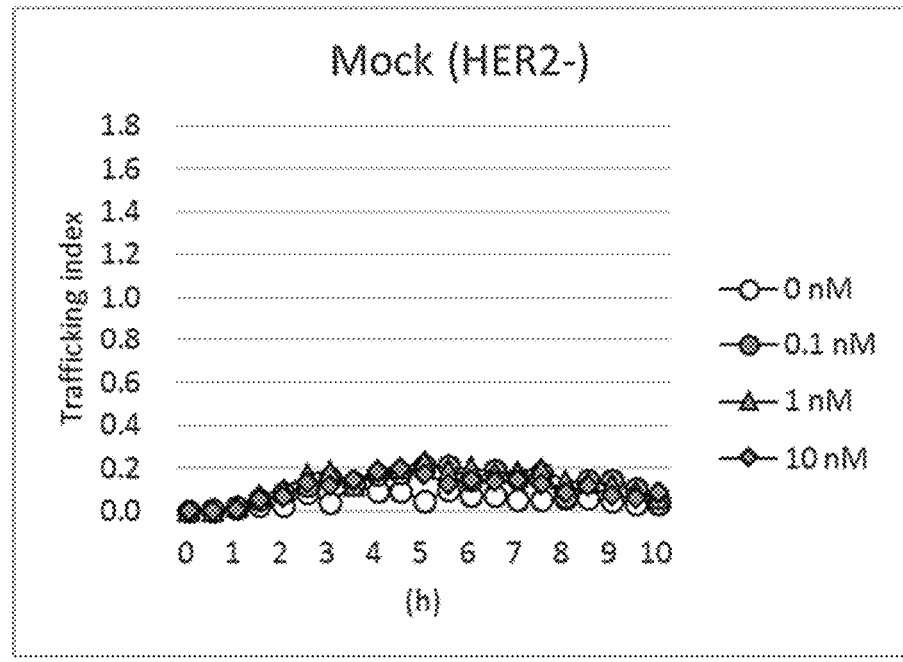

[Figure 64]
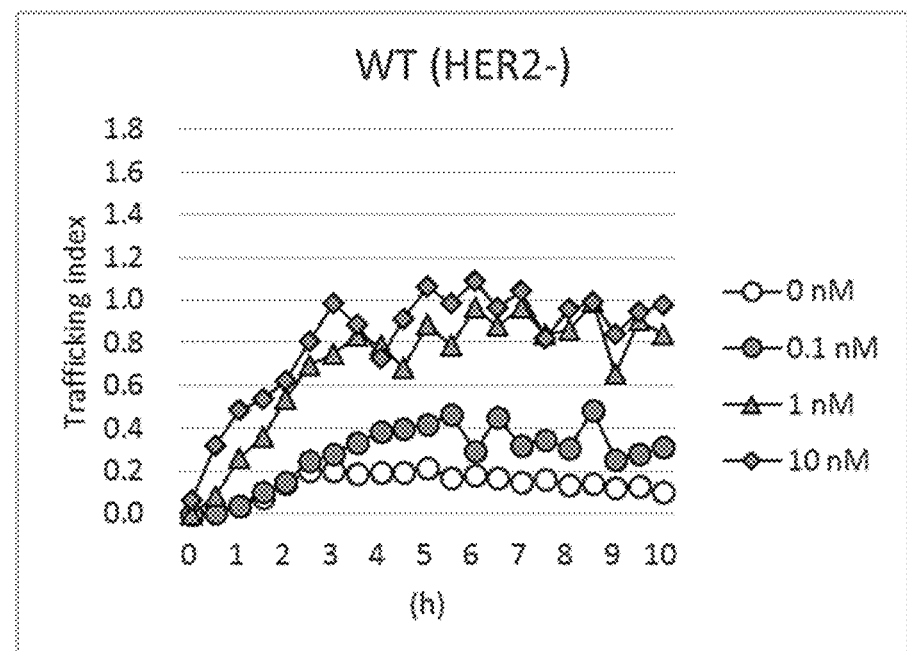

[Figure 65]

SEQ ID NO: 69 - Amino acid sequence of HER3 protein

```
MRANDALQVLGLLFSLARGSEVGNSQAVCPGTLNGLSVTG
DAENQYQTLYKLYERCEVVMGNLEIVLTGHNADLSFLQWI
REVTGYVLVAMNEFSTLPLPNLRVVRGTQVYDGKFAIFVM
LNYNTNSSHALRQLRLTQLTEILSGGVYIEKNDKLCHMDT
IDWRDIVRDRDAEIVVKDNGRSCPPCHEVCKGRCWGPGSE
DCQTLTKTICAPQCNGHCFGPNPNQCCHDECAGGCSGPQD
TDCFACRHFNDSGACVPRCPQPLVYNKLTFQLEPNPHTKY
QYGGVCVASCPHNFVVDQTSCVRACPPDKMEVDKNGLKMC
EPCGGLCPKACEGTGSGSRFQTVDSSNIDGFVNCTKILGN
LDFLITGLNGDPWHKIPALDPEKLNVFRTVREITGYLNIQ
SWPPHMHNFSVFSNLTTIGGRSLYNRGFSLLIMKNLNVTS
LGFRSLKEISAGRIYISANRQLCYHHSLNWTKVLRGPTEE
RLDIKHNRPRRDCVAEGKVCDPLCSSGGCWGPGPGQCLSC
RNYSRGGVCVTHCNFLNGEPREFAHEAECFSCHPECQPME
GTATCNGSGSDTCAQCAHFRDGPHCVSSCPHGVLGAKGPI
YKYPDVQNECRPCHENCTQGCKGPELQDCLGQTLVLIGKT
HLTMALTVIAGLVVIFMMLGGTFLYWRGRRIQNKRAMRRY
LERGESIEPLDPSEKANKVLARIFKETELRKLKVLGSGVF
GTVHKGVWIPEGESIKIPVCIKVIEDKSGRQSFQAVTDHM
LAIGSLDHAHIVRLLGLCPGSSLQLVTQYLPLGSLLDHVR
QHRGALGPQLLLNWGVQIAKGMYYLEEHGMVHRNLAARNV
LLKSPSQVQVADFGVADLLPPDDKQLLYSEAKTPIKWMAL
ESIHFGKYTHQSDVWSYGVTVWELMTFGAEPYAGLRLAEV
PDLLEKGERLAQPQICTIDVYMVMVKCWMIDENIRPTFKE
LANEFTRMARDPPRYLVIKRESGPGIAPGPEPHGLTNKKL
EEVELEPELDLDLEAEEDNLATTTLGSALSLPVGTLNR
PRGSQSLLSPSSGYMPMNQGNLGESCQESAVSGSSERCPR
PVSLHPMPRGCLASESSEGHVTGSEAELQEKVSMCRSRSR
SRSPRPRGDSAYHSQRHSLLTPVTPLSPPGLEEEDVNGYV
MPDTHLKGTPSSREGTLSSVGLSSVLGTEEEDEDEEYEYM
NRRRRHSPPHPPRPSSLEELGYEYMDVGSDLSASLGSTQS
CPLHPVPIMPTAGTTPDEDYEYMNRQRDGGGPGGDYAAMG
ACPASEQGYEEMRAFQGPGHQAPHVHYARLKTLRSLEATD
SAFDNPDYWHSRLFPKANAQRT
```

TREATMENT OF HER3-MUTATED CANCER BY ADMINISTRATION OF ANTI-HER3 ANTIBODY-DRUG CONJUGATE

CROSS-REFERENCE TO RELATED APPLICATIONS

The present application claims priority under 35 U.S.C. § 371 to International Patent Application No. PCT/JP2019/036668, filed Sep. 19, 2019, which claims priority to and the benefit of Japanese Patent Application No. 2018-175510, filed on Sep. 20, 2018. The contents of these applications are hereby incorporated by reference in their entireties.

SEQUENCE LISTING

The instant application contains a Sequence Listing which has been submitted in ASCII format via EFS-Web and is hereby incorporated by reference in its entirety. Said ASCII copy, is named 098065-0286_SL.txt and is 244 kb in size.

TECHNICAL FIELD

The present invention relates to a therapeutic agent for HER3-mutated cancer comprising an anti-HER3 antibody-drug conjugate and/or a method of treatment for cancer comprising administering the anti-HER3 antibody-drug conjugate to a subject determined to have HER3-mutated cancer.

BACKGROUND ART

Human epidermal growth factor receptor 3 (HER3; also known as ErbB3) is a transmembrane receptor belonging to the epidermal growth factor receptor subfamily of receptor protein tyrosine kinases. It is known that HER3 is expressed in various cancers such as breast cancer, lung cancer, and colorectal cancer, and it forms a heterodimer together with tyrosine kinase receptors such as HER2 and EGFR, upon which HER3 is phosphorylated, thereby inducing cancer cell growth or apoptosis suppressing signals (Non Patent References 1 to 3).

There exists a mutant of HER3, which is known as one of the cancer driver mutations (Non Patent References 4 to 6). Such HER3-mutated cancer is reported to be present, for example, in 4% of breast cancer cases (Non Patent Reference 7), 10% of stomach cancer cases (Non Patent Reference 8), 1% of ovarian cancer cases (Non Patent Reference 9), 1% of colorectal cancer cases (Non Patent Reference 5), and 1% of head and neck cancer cases (Non Patent Reference 10).

It has been reported that anti-HER2 drugs such as trastuzumab, pertuzumab, and lapatinib exhibited effectiveness against HER3-mutated cancers in vitro and in vivo in situations where HER2 is overexpressed (Non Patent Reference 11).

Meanwhile, it has also been reported that no effectiveness against HER3-mutated cancers was shown in clinical studies using neratinib, which is an anti-HER2 drug (Non Patent Reference 12).

It has been suggested that one of the reasons why anti-HER2 drugs are not effective against HER3-mutated cancers is that HER3-mutated cancers may function independently of overexpression of HER2. That is, it has been reported that HER3-mutated cancers can induce cancer cell growth even in situations where HER2 is not overexpressed (Non Patent References 13 and 14), and it is thus believed that anti-HER2 drugs cannot exert anti-tumor effects on HER3-mutated cancers in situations where HER2 is not overexpressed.

Further, it is also known that studies have been carried out to verify the efficacy of anti-HER3 antibodies against HER3-mutated cancers (Non Patent Reference 11). However, there are no reports in which anti-HER3 antibodies have demonstrated clear efficacy against HER3-mutated cancers regardless of the presence or absence of overexpression of HER2. In addition, it is generally assumed that the binding of anti-HER3 antibodies to HER3 decreases with the mutation of HER3, and thus it would be difficult to obtain anti-HER3 antibodies that constantly exhibit excellent anti-tumor activity against various HER3 mutants. Accordingly, an effective method of treatment for HER3-mutated cancer has not yet been established.

Antibody-drug conjugates (ADC) having a drug with cytotoxicity conjugated to an antibody, whose antigen is expressed on the surface of cancer cells and which also binds to an antigen capable of cellular internalization, and therefore can deliver the drug selectively to cancer cells, is thus expected to cause accumulation of the drug within cancer cells and to kill the cancer cells (Non Patent References 15 to 19).

As one such antibody-drug conjugate, an anti-HER3 antibody-drug conjugate comprising an anti-HER3 antibody and a derivative of exatecan, which is a topoisomerase I inhibitor, as its components is known (Patent Reference 1). There have been no reports on the efficacy of anti-HER3 antibody-drug conjugates against HER3-mutated cancers.

CITATION LIST

Patent Literature

Patent Reference 1: International Publication No. WO 2015/155998

Non Patent Literature

Non Patent Reference 1: Alimandi et al., Oncogene (1995) 10, 1813-1821.
Non Patent Reference 2: deFazio et al., Int. J. Cancer (2000) 87, 487-498.
Non Patent Reference 3: Naidu et al., Br. J. Cancer (1998) 78, 1385-1390.
Non Patent Reference 4: Sergina et al., Nature (2007) 445, 437-41.
Non Patent Reference 5: Jeong et al., Int. J. Cancer (2006) 119, 2986-7.
Non Patent Reference 6: Ding et al., Nature (2008) 455, 1069-75.
Non Patent Reference 7: Kan et al., Nature (2010) 466, 869-73.
Non Patent Reference 8: Wang et al., Nat. Genet. (2011) 43, 1219-23.
Non Patent Reference 9: Greenman et al., Nature (2007) 446, 153-8.
Non Patent Reference 10: Stransky et al., Science (2011) 333, 1157-60.
Non Patent Reference 11: Jaiswal et al., Cancer Cell (2013) 23, 603-17.
Non Patent Reference 12: Hyman et al., Cancer Res. (2017) Abstract CT001.
Non Patent Reference 13: Mishra et al., Oncotarget (2017) 69, 114371-114392.

Non Patent Reference 14: Mishra et al., Oncotarget (2018) 45, 27773-27788.

Non Patent Reference 15: Ducry et al., Bioconjugate Chem. (2010) 21, 5-13.

Non Patent Reference 16: Alley et al., Current Opinion in Chemical Biology (2010) 14, 529-537.

Non Patent Reference 17: Damle, Expert Opin. Biol. Ther. (2004) 4, 1445-1452.

Non Patent Reference 18: Senter et al., Nature Biotechnology (2012) 30, 631-637.

Non Patent Reference 19: Howard et al., J Clin Oncol (2011) 29, 398-405.

SUMMARY OF INVENTION

Technical Problem

An object of the present invention is to provide a therapeutic agent for HER3-mutated cancer comprising an anti-HER3 antibody-drug conjugate and/or a method of treatment for cancer comprising administering the anti-HER3 antibody-drug conjugate to a subject determined to have HER3-mutated cancer.

Solution to Problem

As a result of diligent studies in order to solve the above problems, the inventors have found that an anti-HER3 antibody-drug conjugate exhibits an excellent anti-tumor activity against HER3-mutated cancers, thereby accomplishing the present invention.

Thus, the present invention provides the following [1] to [85].

[1] A therapeutic agent for HER3-mutated cancer comprising an anti-HER3 antibody-drug conjugate as an active ingredient.

[2] The therapeutic agent according to [1], wherein a HER3 mutation in the HER3-mutated cancer is at least one selected from the group consisting of V104L, V104M, A232V, P262H, G284R, D297Y, G325R, T355I, Q809R, S846I, and E928G.

[3] The therapeutic agent according to [1], wherein a HER3 mutation in the HER3-mutated cancer is Q809R.

[4] The therapeutic agent according to any one of [1] to [3] wherein HER2 is overexpressed in the HER3-mutated cancer.

[5] The therapeutic agent according to any one of [1] to [3] wherein HER2 is not overexpressed in the HER3-mutated cancer.

[6] The therapeutic agent according to any one of [1] to [5] wherein there is no substantial difference in lysosome migrations of the anti-HER3 antibody-drug conjugate between in wild-type HER3-expressing cells and in mutant-type HER3-expressing cells.

[7] The therapeutic agent according to any one of [1] to [6] wherein there is no substantial difference in lysosome migrations of the anti-HER3 antibody-drug conjugate between in HER3-expressing cells overexpressing HER2 and in HER3-expressing cells not overexpressing HER2.

[8] The therapeutic agent according to any one of [1] to [7] wherein the anti-HER3 antibody-drug conjugate is an anti-HER3 antibody-drug conjugate in which a drug-linker represented by the following formula:

[Formula 1]

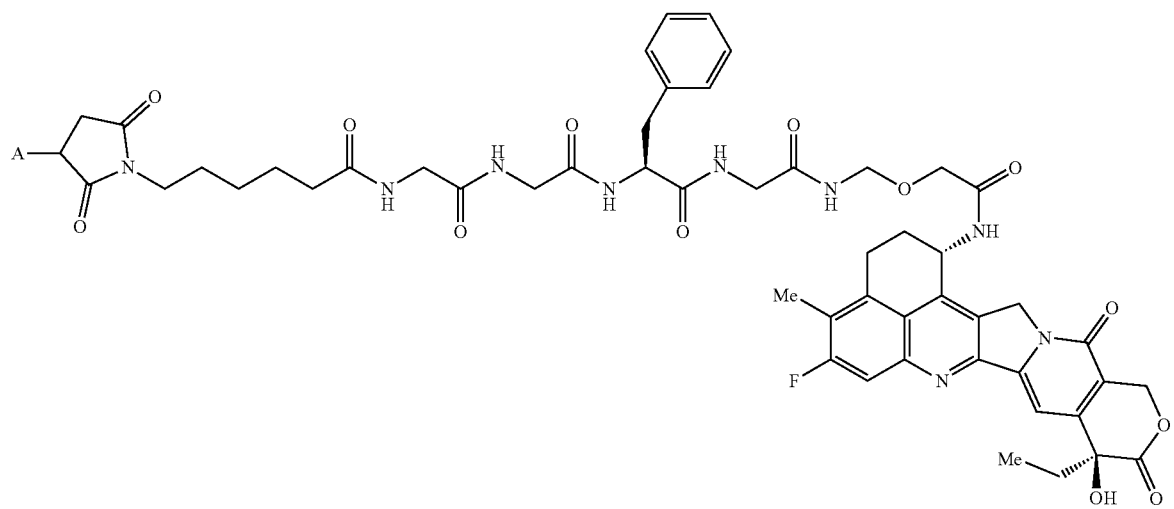

wherein A represents a connecting position to an anti-HER3 antibody;
is conjugated to the anti-HER3 antibody via a thioether bond.

[9] The therapeutic agent according to any one of [1] to [7] wherein the anti-HER3 antibody-drug conjugate is an anti-HER3 antibody-drug conjugate represented by the following formula:

[Formula 2]

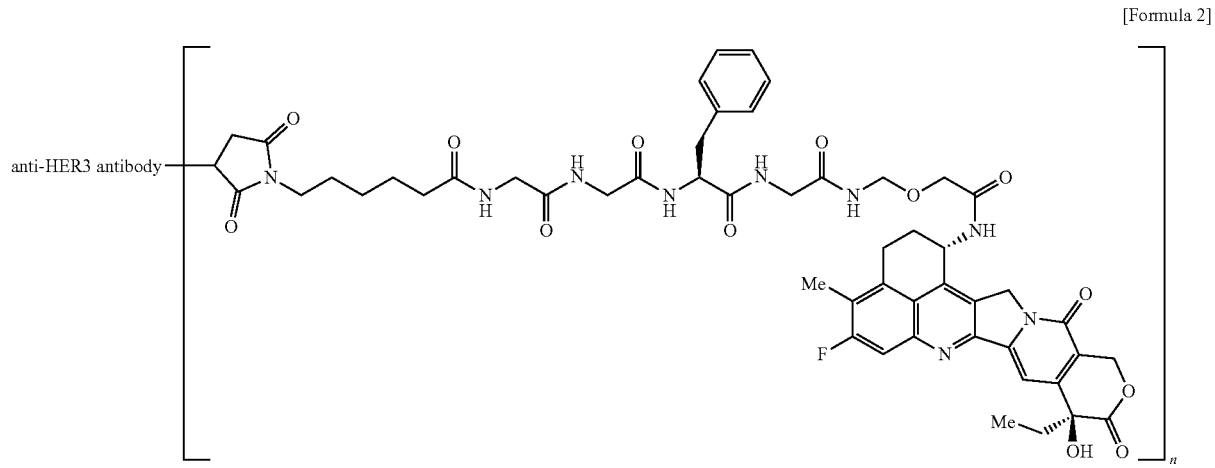

wherein the drug-linker is conjugated to the anti-HER3 antibody via a thioether bond, and n is the average number of units of the drug-linker conjugated per antibody molecule.

[10] The therapeutic agent according to any one of [1] to [9], wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

[11] The therapeutic agent according to any one of [1] to [9], wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

[12] The therapeutic agent according to any one of [1] to [9], wherein the anti-HER3 antibody is an antibody comprising a heavy chain consisting of an amino acid sequence represented by SEQ ID NO: 9 and a light chain consisting of an amino acid sequence represented by SEQ ID NO: 10.

[13] The therapeutic agent according to [12], wherein the anti-HER3 antibody lacks a lysine residue at the carboxyl terminus of the heavy chain.

[14] The therapeutic agent according to any one of [1] to [13], wherein the average number of units of the drug-linker conjugated per antibody molecule in the anti-HER3 antibody-drug conjugate is in the range of 7 to 8.

[15] The therapeutic agent according to any one of [1] to [13], wherein the average number of units of the drug-linker conjugated per antibody molecule in the anti-HER3 antibody-drug conjugate is in the range of 7.5 to 8.

[16] The therapeutic agent according to any one of [1] to [15], wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

[17] The therapeutic agent according to any one of [1] to [15], wherein the cancer is at least one selected from the group consisting of breast cancer, non-small cell lung cancer, colorectal cancer, stomach cancer, ovarian cancer, head and neck cancer, glioblastoma multiforme, and melanoma.

[18] A method of treatment for cancer, comprising administering an anti-HER3 antibody-drug conjugate to a subject determined to have HER3-mutated cancer.

[19] The method of treatment according to [18], wherein a HER3 mutation in the HER3-mutated cancer is at least one selected from the group consisting of V104L, V104M, A232V, P262H, G284R, D297Y, G325R, T355I, Q809R, S846I, and E928G.

[20] The method of treatment according to [18], wherein a HER3 mutation in the HER3-mutated cancer is Q809R.

[21] The method of treatment according to any one of [18] to [20], wherein HER2 is overexpressed in the HER3-mutated cancer.

[22] The method of treatment according to any one of [18] to [20], wherein HER2 is not overexpressed in the HER3-mutated cancer.

[23] The method of treatment according to any one of [18] to [22], wherein there is no substantial difference in lysosome migrations of the anti-HER3 antibody-drug conjugate between in wild-type HER3-expressing cells and in mutant-type HER3-expressing cells.

[24] The method of treatment according to any one of [18] to [23], wherein there is no substantial difference in lysosome migrations of the anti-HER3 antibody-drug conjugate between in HER3-expressing cells overexpressing HER2 and in HER3-expressing cells not overexpressing HER2.

[25] The method of treatment according to any one of [18] to [24], wherein the anti-HER3 antibody-drug conjugate is an anti-HER3 antibody-drug conjugate in which a drug-linker represented by the following formula:

[Formula 3]

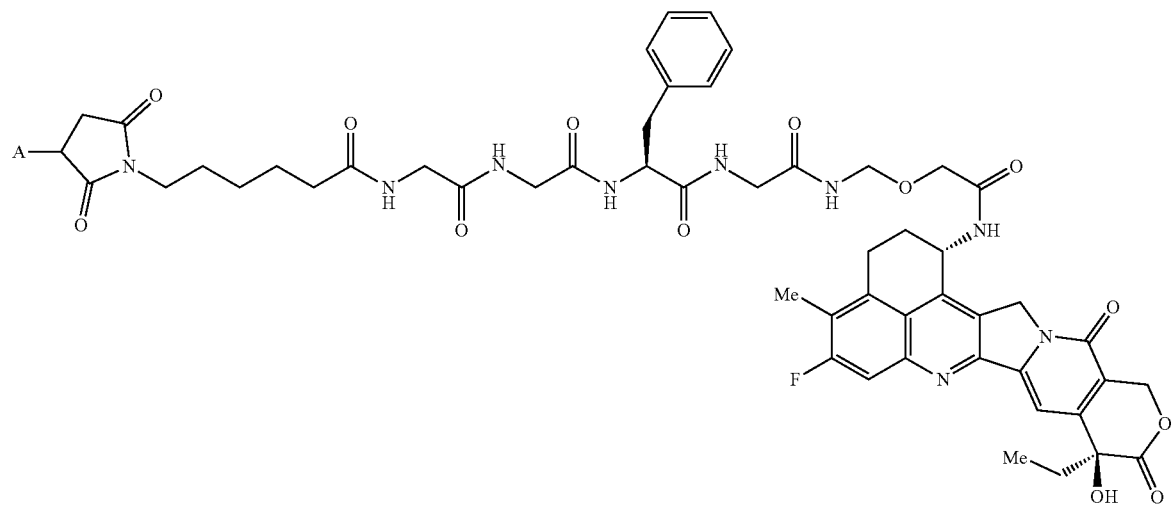

wherein A represents a connecting position to an anti-HER3 antibody;
is conjugated to the anti-HER3 antibody via a thioether bond.

[26] The method of treatment according to any one of [18] to [24], wherein the anti-HER3 antibody-drug conjugate is an anti-HER3 antibody-drug conjugate represented by the following formula:

[Formula 4]

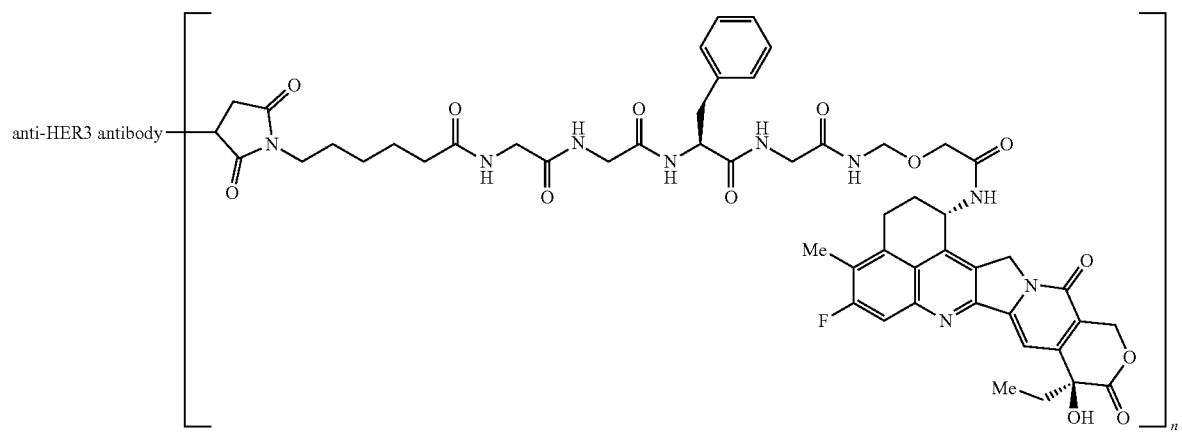

wherein the drug-linker is conjugated to the anti-HER3 antibody via a thioether bond, and n is the average number of units of the drug-linker conjugated per antibody molecule.

[27] The method of treatment according to any one of [18] to [26], wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

[28] The method of treatment according to any one of [18] to [26], wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

[29] The method of treatment according to any one of [18] to [26], wherein the anti-HER3 antibody is an antibody comprising a heavy chain consisting of an amino acid sequence represented by SEQ ID NO: 9 and a light chain consisting of an amino acid sequence represented by SEQ ID NO: 10.

[30] The method of treatment according to [29], wherein the anti-HER3 antibody lacks a lysine residue at the carboxyl terminus of the heavy chain.

[31] The method of treatment according to any one of [18] to [30], wherein the average number of units of the drug-linker conjugated per antibody molecule in the anti-HER3 antibody-drug conjugate is in the range of 7 to 8.

[32] The method of treatment according to any one of [18] to [30], wherein the average number of units of the drug-linker conjugated per antibody molecule in the anti-HER3 antibody-drug conjugate is in the range of 7.5 to 8.

[33] The method of treatment according to any one of [18] to [32], wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

[34] The method of treatment according to any one of [18] to [32], wherein the cancer is at least one selected from the group consisting of breast cancer, non-small cell lung cancer, colorectal cancer, stomach cancer, ovarian cancer, head and neck cancer, glioblastoma multiforme, and melanoma.

[35] An anti-HER3 antibody-drug conjugate for use in treating HER3-mutated cancer.

[36] The anti-HER3 antibody-drug conjugate according to [35], wherein a HER3 mutation in the HER3-mutated cancer is at least one selected from the group consisting of V104L, V104M, A232V, P262H, G284R, D297Y, G325R, T355I, Q809R, S846I, and E928G.

[37] The anti-HER3 antibody-drug conjugate according to [35], wherein a HER3 mutation in the HER3-mutated cancer is Q809R.

[38] The anti-HER3 antibody-drug conjugate according to any one of [35] to [37], wherein HER2 is overexpressed in the HER3-mutated cancer.

[39] The anti-HER3 antibody-drug conjugate according to any one of [35] to [37], wherein HER2 is not overexpressed in the HER3-mutated cancer.

[40] The anti-HER3 antibody-drug conjugate according to any one of [35] to [39], wherein there is no substantial difference in lysosome migrations of the anti-HER3 antibody-drug conjugate between in wild-type HER3-expressing cells and in mutant-type HER3-expressing cells.

[41] The anti-HER3 antibody-drug conjugate according to any one of [35] to [40], wherein there is no substantial difference in lysosome migrations of the anti-HER3 antibody-drug conjugate between in HER3-expressing cells overexpressing HER2 and in HER3-expressing cells not overexpressing HER2.

[42] The anti-HER3 antibody-drug conjugate according to any one of [35] to [41], wherein the anti-HER3 antibody-drug conjugate is an anti-HER3 antibody-drug conjugate in which a drug-linker represented by the following formula:

[Formula 5]

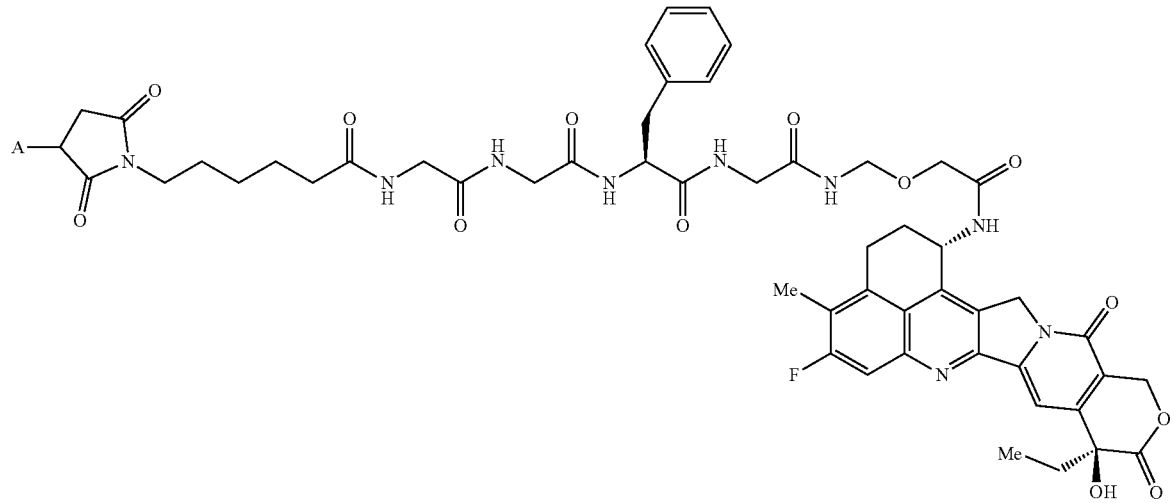

wherein A represents a connecting position to an anti-HER3 antibody;
is conjugated to the anti-HER3 antibody via a thioether bond.

[43] The anti-HER3 antibody-drug conjugate according to any one of [35] to [41], wherein the anti-HER3 antibody-drug conjugate is an anti-HER3 antibody-drug conjugate represented by the following formula:

[Formula 6]

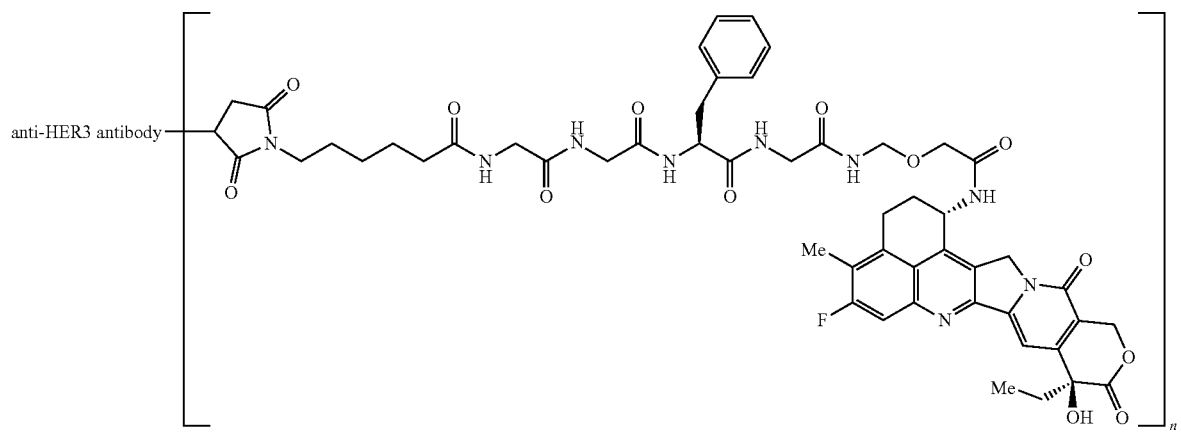

wherein the drug-linker is conjugated to the anti-HER3 antibody via a thioether bond, and n is the average number of units of the drug-linker conjugated per antibody molecule.

[44] The anti-HER3 antibody-drug conjugate according to any one of [35] to [43], wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

[45] The anti-HER3 antibody-drug conjugate according to any one of [35] to [43], wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

[46] The anti-HER3 antibody-drug conjugate according to any one of [35] to [43], wherein the anti-HER3 antibody is an antibody comprising a heavy chain consisting of an amino acid sequence represented by SEQ ID NO: 9 and a light chain consisting of an amino acid sequence represented by SEQ ID NO: 10.

[47] The anti-HER3 antibody-drug conjugate according to [46], wherein the anti-HER3 antibody lacks a lysine residue at the carboxyl terminus of the heavy chain.

[48] The anti-HER3 antibody-drug conjugate according to any one of [35] to [47], wherein the average number of units of the drug-linker conjugated per antibody molecule in the anti-HER3 antibody-drug conjugate is in the range of 7 to 8.

[49] The anti-HER3 antibody-drug conjugate according to any one of [35] to [47], wherein the average number of units of the drug-linker conjugated per antibody molecule in the anti-HER3 antibody-drug conjugate is in the range of 7.5 to 8.

[50] The anti-HER3 antibody-drug conjugate according to any one of [35] to [49], wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

[51] The anti-HER3 antibody-drug conjugate according to any one of [35] to [49], wherein the cancer is at least one selected from the group consisting of breast cancer, non-small cell lung cancer, colorectal cancer, stomach cancer, ovarian cancer, head and neck cancer, glioblastoma multiforme, and melanoma.

[52] Use of an anti-HER3 antibody-drug conjugate for the manufacture of a medicament for treating HER3-mutated cancer.

[53] The use according to [52], wherein a HER3 mutation in the HER3-mutated cancer is at least one selected from the group consisting of V104L, V104M, A232V, P262H, G284R, D297Y, G325R, T355I, Q809R, S846I, and E928G.

[54] The use according to [52], wherein a HER3 mutation in the HER3-mutated cancer is Q809R.

[55] The use according to any one of [52] to [54], wherein the HER2 is overexpressed in the HER3-mutated cancer.

[56] The use according to any one of [52] to [54], wherein HER2 is not overexpressed in the HER3-mutated cancer.

[57] The use according to any one of [52] to [56], wherein there is no substantial difference in lysosome migrations of the anti-HER3 antibody-drug conjugate between in wild-type HER3-expressing cells and in mutant-type HER3-expressing cells.

[58] The use according to any one of [52] to [57], wherein there is no substantial difference in lysosome migrations of the anti-HER3 antibody-drug conjugate between in HER3-expressing cells overexpressing HER2 and in HER3-expressing cells not overexpressing HER2.

[59] The use according to any one of [52] to [58], wherein the anti-HER3 antibody-drug conjugate is an anti-HER3 antibody-drug conjugate in which a drug-linker represented by the following formula:

[Formula 7]

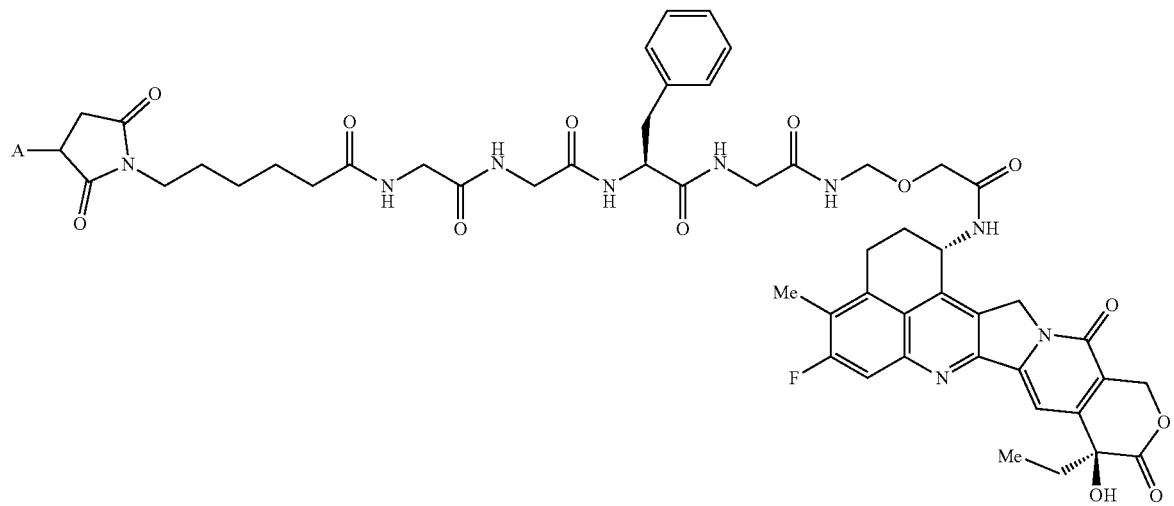

wherein A represents a connecting position to an anti-HER3 antibody;
is conjugated to the anti-HER3 antibody via a thioether bond.

[60] The use according to any one of [52] to [58], wherein the anti-HER3 antibody-drug conjugate is an anti-HER3 antibody-drug conjugate represented by the following formula:

[Formula 8]

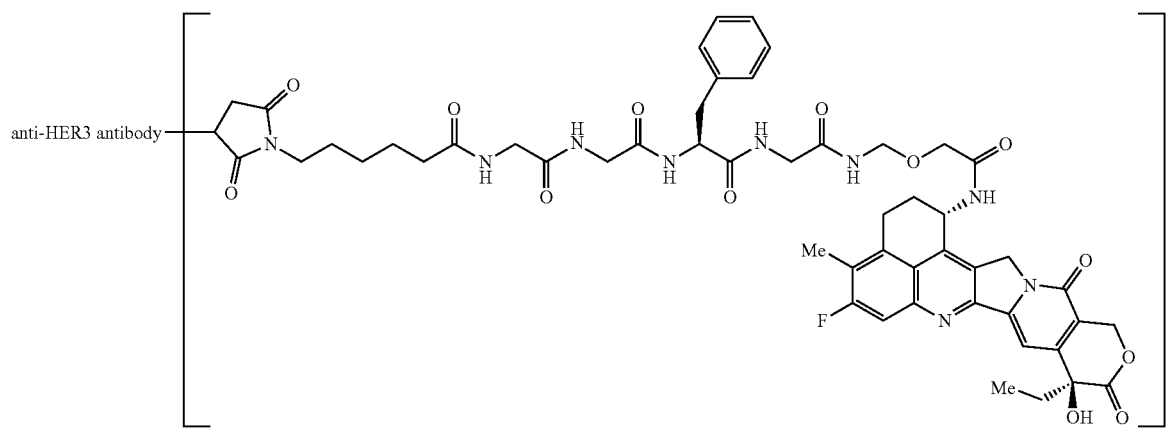

wherein the drug-linker is conjugated to the anti-HER3 antibody via a thioether bond, and n is the average number of units of the drug-linker conjugated per antibody molecule.

[61] The use according to any one of [52] to [60], wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

[62] The use according to any one of [52] to [60], wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

[63] The use according to any one of [52] to [60], wherein the anti-HER3 antibody is an antibody comprising a heavy chain consisting of an amino acid sequence represented by SEQ ID NO: 9 and a light chain consisting of an amino acid sequence represented by SEQ ID NO: 10.

[64] The use according to [63], wherein the anti-HER3 antibody lacks a lysine residue at the carboxyl terminus of the heavy chain.

[65] The use according to any one of [52] to [64], wherein the average number of units of the drug-linker conjugated per antibody molecule in the anti-HER3 antibody-drug conjugate is in the range of 7 to 8.

[66] The use according to any one of [52] to [64], wherein the average number of units of the drug-linker conjugated per antibody molecule in the anti-HER3 antibody-drug conjugate is in the range of 7.5 to 8.

[67] The use according to any one of [52] to [66], wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

[68] The use according to any one of [52] to [66], wherein the cancer is at least one selected from the group consisting of breast cancer, non-small cell lung cancer, colorectal cancer, stomach cancer, ovarian cancer, head and neck cancer, glioblastoma multiforme, and melanoma.

[69] A method of treatment for HER3-mutated cancer, comprising administering an anti-HER3 antibody-drug conjugate to a subject in need of treatment for HER3-mutated cancer.

[70] The method of treatment according to [69], wherein a HER3 mutation in the HER3-mutated cancer is at least one selected from the group consisting of V104L, V104M, A232V, P262H, G284R, D297Y, G325R, T355I, Q809R, S846I, and E928G.

[71] The method of treatment according to [69], wherein a HER3 mutation in the HER3-mutated cancer is Q809R.

[72] The method of treatment according to any one of [69] to [71], wherein HER2 is overexpressed in the HER3-mutated cancer.

[73] The method of treatment according to any one of [69] to [71], wherein HER2 is not overexpressed in the HER3-mutated cancer.

[74] The method of treatment according to any one of [69] to [73], wherein there is no substantial difference in lysosome migrations of the anti-HER3 antibody-drug conjugate between in wild-type HER3-expressing cells and in mutant-type HER3-expressing cells.

[75] The method of treatment according to any one of [69] to [74], wherein there is no substantial difference in lysosome migrations of the anti-HER3 antibody-drug conjugate between in HER3-expressing cells overexpressing HER2 and in HER3-expressing cells not overexpressing HER2.

[76] The method of treatment according to any one of [69] to [75], wherein the anti-HER3 antibody-drug conjugate is an anti-HER3 antibody-drug conjugate in which a drug-linker represented by the following formula:

[Formula 9]

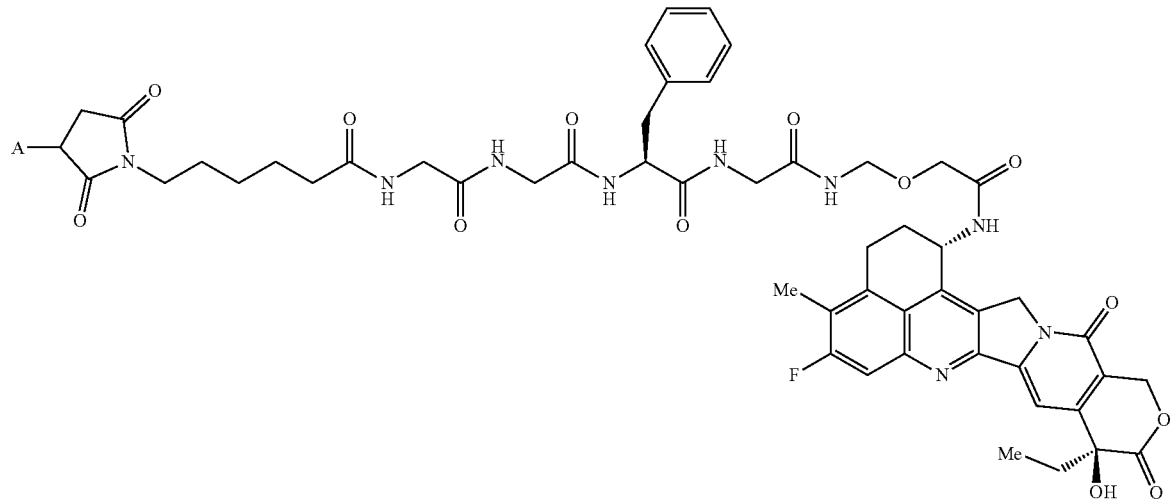

wherein A represents a connecting position to an anti-HER3 antibody;
is conjugated to the anti-HER3 antibody via a thioether bond.

[77] The method of treatment according to any one of [69] to [75], wherein the anti-HER3 antibody-drug conjugate is an anti-HER3 antibody-drug conjugate represented by the following formula:

[Formula 10]

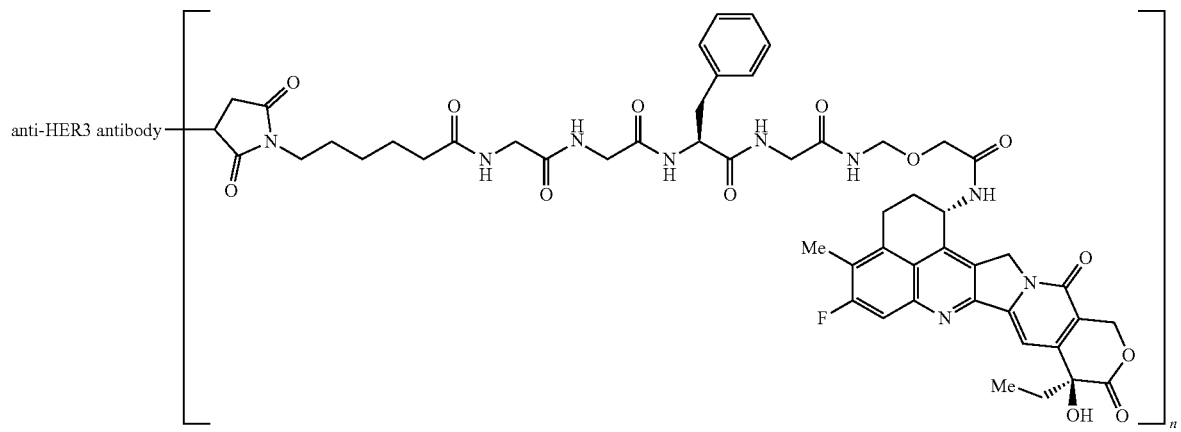

wherein the drug-linker is conjugated to the anti-HER3 antibody via a thioether bond, and n is the average number of units of the drug-linker conjugated per antibody molecule.

[78] The method of treatment according to any one of [69] to [77], wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

[79] The method of treatment according to any one of [69] to [77], wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

[80] The method of treatment according to any one of [69] to [77], wherein the anti-HER3 antibody is an antibody comprising a heavy chain consisting of an amino acid sequence represented by SEQ ID NO: 9 and a light chain consisting of an amino acid sequence represented by SEQ ID NO: 10.

[81] The method of treatment according to [80], wherein the anti-HER3 antibody lacks a lysine residue at the carboxyl terminus of the heavy chain.

[82] The method of treatment according to any one of [69] to [81], wherein the average number of units of the drug-linker conjugated per antibody molecule in the anti-HER3 antibody-drug conjugate is in the range of 7 to 8.

[83] The method of treatment according to any one of [69] to [81], wherein the average number of units of the drug-linker conjugated per antibody molecule in the anti-HER3 antibody-drug conjugate is in the range of 7.5 to 8.

[84] The method of treatment according to any one of [69] to [83], wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

[85] The method of treatment according to any one of [69] to [83], wherein the cancer is at least one selected from the group consisting of breast cancer, non-small cell lung cancer, colorectal cancer, stomach cancer, ovarian cancer, head and neck cancer, glioblastoma multiforme, and melanoma.

Further, the present invention can also be expressed as the following (1) to (48).
(1) A therapeutic agent for HER3 gene mutated cancer comprising an anti-HER3 antibody-drug conjugate as an active ingredient.
(2) The therapeutic agent according to (1), wherein HER2 is overexpressed in the HER3 gene mutated cancer.
(3) The therapeutic agent according to (1), wherein HER2 is not overexpressed in the HER3 gene mutated cancer.
(4) The therapeutic agent according to any one of (1) to (3), wherein the anti-HER3 antibody-drug conjugate is an anti-HER3 antibody-drug conjugate in which a drug-linker represented by the following formula:

[Formula 11]

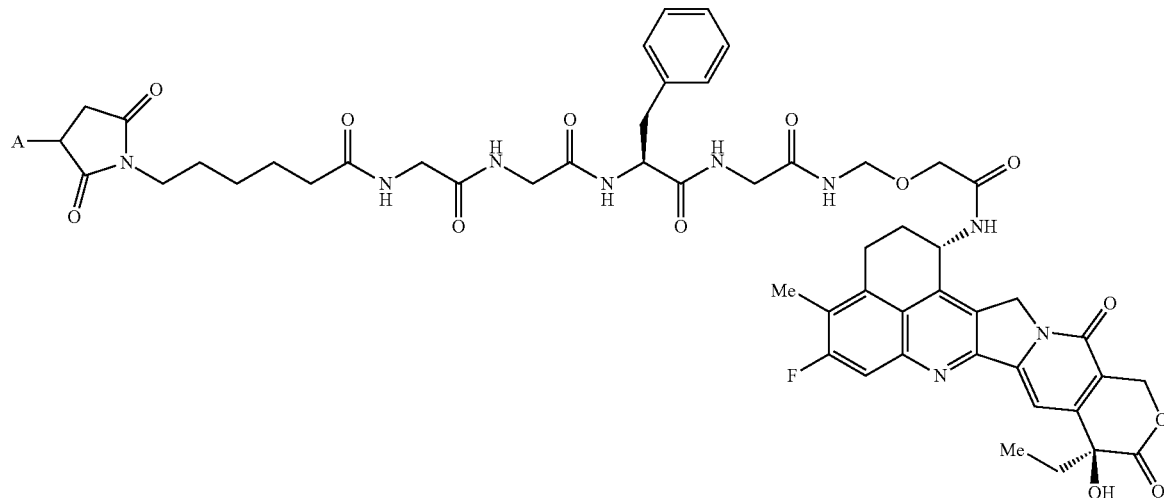

wherein A represents a connecting position to an anti-HER3 antibody;

is conjugated to the anti-HER3 antibody via a thioether bond.

(5) The therapeutic agent according to any one of (1) to (4), wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

(6) The therapeutic agent according to any one of (1) to (5), wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

(7) The therapeutic agent according to any one of (1) to (6), wherein the anti-HER3 antibody is an antibody comprising a heavy chain consisting of an amino acid sequence represented by SEQ ID NO: 9 and a light chain consisting of an amino acid sequence represented by SEQ ID NO: 10.

(8) The therapeutic agent according to (7), wherein the anti-HER3 antibody lacks a lysine residue at the carboxyl terminus of the heavy chain.

(9) The therapeutic agent according to any one of (1) to (8), wherein the average number of units of the drug-linker conjugated per antibody molecule in the anti-HER3 antibody-drug conjugate is in the range of 7 to 8.

(10) The therapeutic agent according to any one of (1) to (8), wherein the average number of units of the drug-linker conjugated per antibody molecule in the anti-HER3 antibody-drug conjugate is in the range of 7.5 to 8.

(11) The therapeutic agent according to any one of (1) to (10), wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

(12) The therapeutic agent according to any one of (1) to (10), wherein the cancer is at least one selected from the group consisting of breast cancer, non-small cell lung cancer, colorectal cancer, stomach cancer, ovarian cancer, head and neck cancer, glioblastoma multiforme, and melanoma.

(13) A method of treatment for cancer, comprising administering an anti-HER3 antibody-drug conjugate to a subject determined to have HER3 gene mutated cancer.

(14) The method of treatment according to (13), wherein HER2 is overexpressed in the HER3 gene mutated cancer.

(15) The method of treatment according to (13), wherein HER2 is not overexpressed in the HER3 gene mutated cancer.

(16) The method of treatment according to any one of (13) to (15), wherein the anti-HER3 antibody-drug conjugate is an anti-HER3 antibody-drug conjugate in which a drug-linker represented by the following formula:

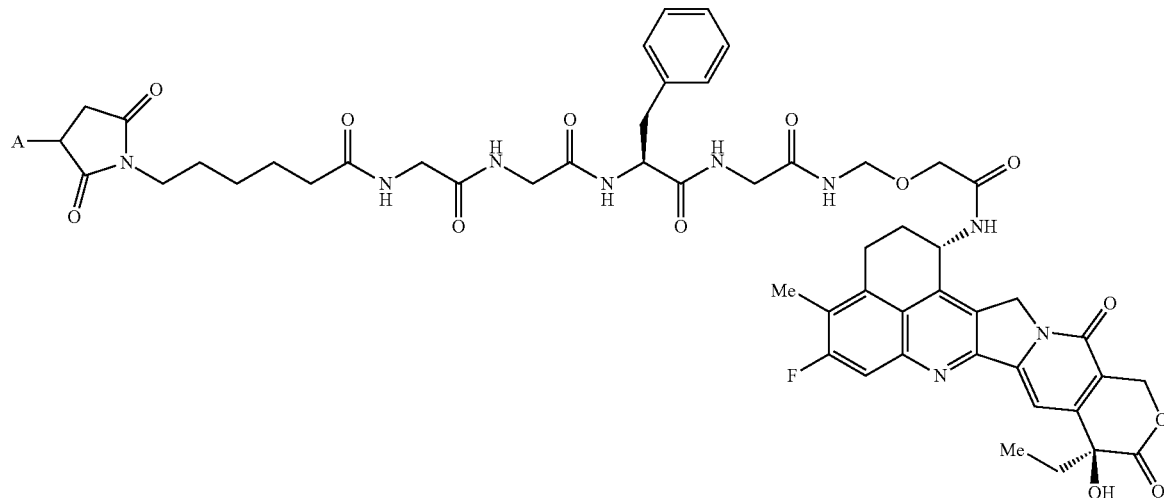

[Formula 12]

wherein A represents a connecting position to an anti-HER3 antibody;

is conjugated to the anti-HER3 antibody via a thioether bond.

(17) The method of treatment according to any one of (13) to (16), wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

(18) The method of treatment according to any one of (13) to (17), wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

(19) The method of treatment according to any one of (13) to (18), wherein the anti-HER3 antibody is an antibody comprising a heavy chain consisting of an amino acid sequence represented by SEQ ID NO: 9 and a light chain consisting of an amino acid sequence represented by SEQ ID NO: 10.

(20) The method of treatment according to (19), wherein the anti-HER3 antibody lacks a lysine residue at the carboxyl terminus of the heavy chain.

(21) The method of treatment according to any one of (13) to (20), wherein the average number of units of the drug-linker conjugated per antibody molecule in the anti-HER3 antibody-drug conjugate is in the range of 7 to 8.

(22) The method of treatment according to any one of (13) to (20), wherein the average number of units of the drug-linker conjugated per antibody molecule in the anti-HER3 antibody-drug conjugate is in the range of 7.5 to 8.

(23) The method of treatment according to any one of (13) to (22), wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

(24) The method of treatment according to any one of (13) to (22), wherein the cancer is at least one selected from the group consisting of breast cancer, non-small cell lung cancer, colorectal cancer, stomach cancer, ovarian cancer, head and neck cancer, glioblastoma multiforme, and melanoma.

(25) An anti-HER3 antibody-drug conjugate for use in treating HER3 gene mutated cancer.

(26) The anti-HER3 antibody-drug conjugate according to (25), wherein HER2 is overexpressed in the HER3 gene mutated cancer.

(27) The anti-HER3 antibody-drug conjugate according to (25), wherein HER2 is not overexpressed in the HER3 gene mutated cancer.

(28) The anti-HER3 antibody-drug conjugate according to any one of (25) to (27), wherein the anti-HER3 antibody-drug conjugate is an anti-HER3 antibody-drug conjugate in which a drug-linker represented by the following formula:

[Formula 13]

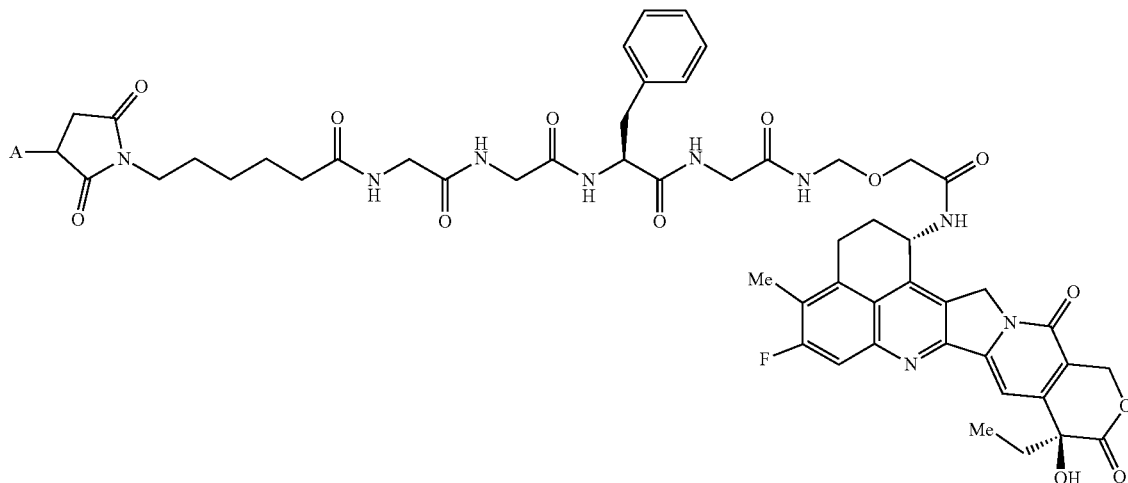

wherein A represents a connecting position to an anti-HER3 antibody;

is conjugated to the anti-HER3 antibody via a thioether bond.

(29) The anti-HER3 antibody-drug conjugate according to any one of (25) to (28), wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

(30) The anti-HER3 antibody-drug conjugate according to any one of (25) to (29), wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

(31) The anti-HER3 antibody-drug conjugate according to any one of (25) to (30), wherein the anti-HER3 antibody is an antibody comprising a heavy chain consisting of an amino acid sequence represented by SEQ ID NO: 9 and a light chain consisting of an amino acid sequence represented by SEQ ID NO: 10.

(32) The anti-HER3 antibody-drug conjugate according to (31), wherein the anti-HER3 antibody lacks a lysine residue at the carboxyl terminus of the heavy chain.

(33) The anti-HER3 antibody-drug conjugate according to any one of (25) to (32), wherein the average number of units of the drug-linker conjugated per antibody molecule in the anti-HER3 antibody-drug conjugate is in the range of 7 to 8.

(34) The anti-HER3 antibody-drug conjugate according to any one of (25) to (33), wherein the average number of units of the drug-linker conjugated per antibody molecule in the anti-HER3 antibody-drug conjugate is in the range of 7.5 to 8.

(35) The anti-HER3 antibody-drug conjugate according to any one of (25) to (34), wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

(36) The anti-HER3 antibody-drug conjugate according to any one of (25) to (34), wherein the cancer is at least one selected from the group consisting of breast cancer, non-small cell lung cancer, colorectal cancer, stomach cancer, ovarian cancer, head and neck cancer, glioblastoma multiforme, and melanoma.

(37) Use of an anti-HER3 antibody-drug conjugate for the manufacture of a medicament for treating HER3 gene mutated cancer.

(38) The use according to (37), wherein HER2 is overexpressed in the HER3 gene mutated cancer.

(39) The use according to (37), wherein HER2 is not overexpressed in the HER3 gene mutated cancer.

(40) The use according to any one of (37) to (39), wherein the anti-HER3 antibody-drug conjugate is an anti-HER3 antibody-drug conjugate in which a drug-linker represented by the following formula:

[Formula 14]

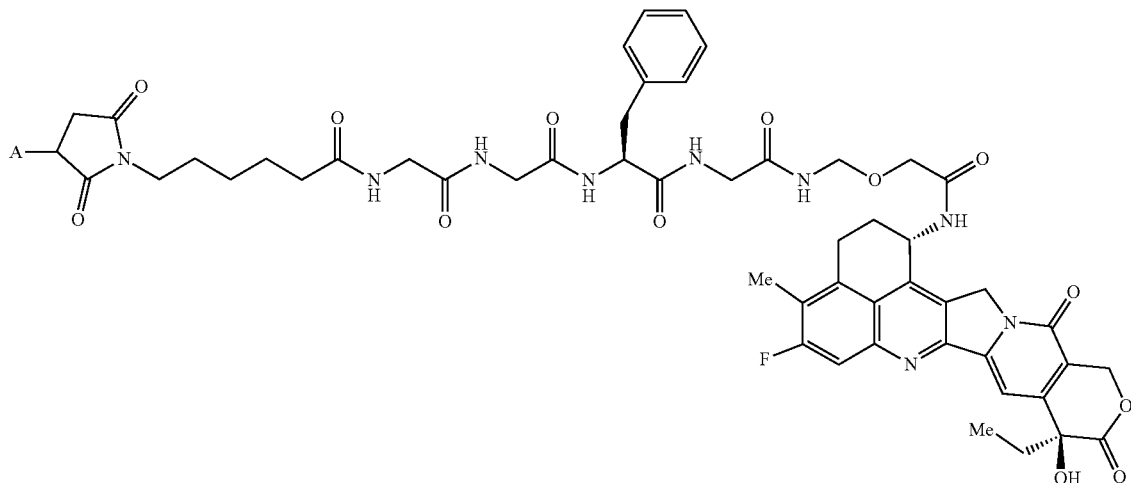

wherein A represents a connecting position to an anti-HER3 antibody;
is conjugated to the anti-HER3 antibody via a thioether bond.
(41) The use according to any one of (37) to (40), wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.
(42) The use according to any one of (37) to (41), wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.
(43) The use according to any one of (37) to (42), wherein the anti-HER3 antibody is an antibody comprising a heavy chain consisting of an amino acid sequence represented by SEQ ID NO: 9 and a light chain consisting of an amino acid sequence represented by SEQ ID NO: 10.
(44) The use according to (43), wherein the anti-HER3 antibody lacks a lysine residue at the carboxyl terminus of the heavy chain.
(45) The use according to any one of (37) to (44), wherein the average number of units of the drug-linker conjugated per antibody molecule in the anti-HER3 antibody-drug conjugate is in the range of 7 to 8.
(46) The use according to any one of (37) to (44), wherein the average number of units of the drug-linker conjugated per antibody molecule in the anti-HER3 antibody-drug conjugate is in the range of 7.5 to 8.
(47) The use according to any one of (37) to (46), wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.
(48) The use according to any one of (37) to (46), wherein the cancer is at least one selected from the group consisting of breast cancer, non-small cell lung cancer, colorectal cancer, stomach cancer, ovarian cancer, head and neck cancer, glioblastoma multiforme, and melanoma.

Advantageous Effects of Invention

The present invention can provide a therapeutic agent for HER3-mutated cancer comprising an anti-HER3 antibody-drug conjugate and/or a method of treatment for cancer comprising administering the anti-HER3 antibody-drug conjugate to a subject determined to have HER3-mutated cancer.

BRIEF DESCRIPTION OF DRAWINGS

FIG. 1 shows an amino acid sequence (SEQ ID NO: 9) of a heavy chain of an anti-HER3 antibody.
FIG. 2 shows an amino acid sequence (SEQ ID NO: 10) of a light chain of an anti-HER3 antibody.
FIG. 3 shows the results (HER3 expression) of 1% agarose gel electrophoresis of RT-PCR products of various kinds of HER3-stably expressing cells.
FIG. 4 shows the results (HER3 expression) of 1% agarose gel electrophoresis of RT-PCR products of various kinds of HER2-overexpressing and HER3-stably expressing cells.
FIG. 5 shows the results (HER2 expression) of 1% agarose gel electrophoresis of RT-PCR products of various kinds of HER2-overexpressing and HER3-stably expressing cells.
FIG. 6 shows the binding activity of HER3-ADC (1) in HER3-stably expressing cells.

FIG. 7 shows the binding activity of HER3-ADC (1) in HER2-overexpressing and HER3-stably expressing cells.

FIG. 8 shows the cell growth inhibitory activities of HER3-ADC (1), HER3-Ab (1), and IgG-ADC (1) against empty vector-introduced cells (without HER2 overexpression).

FIG. 9 shows the cell growth inhibitory activities of HER3-ADC (1), HER3-Ab (1), and IgG-ADC (1) against wild-type HER3-introduced cells (without HER2 overexpression).

FIG. 10 shows the cell growth inhibitory activities of HER3-ADC (1), HER3-Ab (1), and IgG-ADC (1) against mutant-type HER3 (V104L)-introduced cells (without HER2 overexpression).

FIG. 11 shows the cell growth inhibitory activities of HER3-ADC (1), HER3-Ab (1), and IgG-ADC (1) against mutant-type HER3 (V104M)-introduced cells (without HER2 overexpression).

FIG. 12 shows the cell growth inhibitory activities of HER3-ADC (1), HER3-Ab (1), and IgG-ADC (1) against mutant-type HER3 (A232V)-introduced cells (without HER2 overexpression).

FIG. 13 shows the cell growth inhibitory activities of HER3-ADC (1), HER3-Ab (1), and IgG-ADC (1) against mutant-type HER3 (P262H)-introduced cells (without HER2 overexpression).

FIG. 14 shows the cell growth inhibitory activities of HER3-ADC (1), HER3-Ab (1), and IgG-ADC (1) against mutant-type HER3 (G284R)-introduced cells (without HER2 overexpression).

FIG. 15 shows the cell growth inhibitory activities of HER3-ADC (1), HER3-Ab (1), and IgG-ADC (1) against mutant-type HER3 (D297Y)-introduced cells (without HER2 overexpression).

FIG. 16 shows the cell growth inhibitory activities of HER3-ADC (1), HER3-Ab (1), and IgG-ADC (1) against mutant-type HER3 (G325R)-introduced cells (without HER2 overexpression).

FIG. 17 shows the cell growth inhibitory activities of HER3-ADC (1), HER3-Ab (1), and IgG-ADC (1) against mutant-type HER3 (T355I)-introduced cells (without HER2 overexpression).

FIG. 18 shows the cell growth inhibitory activities of HER3-ADC (1), HER3-Ab (1), and IgG-ADC (1) against mutant-type HER3 (S846I)-introduced cells (without HER2 overexpression).

FIG. 19 shows the cell growth inhibitory activities of HER3-ADC (1), HER3-Ab (1), and IgG-ADC (1) against mutant-type HER3 (E928G)-introduced cells (without HER2 overexpression).

FIG. 20 shows the cell growth inhibitory activities of HER3-ADC (1), HER3-Ab (1), and IgG-ADC (1) against empty vector-introduced cells (with HER2 overexpression).

FIG. 21 shows the cell growth inhibitory activities of HER3-ADC (1), HER3-Ab (1), and IgG-ADC (1) against wild-type HER3-introduced cells (with HER2 overexpression).

FIG. 22 shows the cell growth inhibitory activities of HER3-ADC (1), HER3-Ab (1), and IgG-ADC (1) against mutant-type HER3 (V104L)-introduced cells (with HER2 overexpression).

FIG. 23 shows the cell growth inhibitory activities of HER3-ADC (1), HER3-Ab (1), and IgG-ADC (1) against mutant-type HER3 (V104M)-introduced cells (with HER2 overexpression).

FIG. 24 shows the cell growth inhibitory activities of HER3-ADC (1), HER3-Ab (1), and IgG-ADC (1) against mutant-type HER3 (A232V)-introduced cells (with HER2 overexpression).

FIG. 25 shows the cell growth inhibitory activities of HER3-ADC (1), HER3-Ab (1), and IgG-ADC (1) against mutant-type HER3 (P262H)-introduced cells (with HER2 overexpression).

FIG. 26 shows the cell growth inhibitory activities of HER3-ADC (1), HER3-Ab (1), and IgG-ADC (1) against mutant-type HER3 (G284R)-introduced cells (with HER2 overexpression).

FIG. 27 shows the cell growth inhibitory activities of HER3-ADC (1), HER3-Ab (1), and IgG-ADC (1) against mutant-type HER3 (D297Y)-introduced cells (with HER2 overexpression).

FIG. 28 shows the cell growth inhibitory activities of HER3-ADC (1), HER3-Ab (1), and IgG-ADC (1) against mutant-type HER3 (G325R)-introduced cells (with HER2 overexpression).

FIG. 29 shows the cell growth inhibitory activities of HER3-ADC (1), HER3-Ab (1), and IgG-ADC (1) against mutant-type HER3 (T355I)-introduced cells (with HER2 overexpression).

FIG. 30 shows the cell growth inhibitory activities of HER3-ADC (1), HER3-Ab (1), and IgG-ADC (1) against mutant-type HER3 (S846I)-introduced cells (with HER2 overexpression).

FIG. 31 shows the cell growth inhibitory activities of HER3-ADC (1), HER3-Ab (1), and IgG-ADC (1) against mutant-type HER3 (E928G)-introduced cells (with HER2 overexpression).

FIG. 32 shows the cell growth inhibitory activities of HER3-ADC (1), HER3-Ab (1), and IgG-ADC (1) against empty vector-introduced cells (without HER2 overexpression).

FIG. 33 shows the cell growth inhibitory activities of HER3-ADC (1), HER3-Ab (1), and IgG-ADC (1) against wild-type HER3-introduced cells (without HER2 overexpression).

FIG. 34 shows the results (HER3 expression) of 1% agarose gel electrophoresis of RT-PCR products of mutant-type HER3 (Q809R)-introduced cells (with HER2 overexpression).

FIG. 35 shows the results (HER2 expression) of 1% agarose gel electrophoresis of RT-PCR products of mutant-type HER3 (Q809R)-introduced cells (with HER2 overexpression).

FIG. 36 shows the binding activity of HER3-ADC (1) in mutant-type HER3 (Q809R)-introduced cells (with HER2 overexpression).

FIG. 37 shows the cell growth inhibitory activities of HER3-ADC (1), HER3-Ab (1), and IgG-ADC (1) against mutant-type HER3 (Q809R)-introduced cells (with HER2 overexpression).

FIG. 38 shows the lysosome migration of HER3-ADC (1) against empty vector-introduced cells (without HER2 overexpression).

FIG. 39 shows the lysosome migration of HER3-ADC (1) against wild-type HER3-introduced cells (without HER2 overexpression).

FIG. 40 shows the lysosome migration of HER3-ADC (1) against mutant-type HER3 (V104L)-introduced cells (without HER2 overexpression).

FIG. 41 shows the lysosome migration of HER3-ADC (1) against mutant-type HER3 (V104M)-introduced cells (without HER2 overexpression).

FIG. 42 shows the lysosome migration of HER3-ADC (1) against mutant-type HER3 (A232V)-introduced cells (without HER2 overexpression).

FIG. 43 shows the lysosome migration of HER3-ADC (1) against mutant-type HER3 (P262H)-introduced cells (without HER2 overexpression).

FIG. 44 shows the lysosome migration of HER3-ADC (1) against mutant-type HER3 (G284R)-introduced cells (without HER2 overexpression).

FIG. 45 shows the lysosome migration of HER3-ADC (1) against mutant-type HER3 (D297Y)-introduced cells (without HER2 overexpression).

FIG. 46 shows the lysosome migration of HER3-ADC (1) against mutant-type HER3 (G325R)-introduced cells (without HER2 overexpression).

FIG. 47 shows the lysosome migration of HER3-ADC (1) against mutant-type HER3 (T355I)-introduced cells (without HER2 overexpression).

FIG. 48 shows the lysosome migration of HER3-ADC (1) against mutant-type HER3 (S846I)-introduced cells (without HER2 overexpression).

FIG. 49 shows the lysosome migration of HER3-ADC (1) against mutant-type HER3 (E928G)-introduced cells (without HER2 overexpression).

FIG. 50 shows the lysosome migration of HER3-ADC (1) against empty vector-introduced cells (with HER2 overexpression).

FIG. 51 shows the lysosome migration of HER3-ADC (1) against wild-type HER3-introduced cells (with HER2 overexpression).

FIG. 52 shows the lysosome migration of HER3-ADC (1) against mutant-type HER3 (V104L)-introduced cells (with HER2 overexpression).

FIG. 53 shows the lysosome migration of HER3-ADC (1) against mutant-type HER3 (V104M)-introduced cells (with HER2 overexpression).

FIG. 54 shows the lysosome migration of HER3-ADC (1) against mutant-type HER3 (A232V)-introduced cells (with HER2 overexpression).

FIG. 55 shows the lysosome migration of HER3-ADC (1) against mutant-type HER3 (P262H)-introduced cells (with HER2 overexpression).

FIG. 56 shows the lysosome migration of HER3-ADC (1) against mutant-type HER3 (G284R)-introduced cells (with HER2 overexpression).

FIG. 57 shows the lysosome migration of HER3-ADC (1) against mutant-type HER3 (D297Y)-introduced therein (with HER2 overexpression).

FIG. 58 shows the lysosome migration of HER3-ADC (1) against mutant-type HER3 (G325R)-introduced cells (with HER2 overexpression).

FIG. 59 shows the lysosome migration of HER3-ADC (1) against mutant-type HER3 (T355I)-introduced cells (with HER2 overexpression).

FIG. 60 shows the lysosome migration of HER3-ADC (1) against mutant-type HER3 (Q809R)-introduced cells (with HER2 overexpression).

FIG. 61 shows the lysosome migration of HER3-ADC (1) against mutant-type HER3 (S846I)-introduced cells (with HER2 overexpression).

FIG. 62 shows the lysosome migration of HER3-ADC (1) against mutant-type HER3 (E928G)-introduced cells (with HER2 overexpression).

FIG. 63 shows the lysosome migration of HER3-ADC (1) against empty vector-introduced cells (without HER2 overexpression).

FIG. 64 shows the lysosome migration of HER3-ADC (1) against wild-type HER3-introduced cells (without HER2 overexpression).

FIG. 65 shows an amino acid sequence (SEQ ID NO: 69) of HER3 protein.

DESCRIPTION OF EMBODIMENTS

Hereinafter, preferred modes for carrying out the present invention are described. The embodiments described below are given merely for illustrating one example of a typical embodiment of the present invention and are not intended to limit the scope of the present invention.

[Definition]

In the present invention, "HER3" is synonymous with human epidermal growth factor receptor 3 (HER3; also known as ErbB3) and is a transmembrane receptor belonging to the epidermal growth factor receptor subfamily of receptor protein tyrosine kinases together with HER1 (EGFR or ErbB-1), HER2 (ErbB2), and HER4 (ErbB4). It is known that HER3 is expressed in various cancers such as breast cancer, lung cancer, and colorectal cancer, and it forms a heterodimer together with tyrosine kinase receptors such as HER2 and EGFR, upon which HER3 is phosphorylated, thereby inducing cancer cell growth or apoptosis suppressing signals (Alimandi et al., Oncogene (1995) 10, 1813-1821, deFazio et al., Int. J. Cancer (2000) 87, 487-498, Naidu et al., Br. J. Cancer (1998) 78, 1385-1390).

In the present invention, the term "HER3 protein" is used in the same meaning as HER3. The expression of HER3 protein can be detected using a method well known to those skilled in the art, such as immunohistochemistry (IHC). Further, it is also possible to detect the expression of HER3 protein by introducing Flag peptide into HER3 protein and using an anti-Flag peptide antibody.

An amino acid sequence of HER3 protein is shown in SEQ ID NO: 69 (FIG. 65).

In the present invention, "HER3 gene" means a gene encoding HER3 protein. HER3 protein is a gene product of HER3 gene.

In the present invention, "HER3 mutation" means having mutation(s) in the amino acid sequence of HER3 protein.

In the present invention, "HER3-mutated cancer" means a cancer with mutation(s) in the amino acid sequence of HER3 protein. Further, a cancer containing cancer cells with HER3 mutation, even not having the HER3 mutation throughout the tumor tissue is included in the HER3-mutated cancer.

In the present invention, "HER3 gene mutation" means having mutation(s) in HER3 gene.

In the present invention, "HER3 gene mutated cancer" means a cancer with mutation(s) in HER3 gene. Further, a cancer containing cancer cells with HER3 gene mutation, even not having the HER3 gene mutation throughout the tumor tissue is included in the HER3 gene mutated cancer. The HER3 gene mutation causes mutation in the amino acid sequence of HER3 protein that is a gene product, thereby causing HER3 mutation.

Specific examples of the HER3 mutation can include a mutation in which V (valine) that is amino acid residue 104 of HER3 protein is replaced by L (leucine) (which may be also referred to as "V104L") (see Cancer Cell. 2013 May 13; 23 (5): 603-17, Nat Genet. 2014 August; 46 (8): 872-6, Cancer Res. 2014 Nov. 1; 74 (21): 6071-81, Cancer. 2016 Sep. 1; 122 (17): 2654-62, Nat Med. 2017 June; 23 (6): 703-713, and Nature. 2018 Feb. 8; 554 (7691): 189-194, for example), a mutation in which V (valine) that is amino acid residue 104 of HER3 protein is replaced by M (methionine) (which may be also referred to as "V104M") (see Hum Mutat. 2008 March; 29 (3): 441-50, Cancer Cell. 2013 May 13; 23 (5): 603-17, Genome Biol. 2014 Apr. 1; 15 (4): R55, Cancer Res. 2014 Jun. 15; 74 (12): 3238-47, Nat Genet. 2014 August; 46 (8): 872-6, and Ann Oncol. 2016 January; 27(1): 127-33, for example), a mutation in which A (alanine) that is amino acid residue 232 of HER3 protein is replaced by V (valine) (which may be also referred to as "A232V") (see Nat Genet. 2013 May; 45 (5): 478-86, Cancer Cell. 2013 May 13; 23 (5): 603-17, Cancer Cell. 2016 Feb. 8; 29 (2): 229-40, Cell Rep. 2016 Apr. 26; 15 (4): 857-865, for example), a mutation in which P (proline) that is amino acid residue 262 of HER3 protein is replaced by H (histidine) (which may be also referred to as "P262H") (see Cancer Cell. 2013 May 13; 23 (5): 603-17, Gastroenterology. 2014 February; 146 (2): 530-38. e5, and Nat Med. 2017 June; 23 (6): 703-713, for example), a mutation in which G (glycine) that is amino acid residue 284 of HER3 protein is replaced by R (arginine) (which may be also referred to as "G284R") (see Nature. 2008 Oct. 23; 455 (7216): 1069-75, Cancer Cell. 2013 May 13; 23 (5): 603-17, Nat Genet. 2014 June; 46 (6): 573-82, and Ann Oncol. 2015 August; 26 (8): 1704-9, for example), a mutation in which D (aspartic acid) that is amino acid residue 297 of HER3 protein is replaced by Y (tyrosine) (which may be also referred to as "D297Y") (see PLoS One. 2014 Mar. 5; 9 (3): e90459, Nat Genet. 2014 June; 46 (6): 573-82, Nat Genet. 2014 October; 46 (10): 1097-102, Ann Oncol. 2016 January; 27(1): 127-33, and Cancer. 2016 Sep. 1; 122 (17): 2654-62, for example), a mutation in which G (glycine) that is amino acid residue 325 of HER3 protein is replaced by R (arginine) (which may be also referred to as "G325R") (see Nat Med. 2017 June; 23 (6): 703-713, for example), a mutation in which T (threonine) that is amino acid residue 355 of HER3 protein is replaced by I (isoleucine) (which may be also referred to as "T355I") (see Nat Med. 2017 June; 23 (6): 703-713, and Nature. 2018 Feb. 8; 554 (7691): 189-194, for example), a mutation in which Q (glutamine) that is amino acid residue 809 of HER3 protein is replaced by R (arginine) (which may be also referred to as "Q809R") (see Cancer Cell. 2013 May 13; 23 (5): 603-17, Cell Rep. 2016 Apr. 26; 15 (4): 857-865, and Nat Med. 2017 June; 23 (6): 703-713, for example), a mutation in which S (serine) that is amino acid residue 846 of HER3 protein is replaced by I (isoleucine) (which may be also referred to as "S846I") (see Int J Cancer. 2006 Dec. 15; 119 (12): 2986-7, Nat Genet. 2014 December; 46 (12): 1264-6, and Cell Rep. 2016 Apr. 26; 15 (4): 857-865, for example), and a mutation in which E (glutamic acid) that is amino acid residue 928 of HER3 protein is replaced by G (glycine) (which may be also referred to as "E928G") (see Nat Genet. 2011 Oct. 30; 43 (12): 1219-23, Clin Cancer Res. 2016 Apr. 1; 22 (7): 1583-91, Cancer. 2016 Sep. 1; 122 (17): 2654-62, Clin Cancer Res. 2016 Dec. 15; 22 (24): 6061-6068, Cancer Res. 2016 Oct. 15; 76 (20): 5954-5961, and PLoS Med. 2016 Dec. 27; 13 (12): e1002201, for example).

Among the above HER3 mutations, it has been suggested that cancers particularly with Q809R show strong resistance to existing anti-HER2 drugs and anti-HER3 antibodies (Jaiswal et al., Cancer Cell (2013) 23, 603-17).

The HER3 mutation in the present invention is not specifically limited as long as it has mutation(s) in the amino acid sequence of HER3 protein, but examples thereof can include at least one selected from the group consisting of, preferably, V104L, V104M, A232V, P262H, G284R, D297Y, G325R, T355I, Q809R, S846I, and E928G, more preferably Q809R.

The presence or absence of the HER3 mutation can be confirmed, for example, by collecting tumor tissues from a cancer patient and subjecting a formalin-fixed paraffin-embedded specimen (FFPE) to methods such as real-time quantitative PCR (qRT-PCR) or microarray analysis.

Further, the presence or absence of the HER3 mutation can be confirmed by collecting cell-free blood circulating tumor DNA (ctDNA) from a cancer patient and subjecting it to methods such as next generation sequence (NGS) (Sergina et al., Nature (2007) 445, 437-41, Jeong et al., Int. J. Cancer (2006) 119, 2986-7, Ding et al., Nature (2008) 455, 1069-75, Kan et al., Nature (2010) 466, 869-73, Wang et al., Nat. Genet. (2011) 43, 1219-23, Greenman et al., Nature (2007) 446, 153-8, Stransky et al., Science (2011) 333, 1157-60, Jaiswal et al., Cancer Cell (2013) 23, 603-17, Hyman et al., Cancer Res. (2017) Abstract CT001, Mishra et al., Oncotarget (2017) 69, 114371-114392, Mishra et al., Oncotarget (2018) 45, 27773-27788, for example).

In the present invention, the term "HER3 mutation" is used in the same meaning as HER3 gene mutation.

In the present invention, "wild-type HER3" means HER3 protein without HER3 mutation. In the present invention, such a wild-type may be referred to as "WT".

In the present invention, "mutant-type HER3" means HER3 protein with HER3 mutation.

HER3-stably expressing cells can be produced by a chemical transfection method through transfection using cationic lipids, cationic polymers, calcium phosphate, or the like, a physical transfection method through electroporation, microinjection, sonoporation, laser irradiation, or the like, a biological transfection method using a viral vector, etc. For example, in the case of using lentivirus in the biological transfection methods, the cells can be produced by introducing expression plasmids of lentivirus protein and envelope protein and a HER3 expression plasmid into packaging cells such as Lenti-X 293 T cells, thereafter preparing a lentivirus solution from a culture supernatant, and culturing tumor cells using this solution. Here, wild-type or mutant-type HER3-expressing cells can be selectively produced depending on the type of HER3 expression plasmid used. Mutant-type HER3 expression plasmids can be produced using a HER3 mutagenesis primer.

In the present invention, the "anti-HER3 antibody" means an antibody that specifically binds to HER3, preferably, has an activity of being internalized in HER3-expressing cells by binding to HER3, in other words, an antibody that has an activity of migrating into HER3-expressing cells after binding to HER3.

In the present invention, "HER2" is synonymous with human epidermal growth factor receptor 2 (which may be also referred to as neu or ErbB-2) and is a transmembrane receptor belonging to the epidermal growth factor receptor subfamily of receptor protein tyrosine kinases together with HER1, HER3, and HER4. HER2 is known to play an important role in cell growth, differentiation, and survival in normal cells and tumor cells by being activated by autophosphorylation of intercellular tyrosine residues due to heterodimer formation with HER1, HER3, or HER4.

In the present invention, the term "HER2 protein" is used in the same meaning as HER2.

In the present invention, "overexpression" of HER2 means that HER2 expression is determined to be positive. For example, it indicates that HER2 expression is determined to be 3+ by immunohistochemistry (IHC), or that HER2 expression is determined to be 2+ by immunohistochemistry and HER2 expression is determined to be positive by in situ hybridization (ISH). The immunohistochemistry and in situ hybridization can be performed using methods well known to those skilled in the art. For example, HER2 Test Guide, Breast Cancer Edition, 4th edition (created by Breast Cancer HER2 Laboratory Pathology Subcommittee) can be referred to.

HER2-overexpressing cells can be produced by a chemical transfection method through transfection using cationic lipids, cationic polymers, calcium phosphate, or the like, a physical transfection method through electroporation, microinjection, sonoporation, laser irradiation, or the like, a biological transfection method using a viral vector, etc. For example, in the case of using lentivirus in the biological transfection methods, the cells can be produced by introducing expression plasmids of lentivirus protein and envelope protein and a HER2 expression plasmid into packaging cells such as Lenti-X 293 T cells, thereafter preparing a lentivirus solution from a culture supernatant, and culturing tumor cells using this solution. Further, HER2-overexpressing and HER3-stably expressing cells can be produced by culturing HER2-overexpressing cells using the lentivirus solution obtained above by introducing a HER3 expression plasmid.

[Anti-HER3 Antibody-Drug Conjugate]

In the present invention, the "antibody-drug conjugate" means a complex in which a cytotoxic drug is bound to an antibody via a linker. As such antibody-drug conjugates, for example, those described in U.S. Pat. No. 6,214,345, International Publication No. WO 2002/083067, International Publication No. WO 2003/026577, International Publication No. WO 2004/054622, International Publication No. WO 2005/112919, International Publication No. WO 2006/135371, International Publication No. WO 2007112193, International Publication No. WO 2008/033891, International Publication No. WO 2009/100194, International Publication No. WO 2009/134976, International Publication No. WO 2009/134977, International Publication No. WO 2010/093395, International Publication No. WO 2011/130613, International Publication No. WO 2011/130616, International Publication No. WO 2013/055993, International Publication No. WO 2014/057687, International Publication No. WO 2014/061277, International Publication No. WO 2014/107024, International Publication No. WO 2014/134457, and International Publication No. WO 2014/145090 can be exemplified, those described in International Publication No. WO 2014/057687, and International Publication No. WO 2014/061277 can be preferably exemplified, and those described in International Publication No. WO 2014/057687 can be more preferably exemplified. These antibody-drug conjugates can be produced by the methods described in the aforementioned references.

The cytotoxic drug is not particularly limited as long as it has an anti-tumor effect and a substituent or partial structure that can be bound to the linker. As such cytotoxic drugs, for example, camptothecin, calicheamicin, doxorubicin, daunorubicin, mitomycin C, bleomycin, cyclocytidine, vincristine, vinblastine, methotrexate, cisplatin, auristatin E, maytansine, paclitaxel, pyrrolobenzodiazepine, and their derivatives can be exemplified, camptothecin derivatives can be preferably exemplified, and exatecan derivatives can be more preferably exemplified.

Exatecan (IUPAC name: (1S,9S)-1-amino-9-ethyl-5-fluoro-1,2,3,9,12,15-hexahydro-9-hydroxy-4-methyl-10H,13H-benzo[de]pyrano[3',4':6,7]indolizino[1,2-b]quinoline-10,13-dione, (which can be also expressed by chemical name: (1S,9S)-1-amino-9-ethyl-5-fluoro-2,3-dihydro-9-hydroxy-4-methyl-1H,12H-benzo[de]pyrano[3',4':6,7]indolizino[1,2-b]quinoline-10,13 (9H,15H)-dione)), which is a topoisomerase I inhibitor, is a compound represented by the following formula.

[Formula 15]

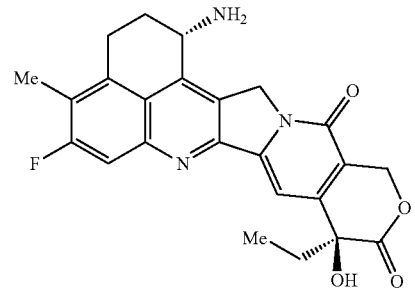

In the present invention, the "drug-linker" means drug and linker moieties in the antibody-drug conjugate, in other words, partial structures other than the antibody in the antibody-drug conjugate.

In the present invention, the "anti-HER3 antibody-drug conjugate" means an antibody-drug conjugate in which the antibody is an anti-HER3 antibody. As such anti-HER3 antibody-drug conjugates, for example, those described in International Publication No. WO 2012/019024, International Publication No. WO 2012/064733, and International Publication No. WO 2015/155998 can be exemplified, and those described in International Publication No. WO 2015/155998 can be preferably exemplified. These anti-HER3 antibody-drug conjugates can be produced by the methods described in the aforementioned references.

The anti-HER3 antibody-drug conjugate preferably used in the present invention is an anti-HER3 antibody-drug conjugate in which a drug-linker represented by the following formula:

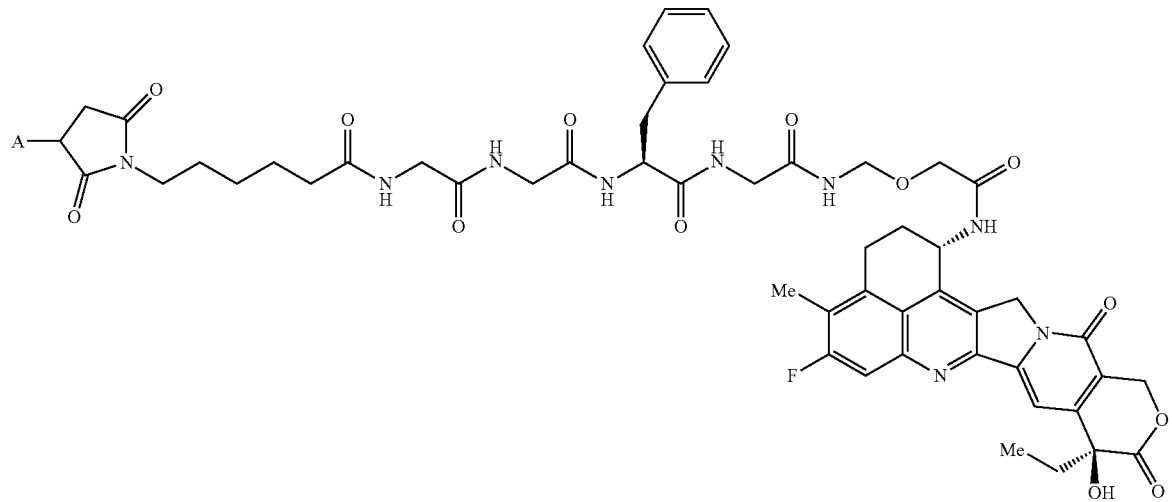

[Formula 16]

wherein A represents a connecting position to an antibody;
is conjugated to the antibody via a thioether bond. The drug-linker is connected to a thiol group (in other words, a sulfur atom of a cysteine residue) formed at an interchain disulfide bond site (two sites between heavy chains and two sites between a heavy chain and a light chain) of the antibody.

The anti-HER3 antibody-drug conjugate preferably used in the present invention can be also represented by the following formula.

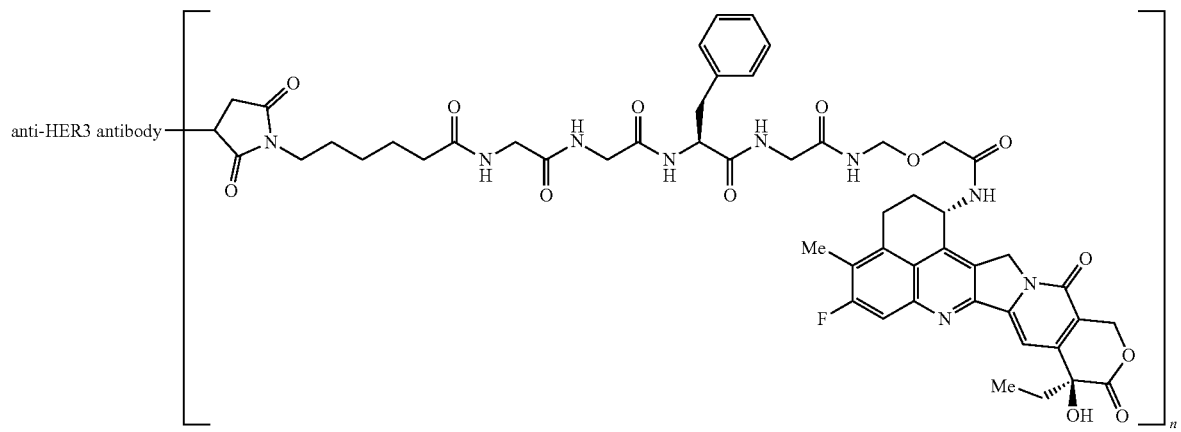

[Formula 17]

wherein the drug-linker is conjugated to the anti-HER3 antibody via a thioether bond. The meaning of n is the same as that of what is called the average number of conjugated drug molecules (DAR; Drug-to-Antibody Ratio) and indicates the average number of units of the drug-linker conjugated per antibody molecule.

The average number of units of the drug-linker conjugated per antibody molecule of the anti-HER3 antibody-drug conjugate preferably used in the present invention is preferably 2 to 8, more preferably 3 to 8, even more preferably 7 to 8, even more preferably 7.5 to 8, and even more preferably about 8.

The anti-HER3 antibody moiety of the anti-HER3 antibody-drug conjugate used in the present invention is preferably an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6, more preferably, an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8, and even more preferably, an antibody comprising a heavy chain consisting of an amino acid sequence represented by SEQ ID NO: 9 and a light chain consisting of an amino acid sequence represented by SEQ ID NO: 10, or a variant of the antibody in which a lysine residue at the carboxyl terminus of the heavy chain is deleted.

After migrating into cancer cells, the anti-HER3 antibody-drug conjugate preferably used in the present invention exerts an anti-tumor effect by releasing a compound represented by the following formula:

[Formula 18]

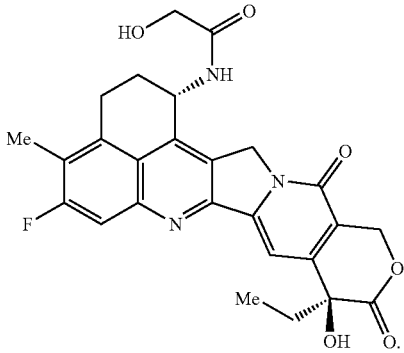

The aforementioned compound is inferred to be the original source of the antitumor activity of the anti-HER3 antibody-drug conjugate preferably used in the present invention, and has been confirmed to have a topoisomerase I inhibitory effect (Ogitani Y. et al., Clinical Cancer Research, 2016 Oct. 15; 22 (20): 5097-5108, Epub 2016 Mar. 29).

The aforementioned compound is inferred to be formed by decomposition of an aminal structure of a compound represented by the following formula:

[Formula 19]

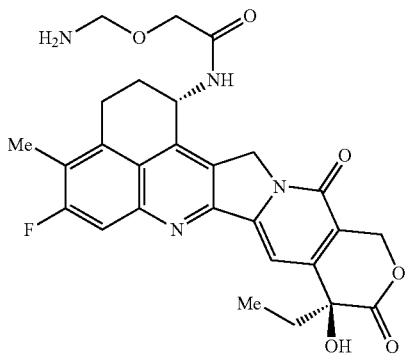

which is inferred to be formed by cleavage of the linker moiety of the anti-HER3 antibody-drug conjugate.

[Production of anti-HER3 antibody] The HER3 protein used in the present invention can be directly purified from human HER3-expressing cells, prepared using cell membrane fractions of such cells as the HER3 protein, in the case of being used as an antigen, or obtained by synthesizing HER3 in vitro or producing HER3 in a host cell by genetic engineering. In genetic engineering, HER3 can be synthesized specifically by incorporating HER3 cDNA into an expressible vector and thereafter incubating the vector in a solution containing enzymes, substrates, and energy materials required for transcription and translation. Alternatively, the protein can be obtained by transforming another prokaryotic or eukaryotic host cell with the vector to express HER3. Further, it is also possible to use the HER3-expressing cells by genetic engineering or cell lines expressing HER3 as HER3 protein antigen.

The RNA sequence, the cDNA sequence, and the amino acid sequence of HER3 are published in a public database and can be referred to, for example, by accession numbers such as AAA35979 (a precursor containing a signal sequence consisting of 19 amino acid residues at the amino terminal) and M34309 (NCBI).

Further, a protein consisting of an amino acid sequence with one to ten amino acids substituted, deleted, added and/or inserted in the amino acid sequence of HER3 and having a biological activity equivalent to the protein is also included in HER3.

The anti-HER3 antibody used in the present invention can be obtained by known methods. For example, the antibody can be obtained by immunizing an animal with any polypeptide selected from HER3 serving as an antigen or the amino acid sequence of HER3, collecting an antibody produced in vivo, and purifying the antibody, using methods generally implemented in this field. The origin of the antigen is not limited to humans, and it is also possible to immunize an animal with an antigen derived from an animal other than humans such as mice and rats. In this case, an anti-HER3 antibody applicable to human diseases can be selected by testing the cross-reactivity between an antibody that binds to the heterogeneous antigen obtained and a human antigen.

Further, it is also possible to obtain monoclonal antibodies by establishing hybridoma by fusing antibody-producing cells that produce antibodies against the antigen with myeloma cells, according to a known method (for example, Kohler and Milstein, Nature (1975) 256, p. 495-497; Kennet, R. ed., Monoclonal Antibodies, p. 365-367, Plenum Press, N.Y. (1980)).

The antigen can be obtained by producing a gene encoding the antigen protein in a host cell by genetic engineering. Specifically, a vector capable of expressing the antigen gene may be produced, so that the vector is introduced into the host cell to express the gene, followed by purification of the antigen expressed. The antibody can be obtained also by using a method of immunizing an animal with antigen-expressing cells obtained by genetic engineering or a cell line expressing the antigen.

The anti-HER3 antibody used in the present invention is preferably a recombinant antibody artificially modified, for example, for the purpose of reducing the heterogeneous antigenicity to humans, such as a chimeric antibody and a humanized antibody, or preferably an antibody having only antibody gene sequences derived from humans, that is, a human antibody. Such antibodies can be produced using known methods.

As the chimeric antibody, an antibody in which the variable region and the constant region of the antibody are heterogeneous with each other, such as a chimeric antibody in which the variable region of a mouse or rat-derived antibody is conjugated to a human-derived constant region can be exemplified (Proc. Natl. Acad. Sci. U.S.A., 81, 6851-6855, (1984)).

As the humanized antibody, an antibody in which only a complementarity determining region (CDR; complementarity determining region) of a heterogeneous antibody is incorporated into a human-derived antibody (Nature (1986) 321, p. 522-525), an antibody in which amino acid residues in a part of the framework of a heterogeneous antibody is transplanted into a human antibody by CDR transplantation (WO 90/07861) in addition to the CDR sequence of the heterogeneous antibody, and an antibody humanized using a gene conversion mutagenesis strategy (U.S. Pat. No. 5,821,337) can be exemplified.

As the human antibody, an antibody prepared using human antibody-producing mice having human chromosome fragments containing the heavy and light-chain genes of human antibodies (see Tomizuka, K. et al., Nature Genetics (1997) 16, p. 133-143; Kuroiwa, Y. et. al., Nucl. Acids Res. (1998) 26, p. 3447-3448; Yoshida, H. et. al., Animal Cell Technology: Basic and Applied Aspects vol. 10, p. 69-73 (Kitagawa, Y., Matsuda, T. and Iijima, S. eds.), Kluwer Academic Publishers, 1999; and Tomizuka, K. et. al., Proc. Natl. Acad. Sci. USA (2000) 97, p. 722-727, for example) can be exemplified. As an alternative, an antibody obtained by phage display selected from a human antibody library (see Wormstone, I. M. et. al, Investigative Ophthalmology & Visual Science. (2002) 43 (7), p. 2301-2308; Carmen, S. et. al., Briefings in Functional Genomics and Proteomics (2002), 1 (2), p. 189-203; and Siriwardena, D. et. al., Ophthalmology (2002) 109 (3), p. 427-431, for example) can be exemplified.

The anti-HER3 antibody used in the present invention also includes modified variants of the antibodies. The modified variants according to the present invention mean those obtained by chemically or biologically modifying the antibodies according to the present invention. The chemically modified variants include chemically modified variants having a chemical moiety attached to the amino acid skeleton or N-linked or O-linked carbohydrate chains. The biologically modified variants include those modified after translation (such as addition of N-linked or 0-linked sugar chains, N-terminal or C-terminal processing, deamidation, isomerization of aspartic acid, and oxidation of methionine), and those with a methionine residue added at the N-terminus by expression using a prokaryotic host cell. Further, the meaning of the modified variants also includes those labeled for enabling detection or isolation of the anti-HER3 antibody or the antigen used in the present invention, such as enzyme-labeled bodies, fluorescence-labeled bodies, and affinity-labeled bodies. Such modified variants of the anti-HER3 antibody used in the present invention are useful for improving the stability and the blood retention of the antibody, reducing the antigenicity, and detecting or isolating the antibody or the antigen.

Further, the antibody-dependent cytotoxic activity can be enhanced by regulating the modification of sugar chains bound to the anti-HER3 antibody used in the present invention (such as glycosylation and defucosylation). As techniques for regulating the modification of sugar chains of the antibody, International Publication No. WO 99/54342, International Publication No. WO 00/61739, International Publication No. WO 02/31140, International Publication No. WO 2007/133855, and International Publication No. WO 2013/120066 and the like are known, but there is no limitation to these examples. The anti-HER3 antibody used in the present invention also includes such antibodies with the modification of sugar chains regulated.

It is known that the lysine residue at the carboxyl terminus of the heavy chain of antibodies produced in cultured mammalian cells is deleted (Journal of Chromatography A, 705: 129-134 (1995)). Further, it is also known that two amino acid residues, glycine and lysine, at the carboxyl terminus of the heavy chain are deleted likewise, and the proline residue newly located at the carboxyl terminus is amidated (Analytical Biochemistry, 360: 75-83 (2007)). However, such deletions and modifications of the heavy chain sequence have no influence on the antigen-binding ability and the effector functions of the antibody (such as complement activation and antibody-dependent cytotoxicity). Accordingly, the anti-HER3 antibody used in the present invention includes the antibodies modified as above and functional fragments of the antibodies, and includes deletion variants with one or two amino acids deleted at the heavy-chain carboxyl terminus and the deletion variants amidated (such as a heavy chain with the proline residue at the carboxyl terminus amidated). However, the deletion variant at the carboxyl terminus of the heavy chain of the anti-HER3 antibody used in the present invention is not limited to the aforementioned types, as long as the antigen-binding ability and the effector functions are maintained. The two heavy chains constituting the anti-HER3 antibody used in the present invention may be composed of any one heavy chain or may be a combination of any two heavy chains selected from the group consisting of the full length and the aforementioned deletion variants. The quantitative ratio of the deletion variants can be affected by the type of cultured mammalian cells and culture conditions for producing the anti-HER3 antibody used in the present invention, but examples of the anti-HER3 antibody used in the present invention can preferably include those with one amino acid residue deleted at the carboxyl terminus in each of the two heavy chains.

As isotypes of the anti-HER3 antibody used in the present invention, IgGs (IgG1, IgG2, IgG3, and IgG4) can be exemplified, and IgG1 or IgG2 can be preferably exemplified. Further, their variants can also be used as the anti-HER3 antibody according to the present invention.

Examples of the anti-HER3 antibody that can be used in the present invention include patritumab (U3-1287), U1-59 (International Publication No. WO 2007/077028), AV-203 (International Publication No. WO 2011/136911), LJM-716 (International Publication No. WO 2012/022814), duligotumab (MEHD-7945A) (International Publication No. WO 2010/108127), istiratumab (MM-141) (International Publication No. WO 2011/047180), lumretuzumab (RG-7116) (International Publication No. WO 2014/108484), setibantumab (MM-121) (International Publication No. WO 2008/100624), REGN-1400 (International Publication No. WO 2013/048883), ZW-9 (International Publication No. WO 2013/063702), and their variants, active fragments, and modified variants. Preferably, patritumab and U1-59 can be exemplified. These anti-HER3 antibodies can be produced by the methods described in the aforementioned references.

[Production of Anti-HER3 Antibody-Drug Conjugate]

The drug-linker intermediate for use in the production of the anti-HER3 antibody-drug conjugate according to the present invention is represented by the following formula.

interchain disulfide within the antibody and reacting with the anti-HER3 antibody in a buffer solution containing a chelating agent such as ethylenediaminetetraacetic acid (EDTA), an anti-HER3 antibody having a sulfhydryl group with partially or completely reduced interchain disulfides within the antibody can be obtained.

Further, by using 2 to 20 molar equivalents of the drug-linker intermediate per anti-HER3 antibody having a sulfhydryl group, an anti-HER3 antibody-drug conjugate in which 2 to 8 drug molecules are conjugated per antibody molecule can be produced.

The average number of conjugated drug molecules per antibody molecule of the anti-HER3 antibody-drug conjugate produced can be determined, for example, by a method of calculation based on measurement of UV absorbance for the anti-HER3 antibody-drug conjugate and the conjugation precursor thereof at two wavelengths of 280 nm and 370 nm (UV method), or a method of calculation based on quantification through HPLC measurement for fragments obtained by treating the antibody-drug conjugate with a reducing agent (HPLC method).

[Formula 20]

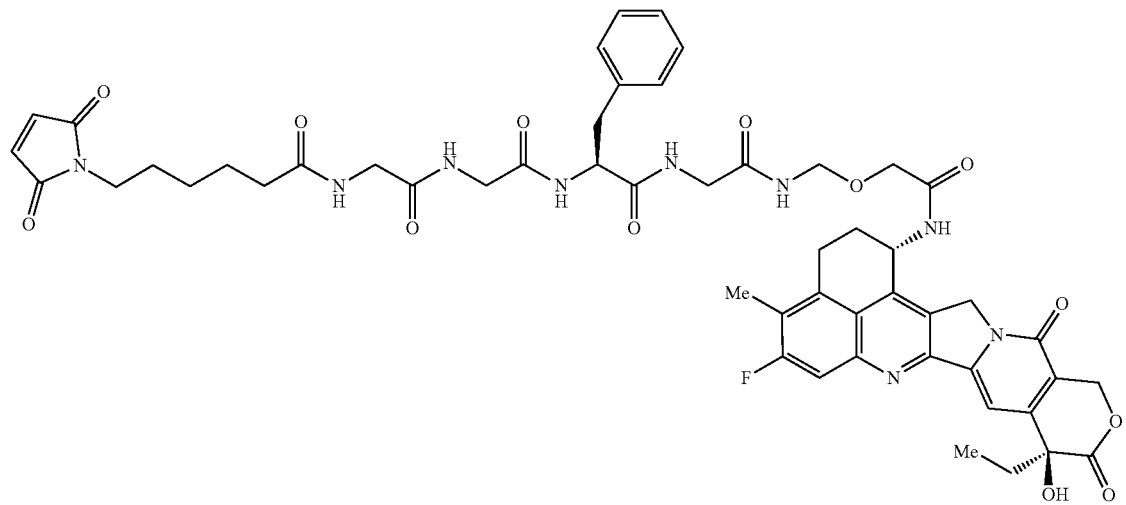

The drug-linker intermediate can be expressed as a chemical name, N-[6-(2,5-dioxo-2,5-dihydro-1H-pyrrole-1-yl)hexanoyl]glycylglycyl-L-phenylalanyl-N-[(2-{[(1S,9S)-9-ethyl-5-fluoro-9-hydroxy-4-methyl-10,13-dioxo-2,3,9,10,13,15-hexahydro-1H,12H-benzo[de]pyrano[3',4':6,7]indolizino[1,2-b]quinolin-1-yl]amino}-2-oxoethoxy)methyl]glycine amide and can be produced with reference to the descriptions of International Publication No. WO 2014/057687, International Publication No. WO 2015/155998, International Publication No. WO 2019/044947, and the like.

The anti-HER3 antibody-drug conjugate used in the present invention can be produced by having the above-described drug-linker intermediate react with an anti-HER3 antibody having a thiol group (alternatively referred to as sulfhydryl group).

The anti-HER3 antibody having a sulfhydryl group can be obtained by a method well known to those skilled in the art (Hermanson, G. T, Bioconjugate Techniques, pp. 56-136, pp. 456-493, Academic Press (1996)). For example, by using 0.3 to 3 molar equivalent of a reducing agent such as tris(2-carboxyethyl)phosphine hydrochloride (TCEP) per Conjugation between the anti-HER3 antibody and the drug-linker intermediate, and calculation of the average number of conjugated drug molecules per antibody molecule of the anti-HER3 antibody-drug conjugate can be performed with reference to the descriptions in International Publication No. WO 2015/155998, and so on.

[Therapeutic Agent and/or Method of Treatment]

The therapeutic agent and/or the method of treatment of the present invention comprise administering an anti-HER3 antibody-drug conjugate and can be used for treatment of HER3-mutated cancer.

The HER3-mutated cancer for which the therapeutic agent and/or the method of treatment of the present invention can be used is preferably at least one selected from the group consisting of breast cancer, lung cancer (including small-cell lung cancer and non-small cell lung cancer), colorectal cancer (which may be also referred to as colorectal cancer and includes colon cancer and rectal cancer), stomach cancer (which may be also referred to as gastric adenocarcinoma), ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer, and more preferably at least one selected from the group consisting of breast cancer, non-small cell lung cancer, colorectal cancer, stomach cancer, ovarian cancer, head and neck cancer, glioblastoma multiforme, and melanoma.

The therapeutic agent and the method of treatment of the present invention can be preferably used for mammals, and can be more preferably used for humans.

The anti-tumor effect of the therapeutic agent and the method of treatment of the present invention can be confirmed, for example, by allowing the tumor cells to express mutant-type HER3 and measuring the cell growth inhibitory activity of the anti-HER3 antibody-drug conjugate without HER2 overexpression and/or with HER2 overexpression. Further, it is also possible to confirm the effect by creating a model by transplanting a tumor expressing mutant-type HER3 into a test animal and applying the therapeutic agent or the method of treatment of the present invention to the animal.

Further, the anti-tumor effect of the therapeutic agent and the method of treatment of the present invention can also be confirmed in clinical studies. That is, the effect can be confirmed by applying the therapeutic agent or the method of treatment of the present invention to cancer patients determined to have HER3 mutation and using the Response Evaluation Criteria in Solid Tumors (RECIST) evaluation method, the WHO evaluation method, the Macdonald evaluation method, weight measurement, and other techniques. The effect can be determined by indices such as Complete response (CR), Partial response (PR), Progressive disease (PD), Objective response rate (ORR), Duration of response (DoR), Progression-free survival (PFS), and Overall survival (OS).

For the anti-tumor effect against HER3-mutated cancer, the advantage of the therapeutic agent and the method of treatment of the present invention over existing anticancer agents can be confirmed by the aforementioned methods.

The therapeutic agent and the method of treatment of the present invention slow the growth of cancer cells, suppress the growth, and even destroy the cancer cells. These actions can release cancer patients from cancer symptoms and improve the QOL, thereby achieving a therapeutic effect, while maintaining the lives of cancer patients. Even if the cancer cells are not destroyed, cancer patients can survive longer, while achieving a higher QOL, by suppressing or controlling the proliferation of the cancer cells.

The therapeutic agent of the present invention can be expected to have a therapeutic effect by being applied locally to cancer tissues, other than by being applied as a systemic therapy to patients.

The therapeutic agent of the present invention can be administered as a pharmaceutical composition containing at least one pharmaceutically suitable ingredient. The pharmaceutically suitable ingredients can be appropriately selected and applied from formulation additives or the like that are generally used in the art, in view of the dosage, the administration concentration or the like of the anti-HER3 antibody-drug conjugate used in the present invention. For example, the therapeutic agent of the present invention can be administered as a pharmaceutical composition (hereinafter, referred to as "the pharmaceutical composition of the present invention") containing a buffer such as a histidine buffer, an excipient such as sucrose or trehalose, and a surfactant such as polysorbate 80 or 20. The pharmaceutical composition of the present invention can be preferably used as an injection, can be more preferably used as an aqueous injection or a lyophilized injection, and can be even more preferably used as a lyophilized injection.

In the case that the pharmaceutical composition of the present invention is an aqueous injection, it can be preferably diluted with a suitable diluent and then given as an intravenous infusion. For the diluent, a dextrose solution, physiological saline, and the like, can be exemplified, and a dextrose solution can be preferably exemplified, and a 5% dextrose solution can be more preferably exemplified.

In the case that the pharmaceutical composition of the present invention is a lyophilized injection, it can be preferably dissolved in water for injection, subsequently a required amount can be diluted with a suitable diluent and then given as an intravenous infusion. For the diluent, a dextrose solution, physiological saline, and the like, can be exemplified, and a dextrose solution can be preferably exemplified, and a 5% dextrose solution can be more preferably exemplified.

Examples of the administration route which may be used to administer the pharmaceutical composition of the present invention include intravenous, intradermal, subcutaneous, intramuscular and intraperitoneal routes, and preferably include an intravenous route.

The anti-HER3 antibody-drug conjugate used in the present invention can be preferably administered to a human once a week, once every 2 weeks, once every 3 weeks or once every 4 weeks, and can be even more preferably administered once every 3 weeks.

Also, the anti-HER3 antibody-drug conjugate used in the present invention can be preferably administered to a human at a dose of 1.6 mg/kg to 12.8 mg/kg, and can be more preferably administered at a dose of 1.6 mg/kg, 3.2 mg/kg, 4.8 mg/kg, 5.6 mg/kg, 6.4 mg/kg, 8.0 mg/kg, 9.6 mg/kg, or 12.8 mg/kg, and can be even more preferably administered at a dose of 4.8 mg/kg, 5.6 mg/kg, or 6.4 mg/kg.

The therapeutic agent of the present invention can also be administered in combination with cancer therapeutic agents other than the anti-HER3 antibody-drug conjugate used in the present invention, thereby enhancing the antitumor effect. Other cancer therapeutic agents used for such purpose may be administered to a subject simultaneously with, separately from, or subsequently to the therapeutic agent of the present invention, and may be administered while varying the administration interval for each. Such cancer therapeutic agents are not limited as long as they are agents having antitumor activity, and can be exemplified by at least one selected from the group consisting of irinotecan (CPT-11), cisplatin, carboplatin, oxaliplatin, fluorouracil (5-FU), gemcitabine, capecitabine, paclitaxel, docetaxel, doxorubicin, epirubicin, cyclophosphamide, mitomycin C, tegafur-gimeracil-oteracil formulation, cetuximab, panitumumab, bevacizumab, ramucirumab, regorafenib, trifluridine-tipiracil formulation, gefitinib, erlotinib, afatinib, osimertinib, methotrexate, pemetrexed, tamoxifen, toremifene, fulvestrant, leuprorelin, goserelin, letrozole, anastrozole, progesterone formulation, trastuzumab emtansin, trastuzumab, pertuzumab, lapatinib, nivolumab, pembrolizumab, atezolizumab, durvalumab, avelumab, ipilimumab, and tremelimumab.

The therapeutic agent of the present invention can also be used in combination with radiation therapy. For example, a cancer patient is subjected to radiation therapy before and/or after treatment with the therapeutic agent of the present invention, or simultaneously therewith.

The therapeutic agent of the present invention can also be used as an adjuvant chemotherapy in combination with a surgical procedure. Surgical procedures are carried out by, for example, removing the whole or a part of a brain tumor. The therapeutic agent of the present invention may be administered for the purpose of diminishing the size of a brain tumor before a surgical procedure (referred to as pre-operative adjuvant chemotherapy, or neoadjuvant therapy), or may be administered after a surgical procedure for the purpose of preventing the recurrence of a brain tumor (referred to as post-operative adjuvant chemotherapy, or adjuvant therapy).

EXAMPLES

The present invention is specifically described in view of the examples shown below. However, the present invention is not limited to these. Further, it is by no means to be interpreted in a limited way.

[Example 1] Production of Anti-HER3 Antibody-Drug Conjugate

In accordance with a production method described in International Publication No. WO 2015/155998, using an anti-HER3 antibody (referred to as "HER3-Ab (1)" in the present invention) comprising a heavy chain consisting of an amino acid sequence represented by SEQ ID NO: 9 and a light chain consisting of an amino acid sequence represented by SEQ ID NO: 10, and reacting with a drug-linker intermediate (hereinafter, referred to as "drug-linker intermediate (1)") represented by the following formula:

[Formula 21]

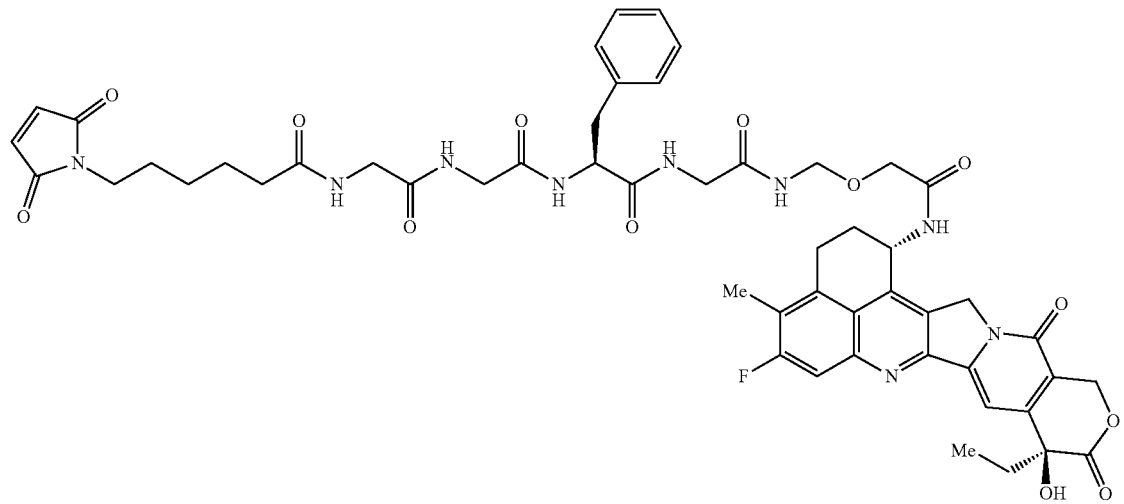

an anti-HER3 antibody-drug conjugate (referred to as "HER3-ADC (1)" in the present invention) in which a drug-linker represented by the following formula:

[Formula 22]

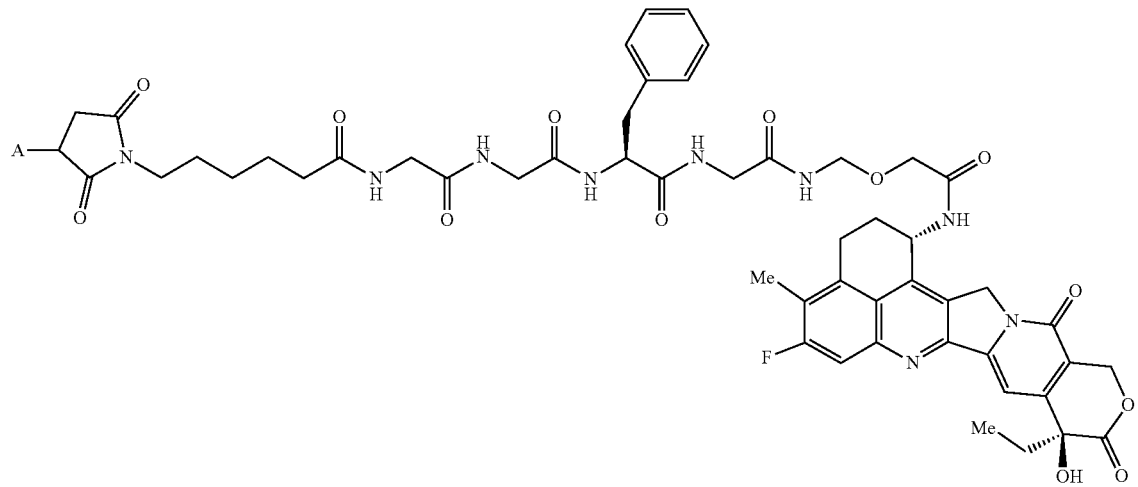

wherein A represents a connecting position to an antibody;
is conjugated to the anti-HER3 antibody via a thioether bond was produced. The average number of conjugated drug molecule per antibody molecule of HER3-ADC (1) is in the range of 7 to 8.

[Example 2] Production of HER3-Stably Expressing Cells

Example 2-1: Production of Vector Used for Lentivirus for Expression of HER3 Mutation 1. Production of pLVSIN EF1α HER3 (WT) Pur Using HER3 cDNA as a template, DNA was amplified with HER3 IF primer (Fw) represented by SEQ ID NO: 11 and HER3 IF primer (Rev) represented by SEQ ID NO: 12 and inserted into the XbaI site of pLVSIN EF1α Pur (#6186, available from Takara Bio Inc.) using InFusion System (available from Clontech Laboratories, Inc.) (pLVSIN EF1α HER3 (WT) Pur). The insertion sequence was confirmed by DNA sequencing.
2. Production of pLVSIN EF1α Flag-HER3 (WT) Pur
Using pLVSIN EF1α HER3 (WT) Pur as a template, the total length of the plasmid was amplified with Flag IF primer (Fw) represented by SEQ ID NO: 13 and Flag IF primer (Rev) represented by SEQ ID NO: 14, to obtain pLVSIN EF1α flag-HER3 (WT) Pur by self-ligation using InFusion System (available from Clontech Laboratories, Inc). The sequence was confirmed by DNA sequencing. The nucleotide sequence of cDNA encoding Flag-HER3 (WT) is shown in SEQ ID NO: 15, and the amino acid sequence of Flag-HER3 (WT) is shown in SEQ ID NO: 16.
3. Production of Each of Plasmids for Expression of Various Kinds of Mutant-Type HER3
i) pLVSIN EF1α Flag-HER3 (V104L) Pur
Using pLVSIN EF1α flag-HER3 (WT) as a template, the total length of the plasmid was amplified with HER3 mutagenesis primer (Fw) represented by SEQ ID NO: 17 and HER3 mutagenesis primer (Rev) represented by SEQ ID NO: 18, to obtain the plasmid for expression of mutant-type HER3 (pLVSIN EF1α flag-HER3 (V104L) Pur) by self-ligation using InFusion System (available from Clontech Laboratories, Inc). The sequence was confirmed by DNA sequencing. The nucleotide sequence of cDNA encoding Flag-HER3 (V104L) is shown in SEQ ID NO: 19, and the amino acid sequence of Flag-HER3 (V104L) is shown in SEQ ID NO: 20.
ii) pLVSIN EF1α Flag-HER3 (V104M) Pur
Using pLVSIN EF1α flag-HER3 (WT) as a template, the total length of the plasmid was amplified with HER3 mutagenesis primer (Fw) represented by SEQ ID NO: 21 and HER3 mutagenesis primer (Rev) represented by SEQ ID NO: 22, to obtain the plasmid for expression of mutant-type HER3 (pLVSIN EF1α flag-HER3 (V104M) Pur) by self-ligation using InFusion System (available from Clontech Laboratories, Inc). The sequence was confirmed by DNA sequencing. The nucleotide sequence of cDNA encoding Flag-HER3 (V104M) is shown in SEQ ID NO: 23, and the amino acid sequence of Flag-HER3 (V104M) is shown in SEQ ID NO: 24.
iii) pLVSIN EF1α Flag-HER3 (A232V) Pur
Using pLVSIN EF1α flag-HER3 (WT) as a template, the total length of the plasmid was amplified with HER3 mutagenesis primer (Fw) represented by SEQ ID NO: 25 and HER3 mutagenesis primer (Rev) represented by SEQ ID NO: 26, to obtain the plasmid for expression of mutant-type HER3 (pLVSIN EF1α flag-HER3 (A232V) Pur) by self-ligation using InFusion System (available from Clontech Laboratories, Inc). The sequence was confirmed by DNA sequencing. The nucleotide sequence of cDNA encoding Flag-HER3 (A232V) is shown in SEQ ID NO: 27, and the amino acid sequence of Flag-HER3 (A232V) is shown in SEQ ID NO: 28.
iv) pLVSIN EF1α Flag-HER3 (P262H) Pur
Using pLVSIN EF1α flag-HER3 (WT) as a template, the total length of the plasmid was amplified with HER3 mutagenesis primer (Fw) represented by SEQ ID NO: 29 and HER3 mutagenesis primer (Rev) represented by SEQ ID NO: 30, to obtain the plasmid for expression of mutant-type HER3 (pLVSIN EF1α flag-HER3 (P262H) Pur) by self-ligation using InFusion System (available from Clontech Laboratories, Inc). The sequence was confirmed by DNA sequencing. The nucleotide sequence of cDNA encoding Flag-HER3 (P262H) is shown in SEQ ID NO: 31, and the amino acid sequence of Flag-HER3 (P262H) is shown in SEQ ID NO: 32.

v) pLVSIN EF1α Flag-HER3 (G284R) Pur

Using pLVSIN EF1α flag-HER3 (WT) as a template, the total length of the plasmid was amplified with HER3 mutagenesis primer (Fw) represented by SEQ ID NO: 33 and HER3 mutagenesis primer (Rev) represented by SEQ ID NO: 34, to obtain the plasmid for expression of mutant-type HER3 (pLVSIN EF1α flag-HER3 (G284R) Pur) by self-ligation using InFusion System (available from Clontech Laboratories, Inc). The sequence was confirmed by DNA sequencing. The nucleotide sequence of cDNA encoding Flag-HER3 (G284R) is shown in SEQ ID NO: 35, and the amino acid sequence of Flag-HER3 (G284R) is shown in SEQ ID NO: 36.

vi) pLVSIN EF1α Flag-HER3 (D297Y) Pur

Using pLVSIN EF1α flag-HER3 (WT) as a template, the total length of the plasmid was amplified with HER3 mutagenesis primer (Fw) represented by SEQ ID NO: 37 and HER3 mutagenesis primer (Rev) represented by SEQ ID NO: 38, to obtain the plasmid for expression of mutant-type HER3 (pLVSIN EF1α flag-HER3 (D297Y) Pur) by self-ligation using InFusion System (available from Clontech Laboratories, Inc). The sequence was confirmed by DNA sequencing. The nucleotide sequence of cDNA encoding Flag-HER3 (D297Y) is shown in SEQ ID NO: 39, and the amino acid sequence of Flag-HER3 (D297Y) is shown in SEQ ID NO: 40.

vii) pLVSIN EF1α Flag-HER3 (G325R) Pur

Using pLVSIN EF1α flag-HER3 (WT) as a template, the total length of the plasmid was amplified with HER3 mutagenesis primer (Fw) represented by SEQ ID NO: 41 and HER3 mutagenesis primer (Rev) represented by SEQ ID NO: 42, to obtain the plasmid for expression of mutant-type HER3 (pLVSIN EF1α flag-HER3 (G325R) Pur) by self-ligation using InFusion System (available from Clontech Laboratories, Inc). The sequence was confirmed by DNA sequencing. The nucleotide sequence of cDNA encoding Flag-HER3 (G325R) is shown in SEQ ID NO: 43, and the amino acid sequence of Flag-HER3 (G325R) is shown in SEQ ID NO: 44.

viii) pLVSIN EF1α Flag-HER3 (T355I) Pur

Using pLVSIN EF1α flag-HER3 (WT) as a template, the total length of the plasmid was amplified with HER3 mutagenesis primer (Fw) represented by SEQ ID NO: 45 and HER3 mutagenesis primer (Rev) represented by SEQ ID NO: 46, to obtain the plasmid for expression of mutant-type HER3 (pLVSIN EF1α flag-HER3 (T355I) Pur) by self-ligation using InFusion System (available from Clontech Laboratories, Inc). The sequence was confirmed by DNA sequencing. The nucleotide sequence of cDNA encoding Flag-HER3 (T355I) is shown in SEQ ID NO: 47, and the amino acid sequence of Flag-HER3 (T355I) is shown in SEQ ID NO: 48.

ix) pLVSIN EF1α Flag-HER3 (S846I) Pur

Using pLVSIN EF1α flag-HER3 (WT) as a template, the total length of the plasmid was amplified with HER3 mutagenesis primer (Fw) represented by SEQ ID NO: 49 and HER3 mutagenesis primer (Rev) represented by SEQ ID NO: 50, to obtain the plasmid for expression of mutant-type HER3 (pLVSIN EF1α flag-HER3 (S846I) Pur) by self-ligation using InFusion System (available from Clontech Laboratories, Inc). The sequence was confirmed by DNA sequencing. The nucleotide sequence of cDNA encoding Flag-HER3 (S846I) is shown in SEQ ID NO: 51, and the amino acid sequence of Flag-HER3 (S846I) is shown in SEQ ID NO: 52.

x) pLVSIN EF1α Flag-HER3 (E928G) Pur

Using pLVSIN EF1α flag-HER3 (WT) as a template, the total length of the plasmid was amplified with HER3 mutagenesis primer (Fw) represented by SEQ ID NO: 53 and HER3 mutagenesis primer (Rev) represented by SEQ ID NO: 54, to obtain the plasmid for expression of mutant-type HER3 (pLVSIN EF1α flag-HER3 (E928G) Pur) by self-ligation using InFusion System (available from Clontech Laboratories, Inc). The sequence was confirmed by DNA sequencing. The nucleotide sequence of cDNA encoding Flag-HER3 (E928G) is shown in SEQ ID NO: 55, and the amino acid sequence of Flag-HER3 (E928G) is shown in SEQ ID NO: 56.

Example 2-2: Production of Vector Used for Lentivirus for Expression of HER2

1. Production of pLVSIN EF1α HER2 Neo

Using HER2 cDNA as a template, DNA was amplified with HER2 IF primer (Fw) represented by SEQ ID NO: 57 and HER2 IF primer (Rev) represented by SEQ ID NO: 58 and inserted into the NotI site of pLVSIN EF1α Neo (Takara Bio Inc., #6184) using InFusion System (available from Clontech Laboratories, Inc.) (pLVSIN EF1α HER2 Neo). The insertion sequence was confirmed by DNA sequencing. The nucleotide sequence of cDNA encoding HER2 is shown in SEQ ID NO: 59, and the amino acid sequence of HER2 is shown in SEQ ID NO: 60.

Example 2-3: Production of HER3-Stably Expressing Cells

Lenti-X 293 T cells (available from Clontech Laboratories, Inc.) were seeded into a 6-well plate at 1×10$^6$ cells/well and cultured overnight. ViraPower (available from Thermo Fisher SCIENTIFIC K.K.) and each of the plasmids for expression of various kinds of HER3 produced in Example 2-1 (pLVSIN EF1α flag-HER3 (WT) Pur, pLVSIN EF1α flag-HER3 (V104L) Pur, pLVSIN EF1α flag-HER3 (V104M) Pur, pLVSIN EF1α flag-HER3 (A232V) Pur, pLVSIN EF1α flag-HER3 (P262H) Pur, pLVSIN EF1α flag-HER3 (G284R) Pur, pLVSIN EF1α flag-HER3 (D297Y) Pur, pLVSIN EF1α flag-HER3 (G325R) Pur, pLVSIN EF1α flag-HER3 (T355I) Pur, pLVSIN EF1α flag-HER3 (S846I) Pur, and pLVSIN EF1α flag-HER3 (E928G) Pur) were introduced into the Lenti-X 293 T cells using Lipofectamine 2000 (available from Thermo Fisher SCIENTIFIC K.K). Further, the plasmid (pLVSIN EF1α Pur) was introduced into the Lenti-X 293 T cells in the same manner as above, in order to produce empty vector-introduced cells. Two days after the introduction, the culture supernatant was collected and passed through a MILLEX-HP 0.45 UM filter (available from Merck KGaA) to prepare a lentivirus solution. A half amount of the lentivirus solution prepared was transferred into a RetroNectin Coating plate (12 well plate) and left standing overnight at 37° C. After washing with PBS, MDA-MB-231 cells were seeded at 1×10$^5$ cells/well and cultured for three days. After the completion of culture, the cells were separated, and the total amount of the cells were seeded into a 6-well plate, to obtain cells with stable expression (polyclone) using drug resistance in the presence of 0.5 μg/mL puromycin (available from Thermo Fisher SCIENTIFIC K.K.) as an index. The total RNA was extracted from the cells obtained and subjected to a reverse transcription reaction using 600 ng of the total RNA. Then, using a ½0 volume of the reverse transcription reaction product as a template, a PCR reaction was performed using HER3 primer (Fw) represented by SEQ ID NO: 61 and HER3 primer (Rev) represented by SEQ ID NO: 62. PCR was performed under the conditions of 25 cycles each including heating at 94° C. for 2 minutes, then at 98° C. for 10 seconds, and at 68° C. for 1 minute. The RT-PCR product was subjected to 1% agarose gel electrophoresis, to confirm HER3 gene expression.

Example 2-4: Production of HER2-Overexpressing and HER3-Stably Expressing Cell Lines 1. Production of HER2-Overexpressing Cells Lenti-X 293 T cells (available from Clontech Laboratories, Inc.) were seeded into a 6-well plate at $1\times10^6$ cells/well and cultured overnight. ViraPower (available from Thermo Fisher SCIENTIFIC K.K.) and the plasmid for expression of HER2 (pLVSIN EF1α HER2 Neo) produced in Example 2-2 were introduced into the Lenti-X 293 T cells using Lipofectamine 2000 (available from Thermo Fisher SCIENTIFIC K.K). Two days after the introduction, the culture supernatant was collected and passed through a MILLEX-HP 0.45 UM filter (available from Merck KGaA) to prepare a lentivirus solution. The lentivirus solution prepared was transferred into a plate (6-well plate) coated with RetroNextin (TAKARA) and left standing overnight at 37° C. After washing with PBS, MDA-MB-231 cells were seeded at $4\times10^5$ cells/well and cultured for three days. After the completion of culture, the cells were separated, and the total amount of the cells were seeded into a T25 flask, to obtain HER2-stably expressing cells (polyclone) using drug resistance in the presence of 800 μg/mL geneticin (available from Thermo Fisher SCIENTIFIC K.K.) as an index. The total RNA was extracted from the cells obtained and subjected to a reverse transcription reaction using 600 ng of the total RNA. Then, using a ½0 volume of the reverse transcription reaction product as a template, a PCR reaction was performed using HER2 primer (Fw) represented by SEQ ID NO: 63 and HER2 primer (Rev) represented by SEQ ID NO: 64. PCR was performed under the conditions of 23 cycles each including heating at 94° C. for 2 minutes, then at 98° C. for 10 seconds, and at 68° C. for 1 minute. The RT-PCR product was subjected to 1% agarose gel electrophoresis, to confirm HER2 gene expression.

2. Production of HER2-Overexpressing and HER3-Stably Expressing Cells

Lenti-X 293 T cells (available from Clontech Laboratories, Inc.) were seeded into a 6-well plate at $1\times10^6$ cells/well and cultured overnight. ViraPower (available from Thermo Fisher SCIENTIFIC K.K.) and each of the plasmids for expression of various kinds of HER3 produced in Example 2-1 (pLVSIN EF1α flag-HER3 (WT) Pur, pLVSIN EF1α flag-HER3 (V104L) Pur, pLVSIN EF1α flag-HER3 (V104M) Pur, pLVSIN EF1α flag-HER3 (A232V) Pur, pLVSIN EF1α flag-HER3 (P262H) Pur, pLVSIN EF1α flag-HER3 (G284R) Pur, pLVSIN EF1α flag-HER3 (D297Y) Pur, pLVSIN EF1α flag-HER3 (G325R) Pur, pLVSIN EF1α flag-HER3 (T355I) Pur, pLVSIN EF1α flag-HER3 (S846I) Pur, and pLVSIN EF1α flag-HER3 (E928G) Pur) were introduced into the Lenti-X 293 T cells using Lipofectamine 2000 (available from Thermo Fisher SCIENTIFIC K.K.). Further, the plasmid (pLVSIN EF1α Pur) was introduced into the Lenti-X 293 T cells in the same manner as above, in order to produce empty vector-introduced cells. Two days after the introduction, the culture supernatant was collected and passed through a MILLEX-HP 0.45 UM filter (available from Merck KGaA) to prepare a lentivirus solution. A half amount of the lentivirus solution prepared was transferred into a plate (12 well plate) coated with RetroNextin (TAKARA) and left standing overnight at 37° C. After washing with PBS, MDA-MB-231 cells overexpressing HER2 were seeded at $1\times10^5$ cells/well and cultured for three days. After the completion of culture, the cells were separated, and the total amount of the cells were seeded into a 6-well plate, to obtain cells with stable expression (polyclone) using drug resistance in the presence of 0.5 μg/mL puromycin (available from Thermo Fisher SCIENTIFIC K.K.) as an index. The total RNA was extracted from the cells obtained and subjected to a reverse transcription reaction using 600 ng of the total RNA. Then, using a ½0 volume of the reverse transcription reaction product as a template, a PCR reaction was performed using HER3 primer (Fw) represented by SEQ ID NO: 61 and HER3 primer (Rev) represented by SEQ ID NO: 62. PCR was performed under the conditions of 25 cycles each including heating at 94° C. for 2 minutes, then at 98° C. for 10 seconds, and at 68° C. for 1 minute. The RT-PCR product was subjected to 1% agarose gel electrophoresis, to confirm HER3 gene expression. Further, HER2 gene expression was also confirmed by the aforementioned method.

FIG. 3 to FIG. 5 show the results. FIG. 3 shows the results of 1% agarose gel electrophoresis of the RT-PCR products of the various kinds of HER3-stably expressing cells, and FIG. 4 and FIG. 5 show the results of 1% agarose gel electrophoresis of the RT-PCR products of the various kinds of HER2-overexpressing and HER3-stably expressing cells.

In the HER3-stably expressing cells, HER3 gene expression was observed in both wild-type and mutant-type HER3. In the HER2-overexpressing and HER3-stably expressing cells, HER2 overexpression was observed, and HER3 gene expression was observed in both HER3 wild-type and mutant-type HER3.

Example 2-5: Confirmation of HER3 Expression Positivity on Cell Surfaces

HER3-stably expression MDA-MB-231 cells were cultured with RPMI1640 medium (available from Thermo Fisher SCIENTIFIC K.K.) containing 10% FBS (available from Hyclone Laboratories, Inc). The cells were separated from the culture plate with TrypLE® Express Enzyme (available from Thermo Fisher SCIENTIFIC K.K.), to measure the number of living cells by trypan blue treatment. The same number of living cells were added to a 96-well U-bottom plate, the cells were precipitated by centrifugation, and the medium was replaced with Stain Buffer (available from Becton, Dickinson and Company). Again, the cells were precipitated by centrifugation and suspended by adding 100 μL of PE anti-DYKDDDDK Tag Antibody (BioLegend, #637310) diluted to 1 μg/mL. The cells treated with Stain Buffer without the addition of PE anti-DYKDDDDK Tag antibody were used as the control group. The cells were allowed to react in the dark on ice for 60 minutes and then washed with Stain Buffer. Again, the cells were suspended in 100 μL of Stain Buffer, then an equal amount of 4% paraformaldehyde phosphate buffer (Wako Pure Chemical Industries, Ltd.) was added thereto, and the mixture was reacted in the dark on ice for 20 minutes. After washing with Stain Buffer, fluorescence signals were measured using Attune NxT Flow Cytometer (available from Thermo Fisher SCIENTIFIC K.K.), and the measurement results were analyzed using FlowJo software (Version 10.5.0, available from Becton, Dickinson and Company). Table 1 shows the HER3 expression positivity of various kinds of mutant-type HER3-introduced cells, treated with PE anti-DYKDDDDK Tag Antibody.

TABLE 1

| Cell line | HER3 expression positivity on cell surfaces (%) | |
|---|---|---|
| | Without HER2 overexpression | With HER2 overexpression |
| Mock | — | — |
| WT | 65.4 | 76.3 |
| V104L | 79.3 | 75.8 |
| V104M | 67.2 | 61.8 |
| A232V | 76.8 | 70.7 |
| P262H | 79.0 | 65.0 |
| G284R | 82.6 | 79.7 |
| D297Y | 79.8 | 83.9 |
| G325R | 76.8 | 79.0 |
| T355I | 75.9 | 72.8 |
| S846I | 81.6 | 80.3 |
| E928G | 81.8 | 73.3 |

The HER3 expression proportions on the cell surfaces were 65.0% to 83.9%, and it was determined that there was no problem in comparing the properties of anti-HER3 antibody-drug conjugates between the cells.

[Example 3] Confirmation of Binding Activity of HER3-ADC (1) to Each of Wild-Type and Various Kinds of Mutant-Type HER3-Introduced Cell Lines Wild-type and various kinds of mutant-type HER3-introduced MDA-MB-231 cells were cultured with RPMI1640 medium (available from Thermo Fisher SCIENTIFIC K.K.) containing 10% FBS (available from Hyclone Laboratories, Inc). The cells were separated from the culture plate with TrypLE® Express Enzyme (available from Thermo Fisher SCIENTIFIC K.K.), to measure the number of living cells by trypan blue treatment. The same number of living cells were added to a 96-well U-bottom plate, then the cells were precipitated by centrifugation, and the medium was replaced with Stain Buffer (available from Becton, Dickinson and Company). Again, the cells were precipitated by centrifugation and suspended in 100 µL of HER3-ADC (1) diluent (prepared to 100 nM to 0.1 nM by 1/10 serial dilution using Stain Buffer) cooled with ice. The cells treated with Stain Buffer without the addition of HER3-ADC (1) were used as the control group. The cells were allowed to react on ice for 60 minutes and then washed with Stain Buffer. Further, 100 µL of Stain Buffer or a secondary antibody (Goat anti-Human IgG (H+L) Cross-Adsorbed Secondary Antibody, Alexa Fluor647, Thermo Fisher SCIENTIFIC K.K., #A-21445) diluted to 10 µg/mL was added thereto, and the cells were suspended therein. After the cells were allowed to react in the dark on ice for 60 minutes and then washed with Stain Buffer. After the cells were suspended in 100 µL of Stain Buffer, an equal amount of 4% paraformaldehyde phosphate buffer (Wako Pure Chemical Industries, Ltd.) was added thereto, and the mixture was reacted in the dark on ice for 20 minutes. After washing with a Stain Buffer, fluorescence signals were measured using Attune NxT Flow Cytometer (available from Thermo Fisher SCIENTIFIC K.K.), and the measurement results were analyzed using FlowJo software (Version 10.5.0, available from Becton, Dickinson and Company). In order to quantify the fluorescence signals derived from HER3-ADC (1) in the cells, a value obtained by subtracting the signals of the control group treated with Stain Buffer was used.

FIG. 6 and FIG. 7 show the results. The vertical axis shows the binding activity (the average fluorescence intensity of HER3-positive cells) of HER3-ADC (1) to each of wild-type and various kinds of mutant-type HER3-introduced cell lines at each concentration.

The binding of HER3-ADC (1) to various kinds of mutant-type HER3-stably expressing cells increased in a concentration-dependent manner, exhibiting the same binding activity as in wild-type HER3 (FIG. 6). The binding of HER3-ADC (1) in the HER2-overexpressing and HER3-stably expressing cells also increased in a concentration-dependent manner, exhibiting the same binding activity as in wild-type HER3 (FIG. 7). In this experiment, the binding activity was measured again using cells without HER2 overexpression for comparison, to confirm that there was no difference in the binding activity of HER3-ADC (1) depending on the HER2 expression level (FIG. 7).

[Example 4] Suppression of In Vitro Cell Growth in Each of Wild-Type and Various Kinds of Mutant-Type HER3-Introduced Cell Lines by HER3-ADC (1)

The growth inhibitory activity of HER3-ADC (1) against each of wild-type and various kinds of mutant-type HER3-introduced MDA-MB-231 cells was measured in the presence of RPMI1640 medium (available from Thermo Fisher SCIENTIFIC K.K.) containing 10% FBS (available from Hyclone Laboratories, Inc). The cell growth was evaluated by measuring the adenosine triphosphate (ATP) activity in an untreated group, a HER3-ADC (1)-treated group, and a HER3-Ab (1)-treated group. As a negative control, an IgG antibody-drug conjugate (referred to as "IgG-ADC (1)" in the present invention) produced by a conjugation reaction between an IgG antibody and a drug-linker intermediate (1) was used.

Example 4-1: Treatment of Cells

Each of wild-type and various kinds of mutant-type HER3-introduced MDA-MB-231 cell lines were seeded into a 96-microwell plate (Corning, #3904, black wall and transparent bottom) as a cell suspension of 500 cells/100 µL/well. On the next day, 10-fold concentrates of HER3-ADC (1), HER3-Ab (1), and the negative control IgG-ADC (1) were prepared with 10% FBS-containing RPMI1640 medium, 10 µL of each was added, and the mixture was cultured at 37° C. under 5% $CO_2$ for 6 days. Only 10 µL of the medium was added to the well serving as a control. The measurement was conducted in 3 wells to 5 wells per condition.

Example 4-2: Determination of Cell Growth-Suppressing Effect

The cell growth inhibitory activity of various agents during the culture for 6 days was evaluated for living cells having metabolic activity based on the ATP activity. 100 µL of CellTiter-Glo® reagent (Promega, #G7573) or 100 µL of ATPlite 1-step Luminescence Assay System (PerkinElmer, #6016739) was added into each well of a 96-microwell plate, to measure the activity using EnVision Workstation (Ultra-sensitive luminescence measurement protocol, h=0.9). In order to measure the reduction of ATP activity, the average luminescence value of 3 wells or 5 wells under each condition was determined. The luminescence residue proportion (%) was determined by comparison with the cells in the untreated group, and this value was interpreted as the cell viability (%).

FIG. 8 to FIG. 33 show the results. FIG. 8 to FIG. 19 are graphs showing the cell growth inhibitory activity of various agents against each of wild-type and various kinds of mutant-type HER3-introduced cells without HER2 overexpression. FIG. 20 to FIG. 31 are graphs showing the cell growth inhibitory activity of various agents against each of wild-type and various kinds of mutant-type HER3-introduced cells with HER2 overexpression. It was found that HER3-ADC (1) exhibited cell growth inhibitory activity against each of various kinds of mutant-type HER3-introduced cell as well as against wild-type HER3-introduced cells (FIG. 8 to FIG. 19). Also, in the HER2-overexpressing and HER3-stably expressing cells, it was found that HER3-ADC (1) exhibited cell growth inhibitory activity against each of various kinds of mutant-type HER3-introduced cells as well as against wild-type HER3-introduced cells (FIG. 20 to FIG. 31). In this experiment, using cells without HER2 overexpression, the cell growth inhibitory activity of various agents was measured again for comparison (FIGS. 32 and 33), to confirm that there was no difference in the cell growth inhibitory activity of HER3-ADC (1) depending on the HER2 expression level.

[Example 5] Production of Mutant-Type HER3 (Q809R)-Introduced Cells and Pharmacological Evaluation Thereof Example 5-1: Production of the Plasmid for Expression of Mutant-Type HER3

Using pLVSIN EF1α flag-HER3 (WT) as a template, the total length of the plasmid was amplified with HER3 mutagenesis primer (Fw) represented by SEQ ID NO: 65 and HER3 mutagenesis primer (Rev) represented by SEQ ID NO: 66, to obtain the plasmid for expression of mutant-type HER3 (pLVSIN EF1α flag-HER3 (Q809R) Pur) by self-ligation using InFusion System (available from Clontech Laboratories, Inc). The sequence was confirmed by DNA sequencing. The nucleotide sequence of cDNA encoding Flag-HER3 (Q809R) is shown in SEQ ID NO: 67, and the amino acid sequence of Flag-HER3 (Q809R) is shown in SEQ ID NO: 68.

Example 5-2: Production of Mutant-Type HER3 (Q809R)-Introduced Cells (with HER2 Overexpression)

Using the plasmid for expression of mutant-type HER3 (pLVSIN EF1α flag-HER3 (Q809R) Pur) produced in Example 5-1, mutant-type HER3 (Q809R)-introduced cells were obtained as HER2-overexpressing and HER3-stably expressing cells (polyclone) by the same method as in Example 2-4. In the same manner as in Example 2-4, the total RNA was extracted from the cells obtained, and the RT-PCR product was subjected to 1% agarose gel electrophoresis, to confirm HER3 gene expression (FIG. 34) and HER2 gene expression (FIG. 35).

Example 5-3: Confirmation of HER3 Expression Positivity on Cell Surfaces

For mutant-type HER3 (Q809R)-introduced cells (with HER2 overexpression) produced in Example 5-2, the HER3 expression positivity on cell surfaces was confirmed by the same method as in Example 2-5. The HER3 expression proportion on cell surfaces was 58.8%, and it was determined that there was no problem in comparing the properties of the anti-HER3 antibody-drug conjugate.

Example 5-4: Confirmation of Binding Activity to Mutant-Type HER3 (Q809R)-Introduced Cells (with HER2 Overexpression)

For mutant-type HER3 (Q809R)-introduced cells (with HER2 overexpression) produced in Example 5-2, the binding activity of HER3-ADC (1) to each of wild-type and mutant-type HER3 (Q809R)-introduced cell lines at each concentration was evaluated by the same method as in Example 3. The binding of HER3-ADC (1) to mutant-type HER3 (Q809R) introduced cell lines increased in a concentration-dependent manner, exhibiting the same binding activity as in wild-type HER3 (FIG. 36).

Example 5-5: Suppression of In-Vitro Cell Growth in Mutant-Type HER3 (Q809R)-Introduced Cells (with HER2 Overexpression)

For mutant-type HER3 (Q809R)-introduced cells (with HER2 overexpression) produced in Example 5-2, the suppressions of in-vitro cell growth of HER3-ADC (1), HER3-Ab (1), and IgG-ADC (1) against each of wild-type and mutant-type HER3 (Q809R)-introduced cell lines were evaluated by the same method as in Example 4. It was found that HER3-ADC (1) exhibited cell growth inhibitory activity against mutant-type HER3 (Q809R)-introduced cells, as well as against wild-type HER3-introduced cells (FIG. 37).

[Example 6] Confirmation of Lysosome Migration of HER3-ADC (1) in Each of Wild-Type and Various Kinds of Mutant-Type HER3-Introduced Cells The lysosome migration of HER3-ADC (1) in each of wild-type and various kinds of mutant-type HER3-introduced cells was measured in the presence of RPMI1640 medium (available from Thermo Fisher SCIENTIFIC K.K.) containing 10% FBS (available from Hyclone Laboratories, Inc). HER3-ADC (1) was labeled with fluorescent dye pHrodo having pH sensitivity and evaluated by measuring fluorescence signals emitted by lysosome migration.

Example 6-1: Preparation of pHrodo-Labeled HER3-ADC (1)

For pHrodo labeling, pHrodo® iFL Microscale Protein Labeling Kit was used. HER3-ADC (1) was prepared to 1 mg/mL using 10 mM Acetate/5% sorbitol (pH5.5, NAC-ALAI TESQUE, INC). 100 μL thereof (equivalent to 100 μg) was added to a reaction tube. pHrodo® iFL Red STP ester was dissolved in DMSO, and an amount corresponding to 10 times the number of moles of protein of HER3-ADC (1) was added to the reaction tube and mixed, and then the mixture was allowed to react at room temperature for 60 minutes. The reaction solution was centrifuged using Zebaspin® desalination column (available from Thermo Fisher SCIENTIFIC K.K.) and Amicon Ultra-0.5 (Merck Millipore Corporation), to purify pHrodo-labeled HER3-ADC (1). The absorbance at 280 nm and 566 nm was measured using NanoDrop® 8000 Spectrophotometer, to determine the labeling efficiency.

Example 6-2: Lysosome Migration in Cultured Cells

Each of wild-type and various kinds of mutant-type HER3-introduced cells were seeded into a 96-microwell plate (Cellcarrier-96 Ultra, available from Thermo Fisher SCIENTIFIC K.K.) as a cell suspension of $5 \times 10^4$ cells/100 µL/well. On the next day, after aspirating the medium, 50 µL of Hoechst 33342 (available from Life Technologies Corporation) diluted to 100 ng/mL with RPMI1640 medium containing 10% FBS was added thereto. After 30 minutes, 50 µL of a 2-fold concentrate of pHrodo-labeled HER3-ADC (1) prepared using a 10% FBS-containing RPMI1640 medium containing 100 ng/mL of Hoechst 33342 was added thereto, while a medium was added to the negative control instead of the pHrodo-labeled HER3-ADC (1). For fluorescence signals, live cell imaging images were obtained every 30 minutes over 10 hours using Opera Phenix® high-throughput/high-content imaging system (available from PerkinElmer, Inc). The measurement was conducted at three spots/well per condition. The images obtained were quantitatively analyzed using image analysis software Harmony® (available from PerkinElmer, Inc). The quantitative value was shown as a value obtained by multiplying the number of fluorescent dots per cell by the fluorescence intensity per dot (Traffiking index).

FIGS. 38 to 64 show the results. FIGS. 38 to 49 show the results of HER3-stably expressing cells (without HER2 overexpression), and FIGS. 50 to 62 show the results of HER3-stably expressing cells (with HER2 overexpression).

The pHrodo-labeled HER3-ADC (1) exhibited lysosome migration in a concentration-dependent manner in each of various kinds of mutant-type HER3-introduced cells as well as in wild-type HER3-introduced cells (FIG. 38 to FIG. 49). It was found from this that there is no substantial difference in lysosome migrations of HER3-ADC (1) between in wild-type HER3-expressing cells and in mutant-type HER3-expressing cells.

It was also found that the pHrodo-labeled HER3-ADC (1) exhibited lysosome migration in a concentration-dependent manner also in the HER2-overexpressing and HER3-stably expressing cells (FIG. 50 to FIG. 62). In this experiment, the lysosome migration of HER3-ADC (1) in cells without HER2 overexpression was confirmed again for comparison (FIGS. 63 and 64). It was found from this that there is no substantial difference in lysosome migrations of HER3-ADC (1) between in HER3-expressing cells with overexpression of HER2 and in HER3-expressing cells without overexpression of HER2.

The aforementioned results confirmed that HER3-ADC (1) exhibited cell growth inhibitory activity against each of various kinds of mutant-type HER3-introduced cells, regardless of the presence or absence of HER2 overexpression.

Currently, HER3-ADC (1) has been clinically studied, and it has been suggested that clinical efficacy can be expected for mutant-type HER3 cases as well as for wild-type HER3 cases.

Free Text of Sequence Listing

SEQ ID NO: 1—Amino acid sequence of CDRH1 of anti-HER3 antibody
SEQ ID NO: 2—Amino acid sequence of CDRH2 of anti-HER3 antibody
SEQ ID NO: 3—Amino acid sequence of CDRH3 of anti-HER3 antibody
SEQ ID NO: 4—Amino acid sequence of CDRL1 of anti-HER3 antibody
SEQ ID NO: 5—Amino acid sequence of CDRL2 of anti-HER3 antibody
SEQ ID NO: 6—Amino acid sequence of CDRL3 of anti-HER3 antibody
SEQ ID NO: 7—Amino acid sequence of heavy chain variable region of anti-HER3 antibody
SEQ ID NO: 8—Amino acid sequence of light chain variable region of anti-HER3 antibody
SEQ ID NO: 9—Amino acid sequence of heavy chain of anti-HER3 antibody
SEQ ID NO: 10—Amino acid sequence of light chain of anti-HER3 antibody
SEQ ID NO: 11—Nucleotide sequence of HER3 IF primer (Fw)
SEQ ID NO: 12—Nucleotide sequence of HER3 IF primer (Rev)
SEQ ID NO: 13—Nucleotide sequence of Flag IF primer (Fw)
SEQ ID NO: 14—Nucleotide sequence of Flag IF primer (Rev)
SEQ ID NO: 15—Nucleotide sequence of cDNA encoding Flag-HER3 (WT)
SEQ ID NO: 16—Amino acid sequence of Flag-HER3 (WT)
SEQ ID NO: 17—Nucleotide sequence of HER3 mutagenesis primer (Fw)
SEQ ID NO: 18—Nucleotide sequence of HER3 mutagenesis primer (Rev)
SEQ ID NO: 19—Nucleotide sequence of cDNA encoding Flag-HER3 (V104L)
SEQ ID NO: 20—Amino acid sequence of Flag-HER3 (V104L)
SEQ ID NO: 21—Nucleotide sequence of HER3 mutagenesis primer (Fw)
SEQ ID NO: 22—Nucleotide sequence of HER3 mutagenesis primer (Rev)
SEQ ID NO: 23—Nucleotide sequence of cDNA encoding Flag-HER3 (V104M)
SEQ ID NO: 24—Amino acid sequence of Flag-HER3 (V104M)
SEQ ID NO: 25—Nucleotide sequence of HER3 mutagenesis primer (Fw)
SEQ ID NO: 26—Nucleotide sequence of HER3 mutagenesis primer (Rev)
SEQ ID NO: 27—Nucleotide sequence of cDNA encoding Flag-HER3 (A232V)
SEQ ID NO: 28—Amino acid sequence of Flag-HER3 (A232V)
SEQ ID NO: 29—Nucleotide sequence of HER3 mutagenesis primer (Fw)
SEQ ID NO: 30—Nucleotide sequence of HER3 mutagenesis primer (Rev)
SEQ ID NO: 31—Nucleotide sequence of cDNA encoding Flag-HER3 (P262H)
SEQ ID NO: 32—Amino acid sequence of Flag-HER3 (P262H)
SEQ ID NO: 33—Nucleotide sequence of HER3 mutagenesis primer (Fw)
SEQ ID NO: 34—Nucleotide sequence of HER3 mutagenesis primer (Rev)
SEQ ID NO: 35—Nucleotide sequence of cDNA encoding Flag-HER3 (G284R)
SEQ ID NO: 36—Amino acid sequence of Flag-HER3 (G284R)
SEQ ID NO: 37—Nucleotide sequence of HER3 mutagenesis primer (Fw)

SEQ ID NO: 38—Nucleotide sequence of HER3 mutagenesis primer (Rev)
SEQ ID NO: 39—Nucleotide sequence of cDNA encoding Flag-HER3 (D297Y)
SEQ ID NO: 40—Amino acid sequence of Flag-HER3 (D297Y)
SEQ ID NO: 41—Nucleotide sequence of HER3 mutagenesis primer (Fw)
SEQ ID NO: 42—Nucleotide sequence of HER3 mutagenesis primer (Rev)
SEQ ID NO: 43—Nucleotide sequence of cDNA encoding Flag-HER3 (G325R)
SEQ ID NO: 44—Amino acid sequence of Flag-HER3 (G325R)
SEQ ID NO: 45—Nucleotide sequence of HER3 mutagenesis primer (Fw)
SEQ ID NO: 46—Nucleotide sequence of HER3 mutagenesis primer (Rev)
SEQ ID NO: 47—Nucleotide sequence of cDNA encoding Flag-HER3 (T355I)
SEQ ID NO: 48—Amino acid sequence of Flag-HER3 (T355I)
SEQ ID NO: 49—Nucleotide sequence of HER3 mutagenesis primer (Fw)
SEQ ID NO: 50—Nucleotide sequence of HER3 mutagenesis primer (Rev)
SEQ ID NO: 51—Nucleotide sequence of cDNA encoding Flag-HER3 (S846I)
SEQ ID NO: 52—Amino acid sequence of Flag-HER3 (S846I)
SEQ ID NO: 53—Nucleotide sequence of HER3 mutagenesis primer (Fw)
SEQ ID NO: 54—Nucleotide sequence of HER3 mutagenesis primer (Rev)
SEQ ID NO: 55—Nucleotide sequence of cDNA encoding Flag-HER3 (E928G)
SEQ ID NO: 56—Amino acid sequence of Flag-HER3 (E928G)
SEQ ID NO: 57—Nucleotide sequence of HER2 IF primer (Fw)
SEQ ID NO: 58—Nucleotide sequence of HER2 IF primer (Rev)
SEQ ID NO: 59—Nucleotide sequence of cDNA encoding HER2
SEQ ID NO: 60—Amino acid sequence of HER2
SEQ ID NO: 61—Nucleotide sequence of HER3 primer (Fw)
SEQ ID NO: 62—Nucleotide sequence of HER3 primer (Rev)
SEQ ID NO: 63—Nucleotide sequence of HER2 primer (Fw)
SEQ ID NO: 64—Nucleotide sequence of HER2 primer (Rev)
SEQ ID NO: 65—Nucleotide sequence of HER3 mutagenesis primer (Fw)
SEQ ID NO: 66—Nucleotide sequence of HER3 mutagenesis primer (Rev)
SEQ ID NO: 67—Nucleotide sequence of cDNA encoding Flag-HER3 (Q809R)
SEQ ID NO: 68—Amino acid sequence of Flag-HER3 (Q809R)
SEQ ID NO: 69—Amino acid sequence of HER3 protein

The invention claimed is:

1. A method of treatment for cancer, comprising administering an anti-HER3 antibody-drug conjugate to a subject determined to have HER3-mutated cancer having a HER3 mutation of at least one of D297Y, G325R, and T355I; wherein the anti-HER3 antibody-drug conjugate comprises a drug-linker conjugated to the anti-HER3 antibody via a thioether bond and represented by the following formula:

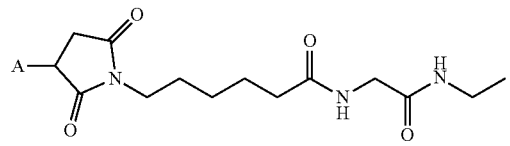

wherein A represents a connecting position to an anti-HER3 antibody; and wherein the anti-HER3 antibody is an antibody comprising a heavy chain comprising CDRH1 comprising an amino acid sequence represented by SEQ ID NO: 1, CDRH2 comprising an amino acid sequence represented by SEQ ID NO: 2, and CDRH3 comprising an amino acid sequence represented by SEQ ID NO: 3 and a light chain comprising CDRL1 comprising an amino acid sequence represented by SEQ ID NO: 4, CDRL2 comprising an amino acid sequence represented by SEQ ID NO: 5, and CDRL3 comprising an amino acid sequence represented by SEQ ID NO: 6.

2. The method of treatment according to claim 1, wherein HER2 is overexpressed in the HER3-mutated cancer.

3. The method of treatment according to claim 1, wherein HER2 is not overexpressed in the HER3-mutated cancer.

4. The method of treatment according to claim 1, wherein there is no difference in lysosome migrations of the anti-HER3 antibody-drug conjugate between in wild-type HER3-expressing cells and in mutant-type HER3-expressing cells.

5. The method of treatment according to claim 1, wherein there is no difference in lysosome migrations of the anti-HER3 antibody-drug conjugate between in HER3-expressing cells overexpressing HER2 and in HER3-expressing cells not overexpressing HER2.

6. The method of treatment according to claim 1, wherein the anti-HER3 antibody-drug conjugate is an anti-HER3 antibody-drug conjugate represented by the following formula:

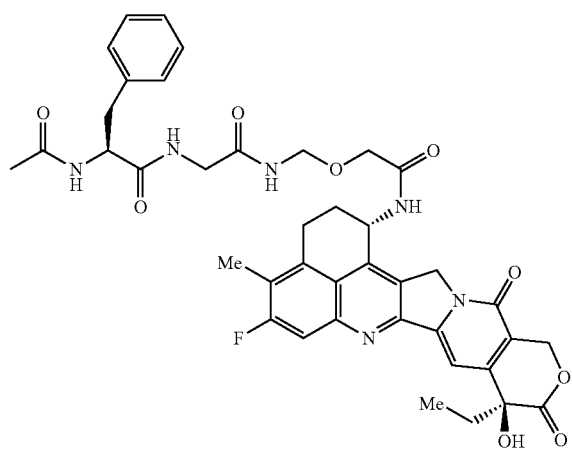

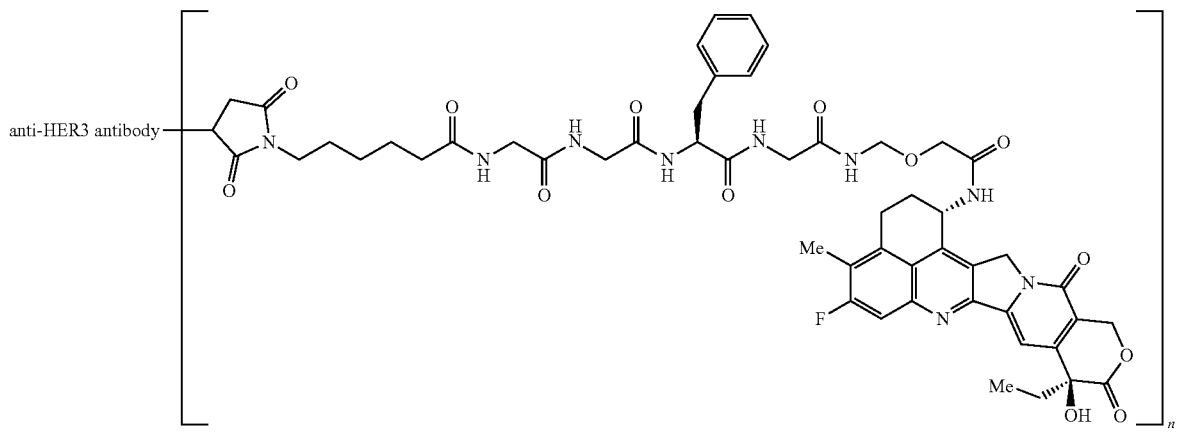

wherein the drug-linker is conjugated to the anti-HER3 antibody via a thioether bond, and n is the average number of units of the drug-linker conjugated per antibody molecule.

7. The method of treatment according to claim 1, wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

8. The method of treatment according to claim 1, wherein the anti-HER3 antibody is an antibody comprising a heavy chain comprising a heavy chain variable region consisting of an amino acid sequence represented by SEQ ID NO: 7 and a light chain comprising a light chain variable region consisting of an amino acid sequence represented by SEQ ID NO: 8.

9. The method of treatment according to claim 1, wherein the anti-HER3 antibody is an antibody comprising a heavy chain consisting of an amino acid sequence represented by SEQ ID NO: 9 and a light chain consisting of an amino acid sequence represented by SEQ ID NO: 10.

10. The method of treatment according to claim 9, wherein the anti-HER3 antibody lacks a lysine residue at the carboxyl terminus of the heavy chain.

11. The method of treatment according to claim 1, wherein the average number of units of the drug-linker conjugated per antibody molecule in the anti-HER3 antibody-drug conjugate is in the range of 7 to 8.

12. The method of treatment according to claim 1, wherein the average number of units of the drug-linker conjugated per antibody molecule in the anti-HER3 antibody-drug conjugate is in the range of 7.5 to 8.

13. The method of treatment according to claim 1, wherein the cancer is at least one selected from the group consisting of breast cancer, lung cancer, colorectal cancer, stomach cancer, ovarian cancer, head and neck cancer, glioblastoma multiforme, melanoma, kidney cancer, urothelial cancer, prostate cancer, pancreatic cancer, bladder cancer, gastrointestinal stromal tumor, cervical cancer, esophageal cancer, squamous cell carcinoma, peritoneal cancer, glioblastoma multiforme, liver cancer, hepatocellular carcinoma, endometrial cancer, uterine cancer, salivary gland cancer, vulvar cancer, thyroid cancer, liver carcinoma, anal carcinoma, and penis cancer.

14. The method of treatment according to claim 1, wherein the cancer is at least one selected from the group consisting of breast cancer, non-small cell lung cancer, colorectal cancer, stomach cancer, ovarian cancer, head and neck cancer, glioblastoma multiforme, and melanoma.

15. The method of claim 1, wherein the anti-HER3 antibody-drug conjugate is an anti-HER3 antibody-drug conjugate represented by the following formula:

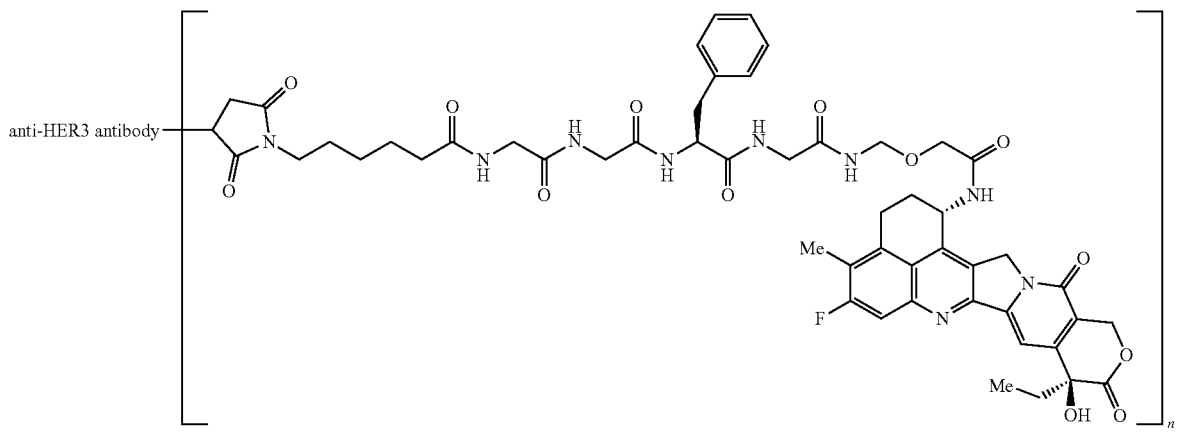

wherein the drug-linker is conjugated to the anti-HER3 antibody via a thioether bond and n is a drug to antibody ratio.

16. The method of treatment according to claim 1, wherein a HER3 mutation in the HER3-mutated cancer is D297Y.

17. The method of treatment according to claim 1, wherein a HER3 mutation in the HER3-mutated cancer is G325R.

18. The method of treatment according to claim 1, wherein a HER3 mutation in the HER3-mutated cancer is T355I.

19. The method of treatment according to claim 1, wherein the anti-HER3 antibody is an antibody comprising a heavy chain comprising a heavy chain variable region comprising an amino acid sequence represented by SEQ ID NO: 7 and a light chain comprising a light chain variable region comprising an amino acid sequence represented by SEQ ID NO: 8.

20. The method of treatment according to claim 1, wherein the anti-HER3 antibody is an antibody comprising a heavy chain comprising an amino acid sequence represented by SEQ ID NO: 9 and a light chain comprising an amino acid sequence represented by SEQ ID NO: 10.

21. The method of treatment according to claim 6, wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

22. The method of treatment according to claim 15, wherein the anti-HER3 antibody is an antibody comprising a heavy chain comprising CDRH1 consisting of an amino acid sequence represented by SEQ ID NO: 1, CDRH2 consisting of an amino acid sequence represented by SEQ ID NO: 2, and CDRH3 consisting of an amino acid sequence represented by SEQ ID NO: 3 and a light chain comprising CDRL1 consisting of an amino acid sequence represented by SEQ ID NO: 4, CDRL2 consisting of an amino acid sequence represented by SEQ ID NO: 5, and CDRL3 consisting of an amino acid sequence represented by SEQ ID NO: 6.

* * * * *

SEQUENCE LISTING

```
<160> NUMBER OF SEQ ID NOS: 69

<210> SEQ ID NO 1
<211> LENGTH: 10
<212> TYPE: PRT
<213> ORGANISM: Artificial Sequence
<220> FEATURE:
<223> OTHER INFORMATION: CDRH1 of anti-HER3 antibody

<400> SEQUENCE: 1

Gly Gly Ser Phe Ser Gly Tyr Tyr Trp Ser
1               5                   10

<210> SEQ ID NO 2
<211> LENGTH: 16
<212> TYPE: PRT
<213> ORGANISM: Artificial Sequence
<220> FEATURE:
<223> OTHER INFORMATION: CDRH2 of anti-HER3 antibody

<400> SEQUENCE: 2

Glu Ile Asn His Ser Gly Ser Thr Asn Tyr Asn Pro Ser Leu Lys Ser
1               5                   10                  15

<210> SEQ ID NO 3
<211> LENGTH: 9
<212> TYPE: PRT
<213> ORGANISM: Artificial Sequence
<220> FEATURE:
<223> OTHER INFORMATION: CDRH3 of anti-HER3 antibody

<400> SEQUENCE: 3

Asp Lys Trp Thr Trp Tyr Phe Asp Leu
```

<210> SEQ ID NO 4
<211> LENGTH: 16
<212> TYPE: PRT
<213> ORGANISM: Artificial Sequence
<220> FEATURE:
<223> OTHER INFORMATION: CDRL1 of anti-HER3 antibody

<400> SEQUENCE: 4

Arg Ser Ser Gln Ser Val Leu Tyr Ser Ser Ser Asn Arg Asn Tyr Leu
1               5                   10                  15

<210> SEQ ID NO 5
<211> LENGTH: 7
<212> TYPE: PRT
<213> ORGANISM: Artificial Sequence
<220> FEATURE:
<223> OTHER INFORMATION: CDRL2 of anti-HER3 antibody

<400> SEQUENCE: 5

Trp Ala Ser Thr Arg Glu Ser
1               5

<210> SEQ ID NO 6
<211> LENGTH: 9
<212> TYPE: PRT
<213> ORGANISM: Artificial Sequence
<220> FEATURE:
<223> OTHER INFORMATION: CDRL3 of anti-HER3 antibody

<400> SEQUENCE: 6

Gln Gln Tyr Tyr Ser Thr Pro Arg Thr
1               5

<210> SEQ ID NO 7
<211> LENGTH: 117
<212> TYPE: PRT
<213> ORGANISM: Artificial Sequence
<220> FEATURE:
<223> OTHER INFORMATION: Heavy chain variable region of anti-HER3
     antibody

<400> SEQUENCE: 7

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Pro Pro Gly Lys Gly Leu Glu Trp Ile
        35                  40                  45

Gly Glu Ile Asn His Ser Gly Ser Thr Asn Tyr Asn Pro Ser Leu Lys
    50                  55                  60

Ser Arg Val Thr Ile Ser Val Glu Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Lys Trp Thr Trp Tyr Phe Asp Leu Trp Gly Arg Gly Thr Leu
            100                 105                 110

Val Thr Val Ser Ser
        115

<210> SEQ ID NO 8
<211> LENGTH: 113

```
<212> TYPE: PRT
<213> ORGANISM: Artificial Sequence
<220> FEATURE:
<223> OTHER INFORMATION: Light chain variable region of anti-HER3
      antibody

<400> SEQUENCE: 8

Asp Ile Glu Met Thr Gln Ser Pro Asp Ser Leu Ala Val Ser Leu Gly
1               5                   10                  15

Glu Arg Ala Thr Ile Asn Cys Arg Ser Ser Gln Ser Val Leu Tyr Ser
            20                  25                  30

Ser Ser Asn Arg Asn Tyr Leu Ala Trp Tyr Gln Gln Asn Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Ser Thr Pro Arg Thr Phe Gly Gln Gly Thr Lys Val Glu Ile
            100                 105                 110

Lys

<210> SEQ ID NO 9
<211> LENGTH: 447
<212> TYPE: PRT
<213> ORGANISM: Artificial Sequence
<220> FEATURE:
<223> OTHER INFORMATION: Heavy chain of anti-HER3 antibody

<400> SEQUENCE: 9

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Pro Pro Gly Lys Gly Leu Glu Trp Ile
        35                  40                  45

Gly Glu Ile Asn His Ser Gly Ser Thr Asn Tyr Asn Pro Ser Leu Lys
    50                  55                  60

Ser Arg Val Thr Ile Ser Val Glu Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Lys Trp Thr Trp Tyr Phe Asp Leu Trp Gly Arg Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205
```

```
Thr Lys Val Asp Lys Arg Val Glu Pro Lys Ser Cys Asp Lys Thr His
    210                 215                 220
Thr Cys Pro Pro Cys Pro Ala Pro Glu Leu Leu Gly Gly Pro Ser Val
225                 230                 235                 240
Phe Leu Phe Pro Pro Lys Pro Lys Asp Thr Leu Met Ile Ser Arg Thr
                245                 250                 255
Pro Glu Val Thr Cys Val Val Val Asp Val Ser His Glu Asp Pro Glu
            260                 265                 270
Val Lys Phe Asn Trp Tyr Val Asp Gly Val Glu Val His Asn Ala Lys
        275                 280                 285
Thr Lys Pro Arg Glu Glu Gln Tyr Asn Ser Thr Tyr Arg Val Val Ser
    290                 295                 300
Val Leu Thr Val Leu His Gln Asp Trp Leu Asn Gly Lys Glu Tyr Lys
305                 310                 315                 320
Cys Lys Val Ser Asn Lys Ala Leu Pro Ala Pro Ile Glu Lys Thr Ile
                325                 330                 335
Ser Lys Ala Lys Gly Gln Pro Arg Glu Pro Gln Val Tyr Thr Leu Pro
            340                 345                 350
Pro Ser Arg Glu Glu Met Thr Lys Asn Gln Val Ser Leu Thr Cys Leu
        355                 360                 365
Val Lys Gly Phe Tyr Pro Ser Asp Ile Ala Val Glu Trp Glu Ser Asn
    370                 375                 380
Gly Gln Pro Glu Asn Asn Tyr Lys Thr Thr Pro Pro Val Leu Asp Ser
385                 390                 395                 400
Asp Gly Ser Phe Phe Leu Tyr Ser Lys Leu Thr Val Asp Lys Ser Arg
                405                 410                 415
Trp Gln Gln Gly Asn Val Phe Ser Cys Ser Val Met His Glu Ala Leu
            420                 425                 430
His Asn His Tyr Thr Gln Lys Ser Leu Ser Leu Ser Pro Gly Lys
        435                 440                 445

<210> SEQ ID NO 10
<211> LENGTH: 220
<212> TYPE: PRT
<213> ORGANISM: Artificial Sequence
<220> FEATURE:
<223> OTHER INFORMATION: Light chain of anti-HER3 antibody

<400> SEQUENCE: 10

Asp Ile Glu Met Thr Gln Ser Pro Asp Ser Leu Ala Val Ser Leu Gly
1               5                   10                  15
Glu Arg Ala Thr Ile Asn Cys Arg Ser Ser Gln Ser Val Leu Tyr Ser
            20                  25                  30
Ser Ser Asn Arg Asn Tyr Leu Ala Trp Tyr Gln Gln Asn Pro Gly Gln
        35                  40                  45
Pro Pro Lys Leu Leu Ile Tyr Trp Ala Ser Thr Arg Glu Ser Gly Val
    50                  55                  60
Pro Asp Arg Phe Ser Gly Ser Gly Ser Gly Thr Asp Phe Thr Leu Thr
65                  70                  75                  80
Ile Ser Ser Leu Gln Ala Glu Asp Val Ala Val Tyr Tyr Cys Gln Gln
                85                  90                  95
Tyr Tyr Ser Thr Pro Arg Thr Phe Gly Gln Gly Thr Lys Val Glu Ile
            100                 105                 110
Lys Arg Thr Val Ala Ala Pro Ser Val Phe Ile Phe Pro Pro Ser Asp
        115                 120                 125
```

```
Glu Gln Leu Lys Ser Gly Thr Ala Ser Val Val Cys Leu Leu Asn Asn
        130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220

<210> SEQ ID NO 11
<211> LENGTH: 39
<212> TYPE: DNA
<213> ORGANISM: Artificial Sequence
<220> FEATURE:
<223> OTHER INFORMATION: HER3 IF primer (Fw)

<400> SEQUENCE: 11
ggatttaaat tctagagcca ccatgagagc caacgatgc                             39

<210> SEQ ID NO 12
<211> LENGTH: 38
<212> TYPE: DNA
<213> ORGANISM: Artificial Sequence
<220> FEATURE:
<223> OTHER INFORMATION: HER3 IF primer (Rev)

<400> SEQUENCE: 12
ccgcggccgc tctagattat gttctctgag cgttggcc                              38

<210> SEQ ID NO 13
<211> LENGTH: 43
<212> TYPE: DNA
<213> ORGANISM: Artificial Sequence
<220> FEATURE:
<223> OTHER INFORMATION: Flag IF primer (Fw)

<400> SEQUENCE: 13
acaaggatga cgacgataag tctgaagtgg gcaacagcca ggc                        43

<210> SEQ ID NO 14
<211> LENGTH: 43
<212> TYPE: DNA
<213> ORGANISM: Artificial Sequence
<220> FEATURE:
<223> OTHER INFORMATION: Flag IF primer (Rev)

<400> SEQUENCE: 14
cgtcgtcatc cttgtaatcg cctctagcca gagagaacag cag                        43

<210> SEQ ID NO 15
<211> LENGTH: 4053
<212> TYPE: DNA
<213> ORGANISM: Artificial Sequence
<220> FEATURE:
<223> OTHER INFORMATION: cDNA encoding Flag-HER3(WT)

<400> SEQUENCE: 15
atgagagcca acgatgctct gcaggttctg ggcctgctgt tctctctggc tagaggcgat      60
```

```
tacaaggatg acgacgataa gtctgaagtg ggcaacagcc aggctgtgtg tcccggaaca    120
ctgaacggct tgtctgtgac aggcgacgcc gagaaccagt accagacact gtacaagctg    180
tacgagagat gcgaggtggt catgggcaac ctggaaatcg tgctgacagg ccacaacgcc    240
gacctgtctt tcctgcagtg gatcagagaa gtgaccggct acgtgctggt ggccatgaac    300
gagttcagca ccctgcctct gcctaacctg agagtcgtca gaggcaccca ggtgtacgat    360
ggcaagttcg ccatcttcgt gatgctgaac tacaacacca acagctctca cgccctgaga    420
cagctgagac tgacccagct gaccgagatc ctgtctggcg gagtgtacat cgagaagaac    480
gacaagctgt gccacatgga caccatcgac tggcgggata tcgtgcggga tagagatgcc    540
gagatcgtgg tcaaggacaa cggcagaagc tgccctcctt gccacgaagt gtgcaagggc    600
agatgttggg ccctggctc tgaggactgt cagaccctga ccaagaccat ctgcgcccct    660
cagtgtaacg ccactgctt cggccctaat cctaaccagt gctgccacga cgaatgcgct    720
ggcggatgtt ctggacctca ggacacagac tgcttcgcct gcagacactt caacgactct    780
ggcgcctgcg tgccaagatg tcctcagcct ctggtgtaca caagctgac ctttcagctg    840 gaacccaatc ctcacaccaa gtaccagtac ggcggcgtgt gtgtggccag ctgtcctcac    900
aacttcgtgg tggaccagac cagctgtgtg cgggcttgtc ctcctgacaa gatggaagtg    960
gacaagaacg gcctgaagat gtgcgagcct tgcggcggac tgtgtcctaa ggcttgtgaa   1020
ggcacaggca gcggcagcag attccagaca gtggacagca gcaacatcga cggcttcgtg   1080
aactgcacca gatcctgggg aaacctggac ttcctgatca ccggcctgaa cggcgatccc   1140
tggcataaga tccctgctct ggaccccgag aagctgaacg tgttcagaac cgtgcgcgag   1200
atcacaggct acctgaacat ccagagctgg cctccacaca tgcacaactt cagcgtgttc   1260
tccaacctga ccaccatcgg cggcagatcc ctgtacaaca ggggcttcag cctgctgatc   1320
atgaagaacc tgaatgtgac cagcctgggc ttcagaagcc tgaaagagat cagcgccggc   1380
agaatctaca tcagcgccaa cagacagctg tgctaccacc acagcctgaa ctggacaaag   1440
gtgctgagag gccccaccga ggaaagactg gacatcaagc acaacagacc tagaagagac   1500
tgcgtggccg agggcaaagt gtgcgaccct ctttgttcta cgcggcggtg ttggggacca   1560
ggacctggac agtgtctctc ctgtagaaac tacagccgcg gaggcgtgtg cgtgacccac   1620
tgcaattttc tgaatggcga gcccagagag ttcgcccacg aggccgagtg tttcagctgt   1680
caccctgagt gccagcctat ggaaggcacc gctacatgta acggcagcgg ctctgatacc   1740
tgcgctcagt gcgcccactt tagagatggc cctcactgcg tgtcctcttg tcctcatggt   1800
gtcctgggcg ctaagggccc catctacaag tacccctgacg tgcagaacga gtgcaggccc   1860
tgccacgaga actgtacaca gggatgcaag ggccctgagc tgcaggattg tctgggacag   1920
acactggtgc tgatcggcaa gacccacctg acaatggccc tgacagtgat cgctggcctg   1980
gtggtcatct ttatgatgct cggcggcacc ttcctgtatt ggagaggcag aagaatccag   2040
aacaagaggg ccatgcggag ataccgggaa agaggcgaga gcatcgagcc actgaccct   2100 agcgagaagg ccaacaaggt gctggccaga atcttcaaag agacagagct gcggaagctg   2160
aaggtgctcg gatctggcgt gttcggcaca gtgcacaaag cgtgtggat ccctgagggc   2220 gagtccatca agatccccgt gtgcatcaaa gtgatcgagg acaagtccgg caggcagagc   2280
ttccaggccg tgacagatca catgctggct atcggcagcc tggatcacgc ccacatcgtt   2340
agactgctgg gactgtgccc tggcagctct ctgcagctcg tgacacagta tctgcctctg   2400
ggatctctgc tggaccacgt gcgacaacat agaggcgctc tgggacctca gctgctgctg   2460
```

-continued

```
aattggggag tgcagatcgc caagggcatg tactacctgg aagaacacgg catggtgcac    2520
agaaacctgg ccgccagaaa cgtgctgctc aagtctccta gccaggtgca ggtcgccgat    2580
ttcggagttg ctgatctcct gccacctgac gacaaacagc tgctgtactc cgaggccaag    2640
acacccatca gtggatggcc cctggaatct atccacttcg gcaagtacac ccaccagagc    2700
gacgtgtggt cttacggcgt gacagtgtgg gagctgatga ccttcggagc cgagccttac    2760
gctggactga gactggctga agtgcccgac ctgctggaaa agggcgaaag acttgcccag    2820
cctcagatct gtaccatcga cgtgtacatg gtcatggtca agtgctggat gatcgacgag    2880
aacatcagac ccacattcaa agagctggct aacgagttta cccggatggc cagagatcct    2940
cctagatacc tcgtgatcaa gagagagagc ggccctggca ttgctcctgg acctgaacct    3000
cacgactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca aagccgcag cagaagcaga agccctagac ctagaggcga cagcgcctac    3420
cactctcaga gacactcact gctgacccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtga ctatgccag actgaaaaacc    3960
ctgagatctc tggaagccac cgactccgcc ttcgacaacc ctgactactg gcacagcaga    4020
ctgttcccca aggccaacgc tcagagaaca taa                                 4053
```

<210> SEQ ID NO 16
<211> LENGTH: 1350
<212> TYPE: PRT
<213> ORGANISM: Artificial Sequence
<220> FEATURE:
<223> OTHER INFORMATION: Flag-HER3(WT)

<400> SEQUENCE: 16

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80
```

```
Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
            115                 120                 125

Leu Asn Tyr Asn Thr Asn Ser Ser His Ala Leu Arg Gln Leu Arg Leu
        130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
            165                 170                 175

Asp Arg Asp Ala Glu Ile Val Val Lys Asp Asn Gly Arg Ser Cys Pro
            180                 185                 190

Pro Cys His Glu Val Cys Lys Gly Arg Cys Trp Gly Pro Gly Ser Glu
        195                 200                 205

Asp Cys Gln Thr Leu Thr Lys Thr Ile Cys Ala Pro Gln Cys Asn Gly
        210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
            245                 250                 255

Phe Asn Asp Ser Gly Ala Cys Val Pro Arg Cys Pro Gln Pro Leu Val
            260                 265                 270

Tyr Asn Lys Leu Thr Phe Gln Leu Glu Pro Asn Pro His Thr Lys Tyr
        275                 280                 285

Gln Tyr Gly Gly Val Cys Val Ala Ser Cys Pro His Asn Phe Val Val
290                 295                 300

Asp Gln Thr Ser Cys Val Arg Ala Cys Pro Pro Asp Lys Met Glu Val
305                 310                 315                 320

Asp Lys Asn Gly Leu Lys Met Cys Glu Pro Cys Gly Gly Leu Cys Pro
            325                 330                 335

Lys Ala Cys Glu Gly Thr Gly Ser Gly Ser Arg Phe Gln Thr Val Asp
            340                 345                 350

Ser Ser Asn Ile Asp Gly Phe Val Asn Cys Thr Lys Ile Leu Gly Asn
        355                 360                 365

Leu Asp Phe Leu Ile Thr Gly Leu Asn Gly Asp Pro Trp His Lys Ile
        370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
            405                 410                 415

Phe Ser Val Phe Ser Asn Leu Thr Thr Ile Gly Gly Arg Ser Leu Tyr
            420                 425                 430

Asn Arg Gly Phe Ser Leu Leu Ile Met Lys Asn Leu Asn Val Thr Ser
        435                 440                 445

Leu Gly Phe Arg Ser Leu Lys Glu Ile Ser Ala Gly Arg Ile Tyr Ile
450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
            485                 490                 495
```

```
Pro Arg Arg Asp Cys Val Ala Glu Gly Lys Val Cys Asp Pro Leu Cys
            500                 505                 510
Ser Ser Gly Gly Cys Trp Gly Pro Gly Pro Gly Gln Cys Leu Ser Cys
        515                 520                 525
Arg Asn Tyr Ser Arg Gly Gly Val Cys Val Thr His Cys Asn Phe Leu
    530                 535                 540
Asn Gly Glu Pro Arg Glu Phe Ala His Glu Ala Glu Cys Phe Ser Cys
545                 550                 555                 560
His Pro Glu Cys Gln Pro Met Glu Gly Thr Ala Thr Cys Asn Gly Ser
                565                 570                 575
Gly Ser Asp Thr Cys Ala Gln Cys Ala His Phe Arg Asp Gly Pro His
            580                 585                 590
Cys Val Ser Ser Cys Pro His Gly Val Leu Gly Ala Lys Gly Pro Ile
        595                 600                 605
Tyr Lys Tyr Pro Asp Val Gln Asn Glu Cys Arg Pro Cys His Glu Asn
    610                 615                 620
Cys Thr Gln Gly Cys Lys Gly Pro Glu Leu Gln Asp Cys Leu Gly Gln
625                 630                 635                 640
Thr Leu Val Leu Ile Gly Lys Thr His Leu Thr Met Ala Leu Thr Val
                645                 650                 655
Ile Ala Gly Leu Val Val Ile Phe Met Met Leu Gly Gly Thr Phe Leu
            660                 665                 670
Tyr Trp Arg Gly Arg Arg Ile Gln Asn Lys Arg Ala Met Arg Arg Tyr
        675                 680                 685
Leu Glu Arg Gly Glu Ser Ile Glu Pro Leu Asp Pro Ser Glu Lys Ala
    690                 695                 700
Asn Lys Val Leu Ala Arg Ile Phe Lys Glu Thr Glu Leu Arg Lys Leu
705                 710                 715                 720
Lys Val Leu Gly Ser Gly Val Phe Gly Thr Val His Lys Gly Val Trp
                725                 730                 735
Ile Pro Glu Gly Glu Ser Ile Lys Ile Pro Val Cys Ile Lys Val Ile
            740                 745                 750
Glu Asp Lys Ser Gly Arg Gln Ser Phe Gln Ala Val Thr Asp His Met
        755                 760                 765
Leu Ala Ile Gly Ser Leu Asp His Ala His Ile Val Arg Leu Leu Gly
    770                 775                 780
Leu Cys Pro Gly Ser Ser Leu Gln Leu Val Thr Gln Tyr Leu Pro Leu
785                 790                 795                 800
Gly Ser Leu Leu Asp His Val Arg Gln His Arg Gly Ala Leu Gly Pro
                805                 810                 815
Gln Leu Leu Leu Asn Trp Gly Val Gln Ile Ala Lys Gly Met Tyr Tyr
            820                 825                 830
Leu Glu Glu His Gly Met Val His Arg Asn Leu Ala Ala Arg Asn Val
        835                 840                 845
Leu Leu Lys Ser Pro Ser Gln Val Gln Val Ala Asp Phe Gly Val Ala
    850                 855                 860
Asp Leu Leu Pro Pro Asp Asp Lys Gln Leu Leu Tyr Ser Glu Ala Lys
865                 870                 875                 880
Thr Pro Ile Lys Trp Met Ala Leu Glu Ser Ile His Phe Gly Lys Tyr
                885                 890                 895
Thr His Gln Ser Asp Val Trp Ser Tyr Gly Val Thr Val Trp Glu Leu
            900                 905                 910
Met Thr Phe Gly Ala Glu Pro Tyr Ala Gly Leu Arg Leu Ala Glu Val
```

-continued

```
                915                 920                 925
Pro Asp Leu Leu Glu Lys Gly Glu Arg Leu Ala Gln Pro Gln Ile Cys
    930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro His Gly Leu Thr Asn Lys Lys Leu
        995                 1000                1005

Glu Glu Val Glu Leu Glu Pro Glu Leu Asp Leu Asp Leu Asp Leu
    1010                1015                1020

Glu Ala Glu Glu Asp Asn Leu Ala Thr Thr Thr Leu Gly Ser Ala
    1025                1030                1035

Leu Ser Leu Pro Val Gly Thr Leu Asn Arg Pro Arg Gly Ser Gln
    1040                1045                1050

Ser Leu Leu Ser Pro Ser Ser Gly Tyr Met Pro Met Asn Gln Gly
    1055                1060                1065

Asn Leu Gly Glu Ser Cys Gln Glu Ser Ala Val Ser Gly Ser Ser
    1070                1075                1080

Glu Arg Cys Pro Arg Pro Val Ser Leu His Pro Met Pro Arg Gly
    1085                1090                1095

Cys Leu Ala Ser Glu Ser Ser Glu Gly His Val Thr Gly Ser Glu
    1100                1105                1110

Ala Glu Leu Gln Glu Lys Val Ser Met Cys Arg Ser Arg Ser Arg
    1115                1120                1125

Ser Arg Ser Pro Arg Pro Arg Gly Asp Ser Ala Tyr His Ser Gln
    1130                1135                1140

Arg His Ser Leu Leu Thr Pro Val Thr Pro Leu Ser Pro Pro Gly
    1145                1150                1155

Leu Glu Glu Glu Asp Val Asn Gly Tyr Val Met Pro Asp Thr His
    1160                1165                1170

Leu Lys Gly Thr Pro Ser Ser Arg Glu Gly Thr Leu Ser Ser Val
    1175                1180                1185

Gly Leu Ser Ser Val Leu Gly Thr Glu Glu Glu Asp Glu Asp Glu
    1190                1195                1200

Glu Tyr Glu Tyr Met Asn Arg Arg Arg Arg His Ser Pro Pro His
    1205                1210                1215

Pro Pro Arg Pro Ser Ser Leu Glu Glu Leu Gly Tyr Glu Tyr Met
    1220                1225                1230

Asp Val Gly Ser Asp Leu Ser Ala Ser Leu Gly Ser Thr Gln Ser
    1235                1240                1245

Cys Pro Leu His Pro Val Pro Ile Met Pro Thr Ala Gly Thr Thr
    1250                1255                1260

Pro Asp Glu Asp Tyr Glu Tyr Met Asn Arg Gln Arg Asp Gly Gly
    1265                1270                1275

Gly Pro Gly Gly Asp Tyr Ala Ala Met Gly Ala Cys Pro Ala Ser
    1280                1285                1290

Glu Gln Gly Tyr Glu Glu Met Arg Ala Phe Gln Gly Pro Gly His
    1295                1300                1305

Gln Ala Pro His Val His Tyr Ala Arg Leu Lys Thr Leu Arg Ser
    1310                1315                1320
```

Leu Glu Ala Thr Asp Ser Ala Phe Asp Asn Pro Asp Tyr Trp His
   1325            1330                1335

Ser Arg Leu Phe Pro Lys Ala Asn Ala Gln Arg Thr
   1340            1345                1350

<210> SEQ ID NO 17
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 17
ctgagactgg tcagaggcac ccaggtgtac g                               31

<210> SEQ ID NO 18
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 18
tctgaccagt ctcaggttag gcagaggcag g                               31

<210> SEQ ID NO 19
<211> LENGTH: 4053
<212> TYPE: DNA
<213> ORGANISM: Artificial Sequence
<220> FEATURE:
<223> OTHER INFORMATION: cDNA encoding Flag-HER3(V104L)

<400> SEQUENCE: 19
atgagagcca acgatgctct gcaggttctg ggcctgctgt tctctctggc tagaggcgat    60
tacaaggatg acgacgataa gtctgaagtg ggcaacagcc aggctgtgtg tcccggaaca   120
ctgaacggct tgtctgtgac aggcgacgcc gagaaccagt accagacact gtacaagctg   180
tacgagagat gcgaggtggt catgggcaac ctggaaatcg tgctgacagg ccacaacgcc   240
gacctgtctt tcctgcagtg gatcagagaa gtgaccggca cgtgctggt ggccatgaac   300 gagttcagca ccctgcctct gcctaacctg agactggtca gaggcaccca ggtgtacgat   360
ggcaagttcg ccatcttcgt gatgctgaac tacaacacca cagctctca cgccctgaga   420 cagctgagac tgacccagct gaccgagatc ctgtctggcg agtgtacat cgagaagaac   480 gacaagctgt gccacatgga caccatcgac tggcgggata cgtgcggga tagagatgcc   540 gagatcgtgg tcaaggacaa cggcagaagc tgccctcctt gccacgaagt gtgcaagggc   600
agatgttggg gccctggctc tgaggactgt cagaccctga ccaagaccat ctgcgcccct   660
cagtgtaacg gccactgctt cggccctaat cctaaccagt gctgccacga cgaatgcgct   720
ggcggatgtt ctggacctca ggacacagac tgcttcgcct gcagacactt caacgactct   780
ggcgcctgcg tgccaagatg tcctcagcct ctggtgtaca acaagctgac ctttcagctg   840
gaacccaatc ctcacaccaa gtaccagtac ggcggcgtgt gtgtggccag ctgtcctcac   900
aacttcgtgg tggaccagac cagctgtgtg cgggcttgtc ctcctgacaa gatggaagtg   960
gacaagaacg gcctgaagat gtgcgagcct tgcggcggac tgtgtcctaa ggcttgtgaa  1020
ggcacaggca cgggcagcag attccagaca gtggacagca gcaacatcga cggcttcgtg  1080
aactgcacca agatcctggg aaacctggac ttcctgatca ccggcctgaa cggcgatccc  1140

-continued

| | | | |
|---|---|---|---|
| tggcataaga | tccctgctct | ggaccccgag | aagctgaacg | tgttcagaac | cgtgcgcgag | 1200 |
| atcacaggct | acctgaacat | ccagagctgg | cctccacaca | tgcacaactt | cagcgtgttc | 1260 |
| tccaacctga | ccaccatcgg | cggcagatcc | ctgtacaaca | ggggcttcag | cctgctgatc | 1320 |
| atgaagaacc | tgaatgtgac | cagcctgggc | ttcagaagcc | tgaaagagat | cagcgccggc | 1380 |
| agaatctaca | tcagcgccaa | cagacagctg | tgctaccacc | acagcctgaa | ctggacaaag | 1440 |
| gtgctgagag | cccccaccga | ggaaagactg | gacatcaagc | acaacagacc | tagaagagac | 1500 |
| tgcgtggccg | agggcaaagt | gtgcgaccct | ctttgttcta | gcggcggctg | ttggggacca | 1560 |
| ggacctggac | agtgtctctc | ctgtagaaac | tacagccgcg | gaggcgtgtg | cgtgacccac | 1620 |
| tgcaattttc | tgaatggcga | gcccagagag | ttcgcccacg | aggccgagtg | tttcagctgt | 1680 |
| caccctgagt | gccagcctat | ggaaggcacc | gctacatgta | acggcagcgg | ctctgatacc | 1740 |
| tgcgctcagt | gcgcccactt | tagagatggc | cctcactgcg | tgtcctcttg | tcctcatggt | 1800 |
| gtcctgggcg | ctaagggccc | catctacaag | taccctgacg | tgcagaacga | gtgcaggccc | 1860 |
| tgccacgaga | actgtacaca | gggatgcaag | ggccctgagc | tgcaggattg | tctgggacag | 1920 |
| acactggtgc | tgatcggcaa | gacccacctg | acaatggccc | tgacagtgat | cgctggcctg | 1980 |
| gtggtcatct | ttatgatgct | cggcggcacc | ttcctgtatt | ggagaggcag | aagaatccag | 2040 |
| aacaagaggg | ccatgcggag | atacctggaa | agaggcgaga | gcatcgagcc | actggaccct | 2100 |
| agcgagaagg | ccaacaaggt | gctggccaga | atcttcaaag | acagagagct | gcggaagctg | 2160 |
| aaggtgctcg | gatctggcgt | gttcggcaca | gtgcacaaag | gcgtgtggat | ccctgagggc | 2220 |
| gagtccatca | gatccccgt | gtgcatcaaa | gtgatcgagg | acaagtccgg | caggcagagc | 2280 |
| ttccaggccg | tgacagatca | catgctggct | atcggcagcc | tggatcacgc | ccacatcgtt | 2340 |
| agactgctgg | gactgtgccc | tggcagctct | ctgcagctcg | tgacacagta | tctgcctctg | 2400 |
| ggatctctgc | tggaccacgt | gcgacaacat | agaggcgctc | tgggacctca | gctgctgctg | 2460 |
| aattggggag | tgcagatcgc | caagggcatg | tactacctgg | aagaacacgg | catggtgcac | 2520 |
| agaaacctgg | ccgccagaaa | cgtgctgctc | aagtctccta | gccaggtgca | ggtcgccgat | 2580 |
| ttcggagttg | ctgatctcct | gccacctgac | gacaaacagc | tgctgtactc | cgaggccaag | 2640 |
| acacccatca | agtggatggc | cctggaatct | atccacttcg | gcaagtacac | ccaccagagc | 2700 |
| gacgtgtggt | cttacggcgt | gacagtgtgg | gagctgatga | ccttcggagc | cgagccttac | 2760 |
| gctggactga | gactggctga | agtgcccgac | ctgctggaaa | agggcgaaag | acttgcccag | 2820 |
| cctcagatct | gtaccatcga | cgtgtacatg | gtcatggtca | agtgctggat | gatcgacgag | 2880 |
| aacatcagac | ccacattcaa | agagctggct | aacgagttta | cccggatggc | cagagatcct | 2940 |
| cctagatacc | tcgtgatcaa | gagagagagc | ggccctggca | ttgctcctgg | acctgaacct | 3000 |
| cacggactga | ccaacaagaa | gctggaagag | gtcgaactgg | aacccgagct | ggacctggat | 3060 |
| ctcgacctgg | aagccgaaga | ggataacctg | gccaccacaa | cactgggctc | tgctctgagt | 3120 |
| ctgcctgtgg | gcacactgaa | cagaccaaga | ggaagccaga | gcctgctgtc | tccaagcagc | 3180 |
| ggctacatgc | ctatgaacca | gggcaatctg | ggcgagagct | gtcaagagtc | tgccgtgtct | 3240 |
| ggcagcagcg | agagatgtcc | tagacctgtg | tctctgcacc | ccatgcctag | aggctgtctg | 3300 |
| gcttctgagt | ctagcgaggg | acacgtgaca | ggatccgagg | ccgaactgca | agagaaagtg | 3360 |
| tctatgtgca | gaagccgcag | cagaagcaga | agccctagac | ctagaggcga | cagcgcctac | 3420 |
| cactctcaga | gacactcact | gctgacccct | gtgacacctc | tgtctccacc | tggactcgag | 3480 |
| gaagaggacg | tcaacggata | cgtgatgccc | gacacacacc | tgaagggcac | ccctagctct | 3540 |

-continued

```
agagagggaa ccctgagtag cgtgggcctg agttctgtgc tgggcaccga agaggaagat    3600
gaggacgagg aatacgagta catgaacaga agaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtgc actatgccag actgaaaacc    3960
ctgagatctc tggaagccac cgactccgcc ttcgacaacc tgactactg gcacagcaga    4020 ctgttcccca aggccaacgc tcagagaaca taa                                 4053
```

<210> SEQ ID NO 20
<211> LENGTH: 1350
<212> TYPE: PRT
<213> ORGANISM: Artificial Sequence
<220> FEATURE:
<223> OTHER INFORMATION: Flag-HER3(V104L)

<400> SEQUENCE: 20

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Leu
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
                165                 170                 175

Asp Arg Asp Ala Glu Ile Val Val Lys Asp Asn Gly Arg Ser Cys Pro
            180                 185                 190

Pro Cys His Glu Val Cys Lys Gly Arg Cys Trp Gly Pro Gly Ser Glu
        195                 200                 205

Asp Cys Gln Thr Leu Thr Lys Thr Ile Cys Ala Pro Gln Cys Asn Gly
    210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
                245                 250                 255

Phe Asn Asp Ser Gly Ala Cys Val Pro Arg Cys Pro Gln Pro Leu Val
            260                 265                 270
```

```
Tyr Asn Lys Leu Thr Phe Gln Leu Glu Pro Asn Pro His Thr Lys Tyr
        275                 280                 285

Gln Tyr Gly Gly Val Cys Val Ala Ser Cys Pro His Asn Phe Val Val
    290                 295                 300

Asp Gln Thr Ser Cys Val Arg Ala Cys Pro Pro Asp Lys Met Glu Val
305                 310                 315                 320

Asp Lys Asn Gly Leu Lys Met Cys Glu Pro Cys Gly Gly Leu Cys Pro
                325                 330                 335

Lys Ala Cys Glu Gly Thr Gly Ser Gly Ser Arg Phe Gln Thr Val Asp
            340                 345                 350

Ser Ser Asn Ile Asp Gly Phe Val Asn Cys Thr Lys Ile Leu Gly Asn
        355                 360                 365

Leu Asp Phe Leu Ile Thr Gly Leu Asn Gly Asp Pro Trp His Lys Ile
    370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
                405                 410                 415

Phe Ser Val Phe Ser Asn Leu Thr Thr Ile Gly Gly Arg Ser Leu Tyr
            420                 425                 430

Asn Arg Gly Phe Ser Leu Leu Ile Met Lys Asn Leu Asn Val Thr Ser
        435                 440                 445

Leu Gly Phe Arg Ser Leu Lys Glu Ile Ser Ala Gly Arg Ile Tyr Ile
    450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
                485                 490                 495

Pro Arg Arg Asp Cys Val Ala Glu Gly Lys Val Cys Asp Pro Leu Cys
            500                 505                 510

Ser Ser Gly Gly Cys Trp Gly Pro Gly Pro Gly Gln Cys Leu Ser Cys
        515                 520                 525

Arg Asn Tyr Ser Arg Gly Gly Val Cys Val Thr His Cys Asn Phe Leu
    530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
                565                 570                 575

Gly Ser Asp Thr Cys Ala Gln Cys Ala His Phe Arg Asp Gly Pro His
            580                 585                 590

Cys Val Ser Ser Cys Pro His Gly Val Leu Gly Ala Lys Gly Pro Ile
        595                 600                 605

Tyr Lys Tyr Pro Asp Val Gln Asn Glu Cys Arg Pro Cys His Glu Asn
    610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                645                 650                 655

Ile Ala Gly Leu Val Val Ile Phe Met Met Leu Gly Gly Thr Phe Leu
            660                 665                 670

Tyr Trp Arg Gly Arg Arg Ile Gln Asn Lys Arg Ala Met Arg Arg Tyr
        675                 680                 685
```

```
Leu Glu Arg Gly Glu Ser Ile Glu Pro Leu Asp Pro Ser Glu Lys Ala
    690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735

Ile Pro Glu Gly Glu Ser Ile Lys Ile Pro Val Cys Ile Lys Val Ile
            740                 745                 750

Glu Asp Lys Ser Gly Arg Gln Ser Phe Gln Ala Val Thr Asp His Met
        755                 760                 765

Leu Ala Ile Gly Ser Leu Asp His Ala His Ile Val Arg Leu Leu Gly
    770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
                805                 810                 815

Gln Leu Leu Leu Asn Trp Gly Val Gln Ile Ala Lys Gly Met Tyr Tyr
            820                 825                 830

Leu Glu Glu His Gly Met Val His Arg Asn Leu Ala Ala Arg Asn Val
        835                 840                 845

Leu Leu Lys Ser Pro Ser Gln Val Gln Val Ala Asp Phe Gly Val Ala
    850                 855                 860

Asp Leu Leu Pro Pro Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                885                 890                 895

Thr His Gln Ser Asp Val Trp Ser Tyr Gly Val Thr Val Trp Glu Leu
            900                 905                 910

Met Thr Phe Gly Ala Glu Pro Tyr Ala Gly Leu Arg Leu Ala Glu Val
        915                 920                 925

Pro Asp Leu Leu Glu Lys Gly Glu Arg Leu Ala Gln Pro Gln Ile Cys
    930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro His Gly Leu Thr Asn Lys Lys Leu
        995                 1000                1005

Glu Glu Val Glu Leu Glu Pro Glu Leu Asp Leu Asp Leu Asp Leu
    1010                1015                1020

Glu Ala Glu Glu Asp Asn Leu Ala Thr Thr Thr Leu Gly Ser Ala
    1025                1030                1035

Leu Ser Leu Pro Val Gly Thr Leu Asn Arg Pro Arg Gly Ser Gln
    1040                1045                1050

Ser Leu Leu Ser Pro Ser Ser Gly Tyr Met Pro Met Asn Gln Gly
    1055                1060                1065

Asn Leu Gly Glu Ser Cys Gln Glu Ser Ala Val Ser Gly Ser Ser
    1070                1075                1080

Glu Arg Cys Pro Arg Pro Val Ser Leu His Pro Met Pro Arg Gly
    1085                1090                1095

Cys Leu Ala Ser Glu Ser Ser Glu Gly His Val Thr Gly Ser Glu
```

```
            1100                1105                1110

Ala  Glu  Leu  Gln  Glu  Lys  Val  Ser  Met  Cys  Arg  Ser  Arg  Ser  Arg
     1115                1120                1125

Ser  Arg  Ser  Pro  Arg  Pro  Arg  Gly  Asp  Ser  Ala  Tyr  His  Ser  Gln
     1130                1135                1140

Arg  His  Ser  Leu  Leu  Thr  Pro  Val  Thr  Pro  Leu  Ser  Pro  Pro  Gly
     1145                1150                1155

Leu  Glu  Glu  Glu  Asp  Val  Asn  Gly  Tyr  Val  Met  Pro  Asp  Thr  His
     1160                1165                1170

Leu  Lys  Gly  Thr  Pro  Ser  Ser  Arg  Glu  Gly  Thr  Leu  Ser  Ser  Val
     1175                1180                1185

Gly  Leu  Ser  Ser  Val  Leu  Gly  Thr  Glu  Glu  Asp  Glu  Asp  Glu
     1190                1195                1200

Glu  Tyr  Glu  Tyr  Met  Asn  Arg  Arg  Arg  Arg  His  Ser  Pro  Pro  His
     1205                1210                1215

Pro  Pro  Arg  Pro  Ser  Ser  Leu  Glu  Glu  Leu  Gly  Tyr  Glu  Tyr  Met
     1220                1225                1230

Asp  Val  Gly  Ser  Asp  Leu  Ser  Ala  Ser  Leu  Gly  Ser  Thr  Gln  Ser
     1235                1240                1245

Cys  Pro  Leu  His  Pro  Val  Pro  Ile  Met  Pro  Thr  Ala  Gly  Thr  Thr
     1250                1255                1260

Pro  Asp  Glu  Asp  Tyr  Glu  Tyr  Met  Asn  Arg  Gln  Arg  Asp  Gly  Gly
     1265                1270                1275

Gly  Pro  Gly  Gly  Asp  Tyr  Ala  Ala  Met  Gly  Ala  Cys  Pro  Ala  Ser
     1280                1285                1290

Glu  Gln  Gly  Tyr  Glu  Glu  Met  Arg  Ala  Phe  Gln  Gly  Pro  Gly  His
     1295                1300                1305

Gln  Ala  Pro  His  Val  His  Tyr  Ala  Arg  Leu  Lys  Thr  Leu  Arg  Ser
     1310                1315                1320

Leu  Glu  Ala  Thr  Asp  Ser  Ala  Phe  Asp  Asn  Pro  Asp  Tyr  Trp  His
     1325                1330                1335

Ser  Arg  Leu  Phe  Pro  Lys  Ala  Asn  Ala  Gln  Arg  Thr
     1340                1345                1350

<210> SEQ ID NO 21
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 21
ctgagaatgg tcagaggcac ccaggtgtac g                              31

<210> SEQ ID NO 22
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 22
tctgaccatt ctcaggttag gcagaggcag g                              31

<210> SEQ ID NO 23
<211> LENGTH: 4053
<212> TYPE: DNA
<213> ORGANISM: Artificial Sequence
```

<220> FEATURE:
<223> OTHER INFORMATION: cDNA encoding Flag-HER3(V104M)

<400> SEQUENCE: 23

```
atgagagcca acgatgctct gcaggttctg ggcctgctgt tctctctggc tagaggcgat      60
tacaaggatg acgacgataa gtctgaagtg ggcaacagcc aggctgtgtg tcccggaaca     120
ctgaacggct tgtctgtgac aggcgacgcc gagaaccagt accagacact gtacaagctg     180
tacgagagat gcgaggtggt catgggcaac ctggaaatcg tgctgacagg ccacaacgcc     240
gacctgtctt tcctgcagtg gatcagagaa gtgaccggct acgtgctggt ggccatgaac     300
gagttcagca ccctgcctct gcctaacctg agaatggtca gaggcaccca ggtgtacgat     360
ggcaagttcg ccatcttcgt gatgctgaac tacaacacca acagctctca cgccctgaga     420
cagctgagac tgaccagct gaccgagatc ctgtctggcg agtgtacat cgagaagaac     480
gacaagctgt gccacatgga caccatcgac tggcgggata tcgtgcggga tagagatgcc     540
gagatcgtgg tcaaggacaa cggcagaagc tgccctcctt gccacgaagt gtgcaagggc     600
agatgttggg gccctggctc tgaggactgt cagaccctga ccaagaccat ctgcgcccct     660
cagtgtaacg gccactgctt cggccctaat cctaaccagt gctgccacga cgaatgcgct     720
ggcggatgtt ctggacctca ggacacagac tgcttcgcct gcagacactt caacgactct     780
ggcgcctgcg tgccaagatg tcctcagcct ctggtgtaca acaagctgac ctttcagctg     840
gaacccaatc ctcacaccaa gtaccagtac ggcggcgtgt gtgtggccag ctgtcctcac     900
aacttcgtgg tggaccagac cagctgtgtg cgggcttgtc ctcctgacaa gatggaagtg     960
gacaagaacg gcctgaagat gtgcgagcct tgcggcggac tgtgtcctaa ggcttgtgaa    1020
ggcacaggca cggcagcag attccagaca gtggacagca gcaacatcga cggcttcgtg    1080
aactgcacca agatcctggg aaacctggac ttcctgatca ccggcctgaa cggcgatccc    1140
tggcataaga tccctgctct ggaccccgag aagctgaacg tgttcagaac cgtgcgcgag    1200
atcacaggct acctgaacat ccagagctgg cctccacaca tgcacaactt cagcgtgttc    1260
tccaacctga ccaccatcgg cggcagatcc ctgtacaaca ggggcttcag cctgctgatc    1320
atgaagaacc tgaatgtgac cagcctgggc ttcagaagcc tgaaagagat cagcgccggc    1380
agaatctaca tcagcgccaa cagacagctg tgctaccacc acagcctgaa ctggacaaag    1440
gtgctgagag gccccaccga ggaaagactg gacatcaagc acaacagacc tagaagagac    1500
tgcgtggccg agggcaaagt gtgcgaccct cttgttcta gcggcggctg ttggggacca    1560
ggacctggac agtgtctctc ctgtagaaac tacagccgcg gaggcgtgtg cgtgacccac    1620
tgcaatttc tgaatggcga gcccagagag ttcgcccacg aggccgagtg tttcagctgt    1680
caccctgagt gccagcctat ggaaggcacc gctacatgta acggcagcgg ctctgatacc    1740
tgcgctcagt gcgcccactt tagagatggc cctcactgcg tgtcctcttg tcctcatggt    1800
gtcctgggcg ctaagggccc catctacaag taccctgacg tgcagaacga gtgcaggccc    1860
tgccacgaga actgtacaca gggatgcaag ggccctgagc tgcaggattg tctgggacag    1920
acactggtgc tgatcggcaa gacccacctg caatggccc tgacagtgat cgctggcctg    1980
gtggtcatct ttatgatgct cggcggcacc ttcctgtatt ggagaggcag aagaatccag    2040
aacaagaggg ccatgcggag atacctggaa agaggcgaga gcatcgagcc actggaccct    2100
agcgagaagg ccaacaaggt gctggccaga atcttcaaag agacagagct gcggaagctg    2160
aaggtgctcg gatctggcgt gttcggcaca gtgcacaaag gcgtgtggat ccctgagggc    2220
```

-continued

| | |
|---|---|
| gagtccatca agatccccgt gtgcatcaaa gtgatcgagg acaagtccgg caggcagagc | 2280 |
| ttccaggccg tgacagatca catgctggct atcggcagcc tggatcacgc ccacatcgtt | 2340 |
| agactgctgg gactgtgccc tggcagctct ctgcagctcg tgacacagta tctgcctctg | 2400 |
| ggatctctgc tggaccacgt gcgacaacat agaggcgctc tgggacctca gctgctgctg | 2460 |
| aattggggag tgcagatcgc caagggcatg tactacctgg aagaacacgg catggtgcac | 2520 |
| agaaacctgg ccgccagaaa cgtgctgctc aagtctccta gccaggtgca ggtcgccgat | 2580 |
| ttcggagttg ctgatctcct gccacctgac gacaaacagc tgctgtactc cgaggccaag | 2640 |
| acacccatca gtggatggc cctggaatct atccacttcg gcaagtacac ccaccagagc | 2700 |
| gacgtgtggt cttacggcgt gacagtgtgg gagctgatga ccttcggagc cgagccttac | 2760 |
| gctggactga gactggctga agtgcccgac ctgctggaaa agggcgaaag acttgcccag | 2820 |
| cctcagatct gtaccatcga cgtgtacatg gtcatggtca agtgctggat gatcgacgag | 2880 |
| aacatcagac ccacattcaa agagctggct aacgagttta cccggatggc cagagatcct | 2940 |
| cctagatacc tcgtgatcaa gagagagagc ggccctggca ttgctcctgg acctgaacct | 3000 |
| cacggactga ccaacaagaa gctggaagag gtcgaactgg aacccgagct ggacctggat | 3060 |
| ctcgacctgg aagccgaaga ggataacctg gccaccacaa cactgggctc tgctctgagt | 3120 |
| ctgcctgtgg gcacactgaa cagaccaaga ggaagccaga gcctgctgtc tccaagcagc | 3180 |
| ggctacatgc ctatgaacca gggcaatctg ggcgagagct gtcaagagtc tgccgtgtct | 3240 |
| ggcagcagcg agagatgtcc tagacctgtg tctctgcacc ccatgcctag aggctgtctg | 3300 |
| gcttctgagt ctagcgaggg acacgtgaca ggatccgagg ccgaactgca agagaaagtg | 3360 |
| tctatgtgca gaagccgcag cagaagcaga agccctagac ctagaggcga cagcgcctac | 3420 |
| cactctcaga gacactcact gctgacccct gtgacacctc tgtctccacc tggactcgag | 3480 |
| gaagaggacg tcaacggata cgtgatgccc gacacacacc tgaagggcac ccctagctct | 3540 |
| agagagggaa ccctgagtag cgtgggcctg agttctgtgc tgggcaccga agaggaagat | 3600 |
| gaggacgagg aatacgagta catgaacaga agaaggcggc acagccctcc acatcctcca | 3660 |
| agacctagca gcctcgagga actgggctac gagtatatgg acgtgggcag cgatctgagc | 3720 |
| gctagcctgg gatctacaca gtcttgccca ctgcaccctg tgcctatcat gcctacagcc | 3780 |
| ggcaccacac cagacgagga ctatgagtat atgaatcggc agagagatgg cggcggacct | 3840 |
| ggcggagatt atgctgctat gggagcctgt cctgctagcg agcagggcta cgaagagatg | 3900 |
| agagccttc aaggccctgg ccatcaggct cctcacgtgc actatgccag actgaaaacc | 3960 |
| ctgagatctc tggaagccac cgactccgcc ttcgacaacc ctgactactg gcacagcaga | 4020 |
| ctgttcccca aggccaacgc tcagagaaca taa | 4053 |

<210> SEQ ID NO 24
<211> LENGTH: 1350
<212> TYPE: PRT
<213> ORGANISM: Artificial Sequence
<220> FEATURE:
<223> OTHER INFORMATION: Flag-HER3(V104M)

<400> SEQUENCE: 24

Met Arg Ala Asn Asp Ala Leu Gln Val Leu Gly Leu Leu Phe Ser Leu
1               5                   10                  15

Ala Arg Gly Asp Tyr Lys Asp Asp Asp Asp Lys Ser Glu Val Gly Asn
            20                  25                  30

Ser Gln Ala Val Cys Pro Gly Thr Leu Asn Gly Leu Ser Val Thr Gly

```
             35                  40                  45
Asp Ala Glu Asn Gln Tyr Gln Thr Leu Tyr Lys Leu Tyr Glu Arg Cys
 50                  55                  60
Glu Val Val Met Gly Asn Leu Glu Ile Val Leu Thr Gly His Asn Ala
 65                  70                  75                  80
Asp Leu Ser Phe Leu Gln Trp Ile Arg Glu Val Thr Gly Tyr Val Leu
                 85                  90                  95
Val Ala Met Asn Glu Phe Ser Thr Leu Pro Leu Pro Asn Leu Arg Met
                100                 105                 110
Val Arg Gly Thr Gln Val Tyr Asp Gly Lys Phe Ala Ile Phe Val Met
            115                 120                 125
Leu Asn Tyr Asn Thr Asn Ser Ser His Ala Leu Arg Gln Leu Arg Leu
        130                 135                 140
Thr Gln Leu Thr Glu Ile Leu Ser Gly Gly Val Tyr Ile Glu Lys Asn
145                 150                 155                 160
Asp Lys Leu Cys His Met Asp Thr Ile Asp Trp Arg Asp Ile Val Arg
                165                 170                 175
Asp Arg Asp Ala Glu Ile Val Val Lys Asp Asn Gly Arg Ser Cys Pro
            180                 185                 190
Pro Cys His Glu Val Cys Lys Gly Arg Cys Trp Gly Pro Gly Ser Glu
        195                 200                 205
Asp Cys Gln Thr Leu Thr Lys Thr Ile Cys Ala Pro Gln Cys Asn Gly
210                 215                 220
His Cys Phe Gly Pro Asn Pro Asn Gln Cys Cys His Asp Glu Cys Ala
225                 230                 235                 240
Gly Gly Cys Ser Gly Pro Gln Asp Thr Asp Cys Phe Ala Cys Arg His
                245                 250                 255
Phe Asn Asp Ser Gly Ala Cys Val Pro Arg Cys Pro Gln Pro Leu Val
            260                 265                 270
Tyr Asn Lys Leu Thr Phe Gln Leu Glu Pro Asn Pro His Thr Lys Tyr
        275                 280                 285
Gln Tyr Gly Gly Val Cys Val Ala Ser Cys Pro His Asn Phe Val Val
290                 295                 300
Asp Gln Thr Ser Cys Val Arg Ala Cys Pro Pro Asp Lys Met Glu Val
305                 310                 315                 320
Asp Lys Asn Gly Leu Lys Met Cys Glu Pro Cys Gly Gly Leu Cys Pro
                325                 330                 335
Lys Ala Cys Glu Gly Thr Gly Ser Gly Ser Arg Phe Gln Thr Val Asp
            340                 345                 350
Ser Ser Asn Ile Asp Gly Phe Val Asn Cys Thr Lys Ile Leu Gly Asn
        355                 360                 365
Leu Asp Phe Leu Ile Thr Gly Leu Asn Gly Asp Pro Trp His Lys Ile
    370                 375                 380
Pro Ala Leu Asp Pro Glu Lys Leu Asn Val Phe Arg Thr Val Arg Glu
385                 390                 395                 400
Ile Thr Gly Tyr Leu Asn Ile Gln Ser Trp Pro Pro His Met His Asn
                405                 410                 415
Phe Ser Val Phe Ser Asn Leu Thr Thr Ile Gly Gly Arg Ser Leu Tyr
            420                 425                 430
Asn Arg Gly Phe Ser Leu Leu Ile Met Lys Asn Leu Asn Val Thr Ser
        435                 440                 445
Leu Gly Phe Arg Ser Leu Lys Glu Ile Ser Ala Gly Arg Ile Tyr Ile
    450                 455                 460
```

-continued

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
            485                 490                 495

Pro Arg Arg Asp Cys Val Ala Glu Gly Lys Val Cys Asp Pro Leu Cys
        500                 505                 510

Ser Ser Gly Gly Cys Trp Gly Pro Gly Pro Gln Cys Leu Ser Cys
        515                 520                 525

Arg Asn Tyr Ser Arg Gly Gly Val Cys Val Thr His Cys Asn Phe Leu
    530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
            565                 570                 575

Gly Ser Asp Thr Cys Ala Gln Cys Ala His Phe Arg Asp Gly Pro His
        580                 585                 590

Cys Val Ser Ser Cys Pro His Gly Val Leu Gly Ala Lys Gly Pro Ile
    595                 600                 605

Tyr Lys Tyr Pro Asp Val Gln Asn Glu Cys Arg Pro Cys His Glu Asn
610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
            645                 650                 655

Ile Ala Gly Leu Val Val Ile Phe Met Met Leu Gly Gly Thr Phe Leu
        660                 665                 670

Tyr Trp Arg Gly Arg Arg Ile Gln Asn Lys Arg Ala Met Arg Arg Tyr
    675                 680                 685

Leu Glu Arg Gly Glu Ser Ile Glu Pro Leu Asp Pro Ser Glu Lys Ala
    690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
            725                 730                 735

Ile Pro Glu Gly Glu Ser Ile Lys Ile Pro Val Cys Ile Lys Val Ile
        740                 745                 750

Glu Asp Lys Ser Gly Arg Gln Ser Phe Gln Ala Val Thr Asp His Met
    755                 760                 765

Leu Ala Ile Gly Ser Leu Asp His Ala His Ile Val Arg Leu Leu Gly
    770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
            805                 810                 815

Gln Leu Leu Leu Asn Trp Gly Val Gln Ile Ala Lys Gly Met Tyr Tyr
        820                 825                 830

Leu Glu Glu His Gly Met Val His Arg Asn Leu Ala Ala Arg Asn Val
    835                 840                 845

Leu Leu Lys Ser Pro Ser Gln Val Gln Val Ala Asp Phe Gly Val Ala
    850                 855                 860

Asp Leu Leu Pro Pro Asp Asp Lys Gln Leu Leu Tyr Ser Glu Ala Lys
865                 870                 875                 880

```
Thr Pro Ile Lys Trp Met Ala Leu Glu Ser Ile His Phe Gly Lys Tyr
            885                 890                 895

Thr His Gln Ser Asp Val Trp Ser Tyr Gly Val Thr Val Trp Glu Leu
            900                 905                 910

Met Thr Phe Gly Ala Glu Pro Tyr Ala Gly Leu Arg Leu Ala Glu Val
            915                 920                 925

Pro Asp Leu Leu Glu Lys Gly Glu Arg Leu Ala Gln Pro Gln Ile Cys
            930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
            965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro His Gly Leu Thr Asn Lys Lys Leu
            995                 1000                1005

Glu Glu Val Glu Leu Glu Pro Glu Leu Asp Leu Asp Leu Asp Leu
        1010                1015                1020

Glu Ala Glu Glu Asp Asn Leu Ala Thr Thr Thr Leu Gly Ser Ala
        1025                1030                1035

Leu Ser Leu Pro Val Gly Thr Leu Asn Arg Pro Arg Gly Ser Gln
        1040                1045                1050

Ser Leu Leu Ser Pro Ser Ser Gly Tyr Met Pro Met Asn Gln Gly
        1055                1060                1065

Asn Leu Gly Glu Ser Cys Gln Glu Ser Ala Val Ser Gly Ser Ser
        1070                1075                1080

Glu Arg Cys Pro Arg Pro Val Ser Leu His Pro Met Pro Arg Gly
        1085                1090                1095

Cys Leu Ala Ser Glu Ser Ser Glu Gly His Val Thr Gly Ser Glu
        1100                1105                1110

Ala Glu Leu Gln Glu Lys Val Ser Met Cys Arg Ser Arg Ser Arg
        1115                1120                1125

Ser Arg Ser Pro Arg Pro Arg Gly Asp Ser Ala Tyr His Ser Gln
        1130                1135                1140

Arg His Ser Leu Leu Thr Pro Val Thr Pro Leu Ser Pro Pro Gly
        1145                1150                1155

Leu Glu Glu Glu Asp Val Asn Gly Tyr Val Met Pro Asp Thr His
        1160                1165                1170

Leu Lys Gly Thr Pro Ser Ser Arg Glu Gly Thr Leu Ser Ser Val
        1175                1180                1185

Gly Leu Ser Ser Val Leu Gly Thr Glu Glu Glu Asp Glu Asp Glu
        1190                1195                1200

Glu Tyr Glu Tyr Met Asn Arg Arg Arg Arg His Ser Pro Pro His
        1205                1210                1215

Pro Pro Arg Pro Ser Ser Leu Glu Glu Leu Gly Tyr Glu Tyr Met
        1220                1225                1230

Asp Val Gly Ser Asp Leu Ser Ala Ser Leu Gly Ser Thr Gln Ser
        1235                1240                1245

Cys Pro Leu His Pro Val Pro Ile Met Pro Thr Ala Gly Thr Thr
        1250                1255                1260

Pro Asp Glu Asp Tyr Glu Tyr Met Asn Arg Gln Arg Asp Gly Gly
        1265                1270                1275

Gly Pro Gly Gly Asp Tyr Ala Ala Met Gly Ala Cys Pro Ala Ser
```

```
          1280              1285              1290
Glu Gln Gly Tyr Glu Glu Met Arg Ala Phe Gln Gly Pro Gly His
      1295              1300              1305

Gln Ala Pro His Val His Tyr Ala Arg Leu Lys Thr Leu Arg Ser
      1310              1315              1320

Leu Glu Ala Thr Asp Ser Ala Phe Asp Asn Pro Asp Tyr Trp His
      1325              1330              1335

Ser Arg Leu Phe Pro Lys Ala Asn Ala Gln Arg Thr
      1340              1345              1350

<210> SEQ ID NO 25
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 25
gaatgcgtcg gcggatgttc tggacctcag g                             31

<210> SEQ ID NO 26
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 26
tccgccgacg cattcgtcgt ggcagcactg g                             31

<210> SEQ ID NO 27
<211> LENGTH: 4053
<212> TYPE: DNA
<213> ORGANISM: Artificial Sequence
<220> FEATURE:
<223> OTHER INFORMATION: cDNA encoding Flag-HER3(A232V)

<400> SEQUENCE: 27
atgagagcca acgatgctct gcaggttctg ggcctgctgt tctctctggc tagaggcgat    60
tacaaggatg acgacgataa gtctgaagtg gcaacagcc aggctgtgtg tccggaaca   120 ctgaacggct tgtctgtgac aggcgacgcc gagaaccagt accagacact gtacaagctg   180
tacgagagat gcgaggtggt catgggcaac ctggaaatcg tgctgacagg ccacaacgcc   240
gacctgtctt tcctgcagtg gatcagagaa gtgaccggct acgtgctggt ggccatgaac   300
gagttcagca ccctgcctct gcctaacctg agagtcgtca gaggcaccca ggtgtacgat   360
ggcaagttcg ccatcttcgt gatgctgaac tacaacacca cagctctca cgccctgaga   420 cagctgagac tgaccagct gaccgagatc ctgtctggcg gagtgtacat cgagaagaac   480
gacaagctgt gccacatgga caccatcgac tggcgggata cgtgcggga tagagatgcc   540 gagatcgtgg tcaaggacaa cggcagaagc tgccctcctt gccacgaagt gtgcaagggc   600
agatgttggg gccctggctc tgaggactgt cagaccctga ccaagaccat ctgcgcccct   660
cagtgtaacg gccactgctt cggccctaat cctaaccagt gctgccacga cgaatgcgtc   720
ggcggatgtt ctggacctca ggacacagac tgcttcgcct gcagacactt caacgactct   780
ggcgcctgcg tgccaagatg tcctcagcct ctggtgtaca acaagctgac ctttcagctg   840
gaacccaatc tcacaccaa gtaccagtac ggcggcgtgt gtgtggccag ctgtcctcac   900
aacttcgtgg tggaccagac cagctgtgtg cgggcttgtc ctccctgacaa gatggaagtg   960
```

-continued

```
gacaagaacg gcctgaagat gtgcgagcct tgcggcggac tgtgtcctaa ggcttgtgaa      1020
ggcacaggca gcggcagcag attccagaca gtggacagca gcaacatcga cggcttcgtg      1080
aactgcacca agatcctggg aaacctggac ttcctgatca ccggcctgaa cggcgatccc      1140
tggcataaga tccctgctct ggaccccgag aagctgaacg tgttcagaac cgtgcgcgag      1200
atcacaggct acctgaacat ccagagctgg cctccacaca tgcacaactt cagcgtgttc      1260
tccaacctga ccaccatcgg cggcagatcc ctgtacaaca ggggcttcag cctgctgatc      1320
atgaagaacc tgaatgtgac cagcctgggc ttcagaagcc tgaaagagat cagcgccggc      1380
agaatctaca tcagcgccaa cagacagctg tgctaccacc acagcctgaa ctggacaaag      1440
gtgctgagag gccccaccga ggaaagactg gacatcaagc acaacagacc tagaagagac      1500
tgcgtggccg agggcaaagt gtgcgaccct ctttgttcta gcggcggctg ttggggacca      1560
ggacctggac agtgtctctc ctgtagaaac tacagccgcg gaggcgtgtg cgtgacccac      1620
tgcaattttc tgaatggcga gcccagagag ttcgcccacg aggccgagtg tttcagctgt      1680
caccctgagt gccagcctat ggaaggcacc gctacatgta acggcagcgg ctctgatacc      1740
tgcgctcagt gcgcccactt tagagatggc cctcactgcg tgtcctcttg tcctcatggt      1800
gtcctgggcg ctaagggccc catctacaag taccctgacg tgcagaacga gtgcaggccc      1860
tgccacgaga actgtacaca gggatgcaag ggccctgagc tgcaggattg tctgggacag      1920
acactggtgc tgatcggcaa gacccacctg acaatggccc tgacagtgat cgctggcctg      1980
gtggtcatct ttatgatgct cggcggcacc ttcctgtatt ggagaggcag aagaatccag      2040
aacaagaggg ccatgcggag ataccctggaa agaggcgaga gcatcgagcc actggaccct      2100
agcgagaagg ccaacaaggt gctggccaga atcttcaaag agacagagct gcggaagctg      2160
aaggtgctcg gatctggcgt gttcggcaca gtgcacaaag gcgtgtggat ccctgagggc      2220
gagtccatca agatcccgt gtgcatcaaa gtgatcgagg acaagtccgg caggcagagc      2280
ttccaggccg tgacagatca catgctggct atcggcagcc tggatcacgc ccacatcgtt      2340
agactgctgg gactgtgccc tggcagctct ctgcagctcg tgacacagta tctgcctctg      2400
ggatctctgc tggaccacgt gcgacaacat agaggcgctc tgggacctca gctgctgctg      2460
aattggggag tgcagatcgc caagggcatg tactacctgg aagaacacgg catggtgcac      2520
agaaacctgg ccgccagaaa cgtgctgctc aagtctccta gccaggtgca ggtcgccgat      2580
ttcggagttg ctgatctcct gccacctgac gacaaacagc tgctgtactc cgaggccaag      2640
acacccatca gtggatggc cctggaatct atccacttcg gcaagtacac ccaccagagc      2700
gacgtgtggt cttacggcgt gacagtgtgg gagctgatga ccttcggagc cgagccttac      2760
gctggactga gactggctga agtgcccgac ctgctggaaa agggcgaaag acttgcccag      2820
cctcagatct gtaccatcga cgtgtacatg gtcatggtca agtgctggat gatcgacgag      2880
aacatcagac ccacattcaa agagctggct aacgagtta cccggatggc cagagatcct      2940
cctagatacc tcgtgatcaa gagagagagc ggccctggca ttgctcctgg acctgaacct      3000
cacggactga ccaacaagaa gctggaagag gtcgaactgg aacccgagct ggacctggat      3060
ctcgacctgg aagccgaaga ggataacctg gccaccacaa cactgggctc tgctctgagt      3120
ctgcctgtgg gcacactgaa cagaccaaga ggaagccaga gcctgctgtc tccaagcagc      3180
ggctacatgc ctatgaacca gggcaatctg ggcgagagct gtcaagagtc tgccgtgtct      3240
ggcagcagcg agagatgtcc tagacctgtg tctctgcacc ccatgcctag aggctgtctg      3300
```

```
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgacccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtgc actatgccag actgaaaacc    3960
ctgagatctc tggaagccac cgactccgcc ttcgacaacc tgactactg gcacagcaga    4020 ctgttcccca aggccaacgc tcagagaaca taa                                 4053
```

<210> SEQ ID NO 28
<211> LENGTH: 1350
<212> TYPE: PRT
<213> ORGANISM: Artificial Sequence
<220> FEATURE:
<223> OTHER INFORMATION: Flag-HER3(A232V)

<400> SEQUENCE: 28

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
                165                 170                 175

Asp Arg Asp Ala Glu Ile Val Val Lys Asp Asn Gly Arg Ser Cys Pro
            180                 185                 190

Pro Cys His Glu Val Cys Lys Gly Arg Cys Trp Gly Pro Gly Ser Glu
        195                 200                 205

Asp Cys Gln Thr Leu Thr Lys Thr Ile Cys Ala Pro Gln Cys Asn Gly
    210                 215                 220

His Cys Phe Gly Pro Asn Pro Asn Gln Cys Cys His Asp Glu Cys Val
```

```
            225                 230                 235                 240
        Gly Gly Cys Ser Gly Pro Gln Asp Thr Asp Cys Phe Ala Cys Arg His
                        245                 250                 255
        Phe Asn Asp Ser Gly Ala Cys Val Pro Arg Cys Pro Gln Pro Leu Val
                        260                 265                 270
        Tyr Asn Lys Leu Thr Phe Gln Leu Glu Pro Asn Pro His Thr Lys Tyr
                        275                 280                 285
        Gln Tyr Gly Gly Val Cys Val Ala Ser Cys Pro His Asn Phe Val Val
            290                 295                 300
        Asp Gln Thr Ser Cys Val Arg Ala Cys Pro Pro Asp Lys Met Glu Val
        305                 310                 315                 320
        Asp Lys Asn Gly Leu Lys Met Cys Glu Pro Cys Gly Gly Leu Cys Pro
                        325                 330                 335
        Lys Ala Cys Glu Gly Thr Gly Ser Gly Ser Arg Phe Gln Thr Val Asp
                        340                 345                 350
        Ser Ser Asn Ile Asp Gly Phe Val Asn Cys Thr Lys Ile Leu Gly Asn
                        355                 360                 365
        Leu Asp Phe Leu Ile Thr Gly Leu Asn Gly Asp Pro Trp His Lys Ile
            370                 375                 380
        Pro Ala Leu Asp Pro Glu Lys Leu Asn Val Phe Arg Thr Val Arg Glu
        385                 390                 395                 400
        Ile Thr Gly Tyr Leu Asn Ile Gln Ser Trp Pro Pro His Met His Asn
                        405                 410                 415
        Phe Ser Val Phe Ser Asn Leu Thr Thr Ile Gly Gly Arg Ser Leu Tyr
                        420                 425                 430
        Asn Arg Gly Phe Ser Leu Leu Ile Met Lys Asn Leu Asn Val Thr Ser
                        435                 440                 445
        Leu Gly Phe Arg Ser Leu Lys Glu Ile Ser Ala Gly Arg Ile Tyr Ile
            450                 455                 460
        Ser Ala Asn Arg Gln Leu Cys Tyr His His Ser Leu Asn Trp Thr Lys
        465                 470                 475                 480
        Val Leu Arg Gly Pro Thr Glu Glu Arg Leu Asp Ile Lys His Asn Arg
                        485                 490                 495
        Pro Arg Arg Asp Cys Val Ala Glu Gly Lys Val Cys Asp Pro Leu Cys
                        500                 505                 510
        Ser Ser Gly Gly Cys Trp Gly Pro Gly Pro Gly Gln Cys Leu Ser Cys
                        515                 520                 525
        Arg Asn Tyr Ser Arg Gly Gly Val Cys Val Thr His Cys Asn Phe Leu
            530                 535                 540
        Asn Gly Glu Pro Arg Glu Phe Ala His Glu Ala Glu Cys Phe Ser Cys
        545                 550                 555                 560
        His Pro Glu Cys Gln Pro Met Glu Gly Thr Ala Thr Cys Asn Gly Ser
                        565                 570                 575
        Gly Ser Asp Thr Cys Ala Gln Cys Ala His Phe Arg Asp Gly Pro His
                        580                 585                 590
        Cys Val Ser Ser Cys Pro His Gly Val Leu Gly Ala Lys Gly Pro Ile
                        595                 600                 605
        Tyr Lys Tyr Pro Asp Val Gln Asn Glu Cys Arg Pro Cys His Glu Asn
            610                 615                 620
        Cys Thr Gln Gly Cys Lys Gly Pro Glu Leu Gln Asp Cys Leu Gly Gln
        625                 630                 635                 640
        Thr Leu Val Leu Ile Gly Lys Thr His Leu Thr Met Ala Leu Thr Val
                        645                 650                 655
```

```
Ile Ala Gly Leu Val Val Ile Phe Met Met Leu Gly Gly Thr Phe Leu
            660                 665                 670

Tyr Trp Arg Gly Arg Ile Gln Asn Lys Arg Ala Met Arg Arg Tyr
        675                 680                 685

Leu Glu Arg Gly Glu Ser Ile Glu Pro Leu Asp Pro Ser Glu Lys Ala
690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735

Ile Pro Glu Gly Glu Ser Ile Lys Ile Pro Val Cys Ile Lys Val Ile
            740                 745                 750

Glu Asp Lys Ser Gly Arg Gln Ser Phe Gln Ala Val Thr Asp His Met
        755                 760                 765

Leu Ala Ile Gly Ser Leu Asp His Ala His Ile Val Arg Leu Leu Gly
770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
                805                 810                 815

Gln Leu Leu Leu Asn Trp Gly Val Gln Ile Ala Lys Gly Met Tyr Tyr
            820                 825                 830

Leu Glu Glu His Gly Met Val His Arg Asn Leu Ala Ala Arg Asn Val
        835                 840                 845

Leu Leu Lys Ser Pro Ser Gln Val Gln Val Ala Asp Phe Gly Val Ala
    850                 855                 860

Asp Leu Leu Pro Pro Asp Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                885                 890                 895

Thr His Gln Ser Asp Val Trp Ser Tyr Gly Val Thr Val Trp Glu Leu
            900                 905                 910

Met Thr Phe Gly Ala Glu Pro Tyr Ala Gly Leu Arg Leu Ala Glu Val
        915                 920                 925

Pro Asp Leu Leu Glu Lys Gly Glu Arg Leu Ala Gln Pro Gln Ile Cys
930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro  His Gly Leu Thr Asn  Lys Lys Leu
        995                 1000                 1005

Glu Glu  Val Glu Leu Glu Pro  Glu Leu Asp Leu Asp  Leu Asp Leu
    1010                 1015                 1020

Glu Ala  Glu Glu Asp Asn Leu  Ala Thr Thr Thr Leu  Gly Ser Ala
    1025                 1030                 1035

Leu Ser  Leu Pro Val Gly Thr  Leu Asn Arg Pro Arg  Gly Ser Gln
    1040                 1045                 1050

Ser Leu  Leu Ser Pro Ser Ser  Gly Tyr Met Pro Met  Asn Gln Gly
    1055                 1060                 1065
```

-continued

Asn Leu Gly Glu Ser Cys Gln Glu Ser Ala Val Ser Gly Ser Ser
1070                1075                1080

Glu Arg Cys Pro Arg Pro Val Ser Leu His Pro Met Pro Arg Gly
1085                1090                1095

Cys Leu Ala Ser Glu Ser Ser Glu Gly His Val Thr Gly Ser Glu
1100                1105                1110

Ala Glu Leu Gln Glu Lys Val Ser Met Cys Arg Ser Arg Ser Arg
1115                1120                1125

Ser Arg Ser Pro Arg Pro Arg Gly Asp Ser Ala Tyr His Ser Gln
1130                1135                1140

Arg His Ser Leu Leu Thr Pro Val Thr Pro Leu Ser Pro Pro Gly
1145                1150                1155

Leu Glu Glu Glu Asp Val Asn Gly Tyr Val Met Pro Asp Thr His
1160                1165                1170

Leu Lys Gly Thr Pro Ser Ser Arg Glu Gly Thr Leu Ser Ser Val
1175                1180                1185

Gly Leu Ser Ser Val Leu Gly Thr Glu Glu Glu Asp Glu Asp Glu
1190                1195                1200

Glu Tyr Glu Tyr Met Asn Arg Arg Arg Arg His Ser Pro Pro His
1205                1210                1215

Pro Pro Arg Pro Ser Ser Leu Glu Glu Leu Gly Tyr Glu Tyr Met
1220                1225                1230

Asp Val Gly Ser Asp Leu Ser Ala Ser Leu Gly Ser Thr Gln Ser
1235                1240                1245

Cys Pro Leu His Pro Val Pro Ile Met Pro Thr Ala Gly Thr Thr
1250                1255                1260

Pro Asp Glu Asp Tyr Glu Tyr Met Asn Arg Gln Arg Asp Gly Gly
1265                1270                1275

Gly Pro Gly Gly Asp Tyr Ala Ala Met Gly Ala Cys Pro Ala Ser
1280                1285                1290

Glu Gln Gly Tyr Glu Glu Met Arg Ala Phe Gln Gly Pro Gly His
1295                1300                1305

Gln Ala Pro His Val His Tyr Ala Arg Leu Lys Thr Leu Arg Ser
1310                1315                1320

Leu Glu Ala Thr Asp Ser Ala Phe Asp Asn Pro Asp Tyr Trp His
1325                1330                1335

Ser Arg Leu Phe Pro Lys Ala Asn Ala Gln Arg Thr
1340                1345                1350

<210> SEQ ID NO 29
<211> LENGTH: 30
<212> TYPE: DNA
<213> ORGANISM: Artificial Sequence
<220> FEATURE:
<223> OTHER INFORMATION: HER3 mutagenesis primer (Fw)

<400> SEQUENCE: 29
cctcagcacc tggtgtacaa caagctgacc                                    30

<210> SEQ ID NO 30
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 30
caccaggtgc tgaggacatc ttggcacgca g             31

<210> SEQ ID NO 31
<211> LENGTH: 4053
<212> TYPE: DNA
<213> ORGANISM: Artificial Sequence
<220> FEATURE:
<223> OTHER INFORMATION: cDNA encoding Flag-HER3(P262H)

<400> SEQUENCE: 31

| | |
|---|---:|
| atgagagcca acgatgctct gcaggttctg ggcctgctgt tctctctggc tagaggcgat | 60 |
| tacaaggatg acgacgataa gtctgaagtg ggcaacagcc aggctgtgtg tcccggaaca | 120 |
| ctgaacggct tgtctgtgac aggcgacgcc gagaaccagt accagacact gtacaagctg | 180 |
| tacgagagat gcgaggtggt catgggcaac ctggaaatcg tgctgacagg ccacaacgcc | 240 |
| gacctgtctt tcctgcagtg gatcagagaa gtgaccggct acgtgctggt ggccatgaac | 300 |
| gagttcagca ccctgcctct gcctaacctg agagtcgtca gaggcaccca ggtgtacgat | 360 |
| ggcaagttcg ccatcttcgt gatgctgaac tacaacacca cagctctca cgccctgaga | 420 |
| cagctgagac tgacccagct gaccgagatc ctgtctggcg gagtgtacat cgagaagaac | 480 |
| gacaagctgt gccacatgga caccatcgac tggcgggata tcgtgcggga tagagatgcc | 540 |
| gagatcgtgg tcaaggacaa cggcagaagc tgccctcctt gccacgaagt gtgcaagggc | 600 |
| agatgttggg gccctggctc tgaggactgt cagaccctga ccaagaccat ctgcgcccct | 660 |
| cagtgtaacg gccactgctt cggccctaat cctaaccagt gctgccacga cgaatgcgct | 720 |
| ggcggatgtt ctggacctca ggacacagac tgcttcgcct gcagacactt caacgactct | 780 |
| ggcgcctgcg tgccaagatg tcctcagcac ctggtgtaca acaagctgac ctttcagctg | 840 |
| gaacccaatc tcacaccaa gtaccagtac ggcggcgtgt gtgtggccag ctgtcctcac | 900 |
| aacttcgtgg tggaccagac cagctgtgtg cgggcttgtc ctcctgacaa gatggaagtg | 960 |
| gacaagaacg gcctgaagat gtgcgagcct tgcggcggac tgtgtcctaa ggcttgtgaa | 1020 |
| ggcacaggca cggcagcag attccagaca gtggacagca gcaacatcga cggcttcgtg | 1080 |
| aactgcacca agatcctggg aaacctggac ttcctgatca ccggcctgaa cggcgatccc | 1140 |
| tggcataaga tccctgctct ggaccccgag aagctgaacg tgttcagaac cgtgcgcgag | 1200 |
| atcacaggct acctgaacat ccagagctgg cctccacaca tgcacaactt cagcgtgttc | 1260 |
| tccaacctga ccaccatcgg cggcagatcc ctgtacaaca ggggcttcag cctgctgatc | 1320 |
| atgaagaacc tgaatgtgac cagcctgggc ttcagaagcc tgaaagagat cagcgccggc | 1380 |
| agaatctaca tcagcgccaa cagacagctg tgctaccacc acagcctgaa ctggacaaag | 1440 |
| gtgctgagag cccccaccga ggaaagactg gacatcaagc acaacagacc tagaagagac | 1500 |
| tgcgtggccg agggcaaagt gtgcgaccct ctttgttcta gcggcggctg ttggggacca | 1560 |
| ggacctggac agtgtctctc ctgtagaaac tacagccgcg gaggcgtgtg cgtgacccac | 1620 |
| tgcaattttc tgaatggcga gcccagagag ttcgcccacg aggccgagtg tttcagctgt | 1680 |
| caccctgagt gccagcctat ggaaggcacc gctacatgta acggcagcgg ctctgatacc | 1740 |
| tgcgctcagt gcgcccactt tagagatggc cctcactgcg tgtcctcttg tcctcatggt | 1800 |
| gtcctgggcg ctaagggccc catctacaag taccctgacg tgcagaacga gtgcaggccc | 1860 |
| tgccacgaga actgtacaca gggatgcaag ggccctgagc tgcaggattg tctgggacag | 1920 |
| acactggtgc tgatcggcaa gacccacctg acaatggccc tgcagtgat cgctggcctg | 1980 |
| gtggtcatct ttatgatgct cggcggcacc ttcctgtatt ggagaggcag aagaatccag | 2040 |

```
aacaagaggg ccatgcggag atacctggaa agaggcgaga gcatcgagcc actggaccct    2100
agcgagaagg ccaacaaggt gctggccaga atcttcaaag agacagagct gcggaagctg    2160
aaggtgctcg gatctggcgt gttcggcaca gtgcacaaag gcgtgtggat ccctgagggc    2220
gagtccatca agatccccgt gtgcatcaaa gtgatcgagg acaagtccgg caggcagagc    2280
ttccaggccg tgacagatca catgctggct atcggcagcc tggatcacgc ccacatcgtt    2340
agactgctgg gactgtgccc tggcagctct ctgcagctcg tgacacagta tctgcctctg    2400
ggatctctgc tggaccacgt gcgacaacat agaggcgctc tgggacctca gctgctgctg    2460
aattggggag tgcagatcgc caagggcatg tactacctgg aagaacacgg catggtgcac    2520
agaaacctgg ccgccagaaa cgtgctgctc aagtctccta gccaggtgca ggtcgccgat    2580
ttcggagttg ctgatctcct gccacctgac gacaaacagc tgctgtactc cgaggccaag    2640
acacccatca gtggatggcc ctggaatct atccacttcg gcaagtacac ccaccagagc    2700
gacgtgtggt cttacggcgt gacagtgtgg gagctgatga ccttcggagc cgagccttac    2760
gctggactga gactggctga agtgcccgac ctgctggaaa agggcgaaag acttgcccag    2820
cctcagatct gtaccatcga cgtgtacatg gtcatggtca agtgctggat gatcgacgag    2880
aacatcagac ccacattcaa agagctggct aacgagttta cccggatggc cagagatcct    2940
cctagatacc tcgtgatcaa gagagagagc ggccctggca ttgctcctgg acctgaacct    3000
cacggactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgaccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtgc actatgccag actgaaaacc    3960
ctgagatctc tggaagccac cgactccgcc ttcgacaacc tgactactg gcacagcaga    4020 ctgttcccca aggccaacgc tcagagaaca taa                                 4053
```

<210> SEQ ID NO 32
<211> LENGTH: 1350
<212> TYPE: PRT
<213> ORGANISM: Artificial Sequence
<220> FEATURE:
<223> OTHER INFORMATION: Flag-HER3(P262H)

<400> SEQUENCE: 32

```
Met Arg Ala Asn Asp Ala Leu Gln Val Leu Gly Leu Leu Phe Ser Leu
1               5                   10                  15
Ala Arg Gly Asp Tyr Lys Asp Asp Asp Lys Ser Glu Val Gly Asn
        20                  25                  30
Ser Gln Ala Val Cys Pro Gly Thr Leu Asn Gly Leu Ser Val Thr Gly
        35                  40                  45
Asp Ala Glu Asn Gln Tyr Gln Thr Leu Tyr Lys Leu Tyr Glu Arg Cys
    50                  55                  60
Glu Val Val Met Gly Asn Leu Glu Ile Val Leu Thr Gly His Asn Ala
65              70                  75                  80
Asp Leu Ser Phe Leu Gln Trp Ile Arg Glu Val Thr Gly Tyr Val Leu
                85                  90                  95
Val Ala Met Asn Glu Phe Ser Thr Leu Pro Leu Pro Asn Leu Arg Val
            100                 105                 110
Val Arg Gly Thr Gln Val Tyr Asp Gly Lys Phe Ala Ile Phe Val Met
            115                 120                 125
Leu Asn Tyr Asn Thr Asn Ser Ser His Ala Leu Arg Gln Leu Arg Leu
        130                 135                 140
Thr Gln Leu Thr Glu Ile Leu Ser Gly Gly Val Tyr Ile Glu Lys Asn
145                 150                 155                 160
Asp Lys Leu Cys His Met Asp Thr Ile Asp Trp Arg Asp Ile Val Arg
                165                 170                 175
Asp Arg Asp Ala Glu Ile Val Val Lys Asp Asn Gly Arg Ser Cys Pro
            180                 185                 190
Pro Cys His Glu Val Cys Lys Gly Arg Cys Trp Gly Pro Gly Ser Glu
        195                 200                 205
Asp Cys Gln Thr Leu Thr Lys Thr Ile Cys Ala Pro Gln Cys Asn Gly
    210                 215                 220
His Cys Phe Gly Pro Asn Pro Asn Gln Cys Cys His Asp Glu Cys Ala
225                 230                 235                 240
Gly Gly Cys Ser Gly Pro Gln Asp Thr Asp Cys Phe Ala Cys Arg His
            245                 250                 255
Phe Asn Asp Ser Gly Ala Cys Val Pro Arg Cys Pro Gln His Leu Val
        260                 265                 270
Tyr Asn Lys Leu Thr Phe Gln Leu Glu Pro Asn Pro His Thr Lys Tyr
    275                 280                 285
Gln Tyr Gly Gly Val Cys Val Ala Ser Cys Pro His Asn Phe Val Val
        290                 295                 300
Asp Gln Thr Ser Cys Val Arg Ala Cys Pro Pro Asp Lys Met Glu Val
305                 310                 315                 320
Asp Lys Asn Gly Leu Lys Met Cys Glu Pro Cys Gly Gly Leu Cys Pro
            325                 330                 335
Lys Ala Cys Glu Gly Thr Gly Ser Gly Ser Arg Phe Gln Thr Val Asp
            340                 345                 350
Ser Ser Asn Ile Asp Gly Phe Val Asn Cys Thr Lys Ile Leu Gly Asn
        355                 360                 365
Leu Asp Phe Leu Ile Thr Gly Leu Asn Gly Asp Pro Trp His Lys Ile
    370                 375                 380
Pro Ala Leu Asp Pro Glu Lys Leu Asn Val Phe Arg Thr Val Arg Glu
385                 390                 395                 400
Ile Thr Gly Tyr Leu Asn Ile Gln Ser Trp Pro Pro His Met His Asn
            405                 410                 415
Phe Ser Val Phe Ser Asn Leu Thr Thr Ile Gly Gly Arg Ser Leu Tyr
```

-continued

```
            420                 425                 430
Asn Arg Gly Phe Ser Leu Leu Ile Met Lys Asn Leu Asn Val Thr Ser
            435                 440                 445
Leu Gly Phe Arg Ser Leu Lys Glu Ile Ser Ala Gly Arg Ile Tyr Ile
            450                 455                 460
Ser Ala Asn Arg Gln Leu Cys Tyr His His Ser Leu Asn Trp Thr Lys
465                 470                 475                 480
Val Leu Arg Gly Pro Thr Glu Arg Leu Asp Ile Lys His Asn Arg
                485                 490                 495
Pro Arg Arg Asp Cys Val Ala Glu Gly Lys Val Cys Asp Pro Leu Cys
                500                 505                 510
Ser Ser Gly Gly Cys Trp Gly Pro Gly Pro Gly Gln Cys Leu Ser Cys
                515                 520                 525
Arg Asn Tyr Ser Arg Gly Gly Val Cys Val Thr His Cys Asn Phe Leu
                530                 535                 540
Asn Gly Glu Pro Arg Glu Phe Ala His Glu Ala Glu Cys Phe Ser Cys
545                 550                 555                 560
His Pro Glu Cys Gln Pro Met Glu Gly Thr Ala Thr Cys Asn Gly Ser
                565                 570                 575
Gly Ser Asp Thr Cys Ala Gln Cys Ala His Phe Arg Asp Gly Pro His
                580                 585                 590
Cys Val Ser Ser Cys Pro His Gly Val Leu Gly Ala Lys Gly Pro Ile
                595                 600                 605
Tyr Lys Tyr Pro Asp Val Gln Asn Glu Cys Arg Pro Cys His Glu Asn
                610                 615                 620
Cys Thr Gln Gly Cys Lys Gly Pro Glu Leu Gln Asp Cys Leu Gly Gln
625                 630                 635                 640
Thr Leu Val Leu Ile Gly Lys Thr His Leu Thr Met Ala Leu Thr Val
                645                 650                 655
Ile Ala Gly Leu Val Val Ile Phe Met Met Leu Gly Gly Thr Phe Leu
                660                 665                 670
Tyr Trp Arg Gly Arg Arg Ile Gln Asn Lys Arg Ala Met Arg Arg Tyr
                675                 680                 685
Leu Glu Arg Gly Glu Ser Ile Glu Pro Leu Asp Pro Ser Glu Lys Ala
                690                 695                 700
Asn Lys Val Leu Ala Arg Ile Phe Lys Glu Thr Glu Leu Arg Lys Leu
705                 710                 715                 720
Lys Val Leu Gly Ser Gly Val Phe Gly Thr Val His Lys Gly Val Trp
                725                 730                 735
Ile Pro Glu Gly Glu Ser Ile Lys Ile Pro Val Cys Ile Lys Val Ile
                740                 745                 750
Glu Asp Lys Ser Gly Arg Gln Ser Phe Gln Ala Val Thr Asp His Met
                755                 760                 765
Leu Ala Ile Gly Ser Leu Asp His Ala His Ile Val Arg Leu Leu Gly
                770                 775                 780
Leu Cys Pro Gly Ser Ser Leu Gln Leu Val Thr Gln Tyr Leu Pro Leu
785                 790                 795                 800
Gly Ser Leu Leu Asp His Val Arg Gln His Arg Gly Ala Leu Gly Pro
                805                 810                 815
Gln Leu Leu Leu Asn Trp Gly Val Gln Ile Ala Lys Gly Met Tyr Tyr
                820                 825                 830
Leu Glu Glu His Gly Met Val His Arg Asn Leu Ala Ala Arg Asn Val
                835                 840                 845
```

```
Leu Leu Lys Ser Pro Ser Gln Val Gln Val Ala Asp Phe Gly Val Ala
850                 855                 860

Asp Leu Leu Pro Pro Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                885                 890                 895

Thr His Gln Ser Asp Val Trp Ser Tyr Gly Val Thr Val Trp Glu Leu
                900                 905                 910

Met Thr Phe Gly Ala Glu Pro Tyr Ala Gly Leu Arg Leu Ala Glu Val
        915                 920                 925

Pro Asp Leu Leu Glu Lys Gly Glu Arg Leu Ala Gln Pro Gln Ile Cys
        930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
                980                 985                 990

Gly Ile Ala Pro Gly Pro Glu Pro His Gly Leu Thr Asn Lys Lys Leu
                995                 1000                1005

Glu Glu Val Glu Leu Glu Pro Glu Leu Asp Leu Asp Leu Asp Leu
1010                1015                1020

Glu Ala Glu Glu Asp Asn Leu Ala Thr Thr Thr Leu Gly Ser Ala
1025                1030                1035

Leu Ser Leu Pro Val Gly Thr Leu Asn Arg Pro Arg Gly Ser Gln
1040                1045                1050

Ser Leu Leu Ser Pro Ser Ser Gly Tyr Met Pro Met Asn Gln Gly
1055                1060                1065

Asn Leu Gly Glu Ser Cys Gln Glu Ser Ala Val Ser Gly Ser Ser
1070                1075                1080

Glu Arg Cys Pro Arg Pro Val Ser Leu His Pro Met Pro Arg Gly
1085                1090                1095

Cys Leu Ala Ser Glu Ser Ser Glu Gly His Val Thr Gly Ser Glu
1100                1105                1110

Ala Glu Leu Gln Glu Lys Val Ser Met Cys Arg Ser Arg Ser Arg
1115                1120                1125

Ser Arg Ser Pro Arg Pro Arg Gly Asp Ser Ala Tyr His Ser Gln
1130                1135                1140

Arg His Ser Leu Leu Thr Pro Val Thr Pro Leu Ser Pro Pro Gly
1145                1150                1155

Leu Glu Glu Glu Asp Val Asn Gly Tyr Val Met Pro Asp Thr His
1160                1165                1170

Leu Lys Gly Thr Pro Ser Ser Arg Glu Gly Thr Leu Ser Ser Val
1175                1180                1185

Gly Leu Ser Ser Val Leu Gly Thr Glu Glu Glu Asp Glu Asp Glu
1190                1195                1200

Glu Tyr Glu Tyr Met Asn Arg Arg Arg Arg His Ser Pro Pro His
1205                1210                1215

Pro Pro Arg Pro Ser Ser Leu Glu Glu Leu Gly Tyr Glu Tyr Met
1220                1225                1230

Asp Val Gly Ser Asp Leu Ser Ala Ser Leu Gly Ser Thr Gln Ser
1235                1240                1245
```

```
Cys Pro Leu His Pro Val Pro Ile Met Pro Thr Ala Gly Thr Thr
    1250                1255                1260

Pro Asp Glu Asp Tyr Glu Tyr Met Asn Arg Gln Arg Asp Gly Gly
    1265                1270                1275

Gly Pro Gly Gly Asp Tyr Ala Ala Met Gly Ala Cys Pro Ala Ser
    1280                1285                1290

Glu Gln Gly Tyr Glu Glu Met Arg Ala Phe Gln Gly Pro Gly His
    1295                1300                1305

Gln Ala Pro His Val His Tyr Ala Arg Leu Lys Thr Leu Arg Ser
    1310                1315                1320

Leu Glu Ala Thr Asp Ser Ala Phe Asp Asn Pro Asp Tyr Trp His
    1325                1330                1335

Ser Arg Leu Phe Pro Lys Ala Asn Ala Gln Arg Thr
    1340                1345                1350

<210> SEQ ID NO 33
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 33
tacggcagag tgtgtgtggc cagctgtcct c                              31

<210> SEQ ID NO 34
<211> LENGTH: 32
<212> TYPE: DNA
<213> ORGANISM: Artificial Sequence
<220> FEATURE:
<223> OTHER INFORMATION: HER3 mutagenesis primer (Rev)

<400> SEQUENCE: 34
acacactctg ccgtactggt acttggtgtg ag                             32

<210> SEQ ID NO 35
<211> LENGTH: 4053
<212> TYPE: DNA
<213> ORGANISM: Artificial Sequence
<220> FEATURE:
<223> OTHER INFORMATION: cDNA encoding Flag-HER3(G284R)

<400> SEQUENCE: 35
atgagagcca acgatgctct gcaggttctg ggcctgctgt tctctctggc tagaggcgat      60
tacaaggatg acgacgataa gtctgaagtg ggcaacagcc aggctgtgtg tcccggaaca    120
ctgaacggct tgtctgtgac aggcgacgcc gagaaccagt accagacact gtacaagctg    180
tacgagagat gcgaggtggt catgggcaac ctggaaatcg tgctgacagg ccacaacgcc    240
gacctgtctt tcctgcagtg gatcagagaa gtgaccggct acgtgctggt ggccatgaac    300
gagttcagca ccctgcctct gcctaacctg agagtcgtca gagcacccca ggtgtacgat    360
ggcaagttcg ccatcttcgt gatgctgaac tacaacacca cagctctca cgccctgaga    420 cagctgagac tgacccagct gaccgagatc tgtctggcg agtgtacat cgagaagaac    480 gacaagctgt gccacatgga caccatcgac tggcgggata cgtgcggga tagagatgcc    540 gagatcgtgg tcaaggacaa cggcagaagc tgccctcctt gccacgaagt gtgcaagggc    600
agatgttggg gccctggctc tgaggactgt cagaccctga ccaagaccat ctgcgcccct    660
cagtgtaacg gccactgctt cggccctaat cctaaccagt gctgccacga cgaatgcgct    720
```

-continued

```
ggcggatgtt ctggacctca ggacacagac tgcttcgcct gcagacactt caacgactct      780
ggcgcctgcg tgccaagatg tcctcagcct ctggtgtaca acaagctgac ctttcagctg      840
gaacccaatc ctcacaccaa gtaccagtac ggcagagtgt gtgtggccag ctgtcctcac      900
aacttcgtgg tggaccagac cagctgtgtg cgggcttgtc ctcctgacaa gatggaagtg      960
gacaagaacg gcctgaagat gtgcgagcct tgcggcggac tgtgtcctaa ggcttgtgaa     1020
ggcacaggca gcggcagcag attccagaca gtggacagca gcaacatcga cggcttcgtg     1080
aactgcacca agatcctggg aaacctggac ttcctgatca ccggcctgaa cggcgatccc     1140
tggcataaga tccctgctct ggaccccgag aagctgaacg tgttcagaac cgtgcgcgag     1200
atcacaggct acctgaacat ccagagctgg cctccacaca tgcacaactt cagcgtgttc     1260
tccaacctga ccaccatcgg cggcagatcc ctgtacaaca ggggcttcag cctgctgatc     1320
atgaagaacc tgaatgtgac cagcctgggc ttcagaagcc tgaaagagat cagcgccggc     1380
agaatctaca tcagcgccaa cagacagctg tgctaccacc acagcctgaa ctggacaaag     1440
gtgctgagag gccccaccga ggaaagactg gacatcaagc acaacagacc tagaagagac     1500
tgcgtggccg agggcaaagt gtgcgaccct ctttgttcta gcggcggctg ttggggacca     1560
ggacctgac agtgtctctc ctgtagaaac tacagccgcg gaggcgtgtg cgtgacccac     1620
tgcaattttc tgaatggcga gcccagagag ttcgcccacg aggccgagtg tttcagctgt     1680
caccctgagt gccagcctat ggaaggcacc gctacatgta acggcagcgg ctctgatacc     1740
tgcgctcagt gcgcccactt tagagatggc cctcactgcg tgtcctcttg tcctcatggt     1800
gtcctgggcg ctaagggccc catctacaag taccctgacg tgcagaacga gtgcaggccc     1860
tgccacgaga actgtacaca gggatgcaag ggccctgagc tgcaggattg tctgggacag     1920
acactggtgc tgatcggcaa gacccactg acaatggccc tgacagtgat cgctggcctg     1980
gtggtcatct ttatgatgct cggcggcacc ttcctgtatt ggagaggcag aagaatccag     2040
aacaagaggg ccatgcggag ataccctggaa agaggcgaga gcatcgagcc actgaccct      2100
agcgagaagg ccaacaaggt gctggccaga atcttcaaag agacagagct gcggaagctg     2160
aaggtgctcg atctggcgt gttcggcaca gtgcacaaag gcgtgtggat ccctgagggc     2220
gagtccatca agatccccgt gtgcatcaaa gtgatcgagg acaagtccgg caggcagagc     2280
ttccaggccg tgacagatca catgctggct atcggcagcc tggatcacgc ccacatcgtt     2340
agactgctgg gactgtgccc tggcagctct ctgcagctcg tgacacagta tctgcctctg     2400
ggatctctgc tggaccacgt gcgacaacat agaggcgctc tgggacctca gctgctgctg     2460
aattggggag tgcagatcgc caagggcatg tactacctgg aagaacacgg catggtgcac     2520
agaaacctgg ccgccagaaa cgtgctgctc aagtctccta gccaggtgca ggtcgccgat     2580
ttcggagttg ctgatctcct gccacctgac gacaaacagc tgctgtactc cgaggccaag     2640
acacccatca gtggatggc cctggaatct atccacttcg gcaagtacac ccaccagagc     2700
gacgtgtggt cttacggcgt gacagtgtgg gagctgatga ccttcggagc cgagccttac     2760
gctggactga gactggctga agtgcccgac ctgctggaaa agggcgaaag acttgcccag     2820
cctcagatct gtaccatcga cgtgtacatg gtcatggtca agtgctggat gatcgacgag     2880
aacatcagac ccacattcaa agagctggct aacgagttta cccggatggc cagagatcct     2940
cctagatacc tcgtgatcaa gagagagagc ggcctggca ttgctcctgg acctgaacct     3000
cacgactga ccaacaagaa gctggaagag gtcgaactgg aacccgagct ggacctggat     3060
ctcgacctgg aagccgaaga ggataacctg gccaccacaa cactgggctc tgctctgagt     3120
```

```
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgaccect gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtgc actatgccag actgaaaacc    3960
ctgagatctc tggaagccac cgactccgcc ttcgacaacc tgactactg gcacagcaga    4020 ctgttcccca aggccaacgc tcagagaaca taa                                 4053
```

<210> SEQ ID NO 36
<211> LENGTH: 1350
<212> TYPE: PRT
<213> ORGANISM: Artificial Sequence
<220> FEATURE:
<223> OTHER INFORMATION: Flag-HER3(G284R)

<400> SEQUENCE: 36

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65              70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
                165                 170                 175

Asp Arg Asp Ala Glu Ile Val Val Lys Asp Asn Gly Arg Ser Cys Pro
            180                 185                 190
```

```
Pro Cys His Glu Val Cys Lys Gly Arg Cys Trp Gly Pro Gly Ser Glu
            195                 200                 205

Asp Cys Gln Thr Leu Thr Lys Thr Ile Cys Ala Pro Gln Cys Asn Gly
    210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
                245                 250                 255

Phe Asn Asp Ser Gly Ala Cys Val Pro Arg Cys Pro Gln Pro Leu Val
            260                 265                 270

Tyr Asn Lys Leu Thr Phe Gln Leu Glu Pro Asn Pro His Thr Lys Tyr
        275                 280                 285

Gln Tyr Gly Arg Val Cys Val Ala Ser Cys Pro His Asn Phe Val Val
    290                 295                 300

Asp Gln Thr Ser Cys Val Arg Ala Cys Pro Pro Asp Lys Met Glu Val
305                 310                 315                 320

Asp Lys Asn Gly Leu Lys Met Cys Glu Pro Cys Gly Gly Leu Cys Pro
                325                 330                 335

Lys Ala Cys Glu Gly Thr Gly Ser Gly Ser Arg Phe Gln Thr Val Asp
            340                 345                 350

Ser Ser Asn Ile Asp Gly Phe Val Asn Cys Thr Lys Ile Leu Gly Asn
        355                 360                 365

Leu Asp Phe Leu Ile Thr Gly Leu Asn Gly Asp Pro Trp His Lys Ile
    370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
                405                 410                 415

Phe Ser Val Phe Ser Asn Leu Thr Thr Ile Gly Gly Arg Ser Leu Tyr
            420                 425                 430

Asn Arg Gly Phe Ser Leu Leu Ile Met Lys Asn Leu Asn Val Thr Ser
        435                 440                 445

Leu Gly Phe Arg Ser Leu Lys Glu Ile Ser Ala Gly Arg Ile Tyr Ile
    450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
                485                 490                 495

Pro Arg Arg Asp Cys Val Ala Glu Gly Lys Val Cys Asp Pro Leu Cys
            500                 505                 510

Ser Ser Gly Gly Cys Trp Gly Pro Gly Pro Gly Gln Cys Leu Ser Cys
        515                 520                 525

Arg Asn Tyr Ser Arg Gly Gly Val Cys Val Thr His Cys Asn Phe Leu
    530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
                565                 570                 575

Gly Ser Asp Thr Cys Ala Gln Cys Ala His Phe Arg Asp Gly Pro His
            580                 585                 590

Cys Val Ser Ser Cys Pro His Gly Val Leu Gly Ala Lys Gly Pro Ile
        595                 600                 605

Tyr Lys Tyr Pro Asp Val Gln Asn Glu Cys Arg Pro Cys His Glu Asn
```

-continued

```
            610                 615                 620
Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                    645                 650                 655

Ile Ala Gly Leu Val Val Ile Phe Met Met Leu Gly Gly Thr Phe Leu
                    660                 665                 670

Tyr Trp Arg Gly Arg Arg Ile Gln Asn Lys Arg Ala Met Arg Arg Tyr
            675                 680                 685

Leu Glu Arg Gly Glu Ser Ile Glu Pro Leu Asp Pro Ser Glu Lys Ala
            690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                    725                 730                 735

Ile Pro Glu Gly Glu Ser Ile Lys Ile Pro Val Cys Ile Lys Val Ile
                    740                 745                 750

Glu Asp Lys Ser Gly Arg Gln Ser Phe Gln Ala Val Thr Asp His Met
            755                 760                 765

Leu Ala Ile Gly Ser Leu Asp His Ala His Ile Val Arg Leu Leu Gly
            770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
                    805                 810                 815

Gln Leu Leu Leu Asn Trp Gly Val Gln Ile Ala Lys Gly Met Tyr Tyr
                    820                 825                 830

Leu Glu Glu His Gly Met Val His Arg Asn Leu Ala Ala Arg Asn Val
            835                 840                 845

Leu Leu Lys Ser Pro Ser Gln Val Gln Val Ala Asp Phe Gly Val Ala
            850                 855                 860

Asp Leu Leu Pro Pro Asp Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                    885                 890                 895

Thr His Gln Ser Asp Val Trp Ser Tyr Gly Val Thr Val Trp Glu Leu
                    900                 905                 910

Met Thr Phe Gly Ala Glu Pro Tyr Ala Gly Leu Arg Leu Ala Glu Val
            915                 920                 925

Pro Asp Leu Leu Glu Lys Gly Glu Arg Leu Ala Gln Pro Gln Ile Cys
            930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                    965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro His Gly Leu Thr Asn Lys Lys Leu
            995                 1000                1005

Glu Glu Val Glu Leu Glu Pro Glu Leu Asp Leu Asp Leu Asp Leu
            1010                1015                1020

Glu Ala Glu Glu Asp Asn Leu Ala Thr Thr Thr Leu Gly Ser Ala
            1025                1030                1035
```

```
Leu Ser Leu Pro Val Gly Thr Leu Asn Arg Pro Arg Gly Ser Gln
    1040            1045                1050

Ser Leu Leu Ser Pro Ser Ser Gly Tyr Met Pro Met Asn Gln Gly
    1055            1060                1065

Asn Leu Gly Glu Ser Cys Gln Glu Ser Ala Val Ser Gly Ser Ser
    1070            1075                1080

Glu Arg Cys Pro Arg Pro Val Ser Leu His Pro Met Pro Arg Gly
    1085            1090                1095

Cys Leu Ala Ser Glu Ser Ser Glu Gly His Val Thr Gly Ser Glu
    1100            1105                1110

Ala Glu Leu Gln Glu Lys Val Ser Met Cys Arg Ser Arg Ser Arg
    1115            1120                1125

Ser Arg Ser Pro Arg Pro Arg Gly Asp Ser Ala Tyr His Ser Gln
    1130            1135                1140

Arg His Ser Leu Leu Thr Pro Val Thr Pro Leu Ser Pro Pro Gly
    1145            1150                1155

Leu Glu Glu Glu Asp Val Asn Gly Tyr Val Met Pro Asp Thr His
    1160            1165                1170

Leu Lys Gly Thr Pro Ser Ser Arg Glu Gly Thr Leu Ser Ser Val
    1175            1180                1185

Gly Leu Ser Ser Val Leu Gly Thr Glu Glu Glu Asp Glu Asp Glu
    1190            1195                1200

Glu Tyr Glu Tyr Met Asn Arg Arg Arg Arg His Ser Pro Pro His
    1205            1210                1215

Pro Pro Arg Pro Ser Ser Leu Glu Glu Leu Gly Tyr Glu Tyr Met
    1220            1225                1230

Asp Val Gly Ser Asp Leu Ser Ala Ser Leu Gly Ser Thr Gln Ser
    1235            1240                1245

Cys Pro Leu His Pro Val Pro Ile Met Pro Thr Ala Gly Thr Thr
    1250            1255                1260

Pro Asp Glu Asp Tyr Glu Tyr Met Asn Arg Gln Arg Asp Gly Gly
    1265            1270                1275

Gly Pro Gly Gly Asp Tyr Ala Ala Met Gly Ala Cys Pro Ala Ser
    1280            1285                1290

Glu Gln Gly Tyr Glu Glu Met Arg Ala Phe Gln Gly Pro Gly His
    1295            1300                1305

Gln Ala Pro His Val His Tyr Ala Arg Leu Lys Thr Leu Arg Ser
    1310            1315                1320

Leu Glu Ala Thr Asp Ser Ala Phe Asp Asn Pro Asp Tyr Trp His
    1325            1330                1335

Ser Arg Leu Phe Pro Lys Ala Asn Ala Gln Arg Thr
    1340            1345                1350

<210> SEQ ID NO 37
<211> LENGTH: 32
<212> TYPE: DNA
<213> ORGANISM: Artificial Sequence
<220> FEATURE:
<223> OTHER INFORMATION: HER3 mutagenesis primer (Fw)

<400> SEQUENCE: 37
gtggtgtacc agaccagctg tgtgcgggct tg                          32

<210> SEQ ID NO 38
<211> LENGTH: 31
```

```
<212> TYPE: DNA
<213> ORGANISM: Artificial Sequence
<220> FEATURE:
<223> OTHER INFORMATION: HER3 mutagenesis primer (Rev)

<400> SEQUENCE: 38
ggtctggtac accacgaagt tgtgaggaca g                                  31

<210> SEQ ID NO 39
<211> LENGTH: 4053
<212> TYPE: DNA
<213> ORGANISM: Artificial Sequence
<220> FEATURE:
<223> OTHER INFORMATION: cDNA encoding Flag-HER3(D297Y)

<400> SEQUENCE: 39
atgagagcca acgatgctct gcaggttctg ggcctgctgt tctctctggc tagaggcgat     60
tacaaggatg acgacgataa gtctgaagtg gcaacagcc aggctgtgtg tcccggaaca    120
ctgaacggct tgtctgtgac aggcgacgcc gagaaccagt accagacact gtacaagctg    180
tacgagagat gcgaggtggt catgggcaac ctggaaatcg tgctgacagg ccacaacgcc    240
gacctgtctt tcctgcagtg gatcagagaa gtgaccggct acgtgctggt ggccatgaac    300
gagttcagca ccctgcctct gcctaacctg agagtcgtca gaggcaccca ggtgtacgat    360
ggcaagttcg ccatcttcgt gatgctgaac tacaacacca acagctctca cgccctgaga    420
cagctgagac tgaccagct gaccgagatc ctgtctggcg gagtgtacat cgagaagaac    480
gacaagctgt gccacatgga caccatcgac tggcgggata cgtgcggga tagagatgcc    540 gagatcgtgg tcaaggacaa cggcagaagc tgccctcctt gccacgaagt gtgcaagggc    600
agatgttggg gccctggctc tgaggactgt cagaccctga ccaagaccat ctgcgcccct    660
cagtgtaacg gccactgctt cggccctaat cctaaccagt gctgccacga cgaatgcgct    720
ggcggatgtt ctggacctca ggacacagac tgcttcgcct gcagacactt caacgactct    780
ggcgcctgcg tgccaagatg tcctcagcct ctggtgtaca caagctgac ctttcagctg    840 gaacccaatc ctcacaccaa gtaccagtac ggcggcgtgt gtgtggccag ctgtcctcac    900
aacttcgtgg tgtaccagac cagctgtgtg cgggcttgtc ctcctgacaa gatggaagtg    960
gacaagaacg gcctgaagat gtgcgagcct tgcggcggac tgtgtcctaa ggcttgtgaa   1020
ggcacaggca gcggcagcag attccagaca gtggacagca gcaacatcga cggcttcgtg   1080
aactgcacca agatcctggg aaacctggac ttcctgatca ccggcctgaa cggcgatccc   1140
tggcataaga tccctgctct ggaccccgag aagctgaacg tgttcagaac cgtgcgcgag   1200
atcacaggct acctgaacat ccagagctgg cctccacaca tgcacaactt cagcgtgttc   1260
tccaacctga ccaccatcgg cggcagatcc ctgtacaaca ggggcttcag cctgctgatc   1320
atgaagaacc tgaatgtgac cagcctgggc ttcagaagcc tgaaagagat cagcgccggc   1380
agaatctaca tcagcgccaa cagacagctg tgctaccacc acagcctgaa ctggacaaag   1440
gtgctgagag cccccaccga ggaaagactg gacatcaagc acaacagacc tagaagagac   1500
tgcgtggccg agggcaaagt gtgcgaccct ctttgttcta gcggcggctg ttggggacca   1560
ggacctggac agtgtctctc ctgtagaaac tacagccgcg gaggcgtgtg cgtgacccac   1620
tgcaattttc tgaatggcga gcccagagag ttcgcccacg aggccgagtg tttcagctgt   1680 cacccctgagt gccagcctat ggaaggcacc gctacatgta acggcagcgg ctctgatacc   1740
tgcgctcagt gcgcccactt tagagatggc cctcactgcg tgtcctcttg tcctcatggt   1800
```

```
gtcctgggcg ctaagggccc catctacaag taccctgacg tgcagaacga gtgcaggccc    1860
tgccacgaga actgtacaca gggatgcaag ggccctgagc tgcaggattg tctgggacag    1920
acactggtgc tgatcggcaa gacccacctg acaatggccc tgacagtgat cgctggcctg    1980
gtggtcatct ttatgatgct cggcggcacc ttcctgtatt ggagaggcag aagaatccag    2040
aacaagaggg ccatgcggag atacctggaa agaggcgaga gcatcgagcc actggaccct    2100
agcgagaagg ccaacaaggt gctggccaga atcttcaaag agacagagct gcggaagctg    2160
aaggtgctcg gatctggcgt gttcggcaca gtgcacaaag gcgtgtggat ccctgagggc    2220
gagtccatca agatccccgt gtgcatcaaa gtgatcgagg acaagtccgg caggcagagc    2280
ttccaggccg tgacagatca catgctggct atcggcagcc tggatcacgc ccacatcgtt    2340
agactgctgg gactgtgccc tggcagctct ctgcagctcg tgacacagta tctgcctctg    2400
ggatctctgc tggaccacgt gcgacaacat agaggcgctc tgggacctca gctgctgctg    2460
aattggggag tgcagatcgc caagggcatg tactacctgg aagaacacgg catggtgcac    2520
agaaacctgg ccgccagaaa cgtgctgctc aagtctccta gccaggtgca ggtcgccgat    2580
ttcggagttg ctgatctcct gccacctgac gacaaacagc tgctgtactc cgaggccaag    2640
acacccatca agtggatggc cctggaatct atccacttcg gcaagtacac ccaccagagc    2700
gacgtgtggt cttacggcgt gacagtgtgg gagctgatga ccttcggagc cgagccttac    2760
gctggactga actggctgaa agtgcccgac ctgctggaaa agggcgaaag acttgcccag    2820
cctcagatct gtaccatcga cgtgtacatg gtcatggtca agtgctggat gatcgacgag    2880
aacatcagac ccacattcaa agagctggct aacgagttta cccggatggc cagagatcct    2940
cctagatacc tcgtgatcaa gagagagagc ggccctggca ttgctcctgg acctgaacct    3000
cacgactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgacccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcacccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagccttc aaggccctgg ccatcaggct cctcacgtgc actatgccag actgaaaaacc    3960
ctgagatctc tggaagccac cgactccgcc ttcgacaacc ctgactactg gcacagcaga    4020
ctgttcccca aggccaacgc tcagagaaca taa                                  4053

<210> SEQ ID NO 40
<211> LENGTH: 1350
```

```
<212> TYPE: PRT
<213> ORGANISM: Artificial Sequence
<220> FEATURE:
<223> OTHER INFORMATION: Flag-HER3(D297Y)

<400> SEQUENCE: 40
```

| | | | | | | | | | | | | | | |
|---|---|---|---|---|---|---|---|---|---|---|---|---|---|---|
| Met | Arg | Ala | Asn | Asp | Ala | Leu | Gln | Val | Leu | Gly | Leu | Leu | Phe | Ser | Leu |
| 1 | | | | 5 | | | | | 10 | | | | | 15 |
| Ala | Arg | Gly | Asp | Tyr | Lys | Asp | Asp | Asp | Lys | Ser | Glu | Val | Gly | Asn |
| | | | 20 | | | | | 25 | | | | | 30 | |
| Ser | Gln | Ala | Val | Cys | Pro | Gly | Thr | Leu | Asn | Gly | Leu | Ser | Val | Thr | Gly |
| | | 35 | | | | | 40 | | | | | 45 | | |
| Asp | Ala | Glu | Asn | Gln | Tyr | Gln | Thr | Leu | Tyr | Lys | Leu | Tyr | Glu | Arg | Cys |
| 50 | | | | | 55 | | | | | 60 | | | | | |
| Glu | Val | Val | Met | Gly | Asn | Leu | Glu | Ile | Val | Leu | Thr | Gly | His | Asn | Ala |
| 65 | | | | | 70 | | | | | 75 | | | | | 80 |
| Asp | Leu | Ser | Phe | Leu | Gln | Trp | Ile | Arg | Glu | Val | Thr | Gly | Tyr | Val | Leu |
| | | | | 85 | | | | | 90 | | | | | 95 | |
| Val | Ala | Met | Asn | Glu | Phe | Ser | Thr | Leu | Pro | Leu | Pro | Asn | Leu | Arg | Val |
| | | | 100 | | | | | 105 | | | | | 110 | | |
| Val | Arg | Gly | Thr | Gln | Val | Tyr | Asp | Gly | Lys | Phe | Ala | Ile | Phe | Val | Met |
| | | | 115 | | | | | 120 | | | | | 125 | | |
| Leu | Asn | Tyr | Asn | Thr | Asn | Ser | Ser | His | Ala | Leu | Arg | Gln | Leu | Arg | Leu |
| 130 | | | | | 135 | | | | | 140 | | | | | |
| Thr | Gln | Leu | Thr | Glu | Ile | Leu | Ser | Gly | Gly | Val | Tyr | Ile | Glu | Lys | Asn |
| 145 | | | | | 150 | | | | | 155 | | | | | 160 |
| Asp | Lys | Leu | Cys | His | Met | Asp | Thr | Ile | Asp | Trp | Arg | Asp | Ile | Val | Arg |
| | | | | 165 | | | | | 170 | | | | | 175 | |
| Asp | Arg | Asp | Ala | Glu | Ile | Val | Val | Lys | Asp | Asn | Gly | Arg | Ser | Cys | Pro |
| | | | 180 | | | | | 185 | | | | | 190 | | |
| Pro | Cys | His | Glu | Val | Cys | Lys | Gly | Arg | Cys | Trp | Gly | Pro | Gly | Ser | Glu |
| | | | 195 | | | | | 200 | | | | | 205 | | |
| Asp | Cys | Gln | Thr | Leu | Thr | Lys | Thr | Ile | Cys | Ala | Pro | Gln | Cys | Asn | Gly |
| | 210 | | | | | 215 | | | | | 220 | | | | |
| His | Cys | Phe | Gly | Pro | Asn | Pro | Asn | Gln | Cys | Cys | His | Asp | Glu | Cys | Ala |
| 225 | | | | | 230 | | | | | 235 | | | | | 240 |
| Gly | Gly | Cys | Ser | Gly | Pro | Gln | Asp | Thr | Asp | Cys | Phe | Ala | Cys | Arg | His |
| | | | | 245 | | | | | 250 | | | | | 255 | |
| Phe | Asn | Asp | Ser | Gly | Ala | Cys | Val | Pro | Arg | Cys | Pro | Gln | Pro | Leu | Val |
| | | | 260 | | | | | 265 | | | | | 270 | | |
| Tyr | Asn | Lys | Leu | Thr | Phe | Gln | Leu | Glu | Pro | Asn | Pro | His | Thr | Lys | Tyr |
| | | 275 | | | | | 280 | | | | | 285 | | | |
| Gln | Tyr | Gly | Gly | Val | Cys | Val | Ala | Ser | Cys | Pro | His | Asn | Phe | Val | Val |
| | 290 | | | | | 295 | | | | | 300 | | | | |
| Tyr | Gln | Thr | Ser | Cys | Val | Arg | Ala | Cys | Pro | Pro | Asp | Lys | Met | Glu | Val |
| 305 | | | | | 310 | | | | | 315 | | | | | 320 |
| Asp | Lys | Asn | Gly | Leu | Lys | Met | Cys | Glu | Pro | Cys | Gly | Gly | Leu | Cys | Pro |
| | | | | 325 | | | | | 330 | | | | | 335 | |
| Lys | Ala | Cys | Glu | Gly | Thr | Gly | Ser | Gly | Ser | Arg | Phe | Gln | Thr | Val | Asp |
| | | | 340 | | | | | 345 | | | | | 350 | | |
| Ser | Ser | Asn | Ile | Asp | Gly | Phe | Val | Asn | Cys | Thr | Lys | Ile | Leu | Gly | Asn |
| | | 355 | | | | | 360 | | | | | 365 | | | |
| Leu | Asp | Phe | Leu | Ile | Thr | Gly | Leu | Asn | Gly | Asp | Pro | Trp | His | Lys | Ile |
| 370 | | | | | 375 | | | | | 380 | | | | | |

-continued

```
Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
            405                 410                 415

Phe Ser Val Phe Ser Asn Leu Thr Thr Ile Gly Gly Arg Ser Leu Tyr
        420                 425                 430

Asn Arg Gly Phe Ser Leu Leu Ile Met Lys Asn Leu Asn Val Thr Ser
    435                 440                 445

Leu Gly Phe Arg Ser Leu Lys Glu Ile Ser Ala Gly Arg Ile Tyr Ile
450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
                485                 490                 495

Pro Arg Arg Asp Cys Val Ala Glu Gly Lys Val Cys Asp Pro Leu Cys
            500                 505                 510

Ser Ser Gly Gly Cys Trp Gly Pro Gly Pro Gln Cys Leu Ser Cys
        515                 520                 525

Arg Asn Tyr Ser Arg Gly Gly Val Cys Val Thr His Cys Asn Phe Leu
    530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
                565                 570                 575

Gly Ser Asp Thr Cys Ala Gln Cys Ala His Phe Arg Asp Gly Pro His
            580                 585                 590

Cys Val Ser Ser Cys Pro His Gly Val Leu Gly Ala Lys Gly Pro Ile
        595                 600                 605

Tyr Lys Tyr Pro Asp Val Gln Asn Glu Cys Arg Pro Cys His Glu Asn
    610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                645                 650                 655

Ile Ala Gly Leu Val Val Ile Phe Met Met Leu Gly Gly Thr Phe Leu
            660                 665                 670

Tyr Trp Arg Gly Arg Arg Ile Gln Asn Lys Arg Ala Met Arg Arg Tyr
        675                 680                 685

Leu Glu Arg Gly Glu Ser Ile Glu Pro Leu Asp Pro Ser Glu Lys Ala
    690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735

Ile Pro Glu Gly Glu Ser Ile Lys Ile Pro Val Cys Ile Lys Val Ile
            740                 745                 750

Glu Asp Lys Ser Gly Arg Gln Ser Phe Gln Ala Val Thr Asp His Met
        755                 760                 765

Leu Ala Ile Gly Ser Leu Asp His Ala His Ile Val Arg Leu Leu Gly
    770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
```

```
            805                 810                 815
Gln Leu Leu Asn Trp Gly Val Gln Ile Ala Lys Gly Met Tyr Tyr
        820                 825                 830
Leu Glu Glu His Gly Met Val His Arg Asn Leu Ala Ala Arg Asn Val
        835                 840                 845
Leu Leu Lys Ser Pro Ser Gln Val Gln Val Ala Asp Phe Gly Val Ala
        850                 855                 860
Asp Leu Leu Pro Pro Asp Asp Lys Gln Leu Leu Tyr Ser Glu Ala Lys
865                 870                 875                 880
Thr Pro Ile Lys Trp Met Ala Leu Glu Ser Ile His Phe Gly Lys Tyr
                885                 890                 895
Thr His Gln Ser Asp Val Trp Ser Tyr Gly Val Thr Val Trp Glu Leu
                900                 905                 910
Met Thr Phe Gly Ala Glu Pro Tyr Ala Gly Leu Arg Leu Ala Glu Val
                915                 920                 925
Pro Asp Leu Leu Glu Lys Gly Glu Arg Leu Ala Gln Pro Gln Ile Cys
        930                 935                 940
Thr Ile Asp Val Tyr Met Val Met Val Lys Cys Trp Met Ile Asp Glu
945                 950                 955                 960
Asn Ile Arg Pro Thr Phe Lys Glu Leu Ala Asn Glu Phe Thr Arg Met
                965                 970                 975
Ala Arg Asp Pro Pro Arg Tyr Leu Val Ile Lys Arg Glu Ser Gly Pro
        980                 985                 990
Gly Ile Ala Pro Gly Pro Glu Pro  His Gly Leu Thr Asn Lys Lys Leu
                995                 1000                 1005
Glu Glu  Val Glu Leu Glu Pro  Glu Leu Asp Leu Asp  Leu Asp Leu
        1010                 1015                 1020
Glu Ala  Glu Glu Asp Asn Leu  Ala Thr Thr Thr Leu  Gly Ser Ala
        1025                 1030                 1035
Leu Ser  Leu Pro Val Gly Thr  Leu Asn Arg Pro Arg  Gly Ser Gln
        1040                 1045                 1050
Ser Leu  Leu Ser Pro Ser Ser  Gly Tyr Met Pro Met  Asn Gln Gly
        1055                 1060                 1065
Asn Leu  Gly Glu Ser Cys Gln  Glu Ser Ala Val Ser  Gly Ser Ser
        1070                 1075                 1080
Glu Arg  Cys Pro Arg Pro Val  Ser Leu His Pro Met  Pro Arg Gly
        1085                 1090                 1095
Cys Leu  Ala Ser Glu Ser Ser  Glu Gly His Val Thr  Gly Ser Glu
        1100                 1105                 1110
Ala Glu  Leu Gln Glu Lys Val  Ser Met Cys Arg Ser  Arg Ser Arg
        1115                 1120                 1125
Ser Arg  Ser Pro Arg Pro Arg  Gly Asp Ser Ala Tyr  His Ser Gln
        1130                 1135                 1140
Arg His  Ser Leu Leu Thr Pro  Val Thr Pro Leu Ser  Pro Pro Gly
        1145                 1150                 1155
Leu Glu  Glu Glu Asp Val Asn  Gly Tyr Val Met Pro  Asp Thr His
        1160                 1165                 1170
Leu Lys  Gly Thr Pro Ser Ser  Arg Glu Gly Thr Leu  Ser Ser Val
        1175                 1180                 1185
Gly Leu  Ser Ser Val Leu Gly  Thr Glu Glu Glu Asp  Glu Asp Glu
        1190                 1195                 1200
Glu Tyr  Glu Tyr Met Asn Arg  Arg Arg Arg His Ser  Pro Pro His
        1205                 1210                 1215
```

Pro Pro Arg Pro Ser Ser Leu Glu Glu Leu Gly Tyr Glu Tyr Met
    1220             1225                 1230

Asp Val Gly Ser Asp Leu Ser Ala Ser Leu Gly Ser Thr Gln Ser
    1235             1240                 1245

Cys Pro Leu His Pro Val Pro Ile Met Pro Thr Ala Gly Thr Thr
    1250             1255                 1260

Pro Asp Glu Asp Tyr Glu Tyr Met Asn Arg Gln Arg Asp Gly Gly
    1265             1270                 1275

Gly Pro Gly Gly Asp Tyr Ala Ala Met Gly Ala Cys Pro Ala Ser
    1280             1285                 1290

Glu Gln Gly Tyr Glu Glu Met Arg Ala Phe Gln Gly Pro Gly His
    1295             1300                 1305

Gln Ala Pro His Val His Tyr Ala Arg Leu Lys Thr Leu Arg Ser
    1310             1315                 1320

Leu Glu Ala Thr Asp Ser Ala Phe Asp Asn Pro Asp Tyr Trp His
    1325             1330                 1335

Ser Arg Leu Phe Pro Lys Ala Asn Ala Gln Arg Thr
    1340             1345                 1350

<210> SEQ ID NO 41
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 41
tgcggcagac tgtgtcctaa ggcttgtgaa g                              31

<210> SEQ ID NO 42
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 42
acacagtctg ccgcaaggct cgcacatctt c                              31

<210> SEQ ID NO 43
<211> LENGTH: 4053
<212> TYPE: DNA
<213> ORGANISM: Artificial Sequence
<220> FEATURE:
<223> OTHER INFORMATION: cDNA encoding Flag-HER3(G325R)

<400> SEQUENCE: 43
atgagagcca acgatgctct gcaggttctg ggcctgctgt tctctctggc tagaggcgat      60
tacaaggatg acgacgataa gtctgaagtg gcaacagcc aggctgtgtg tcccggaaca     120
ctgaacggct tgtctgtgac aggcgacgcc gagaaccagt accagacact gtacaagctg     180
tacgagagat gcgaggtggt catgggcaac ctggaaatcg tgctgacagg ccacaacgcc     240
gacctgtctt tcctgcagtg gatcagagaa gtgaccggct acgtgctggt ggccatgaac     300
gagttcagca ccctgcctct gcctaacctg agagtcgtca gaggcaccca ggtgtacgat     360
ggcaagttcg ccatcttcgt gatgctgaac tacaacacca acagctctca cgccctgaga     420
cagctgagac tgaccagct gaccgagatc ctgtctggcg gagtgtacat cgagaagaac     480
gacaagctgt gccacatgga caccatcgac tggcgggata tcgtgcggga tagagatgcc     540

```
gagatcgtgg tcaaggacaa cggcagaagc tgccctcctt gccacgaagt gtgcaagggc    600
agatgttggg gccctggctc tgaggactgt cagaccctga ccaagaccat ctgcgcccct    660
cagtgtaacg ccactgctt cggccctaat cctaaccagt gctgccacga cgaatgcgct    720
ggcggatgtt ctggacctca ggacacagac tgcttcgcct gcagacactt caacgactct    780
ggcgcctgcg tgccaagatg tcctcagcct ctggtgtaca acaagctgac ctttcagctg    840
gaacccaatc ctcacaccaa gtaccagtac ggcggcgtgt gtgtggccag ctgtcctcac    900
aacttcgtgg tggaccagac cagctgtgtg cgggcttgtc ctcctgacaa gatggaagtg    960
gacaagaacg gcctgaagat gtgcgagcct gcggcagac tgtgtcctaa ggcttgtgaa   1020
ggcacaggca gcggcagcag attccagaca gtggacagca gcaacatcga cggcttcgtg   1080
aactgcacca gatcctgggg aaacctggac ttcctgatca ccggcctgaa cggcgatccc   1140
tggcataaga tccctgctct ggaccccgag aagctgaacg tgttcagaac cgtgcgcgag   1200
atcacaggct acctgaacat ccagagctgg cctccacaca tgcacaactt cagcgtgttc   1260
tccaacctga ccaccatcgg cggcagatcc ctgtacaaca ggggcttcag cctgctgatc   1320
atgaagaacc tgaatgtgac cagcctgggc ttcagaagcc tgaaagagat cagcgccggc   1380
agaatctaca tcagcgccaa cagacagctg tgctaccacc acagcctgaa ctggacaaag   1440
gtgctgagag cccccaccga ggaaagactg gacatcaagc acaacagacc tagaagagac   1500
tgcgtggccg agggcaaagt gtgcgaccct ctttgttcta gcggcggctg ttggggacca   1560
ggacctggac agtgtctctc ctgtagaaac tacagccgcg gaggcgtgtg cgtgacccac   1620 tgcaatttc tgaatggcga gcccagagag ttcgcccacg aggccgagtg tttcagctgt   1680
caccctgagt gccagcctat ggaaggcacc gctacatgta acggcagcgg ctctgatacc   1740
tgcgctcagt gcgcccactt tagagatggc cctcactgcg tgtcctcttg tcctcatggt   1800
gtcctgggcg ctaagggccc catctacaag taccctgacg tgcagaacga gtgcaggccc   1860
tgccacgaga actgtacaca gggatgcaag ggccctgagc tgcaggattg tctgggacag   1920
acactggtgc tgatcggcaa gacccacctg acaatgggcc cgacagtgat cgctggcctg   1980
gtggtcatct ttatgatgct cggcggcacc ttcctgtatt ggagaggcag aagaatccag   2040
aacaagaggg ccatgcggag ataccggaa agaggcgaga gcatcgagcc actggaccct   2100
agcgagaagg ccaacaaggt gctggccaga atcttcaaag acagagct gcggaagctg   2160 aaggtgctcg gatctggcgt gttcggcaca gtgcacaaag gcgtgtggat ccctgagggc   2220
gagtccatca gatccccgt gtgcatcaaa gtgatcgagg acaagtccgg caggcagagc   2280
ttccaggccg tgacagatca catgctggct atcggcagcc tggatcacgc ccacatcgtt   2340
agactgctgg gactgtgccc tggcagctct ctgcagctcg tgacacagta tctgcctctg   2400
ggatctctgc tggaccacgt gcgacaacat agaggcgctc tgggacctca gctgctgctg   2460
aattggggag tgcagatcgc caagggcatg tactacctgg aagaacacgg catggtgcac   2520
agaaacctgg ccgccagaaa cgtgctgctc aagtctccta gccaggtgca ggtcgccgat   2580
ttcggagttg ctgatctcct gccacctgac gacaaacagc tgctgtactc cgaggccaag   2640
acacccatca gtggatggc cctggaatct atccacttcg gcaagtacac ccaccagagc   2700
gacgtgtggt cttacggcgt gacagtgtgg gagctgatga ccttcggagc cgagccttac   2760
gctggactga actggctga agtgcccgac ctgctggaaa agggcgaaag acttgcccag   2820
cctcagatct gtaccatcga cgtgtacatg gtcatggtca agtgctggat gatcgacgag   2880
```

-continued

```
aacatcagac ccacattcaa agagctggct aacgagttta cccggatggc cagagatcct    2940
cctagatacc tcgtgatcaa gagagagagc ggccctggca ttgctcctgg acctgaacct    3000
cacggactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgaccoct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggca cagccctcc acatcctcca    3660 agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtgc actatgccag actgaaaacc    3960
ctgagatctc tggaagccac cgactccgcc ttcgacaacc tgactactg gcacagcaga    4020 ctgttcccca aggccaacgc tcagagaaca taa    4053
```

<210> SEQ ID NO 44
<211> LENGTH: 1350
<212> TYPE: PRT
<213> ORGANISM: Artificial Sequence
<220> FEATURE:
<223> OTHER INFORMATION: Flag-HER3(G325R)

<400> SEQUENCE: 44

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160
```

-continued

Asp Lys Leu Cys His Met Asp Thr Ile Asp Trp Arg Asp Ile Val Arg
            165                 170                 175

Asp Arg Asp Ala Glu Ile Val Val Lys Asp Asn Gly Arg Ser Cys Pro
        180                 185                 190

Pro Cys His Glu Val Cys Lys Gly Arg Cys Trp Gly Pro Gly Ser Glu
            195                 200                 205

Asp Cys Gln Thr Leu Thr Lys Thr Ile Cys Ala Pro Gln Cys Asn Gly
        210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
            245                 250                 255

Phe Asn Asp Ser Gly Ala Cys Val Pro Arg Cys Pro Gln Pro Leu Val
        260                 265                 270

Tyr Asn Lys Leu Thr Phe Gln Leu Glu Pro Asn Pro His Thr Lys Tyr
            275                 280                 285

Gln Tyr Gly Gly Val Cys Val Ala Ser Cys Pro His Asn Phe Val Val
        290                 295                 300

Asp Gln Thr Ser Cys Val Arg Ala Cys Pro Pro Asp Lys Met Glu Val
305                 310                 315                 320

Asp Lys Asn Gly Leu Lys Met Cys Glu Pro Cys Gly Arg Leu Cys Pro
            325                 330                 335

Lys Ala Cys Glu Gly Thr Gly Ser Gly Ser Arg Phe Gln Thr Val Asp
        340                 345                 350

Ser Ser Asn Ile Asp Gly Phe Val Asn Cys Thr Lys Ile Leu Gly Asn
            355                 360                 365

Leu Asp Phe Leu Ile Thr Gly Leu Asn Gly Asp Pro Trp His Lys Ile
        370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
            405                 410                 415

Phe Ser Val Phe Ser Asn Leu Thr Thr Ile Gly Gly Arg Ser Leu Tyr
        420                 425                 430

Asn Arg Gly Phe Ser Leu Leu Ile Met Lys Asn Leu Asn Val Thr Ser
            435                 440                 445

Leu Gly Phe Arg Ser Leu Lys Glu Ile Ser Ala Gly Arg Ile Tyr Ile
        450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
            485                 490                 495

Pro Arg Arg Asp Cys Val Ala Glu Gly Lys Val Cys Asp Pro Leu Cys
        500                 505                 510

Ser Ser Gly Gly Cys Trp Gly Pro Gly Pro Gly Gln Cys Leu Ser Cys
            515                 520                 525

Arg Asn Tyr Ser Arg Gly Gly Val Cys Val Thr His Cys Asn Phe Leu
        530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
            565                 570                 575

```
Gly Ser Asp Thr Cys Ala Gln Cys Ala His Phe Arg Asp Gly Pro His
                580                 585                 590

Cys Val Ser Ser Cys Pro His Gly Val Leu Gly Ala Lys Gly Pro Ile
595                 600                 605

Tyr Lys Tyr Pro Asp Val Gln Asn Glu Cys Arg Pro Cys His Glu Asn
            610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                645                 650                 655

Ile Ala Gly Leu Val Val Ile Phe Met Met Leu Gly Gly Thr Phe Leu
                660                 665                 670

Tyr Trp Arg Gly Arg Arg Ile Gln Asn Lys Arg Ala Met Arg Arg Tyr
            675                 680                 685

Leu Glu Arg Gly Glu Ser Ile Glu Pro Leu Asp Pro Ser Glu Lys Ala
            690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735

Ile Pro Glu Gly Glu Ser Ile Lys Ile Pro Val Cys Ile Lys Val Ile
                740                 745                 750

Glu Asp Lys Ser Gly Arg Gln Ser Phe Gln Ala Val Thr Asp His Met
            755                 760                 765

Leu Ala Ile Gly Ser Leu Asp His Ala His Ile Val Arg Leu Leu Gly
770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
                805                 810                 815

Gln Leu Leu Leu Asn Trp Gly Val Gln Ile Ala Lys Gly Met Tyr Tyr
                820                 825                 830

Leu Glu Glu His Gly Met Val His Arg Asn Leu Ala Ala Arg Asn Val
            835                 840                 845

Leu Leu Lys Ser Pro Ser Gln Val Gln Val Ala Asp Phe Gly Val Ala
850                 855                 860

Asp Leu Leu Pro Pro Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                885                 890                 895

Thr His Gln Ser Asp Val Trp Ser Tyr Gly Val Thr Val Trp Glu Leu
            900                 905                 910

Met Thr Phe Gly Ala Glu Pro Tyr Ala Gly Leu Arg Leu Ala Glu Val
            915                 920                 925

Pro Asp Leu Leu Glu Lys Gly Glu Arg Leu Ala Gln Pro Gln Ile Cys
            930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro His Gly Leu Thr Asn Lys Lys Leu
```

|  | 995 |  |  |  | 1000 |  |  |  | 1005 |  |
|---|---|---|---|---|---|---|---|---|---|---|

Glu Glu Val Glu Leu Glu Pro Glu Leu Asp Leu Asp Leu
1010           1015           1020

Glu Ala Glu Glu Asp Asn Leu Ala Thr Thr Thr Leu Gly Ser Ala
1025           1030           1035

Leu Ser Leu Pro Val Gly Thr Leu Asn Arg Pro Arg Gly Ser Gln
1040           1045           1050

Ser Leu Leu Ser Pro Ser Ser Gly Tyr Met Pro Met Asn Gln Gly
1055           1060           1065

Asn Leu Gly Glu Ser Cys Gln Glu Ser Ala Val Ser Gly Ser Ser
1070           1075           1080

Glu Arg Cys Pro Arg Pro Val Ser Leu His Pro Met Pro Arg Gly
1085           1090           1095

Cys Leu Ala Ser Glu Ser Ser Glu Gly His Val Thr Gly Ser Glu
1100           1105           1110

Ala Glu Leu Gln Glu Lys Val Ser Met Cys Arg Ser Arg Ser Arg
1115           1120           1125

Ser Arg Ser Pro Arg Pro Arg Gly Asp Ser Ala Tyr His Ser Gln
1130           1135           1140

Arg His Ser Leu Leu Thr Pro Val Thr Pro Leu Ser Pro Pro Gly
1145           1150           1155

Leu Glu Glu Glu Asp Val Asn Gly Tyr Val Met Pro Asp Thr His
1160           1165           1170

Leu Lys Gly Thr Pro Ser Ser Arg Glu Gly Thr Leu Ser Ser Val
1175           1180           1185

Gly Leu Ser Ser Val Leu Gly Thr Glu Glu Glu Asp Glu Asp Glu
1190           1195           1200

Glu Tyr Glu Tyr Met Asn Arg Arg Arg Arg His Ser Pro Pro His
1205           1210           1215

Pro Pro Arg Pro Ser Ser Leu Glu Glu Leu Gly Tyr Glu Tyr Met
1220           1225           1230

Asp Val Gly Ser Asp Leu Ser Ala Ser Leu Gly Ser Thr Gln Ser
1235           1240           1245

Cys Pro Leu His Pro Val Pro Ile Met Pro Thr Ala Gly Thr Thr
1250           1255           1260

Pro Asp Glu Asp Tyr Glu Tyr Met Asn Arg Gln Arg Asp Gly Gly
1265           1270           1275

Gly Pro Gly Gly Asp Tyr Ala Ala Met Gly Ala Cys Pro Ala Ser
1280           1285           1290

Glu Gln Gly Tyr Glu Glu Met Arg Ala Phe Gln Gly Pro Gly His
1295           1300           1305

Gln Ala Pro His Val His Tyr Ala Arg Leu Lys Thr Leu Arg Ser
1310           1315           1320

Leu Glu Ala Thr Asp Ser Ala Phe Asp Asn Pro Asp Tyr Trp His
1325           1330           1335

Ser Arg Leu Phe Pro Lys Ala Asn Ala Gln Arg Thr
1340           1345           1350

<210> SEQ ID NO 45
<211> LENGTH: 30
<212> TYPE: DNA
<213> ORGANISM: Artificial Sequence
<220> FEATURE:
<223> OTHER INFORMATION: HER3 mutagenesis primer (Fw)

<400> SEQUENCE: 45
aactgcatca agatcctggg aaacctggac                                30

<210> SEQ ID NO 46
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 46
gatcttgatg cagttcacga agccgtcgat g                              31

<210> SEQ ID NO 47
<211> LENGTH: 4053
<212> TYPE: DNA
<213> ORGANISM: Artificial Sequence
<220> FEATURE:
<223> OTHER INFORMATION: cDNA encoding Flag-HER3(T355I)

<400> SEQUENCE: 47

```
atgagagcca acgatgctct gcaggttctg ggcctgctgt tctctctggc tagaggcgat      60
tacaaggatg acgacgataa gtctgaagtg ggcaacagcc aggctgtgtg tcccggaaca     120
ctgaacggct tgtctgtgac aggcgacgcc gagaaccagt accagacact gtacaagctg     180
tacgagagat gcgaggtggt catgggcaac ctggaaatcg tgctgacagg ccacaacgcc     240
gacctgtctt tcctgcagtg gatcagagaa gtgaccggct acgtgctggt ggccatgaac     300
gagttcagca ccctgcctct gcctaacctg agagtcgtca gaggcaccca ggtgtacgat     360
ggcaagttcg ccatcttcgt gatgctgaac tacaacacca acagctctca cgccctgaga     420
cagctgagac tgaccagct gaccgagatc ctgtctggcg agtgtacat cgagaagaac      480
gacaagctgt gccacatgga caccatcgac tggcgggata tcgtgcggga tagagatgcc     540
gagatcgtgg tcaaggacaa cggcagaagc tgccctcctt gccacgaagt gtgcaagggc     600
agatgttggg gcctggctc tgaggactgt cagaccctga ccaagaccat ctgcgcccct     660
cagtgtaacg ccactgcttc ggccctaat cctaaccagt gctgccacga cgaatgcgct     720
ggcggatgtt ctggacctca ggacacagac tgcttcgcct gcagacactt caacgactct     780
ggcgcctgcg tgccaagatg tcctcagcct ctggtgtaca acaagctgac ctttcagctg     840
gaacccaatc ctcacaccaa gtaccagtac ggcggcgtgt gtgtggccag ctgtcctcac     900
aacttcgtgg tggaccagac cagctgtgtg cgggcttgtc ctcctgacaa gatggaagtg     960
gacaagaacg gcctgaagat gtgcgagcct tgcggcggac tgtgtcctaa ggcttgtgaa    1020
ggcacaggca gcggcagcag attccagaca gtggacagca gcaacatcga cggcttcgtg    1080
aactgcatca gatcctgggg aaacctggac ttcctgatca ccggcctgaa cggcgatccc    1140
tggcataaga tccctgctct ggaccccgag aagctgaacg tgttcagaac cgtgcgcgag    1200
atcacaggct acctgaacat ccagagctgg cctccacaca tgcacaactt cagcgtgttc    1260
tccaacctga ccaccatcgg cggcagatcc ctgtacaaca ggggcttcag cctgctgatc    1320
atgaagaacc tgaatgtgac cagcctgggc ttcagaagcc tgaaagagat cagcgccggc    1380
agaatctaca tcagcgccaa cagacagctg tgctaccacc acagcctgaa ctggacaaag    1440
gtgctgagag cccccaccga ggaaagactg gacatcaagc acaacagacc tagaagagac    1500
tgcgtggccg agggcaaagt gtgcgaccct ctttgttcta gcggcggctg ttggggacca    1560
ggacctggac agtgtctctc ctgtagaaac tacagccgcg gaggcgtgtg cgtgacccac    1620
```

```
tgcaattttc tgaatggcga gcccagagag ttcgcccacg aggccgagtg tttcagctgt    1680
caccctgagt gccagcctat ggaaggcacc gctacatgta acggcagcgg ctctgatacc    1740
tgcgctcagt gcgcccactt tagagatggc cctcactgcg tgtcctcttg tcctcatggt    1800
gtcctgggcg ctaagggccc catctacaag taccctgacg tgcagaacga gtgcaggccc    1860
tgccacgaga actgtacaca gggatgcaag ggccctgagc tgcaggattg tctgggacag    1920
acactggtgc tgatcggcaa gacccacctg acaatggccc tgacagtgat cgctggcctg    1980
gtggtcatct ttatgatgct cggcggcacc ttcctgtatt ggagaggcag aagaatccag    2040
aacaagaggg ccatgcggag atacctggaa agaggcgaga gcatcgagcc actggaccct    2100
agcgagaagg ccaacaaggt gctggccaga atcttcaaag agacagagct gcggaagctg    2160
aaggtgctcg gatctggcgt gttcggcaca gtgcacaaag cgtgtgggat ccctgagggc    2220
gagtccatca agatccccgt gtgcatcaaa gtgatcgagg acaagtccgg caggcagagc    2280
ttccaggccg tgacagatca catgctggct atcggcagcc tggatcacgc ccacatcgtt    2340
agactgctgg gactgtgccc tggcagctct ctgcagctcg tgacacagta tctgcctctg    2400
ggatctctgc tggaccacgt gcgacaacat agaggcgctc tgggacctca gctgctgctg    2460
aattggggag tgcagatcgc caagggcatg tactacctgg aagaacacgg catggtgcac    2520
agaaacctgg ccgccagaaa cgtgctgctc aagtctccta gccaggtgca ggtcgccgat    2580
ttcggagttg ctgatctcct gccacctgac gacaaacagc tgctgtactc cgaggccaag    2640
acacccatca gtggatggc cctggaatct atccacttcg gcaagtacac ccaccagagc    2700
gacgtgtggt cttacggcgt gacagtgtgg gagctgatga ccttcggagc cgagccttac    2760
gctggactga gactggctga agtgcccgac ctgctggaaa agggcgaaag acttgcccag    2820
cctcagatct gtaccatcga cgtgtacatg gtcatggtca agtgctggat gatcgacgag    2880
aacatcagac ccacattcaa agagctggct aacgagttta cccggatggc cagagatcct    2940
cctagatacc tcgtgatcaa gagagagagc ggccctggca ttgctcctgg acctgaacct    3000
cacggactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgaccccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga agaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840 ggcgagatt atgctgctat gggagcctgt cctgctagcg agcagggcta cgaagagatg    3900
agagcctttc aaggccctgg ccatcaggct cctcacgtgc actatgccag actgaaaacc    3960
```

-continued ctgagatctc tggaagccac cgactccgcc ttcgacaacc ctgactactg gcacagcaga    4020
ctgttcccca aggccaacgc tcagagaaca taa    4053

<210> SEQ ID NO 48
<211> LENGTH: 1350
<212> TYPE: PRT
<213> ORGANISM: Artificial Sequence
<220> FEATURE:
<223> OTHER INFORMATION: Flag-HER3(T355I)

<400> SEQUENCE: 48

Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
                165                 170                 175

Asp Arg Asp Ala Glu Ile Val Val Lys Asp Asn Gly Arg Ser Cys Pro
            180                 185                 190

Pro Cys His Glu Val Cys Lys Gly Arg Cys Trp Gly Pro Gly Ser Glu
        195                 200                 205

Asp Cys Gln Thr Leu Thr Lys Thr Ile Cys Ala Pro Gln Cys Asn Gly
    210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
                245                 250                 255

Phe Asn Asp Ser Gly Ala Cys Val Pro Arg Cys Pro Gln Pro Leu Val
            260                 265                 270

Tyr Asn Lys Leu Thr Phe Gln Leu Glu Pro Asn Pro His Thr Lys Tyr
        275                 280                 285

Gln Tyr Gly Gly Val Cys Val Ala Ser Cys Pro His Asn Phe Val Val
    290                 295                 300

Asp Gln Thr Ser Cys Val Arg Ala Cys Pro Pro Asp Lys Met Glu Val
305                 310                 315                 320

Asp Lys Asn Gly Leu Lys Met Cys Glu Pro Cys Gly Gly Leu Cys Pro
                325                 330                 335

Lys Ala Cys Glu Gly Thr Gly Ser Gly Ser Arg Phe Gln Thr Val Asp
            340                 345                 350

```
Ser Ser Asn Ile Asp Gly Phe Val Asn Cys Ile Lys Ile Leu Gly Asn
        355                 360                 365

Leu Asp Phe Leu Ile Thr Gly Leu Asn Gly Asp Pro Trp His Lys Ile
    370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
                405                 410                 415

Phe Ser Val Phe Ser Asn Leu Thr Thr Ile Gly Gly Arg Ser Leu Tyr
            420                 425                 430

Asn Arg Gly Phe Ser Leu Leu Ile Met Lys Asn Leu Asn Val Thr Ser
        435                 440                 445

Leu Gly Phe Arg Ser Leu Lys Glu Ile Ser Ala Gly Arg Ile Tyr Ile
    450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
                485                 490                 495

Pro Arg Arg Asp Cys Val Ala Glu Gly Lys Val Cys Asp Pro Leu Cys
                500                 505                 510

Ser Ser Gly Gly Cys Trp Gly Pro Gly Pro Gly Gln Cys Leu Ser Cys
            515                 520                 525

Arg Asn Tyr Ser Arg Gly Gly Val Cys Val Thr His Cys Asn Phe Leu
        530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
                565                 570                 575

Gly Ser Asp Thr Cys Ala Gln Cys Ala His Phe Arg Asp Gly Pro His
            580                 585                 590

Cys Val Ser Ser Cys Pro His Gly Val Leu Gly Ala Lys Gly Pro Ile
        595                 600                 605

Tyr Lys Tyr Pro Asp Val Gln Asn Glu Cys Arg Pro Cys His Glu Asn
    610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                645                 650                 655

Ile Ala Gly Leu Val Val Ile Phe Met Met Leu Gly Gly Thr Phe Leu
            660                 665                 670

Tyr Trp Arg Gly Arg Arg Ile Gln Asn Lys Arg Ala Met Arg Arg Tyr
        675                 680                 685

Leu Glu Arg Gly Glu Ser Ile Glu Pro Leu Asp Pro Ser Glu Lys Ala
    690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735

Ile Pro Glu Gly Glu Ser Ile Lys Ile Pro Val Cys Ile Lys Val Ile
            740                 745                 750

Glu Asp Lys Ser Gly Arg Gln Ser Phe Gln Ala Val Thr Asp His Met
        755                 760                 765
```

```
Leu Ala Ile Gly Ser Leu Asp His Ala His Ile Val Arg Leu Leu Gly
770                 775                 780
Leu Cys Pro Gly Ser Ser Leu Gln Leu Val Thr Gln Tyr Leu Pro Leu
785                 790                 795                 800
Gly Ser Leu Leu Asp His Val Arg Gln His Arg Gly Ala Leu Gly Pro
                805                 810                 815
Gln Leu Leu Leu Asn Trp Gly Val Gln Ile Ala Lys Gly Met Tyr Tyr
            820                 825                 830
Leu Glu Glu His Gly Met Val His Arg Asn Leu Ala Ala Arg Asn Val
        835                 840                 845
Leu Leu Lys Ser Pro Ser Gln Val Gln Val Ala Asp Phe Gly Val Ala
850                 855                 860
Asp Leu Leu Pro Pro Asp Asp Lys Gln Leu Leu Tyr Ser Glu Ala Lys
865                 870                 875                 880
Thr Pro Ile Lys Trp Met Ala Leu Glu Ser Ile His Phe Gly Lys Tyr
                885                 890                 895
Thr His Gln Ser Asp Val Trp Ser Tyr Gly Val Thr Val Trp Glu Leu
            900                 905                 910
Met Thr Phe Gly Ala Glu Pro Tyr Ala Gly Leu Arg Leu Ala Glu Val
        915                 920                 925
Pro Asp Leu Leu Glu Lys Gly Glu Arg Leu Ala Gln Pro Gln Ile Cys
930                 935                 940
Thr Ile Asp Val Tyr Met Val Met Val Lys Cys Trp Met Ile Asp Glu
945                 950                 955                 960
Asn Ile Arg Pro Thr Phe Lys Glu Leu Ala Asn Glu Phe Thr Arg Met
                965                 970                 975
Ala Arg Asp Pro Pro Arg Tyr Leu Val Ile Lys Arg Glu Ser Gly Pro
            980                 985                 990
Gly Ile Ala Pro Gly Pro Glu Pro His Gly Leu Thr Asn Lys Lys Leu
            995                 1000                1005
Glu Glu Val Glu Leu Glu Pro Glu Leu Asp Leu Asp Leu Asp Leu
    1010                1015                1020
Glu Ala Glu Glu Asp Asn Leu Ala Thr Thr Thr Leu Gly Ser Ala
    1025                1030                1035
Leu Ser Leu Pro Val Gly Thr Leu Asn Arg Pro Arg Gly Ser Gln
    1040                1045                1050
Ser Leu Leu Ser Pro Ser Ser Gly Tyr Met Pro Met Asn Gln Gly
    1055                1060                1065
Asn Leu Gly Glu Ser Cys Gln Glu Ser Ala Val Ser Gly Ser Ser
    1070                1075                1080
Glu Arg Cys Pro Arg Pro Val Ser Leu His Pro Met Pro Arg Gly
    1085                1090                1095
Cys Leu Ala Ser Glu Ser Ser Glu Gly His Val Thr Gly Ser Glu
    1100                1105                1110
Ala Glu Leu Gln Glu Lys Val Ser Met Cys Arg Ser Arg Ser Arg
    1115                1120                1125
Ser Arg Ser Pro Arg Pro Arg Gly Asp Ser Ala Tyr His Ser Gln
    1130                1135                1140
Arg His Ser Leu Leu Thr Pro Val Thr Pro Leu Ser Pro Pro Gly
    1145                1150                1155
Leu Glu Glu Glu Asp Val Asn Gly Tyr Val Met Pro Asp Thr His
    1160                1165                1170
Leu Lys Gly Thr Pro Ser Ser Arg Glu Gly Thr Leu Ser Ser Val
```

| | | | | | | | | | | |
|---|---|---|---|---|---|---|---|---|---|---|
| | | 1175 | | | 1180 | | | | 1185 | |
| Gly | Leu | Ser | Ser | Val | Leu | Gly | Thr | Glu | Glu | Asp Glu Asp Glu |
| | | 1190 | | | | 1195 | | | | 1200 |
| Glu | Tyr | Glu | Tyr | Met | Asn | Arg | Arg | Arg | His | Ser Pro Pro His |
| | | 1205 | | | | 1210 | | | | 1215 |
| Pro | Pro | Arg | Pro | Ser | Ser | Leu | Glu | Glu | Leu | Gly Tyr Glu Tyr Met |
| | | 1220 | | | | 1225 | | | | 1230 |
| Asp | Val | Gly | Ser | Asp | Leu | Ser | Ala | Ser | Leu | Gly Ser Thr Gln Ser |
| | | 1235 | | | | 1240 | | | | 1245 |
| Cys | Pro | Leu | His | Pro | Val | Pro | Ile | Met | Pro | Thr Ala Gly Thr Thr |
| | | 1250 | | | | 1255 | | | | 1260 |
| Pro | Asp | Glu | Asp | Tyr | Glu | Tyr | Met | Asn | Arg | Gln Arg Asp Gly Gly |
| | | 1265 | | | | 1270 | | | | 1275 |
| Gly | Pro | Gly | Gly | Asp | Tyr | Ala | Ala | Met | Gly | Ala Cys Pro Ala Ser |
| | | 1280 | | | | 1285 | | | | 1290 |
| Glu | Gln | Gly | Tyr | Glu | Glu | Met | Arg | Ala | Phe | Gln Gly Pro Gly His |
| | | 1295 | | | | 1300 | | | | 1305 |
| Gln | Ala | Pro | His | Val | His | Tyr | Ala | Arg | Leu | Lys Thr Leu Arg Ser |
| | | 1310 | | | | 1315 | | | | 1320 |
| Leu | Glu | Ala | Thr | Asp | Ser | Ala | Phe | Asp | Asn | Pro Asp Tyr Trp His |
| | | 1325 | | | | 1330 | | | | 1335 |
| Ser | Arg | Leu | Phe | Pro | Lys | Ala | Asn | Ala | Gln | Arg Thr |
| | | 1340 | | | | 1345 | | | | 1350 |

<210> SEQ ID NO 49
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 49
tctcctatcc aggtgcaggt cgccgatttc g                               31

<210> SEQ ID NO 50
<211> LENGTH: 32
<212> TYPE: DNA
<213> ORGANISM: Artificial Sequence
<220> FEATURE:
<223> OTHER INFORMATION: HER3 mutagenesis primer (Rev)

<400> SEQUENCE: 50
cacctggata ggagacttga gcagcacgtt tc                              32

<210> SEQ ID NO 51
<211> LENGTH: 4053
<212> TYPE: DNA
<213> ORGANISM: Artificial Sequence
<220> FEATURE:
<223> OTHER INFORMATION: cDNA encoding Flag-HER3(S846I)

<400> SEQUENCE: 51
atgagagcca acgatgctct gcaggttctg ggcctgctgt tctctctggc tagaggcgat      60
tacaaggatg acgacgataa gtctgaagtg gcaacagcc aggctgtgtg tcccggaaca     120
ctgaacggct tgtctgtgac aggcgacgcc gagaaccagt accagacact gtacaagctg    180
tacgagagat gcgaggtggt catgggcaac ctggaaatcg tgctgacagg ccacaacgcc    240
gacctgtctt tcctgcagtg gatcagagaa gtgaccggct acgtgctggt ggccatgaac    300

```
gagttcagca ccctgcctct gcctaacctg agagtcgtca gaggcaccca ggtgtacgat      360
ggcaagttcg ccatcttcgt gatgctgaac tacaacacca acagctctca cgccctgaga      420
cagctgagac tgacccagct gaccgagatc ctgtctggcg gagtgtacat cgagaagaac      480
gacaagctgt gccacatgga caccatcgac tggcgggata tcgtgcggga tagagatgcc      540
gagatcgtgg tcaaggacaa cggcagaagc tgccctcctt gccacgaagt gtgcaagggc      600
agatgttggg gccctggctc tgaggactgt cagaccctga ccaagaccat ctgcgcccct      660
cagtgtaacg gccactgctt cggccctaat cctaaccagt gctgccacga cgaatgcgct      720
ggcggatgtt ctggacctca ggacacagac tgcttcgcct gcagacactt caacgactct      780
ggcgcctgcg tgccaagatg tcctcagcct ctggtgtaca acaagctgac ctttcagctg      840
gaacccaatc tcacaccaa gtaccagtac ggcggcgtgt gtgtggccag ctgtcctcac       900
aacttcgtgg tggaccagac cagctgtgtg cgggcttgtc ctcctgacaa gatggaagtg      960
gacaagaacg gcctgaagat gtgcgagcct tgcggcggac tgtgtcctaa ggcttgtgaa      1020
ggcacaggca gcggcagcag attccagaca gtggacagca gcaacatcga cggcttcgtg      1080
aactgcacca agatcctggg aaacctggac ttcctgatca ccggcctgaa cggcgatccc      1140
tggcataaga tccctgctct ggaccccgag aagctgaacg tgttcagaac cgtgcgcgag      1200
atcacaggct acctgaacat ccagagctgg cctccacaca tgcacaactt cagcgtgttc      1260
tccaacctga ccaccatcgg cggcagatcc ctgtacaaca ggggcttcag cctgctgatc      1320
atgaagaacc tgaatgtgac cagcctgggc ttcagaagcc tgaaagagat cagcgccggc      1380
agaatctaca tcagcgccaa cagacagctg tgctaccacc acagcctgaa ctggacaaag      1440
gtgctgagag gccccaccga ggaaagactg gacatcaagc acaacagacc tagaagagac      1500
tgcgtggccg agggcaaagt gtgcgaccct ctttgttcta gcgcggctg ttggggacca      1560 ggacctggac agtgtctctc ctgtagaaac tacagccgcg gaggcgtgtg cgtgacccac      1620
tgcaattttc tgaatggcga gcccagagag ttcgcccacg aggccgagtg tttcagctgt      1680
caccctgagt gccagcctat ggaaggcacc gctacatgta acggcagcgg ctctgatacc      1740
tgcgctcagt gcgcccactt tagagatggc cctcactgcg tgtcctcttg tcctcatggt      1800
gtcctgggcg ctaagggccc catctacaag taccctgacg tgcagaacga gtgcaggccc      1860
tgccacgaga actgtacaca gggatgcaag ggccctgagc tgcaggattg tctgggacag      1920
acactggtgc tgatcggcaa gacccacctg acaatggccc tgacagtgat cgctggcctg      1980
gtggtcatct ttatgatgct cggcggcacc ttcctgtatt ggagaggcag aagaatccag      2040
aacaagaggg ccatgcggag atacctggaa agaggcgaga gcatcgagcc actggaccct      2100
agcgagaagg ccaacaaggt gctggccaga atcttcaaag agacagagct gcggaagctg      2160
aaggtgctcg atctggcgt gttcggcaca gtgcacaaag gcgtgtggat ccctgagggc      2220
gagtccatca agatccccgt gtgcatcaaa gtgatcgagg acaagtccgg caggcagagc      2280
ttccaggccg tgacagatca catgctggct atcggcagcc tggatcacgc ccacatcgtt      2340
agactgctgg gactgtgccc tggcagctct ctgcagctcg tgacacagta tctgcctctg      2400
ggatctctgc tggaccacgt cgacaacat agaggcgctc tgggacctca gctgctgctg      2460
aattggggag tgcagatcgc caagggcatg tactacctgg aagaacacgg catggtgcac      2520
agaaacctgg ccgccagaaa cgtgctgctc aagtctccta tccaggtgca ggtcgccgat      2580
ttcggagttg ctgatctcct gccacctgac gacaaacagc tgctgtactc cgaggccaag      2640
acacccatca gtggatggc cctggaatct atccacttcg gcaagtacac ccaccagagc      2700
```

-continued

```
gacgtgtggt cttacggcgt gacagtgtgg gagctgatga ccttcggagc cgagccttac    2760
gctggactga gactggctga agtgcccgac ctgctgaaaa agggcgaaag acttgcccag    2820
cctcagatct gtaccatcga cgtgtacatg gtcatggtca agtgctggat gatcgacgag    2880
aacatcagac ccacattcaa agagctggct aacgagttta cccggatggc cagagatcct    2940
cctagatacc tcgtgatcaa gagagagagc ggccctggca ttgctcctgg acctgaacct    3000 cacgactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac tagaggcga cagcgcctac    3420 cactctcaga gacactcact gctgaccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840 ggcgagatt atgctgctat gggagcctgt cctgctagcg agcagggcta cgaagagatg    3900 agagccttc aaggccctgg ccatcaggct cctcacgtgc actatgccag actgaaaacc    3960
ctgagatctc tggaagccac cgactccgcc ttcgacaacc tgactactg gcacagcaga    4020 ctgttcccca aggccaacgc tcagagaaca taa                                4053
```

<210> SEQ ID NO 52
<211> LENGTH: 1350
<212> TYPE: PRT
<213> ORGANISM: Artificial Sequence
<220> FEATURE:
<223> OTHER INFORMATION: Flag-HER3(S846I)

<400> SEQUENCE: 52

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
                20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
                100                 105                 110

Val Arg Gly Thr Gln Val Tyr Asp Gly Lys Phe Ala Ile Phe Val Met
```

```
                115                 120                 125
Leu Asn Tyr Asn Thr Asn Ser Ser His Ala Leu Arg Gln Leu Arg Leu
            130                 135                 140
Thr Gln Leu Thr Glu Ile Leu Ser Gly Gly Val Tyr Ile Glu Lys Asn
145                 150                 155                 160
Asp Lys Leu Cys His Met Asp Thr Ile Asp Trp Arg Asp Ile Val Arg
                165                 170                 175
Asp Arg Asp Ala Glu Ile Val Val Lys Asp Asn Gly Arg Ser Cys Pro
            180                 185                 190
Pro Cys His Glu Val Cys Lys Gly Arg Cys Trp Gly Pro Gly Ser Glu
                195                 200                 205
Asp Cys Gln Thr Leu Thr Lys Thr Ile Cys Ala Pro Gln Cys Asn Gly
            210                 215                 220
His Cys Phe Gly Pro Asn Pro Asn Gln Cys Cys His Asp Glu Cys Ala
225                 230                 235                 240
Gly Gly Cys Ser Gly Pro Gln Asp Thr Asp Cys Phe Ala Cys Arg His
                245                 250                 255
Phe Asn Asp Ser Gly Ala Cys Val Pro Arg Cys Pro Gln Pro Leu Val
            260                 265                 270
Tyr Asn Lys Leu Thr Phe Gln Leu Glu Pro Asn Pro His Thr Lys Tyr
            275                 280                 285
Gln Tyr Gly Gly Val Cys Val Ala Ser Cys Pro His Asn Phe Val Val
            290                 295                 300
Asp Gln Thr Ser Cys Val Arg Ala Cys Pro Pro Asp Lys Met Glu Val
305                 310                 315                 320
Asp Lys Asn Gly Leu Lys Met Cys Glu Pro Cys Gly Gly Leu Cys Pro
                325                 330                 335
Lys Ala Cys Glu Gly Thr Gly Ser Gly Ser Arg Phe Gln Thr Val Asp
            340                 345                 350
Ser Ser Asn Ile Asp Gly Phe Val Asn Cys Thr Lys Ile Leu Gly Asn
            355                 360                 365
Leu Asp Phe Leu Ile Thr Gly Leu Asn Gly Asp Pro Trp His Lys Ile
            370                 375                 380
Pro Ala Leu Asp Pro Glu Lys Leu Asn Val Phe Arg Thr Val Arg Glu
385                 390                 395                 400
Ile Thr Gly Tyr Leu Asn Ile Gln Ser Trp Pro Pro His Met His Asn
                405                 410                 415
Phe Ser Val Phe Ser Asn Leu Thr Thr Ile Gly Gly Arg Ser Leu Tyr
                420                 425                 430
Asn Arg Gly Phe Ser Leu Leu Ile Met Lys Asn Leu Asn Val Thr Ser
            435                 440                 445
Leu Gly Phe Arg Ser Leu Lys Glu Ile Ser Ala Gly Arg Ile Tyr Ile
            450                 455                 460
Ser Ala Asn Arg Gln Leu Cys Tyr His His Ser Leu Asn Trp Thr Lys
465                 470                 475                 480
Val Leu Arg Gly Pro Thr Glu Glu Arg Leu Asp Ile Lys His Asn Arg
                485                 490                 495
Pro Arg Arg Asp Cys Val Ala Glu Gly Lys Val Cys Asp Pro Leu Cys
            500                 505                 510
Ser Ser Gly Gly Cys Trp Gly Pro Gly Pro Gly Gln Cys Leu Ser Cys
            515                 520                 525
Arg Asn Tyr Ser Arg Gly Gly Val Cys Val Thr His Cys Asn Phe Leu
            530                 535                 540
```

```
Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
            565                 570                 575

Gly Ser Asp Thr Cys Ala Gln Cys Ala His Phe Arg Asp Gly Pro His
        580                 585                 590

Cys Val Ser Ser Cys Pro His Gly Val Leu Gly Ala Lys Gly Pro Ile
    595                 600                 605

Tyr Lys Tyr Pro Asp Val Gln Asn Glu Cys Arg Pro Cys His Glu Asn
610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                645                 650                 655

Ile Ala Gly Leu Val Val Ile Phe Met Met Leu Gly Gly Thr Phe Leu
            660                 665                 670

Tyr Trp Arg Gly Arg Arg Ile Gln Asn Lys Arg Ala Met Arg Arg Tyr
        675                 680                 685

Leu Glu Arg Gly Glu Ser Ile Glu Pro Leu Asp Pro Ser Glu Lys Ala
    690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735

Ile Pro Glu Gly Glu Ser Ile Lys Ile Pro Val Cys Ile Lys Val Ile
            740                 745                 750

Glu Asp Lys Ser Gly Arg Gln Ser Phe Gln Ala Val Thr Asp His Met
        755                 760                 765

Leu Ala Ile Gly Ser Leu Asp His Ala His Ile Val Arg Leu Leu Gly
770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
                805                 810                 815

Gln Leu Leu Leu Asn Trp Gly Val Gln Ile Ala Lys Gly Met Tyr Tyr
            820                 825                 830

Leu Glu Glu His Gly Met Val His Arg Asn Leu Ala Ala Arg Asn Val
        835                 840                 845

Leu Leu Lys Ser Pro Ile Gln Val Gln Val Ala Asp Phe Gly Val Ala
    850                 855                 860

Asp Leu Leu Pro Pro Asp Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                885                 890                 895

Thr His Gln Ser Asp Val Trp Ser Tyr Gly Val Thr Val Trp Glu Leu
            900                 905                 910

Met Thr Phe Gly Ala Glu Pro Tyr Ala Gly Leu Arg Leu Ala Glu Val
        915                 920                 925

Pro Asp Leu Leu Glu Lys Gly Glu Arg Leu Ala Gln Pro Gln Ile Cys
    930                 935                 940

Thr Ile Asp Val Tyr Met Val Met Val Lys Cys Trp Met Ile Asp Glu
945                 950                 955                 960
```

```
Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
        980                 985                 990

Gly Ile Ala Pro Gly Pro Glu Pro His Gly Leu Thr Asn Lys Lys Leu
            995                 1000                1005

Glu Glu Val Glu Leu Glu Pro Glu Leu Asp Leu Asp Leu Asp Leu
    1010                1015                1020

Glu Ala Glu Glu Asp Asn Leu Ala Thr Thr Leu Gly Ser Ala
    1025                1030                1035

Leu Ser Leu Pro Val Gly Thr Leu Asn Arg Pro Arg Gly Ser Gln
    1040                1045                1050

Ser Leu Leu Ser Pro Ser Ser Gly Tyr Met Pro Met Asn Gln Gly
    1055                1060                1065

Asn Leu Gly Glu Ser Cys Gln Glu Ser Ala Val Ser Gly Ser Ser
    1070                1075                1080

Glu Arg Cys Pro Arg Pro Val Ser Leu His Pro Met Pro Arg Gly
    1085                1090                1095

Cys Leu Ala Ser Glu Ser Ser Glu Gly His Val Thr Gly Ser Glu
    1100                1105                1110

Ala Glu Leu Gln Glu Lys Val Ser Met Cys Arg Ser Arg Ser Arg
    1115                1120                1125

Ser Arg Ser Pro Arg Pro Arg Gly Asp Ser Ala Tyr His Ser Gln
    1130                1135                1140

Arg His Ser Leu Leu Thr Pro Val Thr Pro Leu Ser Pro Pro Gly
    1145                1150                1155

Leu Glu Glu Glu Asp Val Asn Gly Tyr Val Met Pro Asp Thr His
    1160                1165                1170

Leu Lys Gly Thr Pro Ser Ser Arg Glu Gly Thr Leu Ser Ser Val
    1175                1180                1185

Gly Leu Ser Ser Val Leu Gly Thr Glu Glu Glu Asp Glu Asp Glu
    1190                1195                1200

Glu Tyr Glu Tyr Met Asn Arg Arg Arg Arg His Ser Pro Pro His
    1205                1210                1215

Pro Pro Arg Pro Ser Ser Leu Glu Glu Leu Gly Tyr Glu Tyr Met
    1220                1225                1230

Asp Val Gly Ser Asp Leu Ser Ala Ser Leu Gly Ser Thr Gln Ser
    1235                1240                1245

Cys Pro Leu His Pro Val Pro Ile Met Pro Thr Ala Gly Thr Thr
    1250                1255                1260

Pro Asp Glu Asp Tyr Glu Tyr Met Asn Arg Gln Arg Asp Gly Gly
    1265                1270                1275

Gly Pro Gly Gly Asp Tyr Ala Ala Met Gly Ala Cys Pro Ala Ser
    1280                1285                1290

Glu Gln Gly Tyr Glu Glu Met Arg Ala Phe Gln Gly Pro Gly His
    1295                1300                1305

Gln Ala Pro His Val His Tyr Ala Arg Leu Lys Thr Leu Arg Ser
    1310                1315                1320

Leu Glu Ala Thr Asp Ser Ala Phe Asp Asn Pro Asp Tyr Trp His
    1325                1330                1335

Ser Arg Leu Phe Pro Lys Ala Asn Ala Gln Arg Thr
    1340                1345                1350
```

<210> SEQ ID NO 53
<211> LENGTH: 32
<212> TYPE: DNA
<213> ORGANISM: Artificial Sequence
<220> FEATURE:
<223> OTHER INFORMATION: HER3 mutagenesis primer (Fw)

<400> SEQUENCE: 53
aagggcggaa gacttgccca gcctcagatc tg            32

<210> SEQ ID NO 54
<211> LENGTH: 31
<212> TYPE: DNA
<213> ORGANISM: Artificial Sequence
<220> FEATURE:
<223> OTHER INFORMATION: HER3 mutagenesis primer (Rev)

<400> SEQUENCE: 54
aagtcttccg cccttttcca gcaggtcggg c             31

<210> SEQ ID NO 55
<211> LENGTH: 4053
<212> TYPE: DNA
<213> ORGANISM: Artificial Sequence
<220> FEATURE:
<223> OTHER INFORMATION: cDNA encoding Flag-HER3(E928G)

<400> SEQUENCE: 55
atgagagcca acgatgctct gcaggttctg ggcctgctgt tctctctggc tagaggcgat      60
tacaaggatg acgacgataa gtctgaagtg ggcaacagcc aggctgtgtg tcccggaaca     120
ctgaacggct tgtctgtgac aggcgacgcc gagaaccagt accagacact gtacaagctg     180
tacgagagat gcgaggtggt catgggcaac ctggaaatcg tgctgacagg ccacaacgcc     240
gacctgtctt tcctgcagtg gatcagagaa gtgaccggct acgtgctggt ggccatgaac     300
gagttcagca ccctgcctct gcctaacctg agagtcgtca gaggcaccca ggtgtacgat     360
ggcaagttcg ccatcttcgt gatgctgaac tacaacacca cagctctca cgccctgaga     420 cagctgagac tgacccagct gaccgagatc ctgtctggcg gagtgtacat cgagaagaac     480
gacaagctgt gccacatgga caccatcgac tggcgggata tcgtgcggga tagagatgcc     540
gagatcgtgg tcaaggacaa cggcagaagc tgccctcctt gccacgaagt gtgcaagggc     600
agatgttggg gccctggctc tgaggactgt cagaccctga ccaagaccat ctgcgcccct     660
cagtgtaacg gccactgctt cggccctaat cctaaccagt gctgccacga cgaatgcgct     720
ggcggatgtt ctggacctca ggacacagac tgcttcgcct gcagacactt caacgactct     780
ggcgcctgcg tgccaagatg tcctcagcct ctggtgtaca acaagctgac ctttcagctg     840
gaacccaatc ctcacaccaa gtaccagtac ggcggcgtgt gtgtggccag ctgtcctcac     900
aacttcgtgg tggaccagac cagctgtgtg cgggcttgtc ctcctgacaa gatggaagtg     960
gacaagaacg gcctgaagat gtgcgagcct tgcggcggac tgtgtcctaa ggcttgtgaa    1020
ggcacaggca gcggcagcag attccagaca gtggacagca gcaacatcga cggcttcgtg    1080
aactgcacca agatcctggg aaacctggac ttcctgatca ccggcctgaa cggcgatccc    1140
tggcataaga tccctgctct ggaccccgag aagctgaacg tgttcagaac cgtgcgcgag    1200
atcacaggct acctgaacat ccagagctgg cctccacaca tgcacaactt cagcgtgttc    1260
tccaacctga ccaccatcgg cggcagatcc ctgtacaaca ggggcttcag cctgctgatc    1320
atgaagaacc tgaatgtgac cagcctgggc ttcagaagcc tgaaagagat cagcgccggc    1380

```
agaatctaca tcagcgccaa cagacagctg tgctaccacc acagcctgaa ctggacaaag    1440
gtgctgagag cccccaccga ggaaagactg gacatcaagc acaacagacc tagaagagac    1500
tgcgtggccg agggcaaagt gtgcgaccct ctttgttcta gcggcggctg ttggggacca    1560
ggacctggac agtgtctctc ctgtagaaac tacagccgcg gaggcgtgtg cgtgacccac    1620
tgcaattttc tgaatggcga gcccagagag ttcgcccacg aggccgagtg tttcagctgt    1680
caccctgagt gccagcctat ggaaggcacc gctacatgta acggcagcgg ctctgatacc    1740
tgcgctcagt gcgcccactt tagagatggc cctcactgcg tgtcctcttg tcctcatggt    1800
gtcctgggcg ctaagggccc catctacaag taccctgacg tgcagaacga gtgcaggccc    1860
tgccacgaga actgtacaca gggatgcaag ggccctgagc tgcaggattg tctgggacag    1920
acactggtgc tgatcggcaa gacccacctg acaatggccc tgacagtgat cgctggcctg    1980
gtggtcatct ttatgatgct cggcggcacc ttcctgtatt ggagaggcag aagaatccag    2040
aacaagaggg ccatgcggag atacctggaa agaggcgaga gcatcgagcc actggaccct    2100
agcgagaagg ccaacaaggt gctggccaga atcttcaaag acagagctg cggaagctg    2160 aaggtgctcg gatctggcgt gttcggcaca gtgcacaaag gcgtgtggat ccctgagggc    2220
gagtccatca agatccccgt gtgcatcaaa gtgatcgagg acaagtccgg caggcagagc    2280
ttccaggccg tgacagatca catgctggct atcggcagcc tggatcacgc ccacatcgtt    2340
agactgctgg gactgtgccc tggcagctct ctgcagctcg tgacacagta tctgcctctg    2400
ggatctctgc tggaccacgt gcgacaacat agaggcgctc tgggacctca gctgctgctg    2460
aattggggag tgcagatcgc caagggcatg tactacctgg aagaacacgg catggtgcac    2520
agaaacctgg ccgccagaaa cgtgctgctc aagtctccta gccaggtgca ggtcgccgat    2580
ttcggagttg ctgatctcct gccacctgac gacaaacagc tgctgtactc cgaggccaag    2640
acacccatca gtggatggc cctggaatct atccacttcg gcaagtacac ccaccagagc    2700
gacgtgtggt cttacggcgt gacagtgtgg gagctgatga ccttcggagc cgagccttac    2760
gctggactga gactggctga agtgcccgac ctgctggaaa agggcggaag acttgcccag    2820
cctcagatct gtaccatcga cgtgtacatg gtcatggtca agtgctggat gatcgacgag    2880
aacatcagac ccacattcaa agagctggct aacgagttta cccggatggc cagagatcct    2940
cctagatacc tcgtgatcaa gagagagagc ggcctggca ttgctcctgg acctgaacct    3000
cacggactga ccaacaagaa gctggaagag gtcgaactgg aacccgagct ggacctggat    3060
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca gaagccgcag cagaagcaga agccctagac ctagaggcga cagcgcctac    3420
cactctcaga gacactcact gctgacccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcacccct gcctatcat gcctacagcc    3780
```

```
ggcaccacac cagacgagga ctatgagtat atgaatcggc agagagatgg cggcggacct    3840
ggcggagatt atgctgctat gggagcctgt cctgctagcg agcagggcta cgaagagatg    3900
agagcctttc aaggccctgg ccatcaggct cctcacgtgc actatgccag actgaaaacc    3960
ctgagatctc tggaagccac cgactccgcc ttcgacaacc tgactactg gcacagcaga     4020 ctgttcccca aggccaacgc tcagagaaca taa                                 4053
```

```
<210> SEQ ID NO 56
<211> LENGTH: 1350
<212> TYPE: PRT
<213> ORGANISM: Artificial Sequence
<220> FEATURE:
<223> OTHER INFORMATION: Flag-HER3(E928G)

<400> SEQUENCE: 56
```

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
                165                 170                 175

Asp Arg Asp Ala Glu Ile Val Val Lys Asp Asn Gly Arg Ser Cys Pro
            180                 185                 190

Pro Cys His Glu Val Cys Lys Gly Arg Cys Trp Gly Pro Gly Ser Glu
        195                 200                 205

Asp Cys Gln Thr Leu Thr Lys Thr Ile Cys Ala Pro Gln Cys Asn Gly
    210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
                245                 250                 255

Phe Asn Asp Ser Gly Ala Cys Val Pro Arg Cys Pro Gln Pro Leu Val
            260                 265                 270

Tyr Asn Lys Leu Thr Phe Gln Leu Glu Pro Asn Pro His Thr Lys Tyr
        275                 280                 285

Gln Tyr Gly Gly Val Cys Val Ala Ser Cys Pro His Asn Phe Val Val
    290                 295                 300

Asp Gln Thr Ser Cys Val Arg Ala Cys Pro Pro Asp Lys Met Glu Val
```

```
          305                 310                 315                 320
Asp Lys Asn Gly Leu Lys Met Cys Glu Pro Cys Gly Leu Cys Pro
                325                 330                 335

Lys Ala Cys Glu Gly Thr Gly Ser Gly Ser Arg Phe Gln Thr Val Asp
                340                 345                 350

Ser Ser Asn Ile Asp Gly Phe Val Asn Cys Thr Lys Ile Leu Gly Asn
                355                 360                 365

Leu Asp Phe Leu Ile Thr Gly Leu Asn Gly Asp Pro Trp His Lys Ile
            370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
                405                 410                 415

Phe Ser Val Phe Ser Asn Leu Thr Thr Ile Gly Gly Arg Ser Leu Tyr
                420                 425                 430

Asn Arg Gly Phe Ser Leu Leu Ile Met Lys Asn Leu Asn Val Thr Ser
            435                 440                 445

Leu Gly Phe Arg Ser Leu Lys Glu Ile Ser Ala Gly Arg Ile Tyr Ile
            450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
                485                 490                 495

Pro Arg Arg Asp Cys Val Ala Glu Gly Lys Val Cys Asp Pro Leu Cys
                500                 505                 510

Ser Ser Gly Gly Cys Trp Gly Pro Gly Pro Gly Gln Cys Leu Ser Cys
            515                 520                 525

Arg Asn Tyr Ser Arg Gly Gly Val Cys Val Thr His Cys Asn Phe Leu
            530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
                565                 570                 575

Gly Ser Asp Thr Cys Ala Gln Cys Ala His Phe Arg Asp Gly Pro His
            580                 585                 590

Cys Val Ser Ser Cys Pro His Gly Val Leu Gly Ala Lys Gly Pro Ile
            595                 600                 605

Tyr Lys Tyr Pro Asp Val Gln Asn Glu Cys Arg Pro Cys His Glu Asn
            610                 615                 620

Cys Thr Gln Gly Cys Lys Gly Pro Glu Leu Gln Asp Cys Leu Gly Gln
625                 630                 635                 640

Thr Leu Val Leu Ile Gly Lys Thr His Leu Thr Met Ala Leu Thr Val
                645                 650                 655

Ile Ala Gly Leu Val Val Ile Phe Met Met Leu Gly Gly Thr Phe Leu
                660                 665                 670

Tyr Trp Arg Gly Arg Arg Ile Gln Asn Lys Arg Ala Met Arg Arg Tyr
            675                 680                 685

Leu Glu Arg Gly Glu Ser Ile Glu Pro Leu Asp Pro Ser Glu Lys Ala
            690                 695                 700

Asn Lys Val Leu Ala Arg Ile Phe Lys Glu Thr Glu Leu Arg Lys Leu
705                 710                 715                 720

Lys Val Leu Gly Ser Gly Val Phe Gly Thr Val His Lys Gly Val Trp
                725                 730                 735
```

-continued

```
Ile Pro Glu Gly Glu Ser Ile Lys Ile Pro Val Cys Ile Lys Val Ile
            740                 745                 750

Glu Asp Lys Ser Gly Arg Gln Ser Phe Gln Ala Val Thr Asp His Met
            755                 760                 765

Leu Ala Ile Gly Ser Leu Asp His Ala His Ile Val Arg Leu Leu Gly
            770                 775                 780

Leu Cys Pro Gly Ser Ser Leu Gln Leu Val Thr Gln Tyr Leu Pro Leu
785                 790                 795                 800

Gly Ser Leu Leu Asp His Val Arg Gln His Arg Gly Ala Leu Gly Pro
                805                 810                 815

Gln Leu Leu Leu Asn Trp Gly Val Gln Ile Ala Lys Gly Met Tyr Tyr
            820                 825                 830

Leu Glu Glu His Gly Met Val His Arg Asn Leu Ala Ala Arg Asn Val
            835                 840                 845

Leu Leu Lys Ser Pro Ser Gln Val Gln Val Ala Asp Phe Gly Val Ala
            850                 855                 860

Asp Leu Leu Pro Pro Asp Asp Lys Gln Leu Leu Tyr Ser Glu Ala Lys
865                 870                 875                 880

Thr Pro Ile Lys Trp Met Ala Leu Glu Ser Ile His Phe Gly Lys Tyr
                885                 890                 895

Thr His Gln Ser Asp Val Trp Ser Tyr Gly Val Thr Val Trp Glu Leu
            900                 905                 910

Met Thr Phe Gly Ala Glu Pro Tyr Ala Gly Leu Arg Leu Ala Glu Val
            915                 920                 925

Pro Asp Leu Leu Glu Lys Gly Gly Arg Leu Ala Gln Pro Gln Ile Cys
            930                 935                 940

Thr Ile Asp Val Tyr Met Val Met Val Lys Cys Trp Met Ile Asp Glu
945                 950                 955                 960

Asn Ile Arg Pro Thr Phe Lys Glu Leu Ala Asn Glu Phe Thr Arg Met
                965                 970                 975

Ala Arg Asp Pro Pro Arg Tyr Leu Val Ile Lys Arg Glu Ser Gly Pro
            980                 985                 990

Gly Ile Ala Pro Gly Pro Glu Pro His Gly Leu Thr Asn Lys Lys Leu
            995                 1000                1005

Glu Glu Val Glu Leu Glu Pro Glu Leu Asp Leu Asp Leu Asp Leu
    1010                1015                1020

Glu Ala Glu Glu Asp Asn Leu Ala Thr Thr Thr Leu Gly Ser Ala
    1025                1030                1035

Leu Ser Leu Pro Val Gly Thr Leu Asn Arg Pro Arg Gly Ser Gln
    1040                1045                1050

Ser Leu Leu Ser Pro Ser Ser Gly Tyr Met Pro Met Asn Gln Gly
    1055                1060                1065

Asn Leu Gly Glu Ser Cys Gln Glu Ser Ala Val Ser Gly Ser Ser
    1070                1075                1080

Glu Arg Cys Pro Arg Pro Val Ser Leu His Pro Met Pro Arg Gly
    1085                1090                1095

Cys Leu Ala Ser Glu Ser Ser Glu Gly His Val Thr Gly Ser Glu
    1100                1105                1110

Ala Glu Leu Gln Glu Lys Val Ser Met Cys Arg Ser Arg Ser Arg
    1115                1120                1125

Ser Arg Ser Pro Arg Pro Arg Gly Asp Ser Ala Tyr His Ser Gln
    1130                1135                1140
```

-continued

```
Arg His Ser Leu Leu Thr Pro Val Thr Pro Leu Ser Pro Pro Gly
    1145                1150                1155

Leu Glu Glu Glu Asp Val Asn Gly Tyr Val Met Pro Asp Thr His
    1160                1165                1170

Leu Lys Gly Thr Pro Ser Ser Arg Glu Gly Thr Leu Ser Ser Val
    1175                1180                1185

Gly Leu Ser Ser Val Leu Gly Thr Glu Glu Glu Asp Glu Asp Glu
    1190                1195                1200

Glu Tyr Glu Tyr Met Asn Arg Arg Arg Arg His Ser Pro Pro His
    1205                1210                1215

Pro Pro Arg Pro Ser Ser Leu Glu Glu Leu Gly Tyr Glu Tyr Met
    1220                1225                1230

Asp Val Gly Ser Asp Leu Ser Ala Ser Leu Gly Ser Thr Gln Ser
    1235                1240                1245

Cys Pro Leu His Pro Val Pro Ile Met Pro Thr Ala Gly Thr Thr
    1250                1255                1260

Pro Asp Glu Asp Tyr Glu Tyr Met Asn Arg Gln Arg Asp Gly Gly
    1265                1270                1275

Gly Pro Gly Gly Asp Tyr Ala Ala Met Gly Ala Cys Pro Ala Ser
    1280                1285                1290

Glu Gln Gly Tyr Glu Glu Met Arg Ala Phe Gln Gly Pro Gly His
    1295                1300                1305

Gln Ala Pro His Val His Tyr Ala Arg Leu Lys Thr Leu Arg Ser
    1310                1315                1320

Leu Glu Ala Thr Asp Ser Ala Phe Asp Asn Pro Asp Tyr Trp His
    1325                1330                1335

Ser Arg Leu Phe Pro Lys Ala Asn Ala Gln Arg Thr
    1340                1345                1350

<210> SEQ ID NO 57
<211> LENGTH: 44
<212> TYPE: DNA
<213> ORGANISM: Artificial Sequence
<220> FEATURE:
<223> OTHER INFORMATION: HER2 IF primer (Fw)

<400> SEQUENCE: 57
aaattctaga gcggccgcgc caccatggag ctggcggcct tgtg            44

<210> SEQ ID NO 58
<211> LENGTH: 38
<212> TYPE: DNA
<213> ORGANISM: Artificial Sequence
<220> FEATURE:
<223> OTHER INFORMATION: HER2 IF primer (Rev)

<400> SEQUENCE: 58
aattggatcc gcggccgcct acactggcac gtccagac                   38

<210> SEQ ID NO 59
<211> LENGTH: 3768
<212> TYPE: DNA
<213> ORGANISM: Homo sapiens

<400> SEQUENCE: 59
atggagctgg cggccttgtg ccgctggggg ctcctcctcg ccctcttgcc cccggagcc      60 gcgagcaccc aagtgtgcac cggcacagac atgaagctgc ggctccctgc cagtcccgag    120
acccacctgg acatgctccg ccacctctac cagggctgcc aggtggtgca gggaaacctg    180
```

```
gaactcacct acctgcccac caatgccagc ctgtccttcc tgcaggatat ccaggaggtg    240
cagggctacg tgctcatcgc tcacaaccaa gtgaggcagg tcccactgca gaggctgcgg    300
attgtgcgag gcacccagct ctttgaggac aactatgccc tggccgtgct agacaatgga    360
gacccgctga acaataccac ccctgtcaca ggggcctccc caggaggcct gcgggagctg    420
cagcttcgaa gcctcacaga gatcttgaaa ggaggggtct tgatccagcg gaaccccag    480 ctctgctacc aggacacgat tttgtggaag gacatcttcc acaagaacaa ccagctggct    540
ctcacactga tagacaccaa ccgctctcgg gcctgccacc cctgttctcc gatgtgtaag    600
ggctcccgct gctggggaga gagttctgag gattgtcaga gcctgacgcg cactgtctgt    660
gccggtggct gtgcccgctg caaggggcca ctgcccactg actgctgcca tgagcagtgt    720
gctgccggct gcacgggccc caagcactct gactgcctgg cctgcctcca cttcaaccac    780
agtggcatct gtgagctgca ctgcccagcc ctggtcacct acaacacaga cacgtttgag    840
tccatgccca atcccgaggg ccggtataca ttcggcgcca gctgtgtgac tgcctgtccc    900
tacaactacc tttctacgga cgtgggatcc tgcacccteg tctgccccct gcacaaccaa    960
gaggtgacag cagaggatgg aacacagcgg tgtgagaagt gcagcaagcc ctgtgcccga   1020
gtgtgctatg gtctgggcat ggagcacttg cgagaggtga gggcagttac cagtgccaat   1080
atccaggagt ttgctggctg caagaagatc tttgggagcc tggcatttct gccggagagc   1140
tttgatgggg acccagcctc caacactgcc ccgctccagc cagagcagct ccaagtgttt   1200
gagactctgg aagagatcac aggttaccta tacatctcag catggccgga cagcctgcct   1260
gacctcagcg tcttccagaa cctgcaagta atccggggac gaattctgca caatggcgcc   1320
tactcgctga ccctgcaagg gctgggcatc agctggctgg ggctgcgctc actgagggaa   1380
ctgggcagtg gactggccct catccaccat aacacccacc tctgcttcgt gcacacggtg   1440
ccctgggacc agctctttcg gaacccgcac caagctctgc tccacactgc caaccggcca   1500
gaggacgagt gtgtgggcga gggcctggcc tgccaccagc tgtgcgcccg agggcactgc   1560 tgggtccag ggcccacccca gtgtgtcaac tgcagccagt tccttcgggg ccaggagtgc   1620
gtggaggaat gccgagtact gcagggctc cccagggagt atgtgaatgc caggcactgt   1680
ttgccgtgcc accctgagtg tcagcccag aatggctcag tgacctgttt tggaccggag   1740
gctgaccagt gtgtggcctg tgcccactat aaggaccctc ccttctgcgt ggcccgctgc   1800
cccagcggtg tgaaacctga cctctcctac atgcccatct ggaagtttcc agatgaggag   1860
ggcgcatgcc agccttgccc catcaactgc acccactcct gtgtggacct ggatgacaag   1920
ggctgccccg ccgagcagag agccagccct ctgacgtcca tcatctctgc ggtggttggc   1980
attctgctgt tcgtggtctt gggggtggtc tttgggatcc tcatcaagcg acggcagcag   2040
aagatccgga gtacacgat gcggagactg ctgcaggaaa cggagctggt ggagccgctg   2100
acacctagcg gagcgatgcc caaccaggcg cagatgcgga tcctgaaaga acggagctg    2160 aggaaggtga aggtgcttgg atctggcgct tttggcacag tctacaaggg catctggatc    2220
cctgatgggg agaatgtgaa aattccagtg gccatcaaag tgttgaggga aaacacatcc    2280
cccaaagcca acaaagaaat cttagacgaa gcatacgtga tggctggtgt gggctcccca    2340
tatgtctccc gccttctggg catctgcctg acatccacgg tgcagctggt gacacagctt    2400 atgcccatg gctgcctctt agaccatgtc cgggaaaacc gcggacgcct gggctcccag    2460
gacctgctga actggtgtat gcagattgcc aaggggatga gctacctgga ggatgtgcgg    2520
```

-continued

| | |
|---|---|
| ctcgtacaca gggacttggc cgctcggaac gtgctggtca agagtcccaa ccatgtcaaa | 2580 |
| attacagact tcgggctggc tcggctgctg gacattgacg agacagagta ccatgcagat | 2640 |
| gggggcaagg tgcccatcaa gtggatggcg ctggagtcca ttctccgccg gcggttcacc | 2700 |
| caccagagtg atgtgtggag ttatggtgtg actgtgtggg agctgatgac ttttgggggcc | 2760 |
| aaaccttacg atgggatccc agcccgggag atccctgacc tgctggaaaa ggggagcgg | 2820 |
| ctgccccagc cccccatctg caccattgat gtctacatga tcatggtcaa atgttggatg | 2880 |
| attgactctg aatgtcggcc aagattccgg gagttggtgt ctgaattctc ccgcatggcc | 2940 |
| agggaccccc agcgctttgt ggtcatccag aatgaggact tgggcccagc cagtcccttg | 3000 |
| gacagcacct tctaccgctc actgctggag gacgatgaca tgggggacct ggtggatgct | 3060 |
| gaggagtatc tggtaccccca gcagggcttc ttctgtccag accctgcccc gggcgctggg | 3120 |
| ggcatggtcc accacaggca ccgcagctca tctaccagga gtggcggtgg ggacctgaca | 3180 |
| ctagggctgg agccctctga agaggaggcc cccaggtctc cactggcacc ctccgaaggg | 3240 |
| gctggctccg atgtatttga tggtgacctg ggaatggggg cagccaaggg gctgcaaagc | 3300 |
| ctccccacac atgaccccag ccctctacag cggtacagtg aggaccccac agtaccctg | 3360 |
| ccctctgaga ctgatggcta cgttgccccc ctgacctgca gccccagcc tgaatatgtg | 3420 |
| aaccagccag atgttcggcc ccagccccct tcgccccgag agggccctct gcctgctgcc | 3480 |
| cgacctgctg gtgccactct ggaaaggccc aagactctct ccccagggaa gaatggggtc | 3540 |
| gtcaaagacg tttttgcctt tgggggtgcc gtggagaacc ccgagtactt gacaccccag | 3600 |
| ggaggagctg cccctcagcc ccaccctcct cctgccttca gcccagcctt cgacaacctc | 3660 |
| tattactggg accaggaccc accagagcgg ggggctccac ccagcacctt caaagggaca | 3720 |
| cctacggcag agaacccaga gtacctgggt ctggacgtgc cagtgtag | 3768 |

<210> SEQ ID NO 60
<211> LENGTH: 1255
<212> TYPE: PRT
<213> ORGANISM: Homo sapiens

<400> SEQUENCE: 60

Met Glu Leu Ala Ala Leu Cys Arg Trp Gly Leu Leu Ala Leu Leu
1               5                   10                  15

Pro Pro Gly Ala Ala Ser Thr Gln Val Cys Thr Gly Thr Asp Met Lys
            20                  25                  30

Leu Arg Leu Pro Ala Ser Pro Glu Thr His Leu Asp Met Leu Arg His
        35                  40                  45

Leu Tyr Gln Gly Cys Gln Val Val Gln Gly Asn Leu Glu Leu Thr Tyr
    50                  55                  60

Leu Pro Thr Asn Ala Ser Leu Ser Phe Leu Gln Asp Ile Gln Glu Val
65                  70                  75                  80

Gln Gly Tyr Val Leu Ile Ala His Asn Gln Val Arg Gln Val Pro Leu
                85                  90                  95

Gln Arg Leu Arg Ile Val Arg Gly Thr Gln Leu Phe Glu Asp Asn Tyr
            100                 105                 110

Ala Leu Ala Val Leu Asp Asn Gly Asp Pro Leu Asn Asn Thr Thr Pro
        115                 120                 125

Val Thr Gly Ala Ser Pro Gly Gly Leu Arg Glu Leu Gln Leu Arg Ser
    130                 135                 140

Leu Thr Glu Ile Leu Lys Gly Gly Val Leu Ile Gln Arg Asn Pro Gln
145                 150                 155                 160

```
Leu Cys Tyr Gln Asp Thr Ile Leu Trp Lys Asp Ile Phe His Lys Asn
                165                 170                 175

Asn Gln Leu Ala Leu Thr Leu Ile Asp Thr Asn Arg Ser Arg Ala Cys
            180                 185                 190

His Pro Cys Ser Pro Met Cys Lys Gly Ser Arg Cys Trp Gly Glu Ser
        195                 200                 205

Ser Glu Asp Cys Gln Ser Leu Thr Arg Thr Val Cys Ala Gly Gly Cys
    210                 215                 220

Ala Arg Cys Lys Gly Pro Leu Pro Thr Asp Cys Cys His Glu Gln Cys
225                 230                 235                 240

Ala Ala Gly Cys Thr Gly Pro Lys His Ser Asp Cys Leu Ala Cys Leu
                245                 250                 255

His Phe Asn His Ser Gly Ile Cys Glu Leu His Cys Pro Ala Leu Val
            260                 265                 270

Thr Tyr Asn Thr Asp Thr Phe Glu Ser Met Pro Asn Pro Glu Gly Arg
        275                 280                 285

Tyr Thr Phe Gly Ala Ser Cys Val Thr Ala Cys Pro Tyr Asn Tyr Leu
    290                 295                 300

Ser Thr Asp Val Gly Ser Cys Thr Leu Val Cys Pro Leu His Asn Gln
305                 310                 315                 320

Glu Val Thr Ala Glu Asp Gly Thr Gln Arg Cys Glu Lys Cys Ser Lys
                325                 330                 335

Pro Cys Ala Arg Val Cys Tyr Gly Leu Gly Met Glu His Leu Arg Glu
            340                 345                 350

Val Arg Ala Val Thr Ser Ala Asn Ile Gln Glu Phe Ala Gly Cys Lys
        355                 360                 365

Lys Ile Phe Gly Ser Leu Ala Phe Leu Pro Glu Ser Phe Asp Gly Asp
    370                 375                 380

Pro Ala Ser Asn Thr Ala Pro Leu Gln Pro Glu Gln Leu Gln Val Phe
385                 390                 395                 400

Glu Thr Leu Glu Glu Ile Thr Gly Tyr Leu Tyr Ile Ser Ala Trp Pro
                405                 410                 415

Asp Ser Leu Pro Asp Leu Ser Val Phe Gln Asn Leu Gln Val Ile Arg
            420                 425                 430

Gly Arg Ile Leu His Asn Gly Ala Tyr Ser Leu Thr Leu Gln Gly Leu
        435                 440                 445

Gly Ile Ser Trp Leu Gly Leu Arg Ser Leu Arg Glu Leu Gly Ser Gly
    450                 455                 460

Leu Ala Leu Ile His His Asn Thr His Leu Cys Phe Val His Thr Val
465                 470                 475                 480

Pro Trp Asp Gln Leu Phe Arg Asn Pro His Gln Ala Leu Leu His Thr
                485                 490                 495

Ala Asn Arg Pro Glu Asp Glu Cys Val Gly Glu Gly Leu Ala Cys His
            500                 505                 510

Gln Leu Cys Ala Arg Gly His Cys Trp Gly Pro Gly Pro Thr Gln Cys
        515                 520                 525

Val Asn Cys Ser Gln Phe Leu Arg Gly Gln Glu Cys Val Glu Glu Cys
    530                 535                 540

Arg Val Leu Gln Gly Leu Pro Arg Glu Tyr Val Asn Ala Arg His Cys
545                 550                 555                 560

Leu Pro Cys His Pro Glu Cys Gln Pro Gln Asn Gly Ser Val Thr Cys
                565                 570                 575
```

```
Phe Gly Pro Glu Ala Asp Gln Cys Val Ala Cys Ala His Tyr Lys Asp
            580                 585                 590
Pro Pro Phe Cys Val Ala Arg Cys Pro Ser Gly Val Lys Pro Asp Leu
        595                 600                 605
Ser Tyr Met Pro Ile Trp Lys Phe Pro Asp Glu Glu Gly Ala Cys Gln
    610                 615                 620
Pro Cys Pro Ile Asn Cys Thr His Ser Cys Val Asp Leu Asp Asp Lys
625                 630                 635                 640
Gly Cys Pro Ala Glu Gln Arg Ala Ser Pro Leu Thr Ser Ile Ile Ser
                645                 650                 655
Ala Val Val Gly Ile Leu Leu Val Val Val Leu Gly Val Val Phe Gly
            660                 665                 670
Ile Leu Ile Lys Arg Arg Gln Gln Lys Ile Arg Lys Tyr Thr Met Arg
        675                 680                 685
Arg Leu Leu Gln Glu Thr Glu Leu Val Glu Pro Leu Thr Pro Ser Gly
    690                 695                 700
Ala Met Pro Asn Gln Ala Gln Met Arg Ile Leu Lys Glu Thr Glu Leu
705                 710                 715                 720
Arg Lys Val Lys Val Leu Gly Ser Gly Ala Phe Gly Thr Val Tyr Lys
                725                 730                 735
Gly Ile Trp Ile Pro Asp Gly Glu Asn Val Lys Ile Pro Val Ala Ile
            740                 745                 750
Lys Val Leu Arg Glu Asn Thr Ser Pro Lys Ala Asn Lys Glu Ile Leu
        755                 760                 765
Asp Glu Ala Tyr Val Met Ala Gly Val Gly Ser Pro Tyr Val Ser Arg
    770                 775                 780
Leu Leu Gly Ile Cys Leu Thr Ser Thr Val Gln Leu Val Thr Gln Leu
785                 790                 795                 800
Met Pro Tyr Gly Cys Leu Leu Asp His Val Arg Glu Asn Arg Gly Arg
                805                 810                 815
Leu Gly Ser Gln Asp Leu Leu Asn Trp Cys Met Gln Ile Ala Lys Gly
            820                 825                 830
Met Ser Tyr Leu Glu Asp Val Arg Leu Val His Arg Asp Leu Ala Ala
        835                 840                 845
Arg Asn Val Leu Val Lys Ser Pro Asn His Val Lys Ile Thr Asp Phe
850                 855                 860
Gly Leu Ala Arg Leu Leu Asp Ile Asp Glu Thr Glu Tyr His Ala Asp
865                 870                 875                 880
Gly Gly Lys Val Pro Ile Lys Trp Met Ala Leu Glu Ser Ile Leu Arg
                885                 890                 895
Arg Arg Phe Thr His Gln Ser Asp Val Trp Ser Tyr Gly Val Thr Val
            900                 905                 910
Trp Glu Leu Met Thr Phe Gly Ala Lys Pro Tyr Asp Gly Ile Pro Ala
        915                 920                 925
Arg Glu Ile Pro Asp Leu Leu Glu Lys Gly Glu Arg Leu Pro Gln Pro
    930                 935                 940
Pro Ile Cys Thr Ile Asp Val Tyr Met Ile Met Val Lys Cys Trp Met
945                 950                 955                 960
Ile Asp Ser Glu Cys Arg Pro Arg Phe Arg Glu Leu Val Ser Glu Phe
                965                 970                 975
Ser Arg Met Ala Arg Asp Pro Gln Arg Phe Val Val Ile Gln Asn Glu
            980                 985                 990
Asp Leu Gly Pro Ala Ser Pro Leu  Asp Ser Thr Phe Tyr  Arg Ser Leu
```

```
                995              1000                1005
Leu Glu Asp Asp Met Gly Asp Leu Val Asp Ala Glu Glu Tyr
    1010            1015                1020

Leu Val Pro Gln Gln Gly Phe Phe Cys Pro Asp Pro Ala Pro Gly
    1025            1030                1035

Ala Gly Gly Met Val His His Arg His Arg Ser Ser Ser Thr Arg
    1040            1045                1050

Ser Gly Gly Gly Asp Leu Thr Leu Gly Leu Glu Pro Ser Glu Glu
    1055            1060                1065

Glu Ala Pro Arg Ser Pro Leu Ala Pro Ser Glu Gly Ala Gly Ser
    1070            1075                1080

Asp Val Phe Asp Gly Asp Leu Gly Met Gly Ala Ala Lys Gly Leu
    1085            1090                1095

Gln Ser Leu Pro Thr His Asp Pro Ser Pro Leu Gln Arg Tyr Ser
    1100            1105                1110

Glu Asp Pro Thr Val Pro Leu Pro Ser Glu Thr Asp Gly Tyr Val
    1115            1120                1125

Ala Pro Leu Thr Cys Ser Pro Gln Pro Glu Tyr Val Asn Gln Pro
    1130            1135                1140

Asp Val Arg Pro Gln Pro Pro Ser Pro Arg Glu Gly Pro Leu Pro
    1145            1150                1155

Ala Ala Arg Pro Ala Gly Ala Thr Leu Glu Arg Pro Lys Thr Leu
    1160            1165                1170

Ser Pro Gly Lys Asn Gly Val Val Lys Asp Val Phe Ala Phe Gly
    1175            1180                1185

Gly Ala Val Glu Asn Pro Glu Tyr Leu Thr Pro Gln Gly Gly Ala
    1190            1195                1200

Ala Pro Gln Pro His Pro Pro Pro Ala Phe Ser Pro Ala Phe Asp
    1205            1210                1215

Asn Leu Tyr Tyr Trp Asp Gln Asp Pro Pro Glu Arg Gly Ala Pro
    1220            1225                1230

Pro Ser Thr Phe Lys Gly Thr Pro Thr Ala Glu Asn Pro Glu Tyr
    1235            1240                1245

Leu Gly Leu Asp Val Pro Val
    1250            1255

<210> SEQ ID NO 61
<211> LENGTH: 25
<212> TYPE: DNA
<213> ORGANISM: Artificial Sequence
<220> FEATURE:
<223> OTHER INFORMATION: HER3 primer (Fw)

<400> SEQUENCE: 61
gctctcacgc cctgagacag ctgag                                25

<210> SEQ ID NO 62
<211> LENGTH: 25
<212> TYPE: DNA
<213> ORGANISM: Artificial Sequence
<220> FEATURE:
<223> OTHER INFORMATION: HER3 primer (Rev)

<400> SEQUENCE: 62
gttccctctc tagagctagg ggtgc                                25

<210> SEQ ID NO 63
```

```
<211> LENGTH: 25
<212> TYPE: DNA
<213> ORGANISM: Artificial Sequence
<220> FEATURE:
<223> OTHER INFORMATION: HER2 primer (Fw)

<400> SEQUENCE: 63
acctgacctc tcctacatgc ccatc                                    25

<210> SEQ ID NO 64
<211> LENGTH: 25
<212> TYPE: DNA
<213> ORGANISM: Artificial Sequence
<220> FEATURE:
<223> OTHER INFORMATION: HER2 primer (Rev)

<400> SEQUENCE: 64
ccccatctgc atggtactct gtctc                                    25

<210> SEQ ID NO 65
<211> LENGTH: 31
<212> TYPE: DNA
<213> ORGANISM: Artificial Sequence
<220> FEATURE:
<223> OTHER INFORMATION: HER3 mutagenesis primer (Fw)

<400> SEQUENCE: 65
ggacctagac tgctgctgaa ttggggagtg c                             31

<210> SEQ ID NO 66
<211> LENGTH: 30
<212> TYPE: DNA
<213> ORGANISM: Artificial Sequence
<220> FEATURE:
<223> OTHER INFORMATION: HER3 mutagenesis primer (Rev)

<400> SEQUENCE: 66
cagcagtcta ggtcccagag cgcctctatg                               30

<210> SEQ ID NO 67
<211> LENGTH: 4053
<212> TYPE: DNA
<213> ORGANISM: Artificial Sequence
<220> FEATURE:
<223> OTHER INFORMATION: cDNA encoding Flag-HER3(Q809R)

<400> SEQUENCE: 67
atgagagcca acgatgctct gcaggttctg ggcctgctgt tctctctggc tagaggcgat    60
tacaaggatg acgacgataa gtctgaagtg gcaacagcc aggctgtgtg tcccggaaca   120
ctgaacggct tgtctgtgac aggcgacgcc gagaaccagt accagacact gtacaagctg   180
tacgagagat gcgaggtggt catgggcaac ctggaaatcg tgctgacagg ccacaacgcc   240
gacctgtctt tcctgcagtg gatcagagaa gtgaccggct acgtgctggt ggccatgaac   300
gagttcagca ccctgcctct gcctaacctg agagtcgtca gaggcaccca ggtgtacgat   360
ggcaagttcg ccatcttcgt gatgctgaac tacaacacca acagctctca cgccctgaga   420
cagctgagac tgacccagct gaccgagatc tgtctggcg gagtgtacat cgagaagaac   480
gacaagctgt gccacatgga caccatcgac tggcgggata tcgtgcggga tagagatgcc   540
gagatcgtgg tcaaggacaa cggcagaagc tgcctcctt gccacgaagt gtgcaagggc   600
agatgttggg gcctggctc tgaggactgt cagaccctga ccaagaccat ctgcgcccct   660
cagtgtaacg gccactgctt cggccctaat cctaaccagt gctgccacga cgaatgcgct   720
```

```
ggcggatgtt ctggacctca ggacacagac tgcttcgcct gcagacactt caacgactct    780
ggcgcctgcg tgccaagatg tcctcagcct ctggtgtaca acaagctgac ctttcagctg    840
gaacccaatc ctcacaccaa gtaccagtac ggcggcgtgt gtgtggccag ctgtcctcac    900
aacttcgtgg tggaccagac cagctgtgtg cgggcttgtc ctcctgacaa gatggaagtg    960
gacaagaacg gcctgaagat gtgcgagcct tgcggcggac tgtgtcctaa ggcttgtgaa   1020
ggcacaggca gcggcagcag attccagaca gtggacagca gcaacatcga cggcttcgtg   1080
aactgcacca agatcctggg aaacctggac ttcctgatca ccggcctgaa cggcgatccc   1140
tggcataaga tccctgctct ggaccccgag aagctgaacg tgttcagaac cgtgcgcgag   1200
atcacaggct acctgaacat ccagagctgg cctccacaca tgcacaactt cagcgtgttc   1260
tccaacctga ccaccatcgg cggcagatcc ctgtacaaca ggggcttcag cctgctgatc   1320
atgaagaacc tgaatgtgac cagcctgggc ttcagaagcc tgaaagagat cagcgccggc   1380
agaatctaca tcagcgccaa cagacagctg tgctaccacc acagcctgaa ctggacaaag   1440
gtgctgagag cccccaccga ggaaagactg gacatcaagc acaacagacc tagaagagac   1500
tgcgtggccg agggcaaagt gtgcgaccct ctttgttcta gcggcggctg ttggggacca   1560
ggacctggac agtgtctctc ctgtagaaac tacagccgcg gaggcgtgtg cgtgacccac   1620
tgcaattttc tgaatggcga gcccagagag ttcgcccacg aggccgagtg tttcagctgt   1680
caccctgagt gccagcctat ggaaggcacc gctacatgta acggcagcgg ctctgatacc   1740
tgcgctcagt gcgcccactt tagagatggc cctcactgcg tgtcctcttg tcctcatggt   1800
gtcctgggcg ctaagggccc catctacaag taccctgacg tgcagaacga gtgcaggccc   1860
tgccacgaga actgtacaca gggatgcaag ggccctgagc tgcaggattg tctgggacag   1920
acactggtgc tgatcggcaa gacccacctg acaatggccc tgacagtgat cgctggcctg   1980
gtggtcatct ttatgatgct cggcggcacc ttcctgtatt ggagaggcag aagaatccag   2040
aacaagaggg ccatgcggag atacctggaa agaggcgaga gcatcgagcc actggaccct   2100
agcgagaagg ccaacaaggt gctggccaga atcttcaaag acacagagct gcggaagctg   2160
aaggtgctcg gatctggcgt gttcggcaca gtgcacaaag cgtgtggat ccctgagggc   2220 gagtccatca agatccccgt gtgcatcaaa gtgatcgagg acaagtccgg caggcagagc   2280
ttccaggccg tgacagatca catgctggct atcggcagcc tggatcacgc ccacatcgtt   2340
agactgctgg gactgtgccc tggcagctct ctgcagctcg tgacacagta tctgcctctg   2400
ggatctctgc tggaccacgt gcgacaacat agaggcgctc tgggacctag actgctgctg   2460
aattggggag ttcagatcgc caagggcatg tactacctgg aagaacacgg catggtgcac   2520
agaaacctgg ccgccagaaa cgtgctgctc aagtctccta gccaggtgca ggtcgccgat   2580
ttcggagttg ctgatctcct gccacctgac gacaaacagc tgctgtactc cgaggccaag   2640
acacccatca gtggatggc cctggaatct atccacttcg gcaagtacac ccaccagagc   2700
gacgtgtggt cttacggcgt gacagtgtgg gagctgatga ccttcggagc cgagccttac   2760
gctggactga gactggctga agtgcccgac ctgctggaaa agggcgaaag acttgcccag   2820
cctcagatct gtaccatcga cgtgtacatg gtcatggtca agtgctggat gatcgacgag   2880
aacatcagac ccacattcaa agagctggct aacgagtttta cccggatggc cagagatcct   2940
cctagatacc tcgtgatcaa gagagagagc ggccctggca ttgctcctgg acctgaacct   3000
cacggactga ccaacaagaa gctggaagag gtcgaactgg aacccgagct ggacctggat   3060
```

```
ctcgacctgg aagccgaaga ggataacctg gccaccacaa cactgggctc tgctctgagt    3120
ctgcctgtgg gcacactgaa cagaccaaga ggaagccaga gcctgctgtc tccaagcagc    3180
ggctacatgc ctatgaacca gggcaatctg ggcgagagct gtcaagagtc tgccgtgtct    3240
ggcagcagcg agagatgtcc tagacctgtg tctctgcacc ccatgcctag aggctgtctg    3300
gcttctgagt ctagcgaggg acacgtgaca ggatccgagg ccgaactgca agagaaagtg    3360
tctatgtgca aagccgcag cagaagcaga agccctagac ctagaggcga cagcgcctac    3420
```
(Note: "aagccgcag" reading uncertain)
```
cactctcaga gacactcact gctgaccct gtgacacctc tgtctccacc tggactcgag    3480
gaagaggacg tcaacggata cgtgatgccc gacacacacc tgaagggcac ccctagctct    3540
agagagggaa ccctgagtag cgtgggcctg agttctgtgc tgggcaccga agaggaagat    3600
gaggacgagg aatacgagta catgaacaga gaaggcggc acagccctcc acatcctcca    3660
agacctagca gcctcgagga actgggctac gagtatatgg acgtgggcag cgatctgagc    3720
gctagcctgg gatctacaca gtcttgccca ctgcaccctg tgcctatcat gcctacagcc    3780
ggcaccacac cagacgagga ctatgagtat atgaatcggc agagagatgg cggcggacct    3840
ggcggagatt atgctgctat gggagcctgt cctgctagcg agcagggcta cgaagagatg    3900 agagccttc aaggccctgg ccatcaggct cctcacgtgc actatgccag actgaaaacc    3960
ctgagatctc tggaagccac cgactccgcc ttcgacaacc tgactactg cacagcaga    4020 ctgttcccca aggccaacgc tcagagaaca taa                                 4053
```

<210> SEQ ID NO 68
<211> LENGTH: 1350
<212> TYPE: PRT
<213> ORGANISM: Artificial Sequence
<220> FEATURE:
<223> OTHER INFORMATION: Flag-HER3(Q809R)

<400> SEQUENCE: 68

```
Met Arg Ala Asn Asp Ala Leu Gln Val Leu Gly Leu Leu Phe Ser Leu
1               5                   10                  15

Ala Arg Gly Asp Tyr Lys Asp Asp Asp Lys Ser Glu Val Gly Asn
            20                  25                  30

Ser Gln Ala Val Cys Pro Gly Thr Leu Asn Gly Leu Ser Val Thr Gly
        35                  40                  45

Asp Ala Glu Asn Gln Tyr Gln Thr Leu Tyr Lys Leu Tyr Glu Arg Cys
    50                  55                  60

Glu Val Val Met Gly Asn Leu Glu Ile Val Leu Thr Gly His Asn Ala
65                  70                  75                  80

Asp Leu Ser Phe Leu Gln Trp Ile Arg Glu Val Thr Gly Tyr Val Leu
                85                  90                  95

Val Ala Met Asn Glu Phe Ser Thr Leu Pro Leu Pro Asn Leu Arg Val
            100                 105                 110

Val Arg Gly Thr Gln Val Tyr Asp Gly Lys Phe Ala Ile Phe Val Met
        115                 120                 125

Leu Asn Tyr Asn Thr Asn Ser Ser His Ala Leu Arg Gln Leu Arg Leu
    130                 135                 140

Thr Gln Leu Thr Glu Ile Leu Ser Gly Gly Val Tyr Ile Glu Lys Asn
145                 150                 155                 160

Asp Lys Leu Cys His Met Asp Thr Ile Asp Trp Arg Asp Ile Val Arg
                165                 170                 175

Asp Arg Asp Ala Glu Ile Val Val Lys Asp Asn Gly Arg Ser Cys Pro
            180                 185                 190
```

```
Pro Cys His Glu Val Cys Lys Gly Arg Cys Trp Gly Pro Gly Ser Glu
        195                 200                 205

Asp Cys Gln Thr Leu Thr Lys Thr Ile Cys Ala Pro Gln Cys Asn Gly
    210                 215                 220

His Cys Phe Gly Pro Asn Pro Asn Gln Cys Cys His Asp Glu Cys Ala
225                 230                 235                 240

Gly Gly Cys Ser Gly Pro Gln Asp Thr Asp Cys Phe Ala Cys Arg His
                245                 250                 255

Phe Asn Asp Ser Gly Ala Cys Val Pro Arg Cys Pro Gln Pro Leu Val
            260                 265                 270

Tyr Asn Lys Leu Thr Phe Gln Leu Glu Pro Asn Pro His Thr Lys Tyr
            275                 280                 285

Gln Tyr Gly Gly Val Cys Val Ala Ser Cys Pro His Asn Phe Val Val
            290                 295                 300

Asp Gln Thr Ser Cys Val Arg Ala Cys Pro Pro Asp Lys Met Glu Val
305                 310                 315                 320

Asp Lys Asn Gly Leu Lys Met Cys Glu Pro Cys Gly Gly Leu Cys Pro
                325                 330                 335

Lys Ala Cys Glu Gly Thr Gly Ser Gly Ser Arg Phe Gln Thr Val Asp
            340                 345                 350

Ser Ser Asn Ile Asp Gly Phe Val Asn Cys Thr Lys Ile Leu Gly Asn
            355                 360                 365

Leu Asp Phe Leu Ile Thr Gly Leu Asn Gly Asp Pro Trp His Lys Ile
    370                 375                 380

Pro Ala Leu Asp Pro Glu Lys Leu Asn Val Phe Arg Thr Val Arg Glu
385                 390                 395                 400

Ile Thr Gly Tyr Leu Asn Ile Gln Ser Trp Pro Pro His Met His Asn
                405                 410                 415

Phe Ser Val Phe Ser Asn Leu Thr Thr Ile Gly Gly Arg Ser Leu Tyr
            420                 425                 430

Asn Arg Gly Phe Ser Leu Leu Ile Met Lys Asn Leu Asn Val Thr Ser
        435                 440                 445

Leu Gly Phe Arg Ser Leu Lys Glu Ile Ser Ala Gly Arg Ile Tyr Ile
    450                 455                 460

Ser Ala Asn Arg Gln Leu Cys Tyr His His Ser Leu Asn Trp Thr Lys
465                 470                 475                 480

Val Leu Arg Gly Pro Thr Glu Glu Arg Leu Asp Ile Lys His Asn Arg
            485                 490                 495

Pro Arg Arg Asp Cys Val Ala Glu Gly Lys Val Cys Asp Pro Leu Cys
            500                 505                 510

Ser Ser Gly Gly Cys Trp Gly Pro Gly Pro Gly Gln Cys Leu Ser Cys
            515                 520                 525

Arg Asn Tyr Ser Arg Gly Gly Val Cys Val Thr His Cys Asn Phe Leu
    530                 535                 540

Asn Gly Glu Pro Arg Glu Phe Ala His Glu Ala Glu Cys Phe Ser Cys
545                 550                 555                 560

His Pro Glu Cys Gln Pro Met Glu Gly Thr Ala Thr Cys Asn Gly Ser
                565                 570                 575

Gly Ser Asp Thr Cys Ala Gln Cys Ala His Phe Arg Asp Gly Pro His
            580                 585                 590

Cys Val Ser Ser Cys Pro His Gly Val Leu Gly Ala Lys Gly Pro Ile
    595                 600                 605
```

```
Tyr Lys Tyr Pro Asp Val Gln Asn Glu Cys Arg Pro Cys His Glu Asn
    610             615                 620
Cys Thr Gln Gly Cys Lys Gly Pro Glu Leu Gln Asp Cys Leu Gly Gln
625             630                 635                 640
Thr Leu Val Leu Ile Gly Lys Thr His Leu Thr Met Ala Leu Thr Val
                645                 650                 655
Ile Ala Gly Leu Val Val Ile Phe Met Met Leu Gly Gly Thr Phe Leu
                660                 665                 670
Tyr Trp Arg Gly Arg Arg Ile Gln Asn Lys Arg Ala Met Arg Arg Tyr
            675                 680                 685
Leu Glu Arg Gly Glu Ser Ile Glu Pro Leu Asp Pro Ser Glu Lys Ala
690                 695                 700
Asn Lys Val Leu Ala Arg Ile Phe Lys Glu Thr Glu Leu Arg Lys Leu
705             710                 715                 720
Lys Val Leu Gly Ser Gly Val Phe Gly Thr Val His Lys Gly Val Trp
                725                 730                 735
Ile Pro Glu Gly Glu Ser Ile Lys Ile Pro Val Cys Ile Lys Val Ile
                740                 745                 750
Glu Asp Lys Ser Gly Arg Gln Ser Phe Gln Ala Val Thr Asp His Met
            755                 760                 765
Leu Ala Ile Gly Ser Leu Asp His Ala His Ile Val Arg Leu Leu Gly
770             775                 780
Leu Cys Pro Gly Ser Ser Leu Gln Leu Val Thr Gln Tyr Leu Pro Leu
785             790                 795                 800
Gly Ser Leu Leu Asp His Val Arg Gln His Arg Gly Ala Leu Gly Pro
                805                 810                 815
Arg Leu Leu Leu Asn Trp Gly Val Gln Ile Ala Lys Gly Met Tyr Tyr
            820                 825                 830
Leu Glu Glu His Gly Met Val His Arg Asn Leu Ala Ala Arg Asn Val
            835                 840                 845
Leu Leu Lys Ser Pro Ser Gln Val Gln Val Ala Asp Phe Gly Val Ala
850                 855                 860
Asp Leu Leu Pro Pro Asp Asp Lys Gln Leu Leu Tyr Ser Glu Ala Lys
865                 870                 875                 880
Thr Pro Ile Lys Trp Met Ala Leu Glu Ser Ile His Phe Gly Lys Tyr
                885                 890                 895
Thr His Gln Ser Asp Val Trp Ser Tyr Gly Val Thr Val Trp Glu Leu
            900                 905                 910
Met Thr Phe Gly Ala Glu Pro Tyr Ala Gly Leu Arg Leu Ala Glu Val
            915                 920                 925
Pro Asp Leu Leu Glu Lys Gly Glu Arg Leu Ala Gln Pro Gln Ile Cys
930                 935                 940
Thr Ile Asp Val Tyr Met Val Met Val Lys Cys Trp Met Ile Asp Glu
945                 950                 955                 960
Asn Ile Arg Pro Thr Phe Lys Glu Leu Ala Asn Glu Phe Thr Arg Met
                965                 970                 975
Ala Arg Asp Pro Pro Arg Tyr Leu Val Ile Lys Arg Glu Ser Gly Pro
            980                 985                 990
Gly Ile Ala Pro Gly Pro Glu Pro His Gly Leu Thr Asn Lys Lys Leu
            995                 1000                1005
Glu Glu Val Glu Leu Glu Pro Glu Leu Asp Leu Asp Leu Asp Leu
    1010                1015                1020
Glu Ala Glu Glu Asp Asn Leu Ala Thr Thr Thr Leu Gly Ser Ala
```

```
                    1025                1030                1035

Leu Ser Leu Pro Val Gly Thr Leu Asn Arg Pro Arg Gly Ser Gln
        1040                1045                1050

Ser Leu Leu Ser Pro Ser Ser Gly Tyr Met Pro Met Asn Gln Gly
        1055                1060                1065

Asn Leu Gly Glu Ser Cys Gln Glu Ser Ala Val Ser Gly Ser Ser
        1070                1075                1080

Glu Arg Cys Pro Arg Pro Val Ser Leu His Pro Met Pro Arg Gly
        1085                1090                1095

Cys Leu Ala Ser Glu Ser Ser Glu Gly His Val Thr Gly Ser Glu
        1100                1105                1110

Ala Glu Leu Gln Glu Lys Val Ser Met Cys Arg Ser Arg Ser Arg
        1115                1120                1125

Ser Arg Ser Pro Arg Pro Arg Gly Asp Ser Ala Tyr His Ser Gln
        1130                1135                1140

Arg His Ser Leu Leu Thr Pro Val Thr Pro Leu Ser Pro Pro Gly
        1145                1150                1155

Leu Glu Glu Glu Asp Val Asn Gly Tyr Val Met Pro Asp Thr His
        1160                1165                1170

Leu Lys Gly Thr Pro Ser Ser Arg Glu Gly Thr Leu Ser Ser Val
        1175                1180                1185

Gly Leu Ser Ser Val Leu Gly Thr Glu Glu Glu Asp Glu Asp Glu
        1190                1195                1200

Glu Tyr Glu Tyr Met Asn Arg Arg Arg Arg His Ser Pro Pro His
        1205                1210                1215

Pro Pro Arg Pro Ser Ser Leu Glu Glu Leu Gly Tyr Glu Tyr Met
        1220                1225                1230

Asp Val Gly Ser Asp Leu Ser Ala Ser Leu Gly Ser Thr Gln Ser
        1235                1240                1245

Cys Pro Leu His Pro Val Pro Ile Met Pro Thr Ala Gly Thr Thr
        1250                1255                1260

Pro Asp Glu Asp Tyr Glu Tyr Met Asn Arg Gln Arg Asp Gly Gly
        1265                1270                1275

Gly Pro Gly Gly Asp Tyr Ala Ala Met Gly Ala Cys Pro Ala Ser
        1280                1285                1290

Glu Gln Gly Tyr Glu Glu Met Arg Ala Phe Gln Gly Pro Gly His
        1295                1300                1305

Gln Ala Pro His Val His Tyr Ala Arg Leu Lys Thr Leu Arg Ser
        1310                1315                1320

Leu Glu Ala Thr Asp Ser Ala Phe Asp Asn Pro Asp Tyr Trp His
        1325                1330                1335

Ser Arg Leu Phe Pro Lys Ala Asn Ala Gln Arg Thr
        1340                1345                1350

<210> SEQ ID NO 69
<211> LENGTH: 1342
<212> TYPE: PRT
<213> ORGANISM: Homo sapiens

<400> SEQUENCE: 69

Met Arg Ala Asn Asp Ala Leu Gln Val Leu Gly Leu Leu Phe Ser Leu
1               5                   10                  15

Ala Arg Gly Ser Glu Val Gly Asn Ser Gln Ala Val Cys Pro Gly Thr
            20                  25                  30
```

-continued

```
Leu Asn Gly Leu Ser Val Thr Gly Asp Ala Glu Asn Gln Tyr Gln Thr
            35                  40                  45

Leu Tyr Lys Leu Tyr Glu Arg Cys Glu Val Val Met Gly Asn Leu Glu
 50                  55                  60

Ile Val Leu Thr Gly His Asn Ala Asp Leu Ser Phe Leu Gln Trp Ile
 65                  70                  75                  80

Arg Glu Val Thr Gly Tyr Val Leu Val Ala Met Asn Glu Phe Ser Thr
                 85                  90                  95

Leu Pro Leu Pro Asn Leu Arg Val Arg Gly Thr Gln Val Tyr Asp
                100                 105                 110

Gly Lys Phe Ala Ile Phe Val Met Leu Asn Tyr Asn Thr Asn Ser Ser
            115                 120                 125

His Ala Leu Arg Gln Leu Arg Leu Thr Gln Leu Thr Glu Ile Leu Ser
        130                 135                 140

Gly Gly Val Tyr Ile Glu Lys Asn Asp Lys Leu Cys His Met Asp Thr
145                 150                 155                 160

Ile Asp Trp Arg Asp Ile Val Arg Asp Arg Asp Ala Glu Ile Val Val
                165                 170                 175

Lys Asp Asn Gly Arg Ser Cys Pro Pro Cys His Glu Val Cys Lys Gly
            180                 185                 190

Arg Cys Trp Gly Pro Gly Ser Glu Asp Cys Gln Thr Leu Thr Lys Thr
        195                 200                 205

Ile Cys Ala Pro Gln Cys Asn Gly His Cys Phe Gly Pro Asn Pro Asn
    210                 215                 220

Gln Cys Cys His Asp Glu Cys Ala Gly Gly Cys Ser Gly Pro Gln Asp
225                 230                 235                 240

Thr Asp Cys Phe Ala Cys Arg His Phe Asn Asp Ser Gly Ala Cys Val
                245                 250                 255

Pro Arg Cys Pro Gln Pro Leu Val Tyr Asn Lys Leu Thr Phe Gln Leu
            260                 265                 270

Glu Pro Asn Pro His Thr Lys Tyr Gln Tyr Gly Gly Val Cys Val Ala
        275                 280                 285

Ser Cys Pro His Asn Phe Val Val Asp Gln Thr Ser Cys Val Arg Ala
    290                 295                 300

Cys Pro Pro Asp Lys Met Glu Val Asp Lys Asn Gly Leu Lys Met Cys
305                 310                 315                 320

Glu Pro Cys Gly Gly Leu Cys Pro Lys Ala Cys Glu Gly Thr Gly Ser
                325                 330                 335

Gly Ser Arg Phe Gln Thr Val Asp Ser Ser Asn Ile Asp Gly Phe Val
            340                 345                 350

Asn Cys Thr Lys Ile Leu Gly Asn Leu Asp Phe Leu Ile Thr Gly Leu
        355                 360                 365

Asn Gly Asp Pro Trp His Lys Ile Pro Ala Leu Asp Pro Glu Lys Leu
    370                 375                 380

Asn Val Phe Arg Thr Val Arg Glu Ile Thr Gly Tyr Leu Asn Ile Gln
385                 390                 395                 400

Ser Trp Pro Pro His Met His Asn Phe Ser Val Phe Ser Asn Leu Thr
                405                 410                 415

Thr Ile Gly Gly Arg Ser Leu Tyr Asn Arg Gly Phe Ser Leu Leu Ile
            420                 425                 430

Met Lys Asn Leu Asn Val Thr Ser Leu Gly Phe Arg Ser Leu Lys Glu
        435                 440                 445

Ile Ser Ala Gly Arg Ile Tyr Ile Ser Ala Asn Arg Gln Leu Cys Tyr
```

```
                450             455             460
His His Ser Leu Asn Trp Thr Lys Val Leu Arg Gly Pro Thr Glu Glu
465             470             475             480

Arg Leu Asp Ile Lys His Asn Arg Pro Arg Asp Cys Val Ala Glu
                485             490             495

Gly Lys Val Cys Asp Pro Leu Cys Ser Ser Gly Cys Trp Gly Pro
                500             505             510

Gly Pro Gly Gln Cys Leu Ser Cys Arg Asn Tyr Ser Arg Gly Gly Val
                515             520             525

Cys Val Thr His Cys Asn Phe Leu Asn Gly Glu Pro Arg Glu Phe Ala
                530             535             540

His Glu Ala Glu Cys Phe Ser Cys His Pro Glu Cys Gln Pro Met Glu
545             550             555             560

Gly Thr Ala Thr Cys Asn Gly Ser Gly Ser Asp Thr Cys Ala Gln Cys
                565             570             575

Ala His Phe Arg Asp Gly Pro His Cys Val Ser Ser Cys Pro His Gly
                580             585             590

Val Leu Gly Ala Lys Gly Pro Ile Tyr Lys Tyr Pro Asp Val Gln Asn
                595             600             605

Glu Cys Arg Pro Cys His Glu Asn Cys Thr Gln Gly Cys Lys Gly Pro
610             615             620

Glu Leu Gln Asp Cys Leu Gly Gln Thr Leu Val Leu Ile Gly Lys Thr
625             630             635             640

His Leu Thr Met Ala Leu Thr Val Ile Ala Gly Leu Val Val Ile Phe
                645             650             655

Met Met Leu Gly Gly Thr Phe Leu Tyr Trp Arg Gly Arg Arg Ile Gln
                660             665             670

Asn Lys Arg Ala Met Arg Arg Tyr Leu Glu Arg Gly Glu Ser Ile Glu
                675             680             685

Pro Leu Asp Pro Ser Glu Lys Ala Asn Lys Val Leu Ala Arg Ile Phe
                690             695             700

Lys Glu Thr Glu Leu Arg Lys Leu Lys Val Leu Gly Ser Gly Val Phe
705             710             715             720

Gly Thr Val His Lys Gly Val Trp Ile Pro Glu Gly Glu Ser Ile Lys
                725             730             735

Ile Pro Val Cys Ile Lys Val Ile Glu Asp Lys Ser Gly Arg Gln Ser
                740             745             750

Phe Gln Ala Val Thr Asp His Met Leu Ala Ile Gly Ser Leu Asp His
                755             760             765

Ala His Ile Val Arg Leu Leu Gly Leu Cys Pro Gly Ser Ser Leu Gln
770             775             780

Leu Val Thr Gln Tyr Leu Pro Leu Gly Ser Leu Asp His Val Arg
785             790             795             800

Gln His Arg Gly Ala Leu Gly Pro Gln Leu Leu Leu Asn Trp Gly Val
                805             810             815

Gln Ile Ala Lys Gly Met Tyr Tyr Leu Glu Glu His Gly Met Val His
                820             825             830

Arg Asn Leu Ala Ala Arg Asn Val Leu Leu Lys Ser Pro Ser Gln Val
                835             840             845

Gln Val Ala Asp Phe Gly Val Ala Asp Leu Leu Pro Pro Asp Asp Lys
                850             855             860

Gln Leu Leu Tyr Ser Glu Ala Lys Thr Pro Ile Lys Trp Met Ala Leu
865             870             875             880
```

```
Glu Ser Ile His Phe Gly Lys Tyr Thr His Gln Ser Asp Val Trp Ser
            885                 890                 895

Tyr Gly Val Thr Val Trp Glu Leu Met Thr Phe Gly Ala Glu Pro Tyr
            900                 905                 910

Ala Gly Leu Arg Leu Ala Glu Val Pro Asp Leu Leu Glu Lys Gly Glu
            915                 920                 925

Arg Leu Ala Gln Pro Gln Ile Cys Thr Ile Asp Val Tyr Met Val Met
            930                 935                 940

Val Lys Cys Trp Met Ile Asp Glu Asn Ile Arg Pro Thr Phe Lys Glu
945                 950                 955                 960

Leu Ala Asn Glu Phe Thr Arg Met Ala Arg Asp Pro Pro Arg Tyr Leu
            965                 970                 975

Val Ile Lys Arg Glu Ser Gly Pro Gly Ile Ala Pro Gly Pro Glu Pro
            980                 985                 990

His Gly Leu Thr Asn Lys Lys Leu Glu Glu Val Glu Leu Glu Pro Glu
            995                 1000                1005

Leu Asp Leu Asp Leu Asp Leu Glu Ala Glu Glu Asp Asn Leu Ala
        1010            1015            1020

Thr Thr Thr Leu Gly Ser Ala Leu Ser Leu Pro Val Gly Thr Leu
        1025            1030            1035

Asn Arg Pro Arg Gly Ser Gln Ser Leu Leu Ser Pro Ser Ser Gly
        1040            1045            1050

Tyr Met Pro Met Asn Gln Gly Asn Leu Gly Glu Ser Cys Gln Glu
        1055            1060            1065

Ser Ala Val Ser Gly Ser Ser Glu Arg Cys Pro Arg Pro Val Ser
        1070            1075            1080

Leu His Pro Met Pro Arg Gly Cys Leu Ala Ser Glu Ser Ser Glu
        1085            1090            1095

Gly His Val Thr Gly Ser Glu Ala Glu Leu Gln Glu Lys Val Ser
        1100            1105            1110

Met Cys Arg Ser Arg Ser Arg Ser Arg Ser Pro Arg Pro Arg Gly
        1115            1120            1125

Asp Ser Ala Tyr His Ser Gln Arg His Ser Leu Leu Thr Pro Val
        1130            1135            1140

Thr Pro Leu Ser Pro Pro Gly Leu Glu Glu Glu Asp Val Asn Gly
        1145            1150            1155

Tyr Val Met Pro Asp Thr His Leu Lys Gly Thr Pro Ser Ser Arg
        1160            1165            1170

Glu Gly Thr Leu Ser Ser Val Gly Leu Ser Ser Val Leu Gly Thr
        1175            1180            1185

Glu Glu Glu Asp Glu Asp Glu Glu Tyr Glu Tyr Met Asn Arg Arg
        1190            1195            1200

Arg Arg His Ser Pro Pro His Pro Pro Arg Pro Ser Ser Leu Glu
        1205            1210            1215

Glu Leu Gly Tyr Glu Tyr Met Asp Val Gly Ser Asp Leu Ser Ala
        1220            1225            1230

Ser Leu Gly Ser Thr Gln Ser Cys Pro Leu His Pro Val Pro Ile
        1235            1240            1245
```

| | | | | | | | | | | |
|---|---|---|---|---|---|---|---|---|---|---|
| Met | Pro 1250 | Thr | Ala | Gly | Thr 1255 | Thr | Pro | Asp | Glu 1260 | Asp | Tyr | Glu | Tyr | Met |
| Asn | Arg 1265 | Gln | Arg | Asp | Gly 1270 | Gly | Gly | Pro | Gly 1275 | Gly | Asp | Tyr | Ala | Ala |
| Met | Gly 1280 | Ala | Cys | Pro | Ala 1285 | Ser | Glu | Gln | Gly 1290 | Tyr | Glu | Glu | Met | Arg |
| Ala | Phe 1295 | Gln | Gly | Pro | Gly 1300 | His | Gln | Ala | Pro 1305 | His | Val | His | Tyr | Ala |
| Arg | Leu 1310 | Lys | Thr | Leu | Arg 1315 | Ser | Leu | Glu | Ala 1320 | Thr | Asp | Ser | Ala | Phe |
| Asp | Asn 1325 | Pro | Asp | Tyr | Trp 1330 | His | Ser | Arg | Leu 1335 | Phe | Pro | Lys | Ala | Asn |
| Ala | Gln 1340 | Arg | Thr | | | | | | | | | | | |